US011315185B1

(12) United States Patent
Gordon, III et al.

(10) Patent No.: US 11,315,185 B1
(45) Date of Patent: *Apr. 26, 2022

(54) BLOCKCHAIN INSTRUMENT FOR TRANSFERABLE EQUITY

(71) Applicant: Equity Shift, Inc., Raleigh, NC (US)

(72) Inventors: Thomas Marshall Gordon, III, Raleigh, NC (US); Gregory Frederick Bush, Cary, NC (US)

(73) Assignee: EQUITY SHIFT, INC., Raleigh, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 17/514,746

(22) Filed: Oct. 29, 2021

Related U.S. Application Data

(63) Continuation of application No. 16/918,368, filed on Jul. 1, 2020, now Pat. No. 11,164,254, which is a
(Continued)

(51) Int. Cl.
G06Q 20/38 (2012.01)
G06Q 40/04 (2012.01)
G06Q 20/06 (2012.01)
H04L 9/06 (2006.01)
G06Q 20/36 (2012.01)

(52) U.S. Cl.
CPC ......... *G06Q 40/04* (2013.01); *G06Q 20/0658* (2013.01); *G06Q 20/3678* (2013.01); *G06Q 20/389* (2013.01); *H04L 9/0637* (2013.01); *H04L 9/0643* (2013.01); *G06Q 2220/00* (2013.01)

(58) Field of Classification Search
None
See application file for complete search history.

(56) References Cited

U.S. PATENT DOCUMENTS 6,330,547 B1 12/2001 Martin
7,472,098 B2 12/2008 Shields et al.
(Continued)

FOREIGN PATENT DOCUMENTS

GB 2560671 A * 9/2018 ............ H04W 12/06
GB 2560671 B 6/2019
(Continued)

OTHER PUBLICATIONS

Bitcoinist.net"GetReadytoBeSurprisedDuringtheAdditionalRoundofe-ChatICO" Jan. 1, 2018BitcoinInsider, Retrieved fromtheInternet:httos:/Avww.bitcoininsider.org/article/13605/get-ready-be-surprised-during-additional-round-e-chatico (Year: 2018).*
(Continued)

*Primary Examiner* — Narayanswamy Subramanian
*Assistant Examiner* — Paul S Schwarzenberg
(74) *Attorney, Agent, or Firm* — Neo IP

(57) ABSTRACT

Systems and methods for offering and purchasing tokenized securities on a blockchain platform meeting current and future federal, state, and offering and holding entity rules and regulations. Tokenized securities purchased during or after the tokenized securities offering are tradable on a secondary market. The server computer of the tokenized securities provides an automated transfer capability for tokenized securities holders.

30 Claims, 178 Drawing Sheets

Related U.S. Application Data continuation-in-part of application No. 16/910,936, filed on Jun. 24, 2020, which is a continuation of application No. 16/518,329, filed on Jul. 22, 2019, now Pat. No. 10,699,340, which is a continuation-in-part of application No. 16/271,447, filed on Feb. 8, 2019, now Pat. No. 10,713,722.

(60) Provisional application No. 62/630,559, filed on Feb. 14, 2018.

(56) References Cited

U.S. PATENT DOCUMENTS

| | | | |
|---|---|---|---|
| 8,078,490 | B2 | 12/2011 | Wallman |
| 9,692,738 | B1 | 6/2017 | Wenneman et al. |
| 9,704,143 | B2 | 7/2017 | Walker et al. |
| 9,892,460 | B1 | 2/2018 | Winklevoss et al. |
| 9,898,782 | B1 | 2/2018 | Winklevoss et al. |
| 9,965,804 | B1 | 5/2018 | Winklevoss et al. |
| 9,965,805 | B1 | 5/2018 | Winklevoss et al. |
| 10,002,389 | B1 | 6/2018 | Winklevoss et al. |
| 10,255,108 | B2 * | 4/2019 | Dillenberger ........... G06F 16/28 |
| 10,255,635 | B1 | 4/2019 | Winklevoss et al. |
| 10,333,706 | B2 | 6/2019 | Smith et al. |
| 10,339,603 | B1 | 7/2019 | Sandulli |
| 10,356,094 | B2 | 7/2019 | Anton et al. |
| 10,636,180 | B2 | 4/2020 | Brogger |
| 2002/0002520 | A1 * | 1/2002 | Gatto ..................... G06Q 40/04 705/36 R |
| 2003/0149646 | A1 * | 8/2003 | Chen ..................... G06Q 40/00 705/35 |
| 2005/0091133 | A1 * | 4/2005 | Ballman ................. G06Q 40/00 705/35 |
| 2007/0078745 | A1 | 4/2007 | Kalt |
| 2007/0233589 | A1 | 10/2007 | Vasinkevich |
| 2012/0011044 | A1 | 1/2012 | Vasinkevich |
| 2012/0173403 | A1 * | 7/2012 | Foley ..................... G06Q 99/00 705/37 |
| 2014/0012780 | A1 * | 1/2014 | Sanders ............. G06Q 30/0213 705/36 R |
| 2014/0108277 | A1 | 4/2014 | Dresner et al. |
| 2015/0379510 | A1 | 12/2015 | Smith |
| 2016/0012465 | A1 | 1/2016 | Sharp |
| 2016/0035025 | A1 | 2/2016 | Lagman |
| 2016/0098723 | A1 | 4/2016 | Feeney |
| 2016/0321751 | A1 | 11/2016 | Creighton, IV et al. |
| 2016/0344737 | A1 | 11/2016 | Anton et al. |
| 2017/0011460 | A1 * | 1/2017 | Molinari ............... G06F 21/645 |
| 2017/0085545 | A1 | 3/2017 | Lohe et al. |
| 2017/0103391 | A1 | 4/2017 | Wilson, Jr. et al. |
| 2017/0155515 | A1 | 6/2017 | Androulaki et al. |
| 2017/0221052 | A1 | 8/2017 | Sheng et al. |
| 2017/0228822 | A1 | 8/2017 | Creighton, IV et al. |
| 2017/0289111 | A1 | 10/2017 | Voell et al. |
| 2017/0308893 | A1 | 10/2017 | Saraniecki |
| 2017/0330174 | A1 | 11/2017 | DeMarinis et al. |
| 2018/0096349 | A1 | 4/2018 | McDonald et al. |
| 2018/0294967 | A1 | 10/2018 | Roberts et al. |
| 2018/0323963 | A1 | 11/2018 | Stollman |
| 2019/0005469 | A1 * | 1/2019 | Dhupkar ................ G06Q 20/06 |
| 2019/0035014 | A1 | 1/2019 | Bell et al. |
| 2019/0043048 | A1 | 2/2019 | Wright et al. |
| 2019/0057448 | A1 | 2/2019 | Sandulli |
| 2019/0066206 | A1 | 2/2019 | Marks |
| 2019/0080402 | A1 | 3/2019 | Molinari et al. |
| 2019/0080404 | A1 | 3/2019 | Molinari et al. |
| 2019/0080405 | A1 | 3/2019 | Molinari et al. |
| 2019/0080406 | A1 | 3/2019 | Molinari et al. |
| 2019/0080407 | A1 | 3/2019 | Molinari et al. |
| 2019/0102409 | A1 | 4/2019 | Shi et al. |
| 2019/0130483 | A1 | 5/2019 | Jong |
| 2019/0139136 | A1 | 5/2019 | Molinari et al. |
| 2019/0156304 | A1 * | 5/2019 | Hudson ................. H04L 9/0637 |
| 2019/0164151 | A1 | 5/2019 | Doney et al. |
| 2019/0180372 | A1 | 6/2019 | Creighton, IV et al. |
| 2019/0180373 | A1 | 6/2019 | Creighton, IV et al. |
| 2019/0188793 | A1 | 6/2019 | Molinari et al. |
| 2019/0190697 | A1 | 6/2019 | Cunico et al. |
| 2019/0197622 | A1 | 6/2019 | Molinari et al. |
| 2019/0251629 | A1 | 8/2019 | Gordon, III et al. |
| 2019/0333051 | A1 | 10/2019 | Brogger |
| 2019/0340689 | A1 | 11/2019 | Gordon, III et al. |
| 2019/0347660 | A1 | 11/2019 | Wilkinson et al. |
| 2019/0385155 | A1 * | 12/2019 | Silverman ............. G06Q 40/04 |
| 2020/0076576 | A1 | 3/2020 | Ahlbäck et al. |
| 2020/0160320 | A1 * | 5/2020 | Williams ............... G06Q 20/36 |
| 2020/0175623 | A1 | 6/2020 | Howie |
| 2020/0265518 | A1 | 8/2020 | Spangenberg et al. |

FOREIGN PATENT DOCUMENTS

| | | | | |
|---|---|---|---|---|
| WO | 2017090041 | A1 | 6/2017 | |
| WO | 2017197110 | A1 | 11/2017 | |
| WO | 2017213943 | A1 | 12/2017 | |
| WO | 2019067603 | A1 | 4/2019 | |
| WO | WO-2019067603 | A1 * | 4/2019 | ......... G06Q 20/3678 |

OTHER PUBLICATIONS

Amano et al. "The Regulated Token (R-Token) Standard", Feb. 2018, Harbor, Retrieved from the Internet: https://harbor.com/rtokenwhitepaper.com (Year: 2018).

Aste et al., Blockchain Technologies: The Foreseeable Impacton Society and Industry, Published in: Computer (vol. 50, Issue: 9, pp. 18-28), Sep. 22, 2017 (https://ieeexplore.ieee.org/document/8048633) (Year: 2017).

Bitcoinist.net "Get Ready to Be Surprised During the Additional Round of e-Chat ICO", Jan. 1, 2018, Bitcoin Insider, Retrieved from the Internet: https://www.bitcoininsider.org/article/13605/get-ready-be-surprised-during-additional-round-e-chat-ico (Year: 2018).

Euler, The Token Classification Framework: A multi-Dimensional tool for understanding and classifying crypto tokens, Published—Untitled INC, Jan. 1, 2018 (http://www.untitled-inc.com/the-token-classification-framework-a-multi-dimensianal-tool-for-understanding-and-classifying-crypto-tokens/) (Year: 2018).

Stark, Law 360: ICO Token Purchasers May Be Entitled To A Refund, Published Portfolio Media. Inc.: Nov. 13, 2017 (https://www.law360.com/articles/985189/ico-token-purchasers-may-be-entitled-to-a-refund) (Year: 2017).

* cited by examiner

Inventor Registration

1. Accept Non-Disclosure Agreement
2. Provide e-mail address

Post Qualification with Third Party

1. Specify Agency and unique qualification ID
2. Verify legal name and address
3. Make investor documents available for download

Post Download

1. Agree to terms and conditions of PPM and Subscription Agreement
2. Provide wallet address

Investor Documents

- Private Placement Memorandum (PPM) (NOT signed)
  - Risk
  - Company charter
  - Business Plan

- Subscription Agreement (Signed)
  - What are you buying
  - Stock Definition

- Investor Qualification (Signed)
  - Proof of net income
  - or
  - proof of annual income

Register for an Account

☑ I accept the Privacy Notice and Terms and Conditions of Use.

First Name

> tgusta

Last Name

> guestme

Email Address

> tguestme@company.com

Register

Already have an Account?

Account Details

Account Confirmed!
Complete your profile to see your assets and receive notifications.

First Name

[ tgusta ]

Last Name

[ guestme ]

Email Address

[ tguestme@company.com ]

[ Add this Access ]

Mobile phone number

[ (703) 555-2987 ] [ Verify ]

How would you like to receive notifications and verification codes?

○ Notifications by email and verification codes by text message
○ Notifications by text message and verification codes by email

Account Confirmed!

Complete your profile to see your assets and receive notifications.

First Name tgusto

Last Name guestme

Email Address tguestme@company.com

Mobile phone number (703)-555-2987    Verified

How would you like to receive notifications and verification codes?

● Notifications by email and verification codes by text message
○ Notifications by text message and verification codes by email

FIG. 30

Company Details

Info  Preferences  Affiliates  Groups  Members  Blacklist

| Name | Tax Identifier | Parent Company | Banking | |
|---|---|---|---|---|
| FINRA TEST | | | Not Registered | |

+ Add Company

FIG. 32

| Info | Board Members | Officers | Custom Groups | Blacklist | Affiliates |

| Email | Name | Title/Description |
|---|---|---|
| sschumm@company.com | Savannah Schumm | Chairman/Joined 2007 |
| dortiz@company.com | Dianna Ortiz | Vice Chair/Joined 2012 |
| mauer@company.com | Madalyn Auer | Secretary/Joined 2009 |
| bgoodwin@company.com | Buford Goodwin | Treasurer/Joined 2018 |

Company A

Info    Board Members    Officers    Custom Groups    Bl...

| Email | Name | Title |
|---|---|---|
| sschumm@company.com | Savannah Schumm | CEO |
| dortiz@company.com | Dianna Ortiz | COO |
| mauer@company.com | Madalyn Auer | General Counsel |
| bgoodwin@company.com | Buford Goodwin | CFO |
| bkertzmann@company.com | Bethany Kertzmann | CTO |
| pblick@company.com | Pierce Blick | Vice President, HR |

Add a Custom Group

Name

Include Groups

☑ Class A
☑ Class B
☑ Class C
☐ Directors
☐ Executives
☐ Trusted Buyers
☐ Brokerage Partners Save Cancel

FIG. 36

< Back

Custom Group Name  Edit

Linked Groups

Seed Round, Series A

Group Members

+ Link Group        + Add Member

| Email or Domain | Name | Associated Shareclasses | |
|---|---|---|---|
| kirtin.juliet@yahoo.com | Henry Kuhn | - None - | ... |
| albina.merz@gmail.com | Rudolph Schimmel | Seed Round, Series A | ... |
| mccullough.brisa@hotmail.com | Dylan Moore | - None - | ... |
| mwindler@gmail.com | Mauricio Harvey | - None - | ... |
| hector.mohr@hotmail.com | Norbert Wunsch | - None - | ... |
| pkuhic@gmail.com | Cheyenne Ortiz | - None - | ... |
| cayla.dare@yahoo.com | Claudine Senger | Seed Round, Series A | ... |
| erunolfsson@yahoo.com | Vincenza Jerde | Seed Round, Series A | ... |
| daron69@gmail.com | Keven Feil | Seed Round, Series A | ... |
| vgleichner@yahoo.com | Gennaro Ortiz | Seed Round, Series A | ... |

FIG. 37

Link an Existing Group

Include Groups

- ☑ Class A
- ☑ Class B
- ☑ Class C
- ☐ Directors
- ☐ Executives
- ☐ Trusted Buyers
- ☐ Brokerage Partners

Save

Cancel

FIG. 39

Company A

Info | Board Members | Officers | Custom Groups | Black List | Affiliates

| Email | Name | | | |
|---|---|---|---|---|
| | | | | + Add |
| bjohnson@companyb.com | Bob Johnson | Former owner | ... | |
| smcpherson@scams.com | Sam McPherson | Scammer | ... | |
| dsmith@insolventfirm.com | Dan Smith | Insolvent firm | ... | |

FIG. 40

Add to Blacklist

Adding a domain to your blacklist will block any user with an account from that domain from seeing your company info, documents, or participating in any transfer events.

Email Address or Domain

Name (optional)

Description (optional)

Cancel   Save

FIG. 41

Activity

Action Requested | Offer Status | Closing Status

No Recent Activity to Report

Activity

Action Requested ● Offer Status ● Closing Status ● Reconcile

Page: 1 of 1

Request your Approval (or disapproval) of an equity sale with Equity Shift, Inc.

Tom Creative requesting to sell 100 shares of Seed Round at a price of $8.00

Do you approve or disapprove of the Sale?

Approve

Disapprove

Share Classes

Share Classes
Upload Shareholders

Share Classes

| Name | Share Type | | Fully Diluted | | |
|---|---|---|---|---|---|
| Seed Round | Common Stock | + Add Share Class | 7,000 | ... | ... |
| Series A | Preferred Stock | | 250,000 | | |

Share Classes

Share Classes  Upload Shareholders

Share Classes > Seed Round

Details  Owners

Share Class Name

[ Seed Round ]

Authorized Shares

[ 1,000,000 ]

Date Closed

[ Feb 14, 2018 ]

Issued 7,000

Outstanding 7,000

Fully Diluted 7,000

Reporting Exemption

[ Regulation D, Rule 506(c) ⌄ ]

Votes Per Share

[ 1 ]

Cancel   Save

Share Classes

Share Classes    Upload shareholders

☐ Download spreadsheet template shareholder-upload-example.xlsx    Browse

Summary

| Share Class | Number of Owners | Number of Holdings | Analyzed / Empty Rows | Errors |
|---|---|---|---|---|
| Seed Round | 4 | 4 | 4/0 | 0 |
| Series A | 0 | 0 | 0/0 | 0 |
| Overall | 4 | 4 | 4/0 | 0 |

Upload Complete
Imported 4 new owners and 4 holdings

Share Classes > Option Plan I

Details  Owners

Share Class Name

[ Option Plan I ]

Authorized Shares

[ 1,000,000 ]

Date Closed

[ Apr 18, 2018 ]

Issued

[ 0 ]

Outstanding

[ 0 ]

Fully Diluted

[ 3,000 ]

Reporting Exemption

[ Securities Act, Rule 701 ▼ ]

Votes Per Share

[ 1 ]

Vesting Schedule(s)

[ 1 yr cliff, 3 year flat ▼ ] [ Edit ]

[ + Add Vesting Schedule ]

Conversion Ratio

[ 1 ] : [ 1 ]

Converts into Share Class

[ Seed Round ▼ ]

[ Cancel ] [ Save ]

FIG. 58

Share Classes > Option Plan I

Details  Owners

Owner

John Doe
jdoe@company.com

Total Number Granted 2,000

Date Granted

Apr 18, 2018

Holding Period Commencement Date

Apr 18, 2018

Affiliate Shares (i.e., purchased from Issuer, Officer, Director or other affiliate of the issuer)

☒ Affiliate Shares

Strike Price $ 1.25

Initial Vested Grants

0

Vesting Schedule

Custom  ✕

[+ View]

Expiration Date

Apr 18, 2022

[Cancel]  [Save]

New Issuance - Step 1: Info

New Issuance Targets

Total Raise Goal

[                    ]

Price

[                    ]

Minimum Raise Amount

[                                        ]

● When the minimum raise has been met, the compay can begin to collect funds for this issuance Close Date

[ 02/03/2020 📅 ]

Minimum Participation Guidelines

These are suggested parameters. Participants can enter other quantities that can be accepted or rejected.

Guideline

[ Dollar Amount ▼ ]

Dollar Amount

Shares

Increment

New Issuance - Step 2: Invite Participants

Participants will be emailed terms of the new issuance. The company can verify a participant's qualifications and decide whether they will approve the participant.

| Name | Email | Accreditation Verification |
|---|---|---|
| John Doe | jdoe@company.com | 3rd Party Verification requested ▼ |

- 3rd party verification requested
- Self verification
- Verified (company waived)

Add ▶

FIG. 70

New Issuance Details  Edit

Info    Participants    Documents

New Issuance Targets

Total Raise Goal
$5,000,000

Price per Share
$15.00

Minimum Raise Amount
$2,000,000
● When the minimum raise has been met, the company can begin to collect funds for this issuance Start Date
02/03/2020

Close Date
03/01/2020

Minimum Participation Guidelines
These are suggested parameters. Participants can enter other quantities that can be accepted or rejected.

Guideline
Dollar Amount ▼

Minimum Quantity
$100,000
● helpful helper text

Increment
$25,000
● helpful helper text

Save

FIG. 71

Transfer Window: July 1, 2019 – October 3, 2019

Participating Share Classes: Share Class Name 1, Share Class Name 2
Asks: 10
Completed Transactions: 5

[ ▼ Filter by company name ]  [ Filter by activity  › ]

Ask Received

10,000,000 shares
Ask: $

July 2, 2019 12:39pm

Transaction Complete

10,000,000 shares
Cost per share: $
Total cost: $

July 2, 2019 12:39pm

Ask Received

10,000,000 shares
Ask: $

July 9, 2019 12:39pm

Transaction Complete

10,000,000 shares
Cost per share: $
Total cost: $

Transfer Windows

Current Prior Prior Closings

| Share Classes | Start Date | End Date | # closings |
|---|---|---|---|
| Seed Round | Mar 5, 2020 | Jun 4, 2020 | 1 |
| Seed Round | Mar 5, 2020 | Jun 5, 2020 | 1 |

FIG. 73

Transfer Windows

Current  *Prior*  *Prior Closings*

| Share Classes | Status | Start Date | End Date | # Open Closings | # Finished Closings | |
|---|---|---|---|---|---|---|
| Seed Round | Scheduled | May 20, 2020 | Jul 14, 2020 | 0 | 0 | ••• |
| Seed Two | Open | Apr 23, 2020 | Jul 22, 2020 | 0 | 1 | ••• |
| Series A | Open | May 6, 2020 | Jul 28, 2020 | 0 | 1 | ••• |

[+ Add Transfer Window]

FIG. 74

Transfer Windows

Current  Prior  Prior Closings

Apr 07, 2020

| Share Class | Status | Closing Start Date | Closing End Date | Company | Seller(s) | Buyer(s) | Document Status |
|---|---|---|---|---|---|---|---|
| Seed Round | Completed | Apr 15, 2020 | Apr 13, 2020 | Fees: $460.97<br>Status: completed<br>Received: $460.97 | Tim Tester<br>Price: $7.31<br>Qty: 2,811<br>Fees: $50.00<br>Status: completed<br>To Receive: $20,498.41<br>Received: $20,498.41 | Bobby Answer<br>Price: $7.31<br>Qty: 2,811<br>Fees: $410.97<br>Status: completed<br>Costs: $20,959.38<br>Paid: $20,959.38 | |
| Seed Round | Completed | Apr 15, 2020 | Apr 13, 2020 | Fees: $91.25<br>Status: completed<br>Received: $91.25 | Betty Worst<br>Price: $7.50<br>Qty: 275<br>Fees: $50.00<br>Status: completed<br>To Receive: $2,012.50<br>Received: $2,012.50 | Tim Tester<br>Price: $7.50<br>Qty: 275<br>Fees: $41.25<br>Status: completed<br>Costs: $2,103.75<br>Paid: $2,103.75 | |

Current Transfer Windows > Edit Transfer Window

Share Selection | Transfer Steps

← Back to Steps

Step 2: Approval - Please indicate which party(ies) are required to approve a transfer.

Company Administrators
☒ Equity Shift, Inc.

Share Class Shareholders
☐ Seed Round
☐ Series A
☐ Seed Two
☐ Option Plan I

Individual Shareholders

Select...

Days to Approve

Current Transfer Windows > Edit Transfer Window

Share Selection | Transfer Steps

← Back to Steps

Step 3: Bidding - Please select parameters for an Ask/Bid

☐ Use previous Offer participants in this step
☐ Set Minimum Bid at Seller Ask Price
☑ Require Seller to Accept Highest Bid
☐ Allow Bidders to Bid a different quantity than was Asked by the Se Minimum Bid Price Increment ($ or %)
2 %

Days to Bid
1

Minimum Hours to keep Bidding open after latest Bid
2

Current Transfer Windows > Edit Transfer Window

Share Selection    Transfer Steps

← Back to Steps

Step 5: Refusal Right - Please indicate which party(ies) have Right of First Refusal transfer rights.

Company Administrators
- Equity Shift, Inc.

Share Class Shareholders
- ☑ Seed Round
- Series A
- Seed Two
- Option Plan 1

Individual Shareholders

Select...

How to Handle Multiple First Refusal Participants
- First to exercise can acquire All
- Use Pro Rata for multiple exercising participants

- Allow Prospective Transferees to participate in Pro Rata
- ☑ Allow Unsubscribed to Participate Days to Exercise Refusal Right n/a Current Transfer Windows > Edit Transfer Window

Transfer Steps

← Back to Steps

Step 4: Undersubscription Right - Please indicate which party(ies) have Undersubscription rights.

Refused Right Participants

○ Blue Sky, LLC, Series A Shares, Common Shares, Founder Shares,

How to Handle Multiple Undersubscribed Participants

○ First to exercise can acquire All
● Use Pro Rata for multiple exercising participants Days to Exercise Undersubscribed rights

[ 2 ]

Save

Cancel

FIG. 87

Company Details

Info Preferences Affiliates Groups Members Blacklist

Duration in Days Calculation
- Business Calendar (i.e., Gregorian calendar that excludes Saturday and s
- Gregorian Calendar

Banking Fees ($ or %)
Transfer Retry Fee  $ 0.00

Transaction Fees

| Name | Who Pays | Method | Amount | |
|---|---|---|---|---|
| | | | | + |
| buyer fee | Buyer | Percentage | 2.00000 % | × |
| Seller fee | Seller | Fixed | $50.00 | × |

FIG. 88

Company Details

Info  Preferences  Affiliates  Groups  Members  Blacklist

Shareholders

Betty Worst
Test1 User
bworst@company.com
Tom Creative

Add

| Affiliate | | Termination Date |
|---|---|---|
| ○ Bobby Answer | | |
| ○ Tim Tester | | May 7, 2020 | note: An affiliate can only be deleted 1 month after termination

FIG. 89

Upload New Document
File
 Choose File
Document Name
Document Requirements
 Optional
 Read Required
 Signature Required
Cancel  Save
FIG. 94

Data Room

Documents

| ▼ Filter by document name | All Groups ⌄ | ☐ View Archived Documents | | ⬆ Upload Document |
|---|---|---|---|---|
| Document Name | Requirements | Last modified | | |
| Privacy Policy | Optional | August 3, 2019 by bryan@newcorp.com | | |
| Class A Shareholder Rights | Optional | October 3, 2019 by bryan@newcorp.com | | |
| Standard Transfer Agreement | Optional | February 1, 2019 by sarah@newcorp.com | Manage Document | |
| Preferred Transfer Agreement | Optional | February 1, 2019 by elaine@new | Archive Document | |
| Public Disclosure | Optional | February 1, 2019 by bryan@new | Version History | |
| | | | Delete | |

FIG. 97

Add Group

☐ Group

☑ Board Members

☑ Officers

☑ Secretary

☐ All Employees

[Add groups]

[Cancel]

FIG. 100

New Messages + Files  edit

| Messages | Visibility | Documents | | |
|---|---|---|---|---|
| Name | Date Added | Response Required | | |
| legal-doc.pdf | Jul 13, 2019 | Yes (3 of 9 respondents) | ... | |
| Disclosures.pdf | Jul 27, 2019 | No | ... | |
| Due-diligence.pdf | Aug 13, 2019 | No | ... | |

Add +

< Back

Poll Results: Employee Liquidity Event

Audience - 24 of 24 Respondents 
Board Members, Preferred Investors

Question 1

Do you approve the initiation of transfer window for employees of Blue Sky from 02/02/2020 - 02/29/2020

Results
Yes
24 - (100%)
No
0 - (0%)

Question 2

Have you seen this example of a multiple choice question before?

Results
I think I have
24 - (100%)
Something something multiple choice
0 - (0%)
Most defintely not
0 - (0%)

FIG. 106

Poll Shareholders
You will send a poll to shareholders about the possibility of their participation in an aggregate sale
Expiration Date
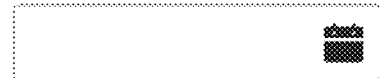
Approval Requirement
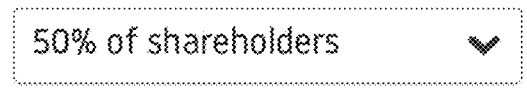
Cancel    Send Poll
FIG. 107

Profile Details

Please provide us with the following information. We gather this information so that we can contact you in the future, complete our corporate records, and for regulatory and tax purposes. Please see our Terms and Conditions and Privacy Policy for more information.

Changes are restricted due to banking registration rules.

As a shareholder, what is your legal status?

| An Individual | An Entity or Trust |

First Name: Thomas

Last Name: Owner

Birth Date: 04 / 06 / 1955

Social Security Number: 444-55-6699

Email: towner@company.com

Address:
8480 Honeycutt Rd Ste 112
Raleigh NC 27615-2261

[Cancel] [Save]

My Shares

| Company | Share Class | Share Type | Shares | Transfer Window | |
|---|---|---|---|---|---|
| Company A | Seed Round | Common Stock | 1,200 (Issued) | Open (closes May 26, 2020) | Sell Shares |
| Company A | Series A | Preferred Stock | 35 (Issued) | -- | |
| Company A | Series B | Preferred Stock | 5,000 (Issued) | -- | Holding Period: 20 days |
| Company A | Seed Round 2 | Common Stock | 500 (Issued) | -- | |
| The Blue Sky Company, Inc. | SANDBOX | Common Stock | 100 (Issued) | Open (closes Apr 27, 2020) | Sell Shares |

FIG. 110

Activity

Page: 1 of 1

Signature Required to complete transaction with The Blue Sky Company, Inc. — Please sign the Sample Purchase Agreement.pdf document using the DocuSign service. Review and Sign

Payment request to purchase shares of The Blue Sky Company, Inc. — Please send $1,505.00 to purchase 200 shares of SANDBOX. Make Payment

FIG. 112

Attachments

| Name | Response Required | |
|---|---|---|
| Legal-doc.pdf | Yes | |
| Disclosures.pdf | No | |
| Due-diligence.pdf | No | |

[Close]

FIG. 115

Activity

Execute Offer in Equity Shift, Inc.

Page: 1 of 1

There are 100 shares of Seed Round being sold at a price of $8.00. You have a Right to purchase shares in this transaction. If multiple parties accept this offer, you will enter a bidding process to determine who can purchase the shares.

Do you wish to execute your offer right to purchase the shares?

Yes  No

FIG. 116

Make Payment

| | |
|---|---|
| Company: | Equity Shift, Inc. |
| Share Class: | Seed Round |
| Number of Shares: | 60 |
| Price per Share: | $8.00 |
| Share Cost: | $480.00 |
| Fees: | $9.60 |
| Total Cost: | $489.60 |

☐ I hereby authorize the payment of $489.60 from my 'Dev2 Account' checking account at 'SANDBOX TEST BANK' to 'Equity Shift, Inc.' for the purchase of equity described above using the Automated Clearing House (ACH) network. This authorization includes the initiation of credit entries, and, if necessary, debit entries and adjustments for any credit entries in error.

Submit

Cancel

FIG. 117

Activity

Execute Right of First Refusal in Equity Shift, Inc.

Page: 1 of 1

There are 100 shares of Seed Round being sold at a price of $8.00. You have a Right of Refusal to purchase shares in this transaction.

Do you wish to execute your right of first refusal and purchase your pro rata ownership of the shares?

Yes

Make Bid

Company

The Blue Sky Company, Inc.

Share Class

SANDBOX

Number of Shares

200

Ask Price $8.00

Bid Number of Shares

Bid

Cancel

FIG. 128

Make Bid

Bid Number of Shares

200

Bid Price per share ( min $5.00, max $10.00 )

$ 7.50

Expiration Date

Apr 27, 2020

Previous Bids

| Bid # Shares | Bid Price | Expiration |
|---|---|---|

Bid

Cancel

FIG. 129

Place Bid 
Preferred A - 25,000 shares
Ask Price: $3.95
Highest Bid: $3.30 (expires Oct 31, 2019)
 Bid Calculator
Your bid price
3.85|
Bid expiration
Oct 31, 2019 
Cancel    Place Bid
FIG. 130

Asks

Current Asks | Ask History

| Company Name | Share Class | Shares | Ask Price | Highest Bid | My Bid | Ask Expiration | |
|---|---|---|---|---|---|---|---|
| TMG Company1 | Seed Round | 125 | $4.25 | -- | -- | Jun 30, 2020 | ••• |

FIG. 131

Asks

Current Asks | Ask History

Filter by Company or Share Class

| Company Name | Share Class | Shares | Ask Price | Highest Bid | My Bid | Ask Expiration |
|---|---|---|---|---|---|---|
| Company A | Seed Round | 250 | $3.00 | $2.25 for 250 shares | $2.25 | May 26, 2020 |
| The Blue Sky Company, Inc. | SANDBOX | 200 | $8.00 | $7.50 for 200 shares | $7.50 | Apr 27, 2020 |

Successfully updated offer

Activity | My Shares | Asks

Accept Bid

Company

TMG Company1

Share Class

Seed Round

Number of Shares

21

Ask Price $5.00

Existing Bids

| Bid # Shares | Bid Price | Expiration |
|---|---|---|
| 31 | $4.00 | Jun 26, 2020 6:27 PM |

Cancel

FIG. 134

Accept Ask

Company

TMG Company1

Share Class

Seed Round

Number of Shares

21

Accepted Bid Price $4.00

Expiration Date

06/26/2020

Once you accept the Ask, the Company will review the transaction and if it is approved, you will be notified to review and sign documents and to remit payment.

Cancel   Accept

FIG. 135

SHARE PURCHASE AGREEMENT

THIS SHARE PURCHASE AGREEMENT (this "*Agreement*") is made as of May 7, 2020

SECTION 1
AUTHORIZATION AND SALE AND ISSUANCE OF SHARES 1.1 <u>Authorization</u>. The Company will have authorized before the Initial Closing (as defined below) the sale and issuance of three million (3,000,000) Common Shares. The Common Shares shall have the rights, preferences, privileges and restrictions set forth in the Company's Limited Liability Company Agreement in the form of Exhibit B attached hereto (the "*Operating Agreement*").

1.2 <u>Issuance and Sale</u>. Subject to the terms and conditions of this Agreement, at the Initial Closing (as defined below), the Company shall issue and sell to the Investor _____ (the "*Shares*").

1.3 Each Share so issued shall be treated as having, on the date of issuance, a purchase price of $8.00 _____ (the "*Purchase Price*"), and such amount shall be deemed to be a Capital Contribution (as defined in the Operating Agreement) with respect to such Share.

FIG. 136

Company

Purpose UX, LLC ▼

Share Class

Pref A ▼

Quantity

50,000

Valuation (in millions)

Today

12.5

Future

24.5

$9.20

$7.15

Confidence
40%

Confidence
70%

$4.82

$4.25

Today — Future

Time Frame

18 months

FIG. 147

Convert or Sell Options

| | |
|---|---|
| Share class: | Preferred A |
| Vested options: | 25,000 |
| Quantity to convert: | 25,000 |
| Conversion Ratio: | 1:1 |
| Shares after conversion: | 25,000 |
| Strike Price: | $3.25 |
| Payment Due: | $81,250 |

◉ Sell options

Payment will be automatically deducted at the time of the completed sale. Shares will transfer to buyer as per your Shareholder Agreement.

○ Convert options

Payment will be due now. Once payment is processed, you will own the quantity of the shares listed, with rights outlined in accordance with your Shareholder Agreement.

[Cancel] [Next >]

FIG. 149

Convert Note ✕

● Convert to shares
○ Reinvest principal with interest
○ Other conversion method

| | |
|---|---|
| Share class: | Common |
| Initial investment: | $100,000.00 |
| Investment w/ interest: | $125,000.00 |
| Quantity to convert: | $125,000.00 |

| | |
|---|---|
| Company Valuation: | $20 million |
| Share Price: | $10 |
| Discount: | -- |

Shares after conversion: 12,500

When you convert this note, you will own the quantity of shares listed, with rights outlined in accordance with your Shareholder Agreement.

[ Cancel ] [ Convert Note ]

FIG. 150

Convert Options 

| | |
|---|---|
| Share class: | Common |
| Vested options: | 25,000 |
| Quantity to convert: | 25,000 |
| Conversion Ratio: | 3:1 |
| Shares after conversion: | 75,000 |
| Strike Price: | $5.50 |
| Payment Due: | $137,500 |

When you convert these options, you will be taken to a payment processing screen. Once payment is received, you will own the quantity of the shares listed, with rights outlined in accordance with your Shareholder Agreement.

[ Cancel ]    [ Make Payment ]

FIG. 151

Convert Restricted Stock Units

| | |
|---|---|
| Share class: | Common |
| Vested RSUs: | 15,000 |
| Quantity to convert: | 10,000 |
| Conversion Ratio: | 3:1 |
| Shares after conversion: | 30,000 |

When you convert these restricted stock units, you will own the quantity of the shares listed, with rights outlined in accordance with your Shareholder Agreement.

Cancel    Convert

Convert Warrants ✕

| | |
|---|---|
| Share class: | Common |
| Warrants: | 1,000 |
| Quantity to convert: | 1,000 |
| Conversion Ratio: | 3:1 |
| Shares after conversion: | 3,000 |
| Strike Price: | $5.50 |
| Payment Due: | $5,500.00 |

When you convert these warrants, you will be taken to a payment processing screen. Once payment is received, you will own the quantity of the shares listed, with rights outlined in accordance with your Shareholder Agreement.

Cancel | Make Payment

Company A

1234 Main St.
Denver, NC 27703
910-555-1212

Business Industry: Technology
Industry Classification: ---

← Back

History  Payments  Documents

[Create Liquidity Event]

Transactions

| Company | Share Class | Shares | Closing Price | Date | Buyer | Seller |
|---|---|---|---|---|---|---|
| Company A | Preferred | 145 | $8.00 | May 1, 2020 | Jane Doe | Michael Ng |
| Company A | Seed Round | 20 | $7.00 | May 4, 2020 | Michael Ng | Sandra Smith |

FIG. 159

Company A

1234 Main St.
Durham, NC 27701
919-555-1212

Business Industry: Tech/other
Industry Classification: --

< Back

*Active Deals*

Company A
Series B
Common Stock
100,000 Shares

Ask: $4.25
Valuation: $1.2 Billion
Transfer Window Closes: 06/31/2020

Deal Status: Active

History    Payment    Documents

Transactions

| Company | Share Class | Shares | Closing Price | Date |
|---|---|---|---|---|
| Company A | Series A | 125,000 | $5.00 | 05/20/2019 |

Invite a New Client

You can invite propsective clients to see a list of companies you have relationships with and broker deals.

Name

[This can be an individual or an entity/trust]

Email Address

Invite

Cancel

Invite Clients to this Deal

You can invite clients to participate this deal.

Filters

Search: [          ]

Business Industry: [ All ▾ ]

[Reset] [Apply]

○ Acme Private Co.
1234 Main St.
Durham, NC 27701
919-555-1212
Business Industry: Tech/other
Industry Classification: ---
⋯

◉ Joe Exotic
1234 Main St.
Durham, NC 27701
919-555-1212
joe.exotic@investco.com
⋯

< 1 2 3 4 5 ... 10 >

[Send Invites]

FIG. 165

Document Templates

Filters

Search

Visibility Groups

Deal Status
All

Reset

| File | File Size | Visibility Groups | Deal Status | |
|---|---|---|---|---|
| PurchaseAgreementSeedRound.pdf | 120 KB | Seed Round | Closed | ⋮ |
| EmployeeStockOptions.pdf | 110 KB | All Employees | In Progress | ⋮ |
| PurchaseAgreementTransferWindow.pdf | 90 KB | Seed Round, Common | Open | ⋮ |

Employee Roster

Filters

Search

FINRA ID#

Reset

| Employee | FINRA ID# | Email | Phone | |
|---|---|---|---|---|
| Bill Sanders | 1264123 | bill.sanders@example.com | (209) 555-0104 | ⋯ |
| Rita Henry | 264539 | rita.henry@example.com | (505) 555-0125 | ⋯ |
| Gary Herrara | 3125923 | gary.herrara@example.com | (252) 555-0126 | ⋯ |
| Hugh Fleming | 0926288 | hugh.fleming@example.com | (208) 555-0112 | ⋯ |
| Ralph Phillips | 1869863 | ralph.phillips@example.com | (225) 555-0118 | ⋯ |
| Stanley Baker | 6903129 | stanley.baker@example.com | (406) 555-0120 | ⋯ |

Employee Name - FINRA ID: 1264123 employee@email.com
919-555-1212

← Back

History    Licenses

License Date and Status

| First Name | Last Name | CRD# | Date of Licensing | Other Licenses | Other Licenses Date |
|---|---|---|---|---|---|
| Kathleen | Kennedy | 1287645 | January 4, 2020 | Series 7 | March 4, 2020 |
| John | Jackson | 1359789 | March 6, 2020 | Series 24 | April 16, 2020 |
| William | Smith | 1408273 | April 15, 2020 | Series 24<br>Seires 63 | April 30, 2020<br>May 5, 2020 |
| ⋮ | ⋮ | ⋮ | ⋮ | ⋮ | ⋮ |

Reports

Filters

Search

Deal Status
All ⌄

| Report | Last Run | |
|---|---|---|
| Quarterly Sales | Aug 14, 2013 | ⋮ |
| Quarterly Transactions | May 7, 2014 | ⋮ |
| Quarterly Commissions | May 13, 2018 | ⋮ |

BLOCKCHAIN INSTRUMENT FOR TRANSFERABLE EQUITY

CROSS-REFERENCES TO RELATED APPLICATIONS

The present invention is related to and claims priority from the following U.S. patent documents: this application is a continuation of U.S. patent application Ser. No. 16/918, 368, filed Jul. 1, 2020, which is a continuation-in-part of Ser. No. 16/910,936, filed Jun. 24, 2020, which is a continuation of U.S. patent application Ser. No. 16/518,329, filed Jul. 22, 2019 and issued as U.S. Pat. No. 10,699,340, which is a continuation-in-part of U.S. patent application Ser. No. 16/271,447, filed Feb. 8, 2019 and issued as U.S. Pat. No. 10,713,722, which claims priority from U.S. Provisional Patent Application No. 62/630,559, filed Feb. 14, 2018. Each of the above listed applications is incorporated herein by reference in its entirety.

BACKGROUND OF THE INVENTION

1. Field of the Invention

This invention relates to systems and methods for offering, purchasing, and reselling blockchain instruments for transferable equity. More particularly, the present invention provides systems and methods for offering, purchasing, and reselling tokenized securities on an immutable ledger-based platform.

2. Description of the Prior Art

A blockchain is a distributed database storing a registry of transactions and records across a peer-to-peer network. The registry is replicated on every computer that uses the network. The transactions and records are built into blocks and secured through cryptography. Each block contains a timestamp and a hash link to a previous block. A cryptocurrency is a digital medium of exchange using cryptography to secure the transactions and to control the creation of additional units of the cryptocurrency. The blockchain technology is the underlying technology for the first cryptocurrency Bitcoin which was created in 2009. Many different cryptocurrencies have been created since then. An initial coin offering (ICO) has become a wildly popular means of crowdfunding by launching a new cryptocurrency. During the ICO, a company offers a new cryptocurrency or token which can be used for products or services on their platform in the future in exchange for cryptocurrencies of immediate, liquid value, such as Bitcoin and ETHEREUM. ICOs have provided a means by which start-up companies can avoid costs of regulatory compliance and intermediary financial organizations, while increasing risk for investors. ICOs may fall outside existing regulations or may need to be regulated depending on the nature of the project. Some jurisdictions, such as China and South Korea, have banned ICOs altogether. In the United States, the Securities and Exchange Commission (SEC) has been sending out warnings regarding ICOs and cryptocurrencies and indicating tokens offered during an ICO may be considered securities.

Exemplary US Patent Documents relevant to the prior art include:

U.S. Pat. No. 9,704,143 for Cryptographic currency for securities settlement by inventors Walker et al., filed Oct. 30, 2014 and issued Jul. 11, 2017, discloses security settlement in financial markets and cryptographic currencies. Particular portions of the disclosure are directed to a cryptographic currency protocol and to a cryptographic currency that includes a positional item. The cryptographic currency protocol supports a virtual wallet that, in various embodiments, is a security and cash account for storing and managing the cryptographic currency. Opening a transaction via the virtual wallet to transfer the cryptographic currency is a strong guarantee of the availability of funds in the virtual wallet because, e.g., funds are not transacted unless the commit phase is successful.

U.S. Patent Publication No. 2016/0012465 for System and method for distributing, receiving, and using funds or credits and apparatus thereof by inventor Sharp, filed Feb. 8, 2015 and published Jan. 14, 2016, discloses a system for performing various methods of sending, receiving, distributing, and utilizing funds and/or credits is disclosed. In many embodiments, various communications platforms and/ or protocols may be employed. Methods of sending funds or credits may be practiced in different environments, including physical and electronic environments. According to some preferred embodiments, users may perform a variety of transactions including various gifting functions, re-gifting functions, and social interactions simply, through various types of electronic communications, including, but not limited to electronic messaging.

U.S. Patent Publication No. 2017/0308893 for Asset and obligation management using flexible settlement times by inventor Saraniecki, filed Aug. 25, 2016 and published Oct. 26, 2017, discloses a system and method for managing a transaction having at least one enduring obligation and at least one repo obligation with respect to a plurality of assets, where the system includes at least one signing server for authorizing the at least one enduring obligation and the at least one repo obligation.

U.S. Patent Publication No. 2017/0085545 for Smart Rules and Social Aggregating, Fractionally Efficient Transfer Guidance, Conditional Triggered Transaction, Datastructures, Apparatuses, Methods and Systems by inventors Lohe et al., filed Jul. 14, 2016 and published Mar. 23, 2017, discloses the Smart Rules and Social Aggregating, Fractionally Efficient Transfer Guidance, Conditional Triggered Transaction, Datastructures, Apparatuses, Methods and Systems ("SOCOACT") transforms smart contract request, crypto currency deposit request, crypto collateral deposit request, crypto currency transfer request, crypto collateral transfer request inputs via SOCOACT components into transaction confirmation outputs. A selection of a crypto smart rule type for a crypto smart rule associated with an aggregated crypto transaction trigger entry may be obtained from a user. A crypto smart rule generator user interface (UI) for the selected crypto smart rule type may be provided. Selections of a threshold constraint and of an aggregated blockchain oracle for the crypto smart rule may be obtained from the user via the UI. The aggregated crypto transaction trigger entry may be generate based on the selections and instantiated in a socially aggregated blockchain datastructure.

U.S. Patent Publication No. 2017/0221052 for Computationally Efficient Transfer Processing and Auditing Apparatuses, Methods and Systems by inventors Sheng et al., filed Apr. 12, 2017 and published Aug. 3, 2017, discloses the Computationally Efficient Transfer Processing, Auditing, and Search Apparatuses, Methods and Systems ("SOCOACT") transforms smart contract request, crypto currency deposit request, crypto collateral deposit request, crypto currency transfer request, crypto collateral transfer request inputs via SOCOACT components into transaction confirmation outputs. Also, SOCOACT transforms transaction record inputs via SOCOACT components into matrix and list tuple outputs for computationally efficient auditing. A blockchain transaction data auditing apparatus comprises a blockchain recordation component, a matrix Conversion component, and a bloom filter component. The blockchain recordation component receives a plurality of transaction records for each of a plurality of transactions, each transaction record comprising a source address, a destination address, a transaction amount and a timestamp of a transaction; the source address comprising a source wallet address corresponding to a source digital wallet, and the destination address comprising a destination wallet address corresponding to a destination virtual currency wallet; verifies that the transaction amount is available in the source virtual currency wallet; and when the transaction amount is available, cryptographically records the transaction in a blockchain comprising a plurality of hashes of transaction records. The Bloom Filter component receives the source address and the destination address, hashes the source address using a Bloom Filter to generate a source wallet address, and hashes the destination address using the Bloom Filter to generate a destination wallet address. The Matrix Conversion component adds the source wallet address as a first row and a column entry to a stored distance matrix representing the plurality of transactions, adds the destination wallet address as a second row and column entry to the stored distance matrix representing the plurality of transactions, adds the transaction amount and the timestamp as an entry to the row corresponding to the source wallet address and the column corresponding to the destination wallet address; and generate a list representation of the matrix, where each entry in the list comprises a tuple having the source wallet address, the destination wallet address, the transaction amount and the timestamp.

U.S. Patent Publication No. 2017/0103391 for Digital asset intermediary electronic settlement platform by inventors Wilson et al., filed Dec. 22, 2016 and published Apr. 13, 2017, discloses a digital asset settlement method includes receiving from a first user an authorization for a conditional transaction involving a digital right, which has been digitized on a distributed ledger, matching the authorization for transaction from the first user with an authorization for transaction from at least one other user, settling the transaction between at least the first and other users if the conditional is met, and memorializing the settled transaction on the distributed ledger.

SUMMARY OF THE INVENTION

In one embodiment of the present invention, systems and methods for offering and purchasing tokenized securities on a blockchain platform are provided. At least one user device for at least one investor is configured and constructed in network communication with a server computer of a tokenized securities offering entity. The at least one user device transmits user input data to the server computer of the tokenized securities offering entity via a graphical user interface (GUI). The server computer of the tokenized securities offering entity transmits a link to at least one accreditation agency to the at least one user device for investor accreditation. The server computer of the tokenized securities offering entity accesses to and synchronizes with at least one database of the at least one accreditation agency in real time, and creates an up-to-date whitelist of accredited investors based on accreditation information obtained from the at least one database of the at least one accreditation agency. The server computer of the tokenized securities offering entity verifies the accreditation status of the at least one investor and sends a link to at least one tokenized securities contract deployed on the blockchain platform. The at least one user device sends an acceptance message after the at least one investor review documents included in the at least one tokenized securities contract on the blockchain platform. The at least one user device transmits a predetermined amount of cryptocurrency from a uniquely identified account or cryptocurrency account or a digital wallet of the at least one investor to an escrow account of the tokenized securities offering entity on the blockchain platform. In one embodiment, the at least one tokenized securities contract has an escrow function. At least one securities token is sent to the uniquely identified account or cryptocurrency account or the digital wallet of the at least one investor, and the predetermined amount of the currency is sent to a uniquely identified account or a digital wallet of the tokenized securities offering entity.

In another embodiment, the present invention provides systems and method for selling (or reselling) tokenized securities on the blockchain platform. Tokenized securities purchased during the tokenized securities offering (or through existing manual means) are tradable on a secondary market usually after a rest period. In another embodiment, the server computer of the tokenized securities offering entity provides a token transfer system for selling (or reselling) securities tokens issued by the tokenized securities offering or holding entity.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 8 lists investor documents in a token purchase process according to one embodiment of the present invention.

FIG. 21B illustrates an Edit Company GUI for a tokenized securities platform continued from FIG. 21A.

FIG. 22 illustrates an Account Registration GUI for a tokenized securities platform according to one embodiment of the present invention.

FIG. 23 illustrates an Administrator Profile GUI for a tokenized securities platform according to one embodiment of the present invention.

FIG. 24 illustrates an Account Details GUI for a tokenized securities platform according to one embodiment of the present invention.

FIG. 26 is an example of an Email Verification GUI for a tokenized securities platform according to one embodiment of the present invention.

FIG. 28 is an example of an error message that states a verification code has successfully been entered for a tokenized securities platform according to one embodiment of the present invention.

FIG. 29 illustrates a Login GUI for a tokenized securities platform according to one embodiment of the present invention.

FIG. 30 illustrates an example of a Guest GUI for a tokenized securities platform according to one embodiment of the present invention.

FIG. 32 shows an Information page for a Company Details GUI for a tokenized securities platform according to one embodiment of the present invention.

FIG. 34 illustrates a Board Member GUI for a tokenized securities platform according to one embodiment of the present invention.

FIG. 35 illustrates an Officer List GUI for a tokenized securities platform according to one embodiment of the present invention.

FIG. 36 illustrates an Add Custom Group GUI for a tokenized securities platform according to one embodiment of the present invention.

FIG. 37 illustrates a Custom Group GUI for a tokenized securities platform according to one embodiment of the present invention.

FIG. 39 illustrates a Group Link GUI for a tokenized securities platform according to one embodiment of the present invention.

FIG. 40 illustrates a Blacklist GUI for a tokenized securities platform according to one embodiment of the present invention.

FIG. 41 illustrates an Add-to-Blacklist GUI for a tokenized securities platform according to one embodiment of the present invention.

FIG. 42 illustrates an Action Requested page for an Activity GUI for a tokenized securities platform according to one embodiment of the present invention.

FIG. 43 illustrates an Action Requested GUI for a tokenized securities platform according to one embodiment of the present invention.

FIG. 44 illustrates an Action Requested GUI for a tokenized securities platform according to another embodiment of the present invention.

FIG. 45 illustrates an Issuer Activity History GUI for a tokenized securities platform according to one embodiment of the present invention.

FIG. 48 illustrates a Closing Status GUI for a tokenized securities platform according to one embodiment of the present invention.

FIG. 49 illustrates a Share Class Owners GUI for a tokenized securities platform according to one embodiment of the present invention.

FIG. 50 illustrates an example of an email inviting an investor to manage shares on the platform.

FIG. 51 illustrates a Share Classes GUI for a tokenized securities platform according to one embodiment of the present invention.

FIG. 52 illustrates a Shareholders page for a Share Class List GUI for a tokenized securities platform according to another embodiment of the present invention.

FIG. 53 illustrates a Share Class Information GUI for a tokenized securities platform according to one embodiment of the present invention.

FIG. 54 illustrates an Add Shareholder GUI for a tokenized securities platform according to one embodiment of the present invention.

FIG. 56D illustrates a populated template without errors.

FIG. 56E illustrates the results of adding a populated template without errors into the Upload Shareholder GUI.

FIG. 56F illustrates the results of the user selecting the Upload GUI button on the Upload Shareholder GUI.

FIG. 57 illustrates a Create a Custom Vesting Schedule GUI for a tokenized securities platform according to one embodiment of the present invention.

FIG. 58 illustrates a Share Class Details GUI for a tokenized securities platform according to one embodiment of the present invention.

FIG. 60 illustrates a Share Class Owners GUI for a tokenized securities platform according to one embodiment of the present invention.

FIG. 63 illustrates a New Issuance GUI for a tokenized securities platform according to one embodiment of the present invention.

FIG. 65 illustrates a Create New Issuance GUI for a tokenized securities platform according to one embodiment of the present invention.

FIG. 69 illustrates a new group addition for a New Issuance GUI for a tokenized securities platform according to one embodiment of the present invention.

FIG. 70 illustrates an accreditation verification drop-down list for a New Issuance GUI for a tokenized securities platform according to one embodiment of the present invention.

FIG. 71 illustrates a New Issuance Details GUI for a tokenized securities platform according to one embodiment of the present invention.

FIG. 72 illustrates a Transfer Window GUI for a tokenized securities platform according to one embodiment of the present invention.

FIG. 73 illustrates a Past Windows page for a Transfer Window GUI for a tokenized securities platform according to one embodiment of the present invention.

FIG. 74 illustrates a Current Transfer Windows GUI for a tokenized securities platform according to one embodiment of the present invention.

FIG. 75 illustrates a Prior Transfer Windows Closings GUI for a tokenized securities platform according to one embodiment of the present invention.

FIG. 78 illustrates an Edit Transfer Window GUI for a tokenized securities platform according to another embodiment of the present invention.

FIG. 82 illustrates an Approval Step GUI for a tokenized securities platform according to one embodiment of the present invention.

FIG. 83 illustrates a First Offer Step GUI for a tokenized securities platform according to one embodiment of the present invention.

FIG. 84 illustrates a Bidding Step GUI for a tokenized securities platform according to one embodiment of the present invention.

FIG. 85 illustrates a Refusal Rights Step GUI for a tokenized securities platform according to one embodiment of the present invention.

FIG. 87 illustrates an Undersubscription Right GUI for a tokenized securities platform according to one embodiment of the present invention.

FIG. 88 illustrates a Company Details Preferences GUI for a tokenized securities platform according to one embodiment of the present invention.

FIG. 89 illustrates a Company Details Affiliates GUI for a tokenized securities platform according to one embodiment of the present invention.

FIG. 94 illustrates an Upload New Document GUI for a tokenized securities platform according to one embodiment of the present invention.

FIG. 95 illustrates a Manage Document GUI for a tokenized securities platform according to one embodiment of the present invention.

FIG. 96 illustrates a Legal Document GUI for a tokenized securities platform according to one embodiment of the present invention.

FIG. 97 illustrates a Data Room GUI for a tokenized securities platform according to one embodiment of the present invention.

FIG. 100 illustrates an Add Group GUI for a New Message GUI for a tokenized securities platform according to one embodiment of the present invention.

FIG. 101 illustrates a Documents page for a New Message GUI for a tokenized securities platform according to one embodiment of the present invention.

FIG. 103 illustrates a Documents page for a New Meeting GUI for a tokenized securities platform according to one embodiment of the present invention.

FIG. 105 illustrates a Poll Creation GUI for a tokenized securities platform according to one embodiment of the present invention.

FIG. 106 illustrates a Poll Results GUI for a tokenized securities platform according to one embodiment of the present invention FIG. 107 illustrates a Poll Shareholders GUI associated with a Capitalization Table GUI for a tokenized securities platform according to one embodiment of the present invention.

FIG. 108 illustrates an Investor Profile GUI for a tokenized securities platform according to one embodiment of the present invention.

FIG. 109A illustrates an Investor Profile GUI for a tokenized securities platform according to another embodiment of the present invention.

FIG. 109B illustrates an Investor Profile GUI for a tokenized securities platform continued from FIG. 109A.

FIG. 110 illustrates a My Shares GUI for a tokenized securities platform according to one embodiment of the present invention.

FIG. 112 illustrates an Activity GUI for a tokenized securities platform according to another embodiment of the present invention.

FIG. 115 illustrates an Attachments GUI for a tokenized securities platform according to one embodiment of the present invention.

FIG. 116 illustrates an Activity GUI for a tokenized securities platform according to one embodiment of the present invention.

FIG. 117 illustrates a Make Payment GUI for a tokenized securities platform according to one embodiment of the present invention.

FIG. 118 illustrates an Activity GUI for a tokenized securities platform according to another embodiment of the present invention.

FIG. 119 illustrates an Activity GUI for a tokenized securities platform according to yet another embodiment of the present invention FIG. 120 illustrates an Activity GUI for a tokenized securities platform according to still another embodiment of the present invention.

FIG. 121 illustrates an Activity GUI for a tokenized securities platform according to another embodiment of the present invention.

FIG. 122 illustrates a Refusal Right Share Selection GUI for a tokenized securities platform according to one embodiment of the present invention.

FIG. 123 illustrates an Investor Activity History GUI for a tokenized securities platform according to one embodiment of the present invention.

FIG. 124 illustrates a My Shares GUI for a tokenized securities platform on a mobile device according to one embodiment of the present invention.

FIG. 125 illustrates a Create Ask GUI for a tokenized securities platform according to one embodiment of the present invention.

FIG. 126 illustrates an Investor Asks GUI for a tokenized securities platform according to one embodiment of the present invention.

FIG. 127 illustrates a Review Documents GUI for a tokenized securities platform according to one embodiment of the present invention.

FIG. 128 illustrates a Make Bid GUI for a tokenized securities platform according to one embodiment of the present invention.

FIG. 129 illustrates a Make Bid GUI for a tokenized securities platform according to another embodiment of the present invention.

FIG. 130 illustrates a Place Bid GUI for a tokenized securities platform according to one embodiment of the present invention.

FIG. 131 illustrates an Investor Asks GUI for a tokenized securities platform according to yet another embodiment of the present invention.

FIG. 132 illustrates an Investor Asks GUI for a tokenized securities platform according to yet another embodiment of the present invention.

Figure 133:
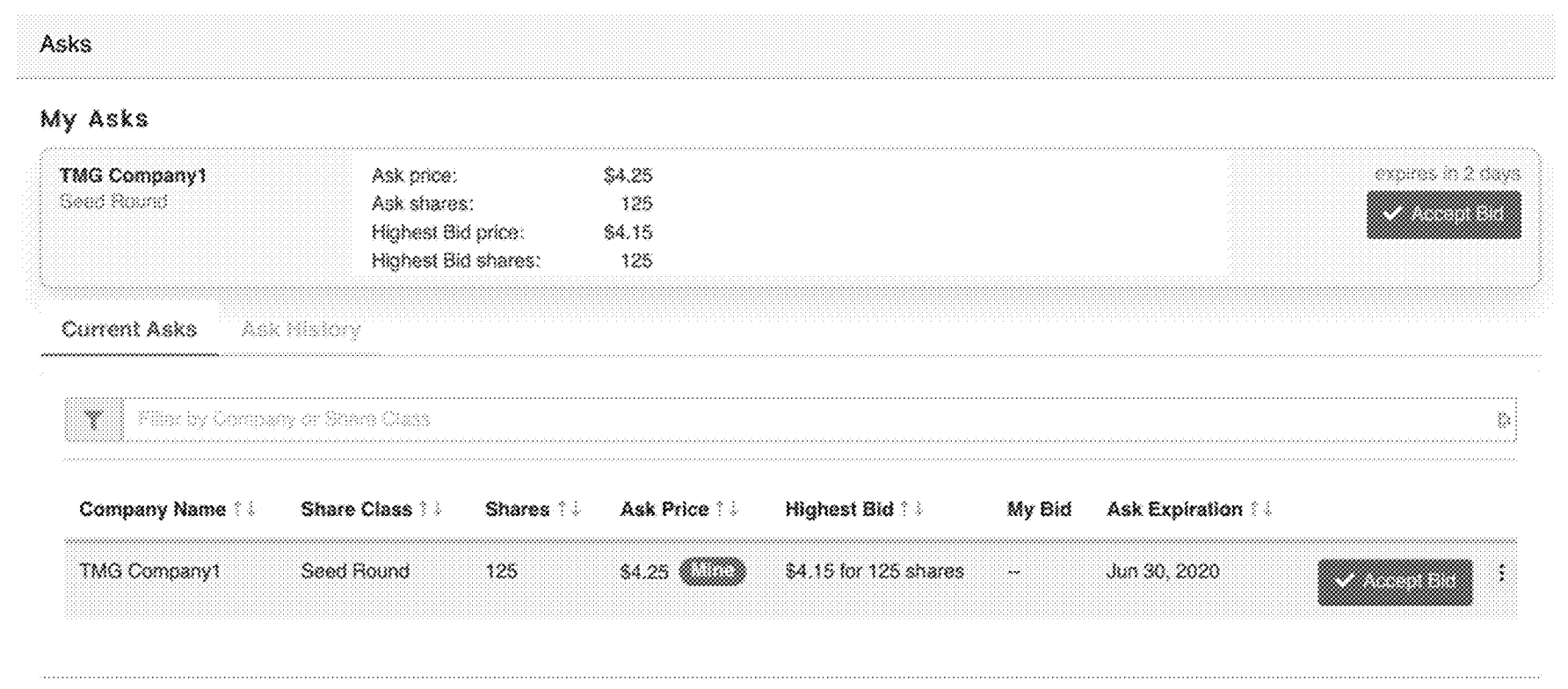

FIG. 133 illustrates an Investor Asks GUI for a tokenized securities platform according to yet another embodiment of the present invention.

FIG. 134 illustrates an Accept Bid GUI for a tokenized securities platform according to one embodiment of the present invention.

FIG. 135 illustrates an Accept Ask GUI for a tokenized securities platform according to one embodiment of the present invention.

FIG. 136 illustrates an example of a Share Purchase Agreement for a tokenized securities platform according to one embodiment of the present invention.

Figure 137:

FIG. 137 illustrates a buyer signature page according to one embodiment of the present invention.

Figure 138:

FIG. 138 illustrates a seller signature page according to one embodiment of the present invention.

Figure 139:

FIG. 139 illustrates a company signature page according to one embodiment of the present invention.

Figure 140:
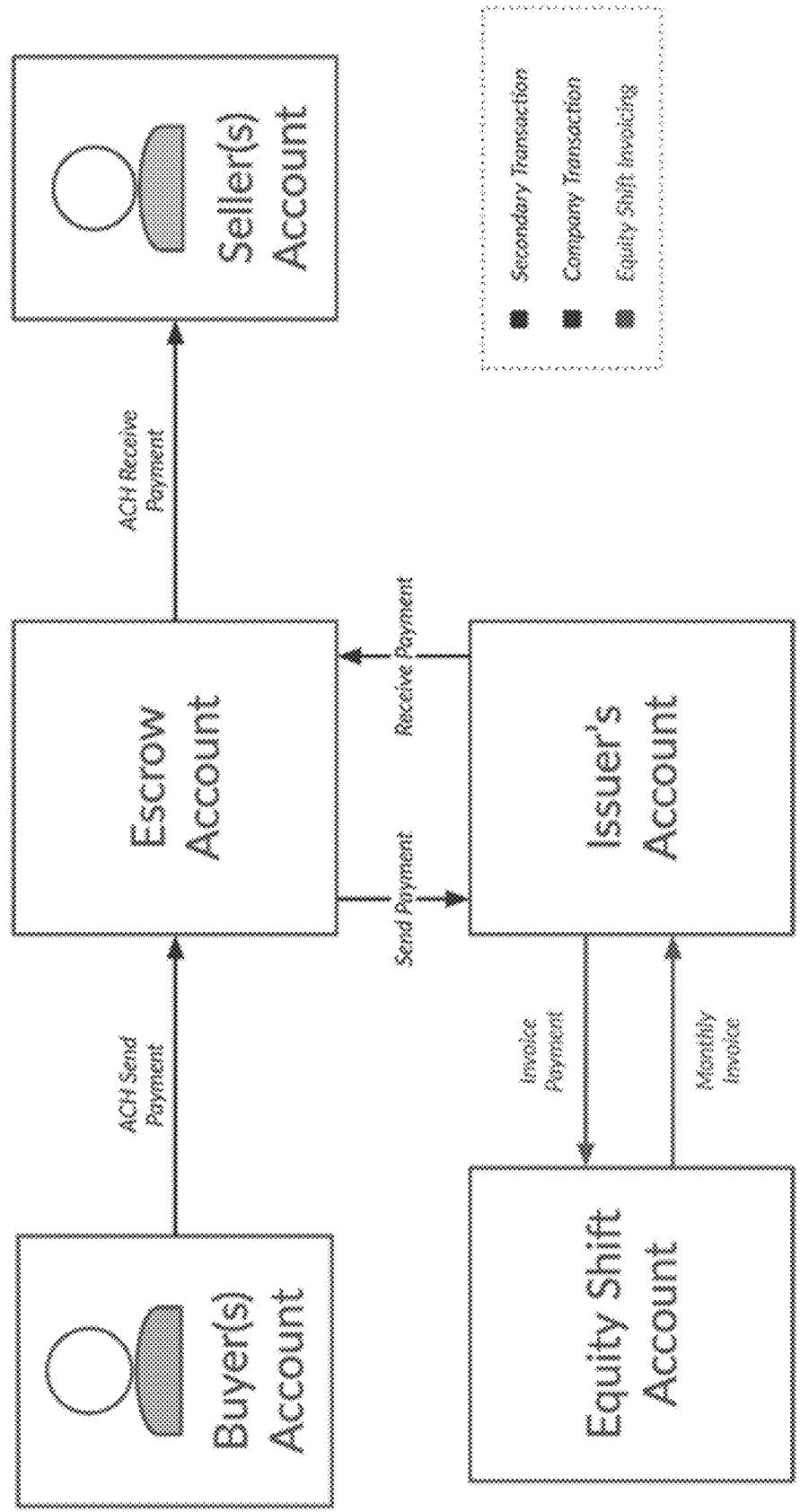

FIG. 140 illustrates a flow diagram for a transaction flow according to one embodiment of the present invention.

Figure 141:
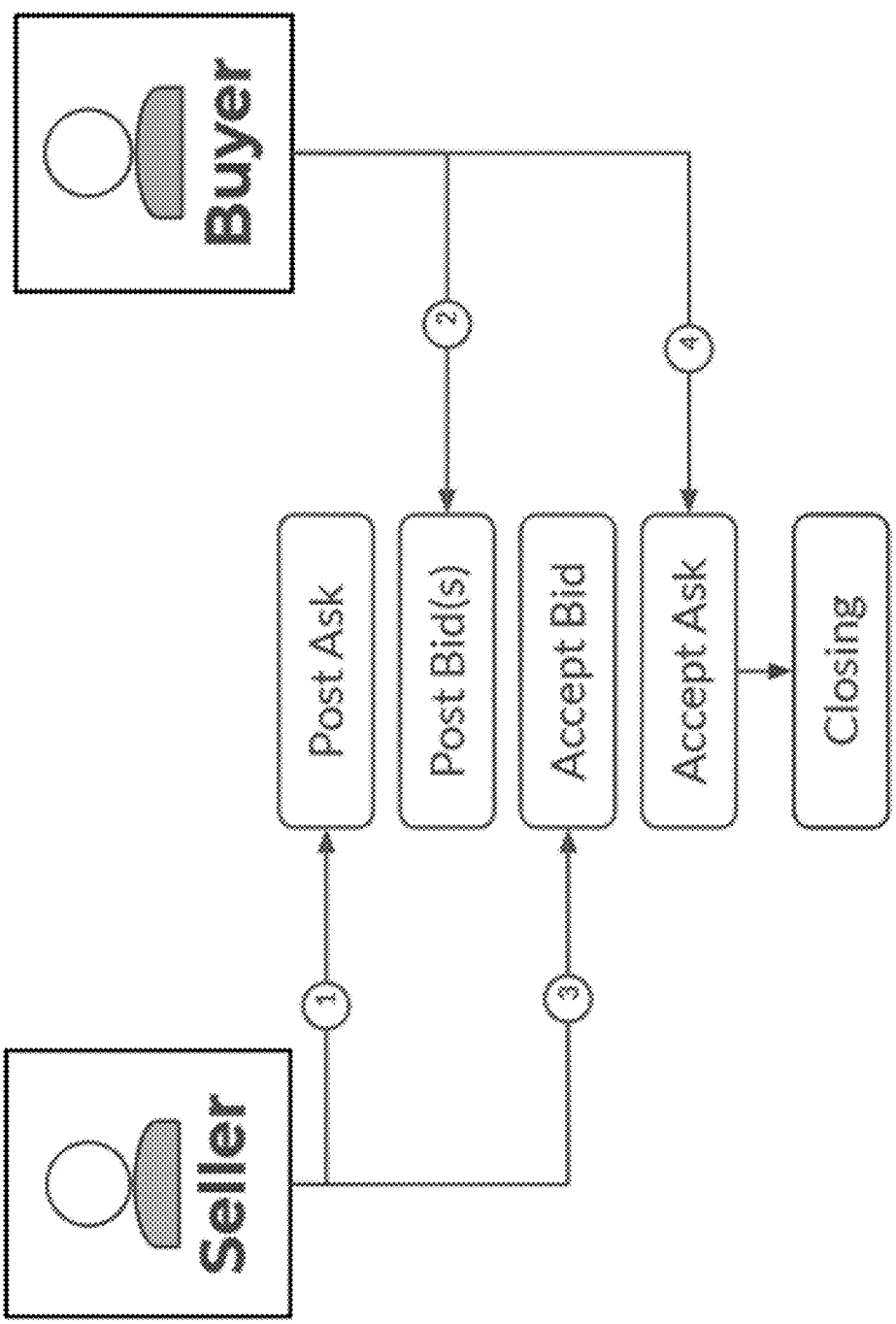

FIG. 141 illustrates a flow diagram of a "House" Bid-Ask Model according to one embodiment of the present invention.

Figure 142:
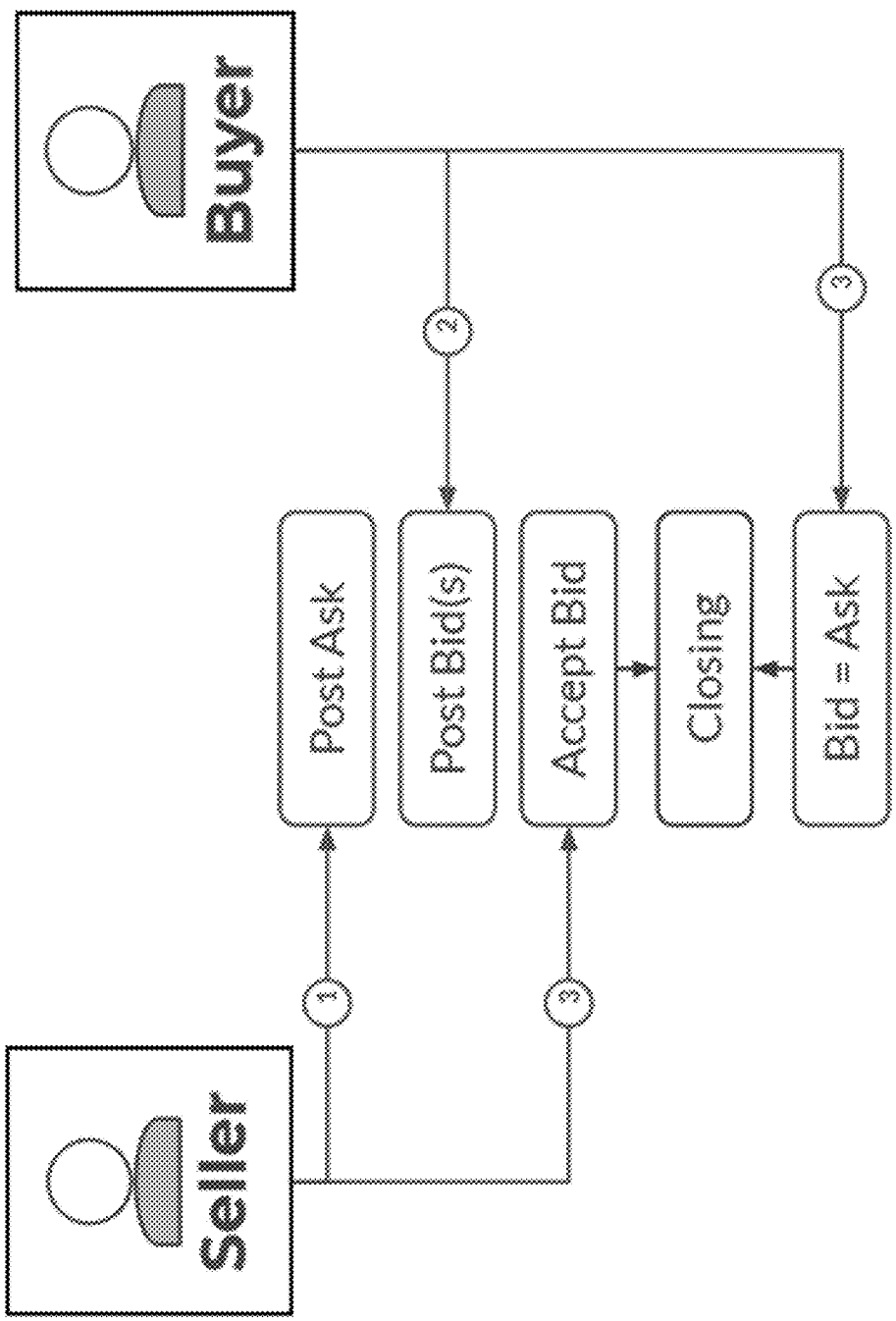

FIG. 142 illustrates a flow diagram of a "Price Matcher" Bid-Ask Model according to one embodiment of the present invention.

Figure 143:
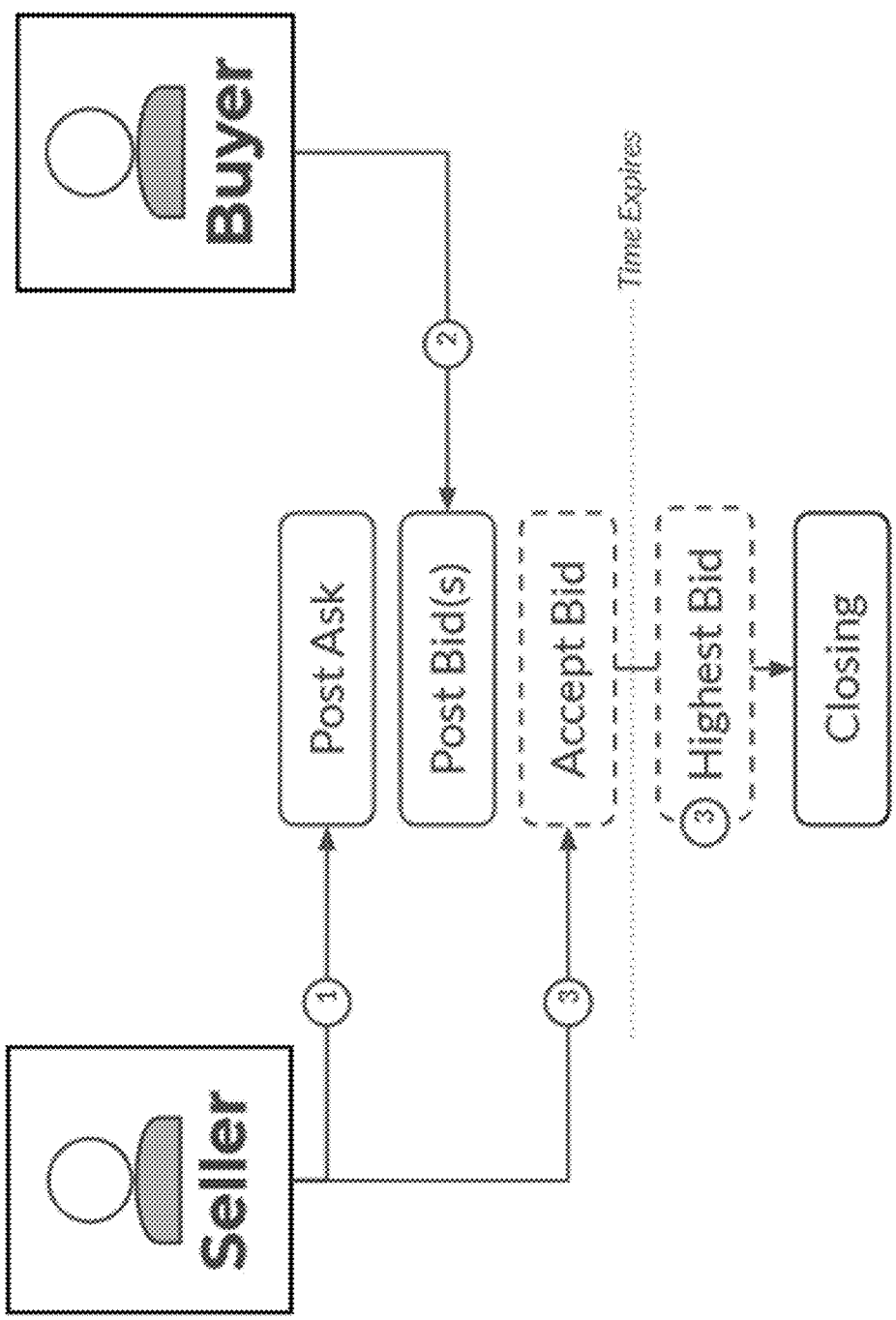

FIG. 143 illustrates a flow diagram of a "Highest Bid" Bid-Ask Model according to one embodiment of the present invention.

Figure 144:
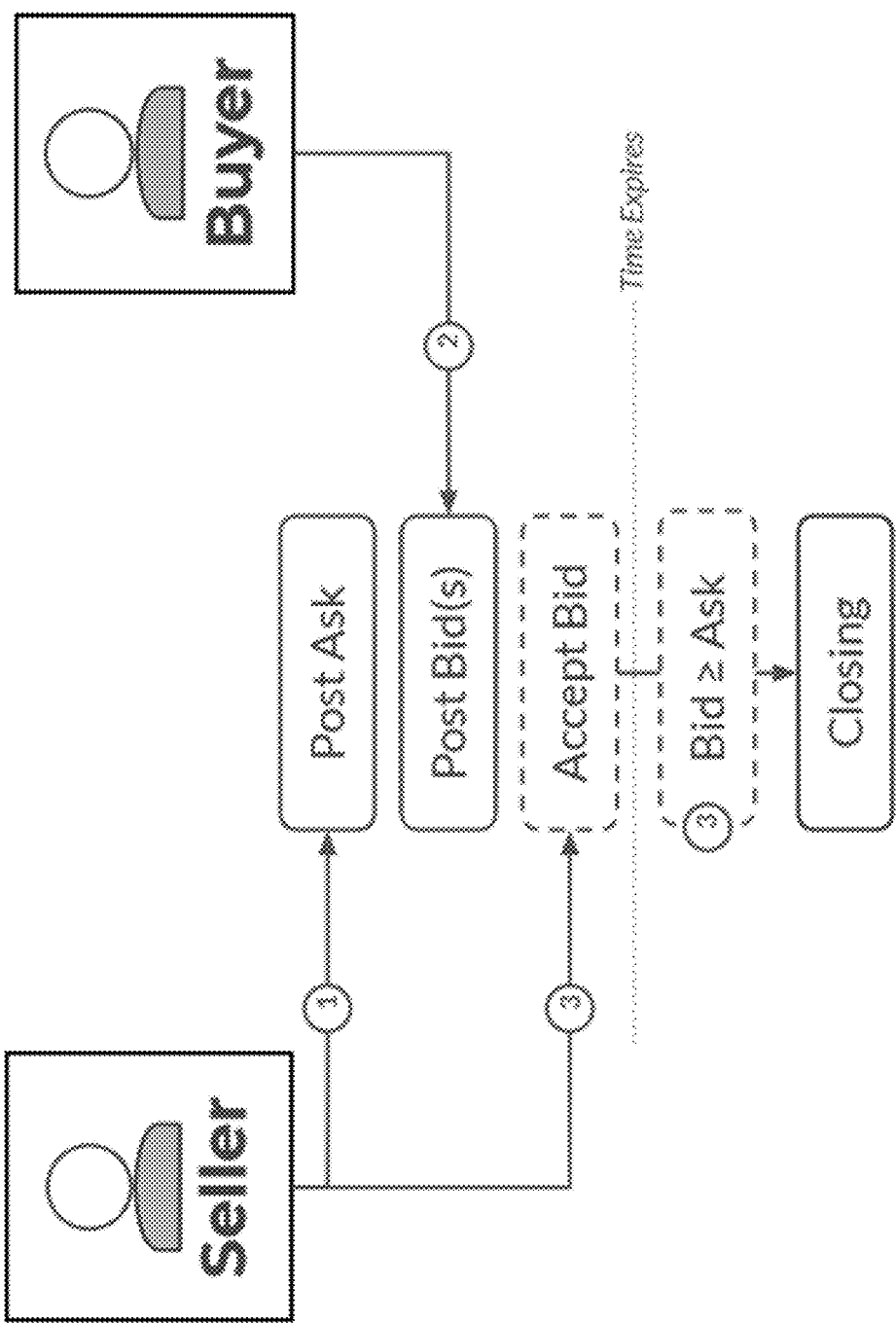

FIG. 144 illustrates a flow diagram of a "Match Expire" Bid-Ask Model according to one embodiment of the present invention.

Figure 145:
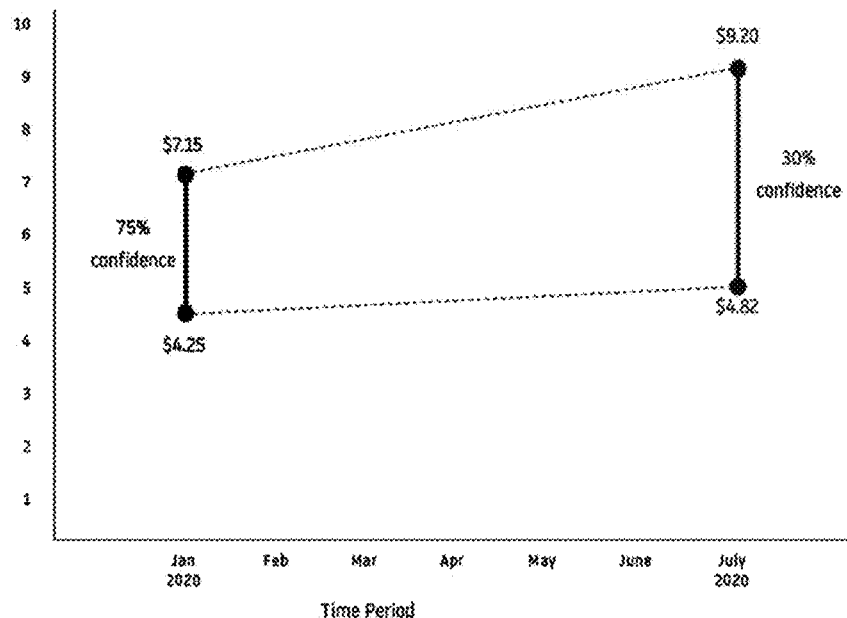

FIG. 145 illustrates a Bid Calculator GUI for a tokenized securities platform according to one embodiment of the present invention.

Figure 146:

FIG. 146 illustrates a Valuation Estimator GUI for a tokenized securities platform on a mobile device according to one embodiment of the present invention.

FIG. 147 illustrates a Valuation Estimator GUI for a tokenized securities platform on a mobile device according to another embodiment of the present invention.

Figure 148:
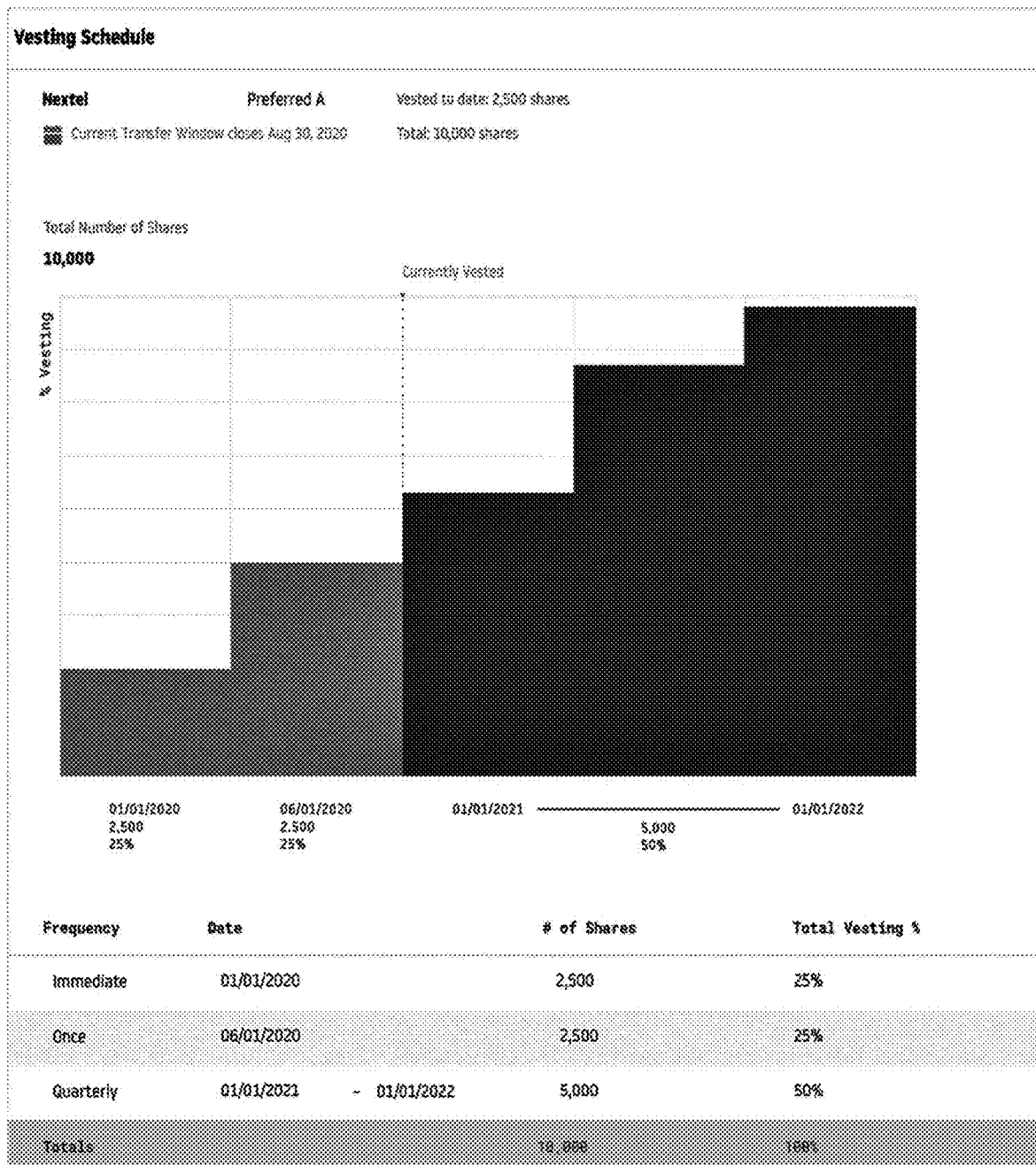

FIG. 148 illustrates an Investor Vesting Schedule GUI for a tokenized securities platform according to one embodiment of the present invention.

FIG. 149 illustrates a Convert or Sell Options GUI for a tokenized securities platform according to one embodiment of the present invention.

FIG. 150 illustrates a Convert Note GUI for a tokenized securities platform according to one embodiment of the present invention.

FIG. 151 illustrates a Convert Options GUI for a tokenized securities platform according to one embodiment of the present invention.

Figure 152:

FIG. 152 illustrates a Convert Restricted Stock Units GUI for a tokenized securities platform according to one embodiment of the present invention.

FIG. 153 illustrates a Convert Warrants GUI for a tokenized securities platform according to one embodiment of the present invention.

Figure 154:
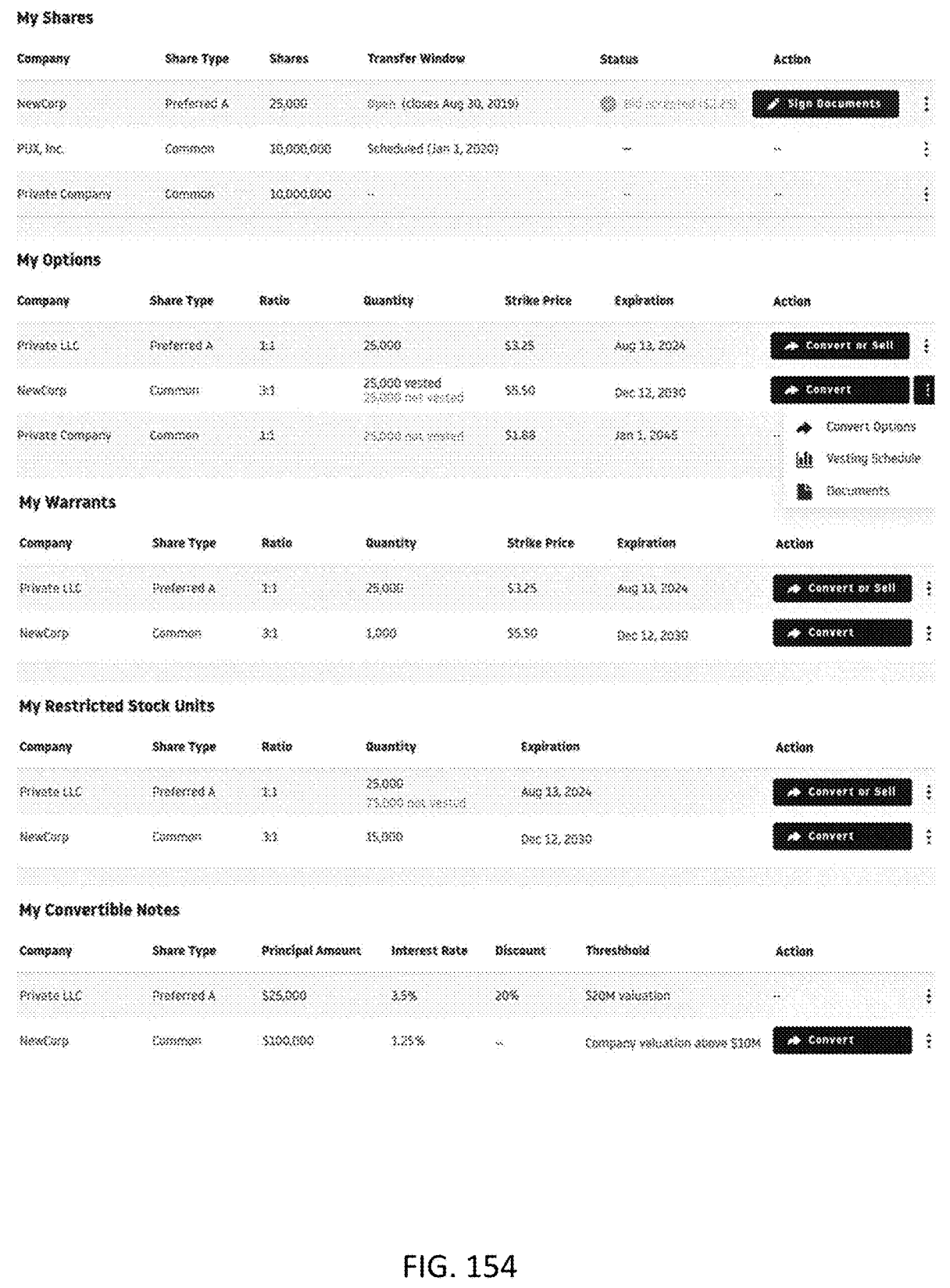

FIG. 154 illustrates a Convertibles Menu GUI for a tokenized securities platform according to one embodiment of the present invention.

Figure 155:
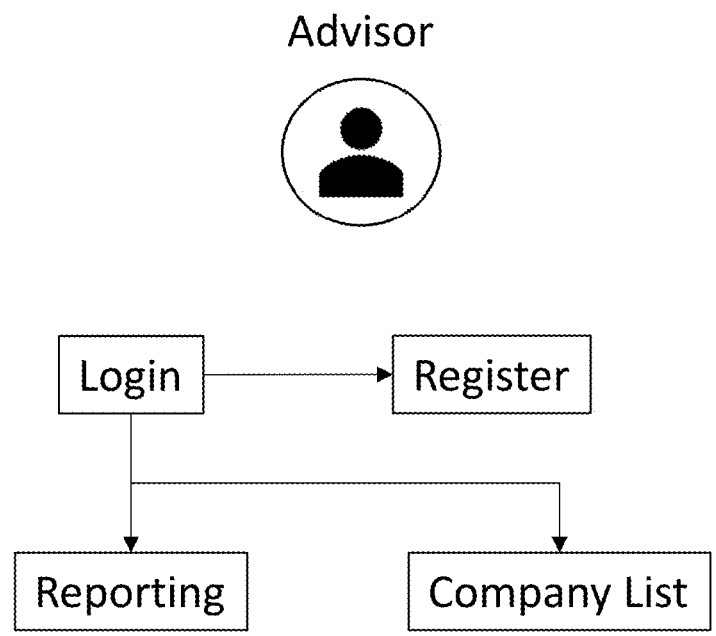

FIG. 155 illustrates a modeling workflow for advisors according to one embodiment of the present invention.

Figure 156:
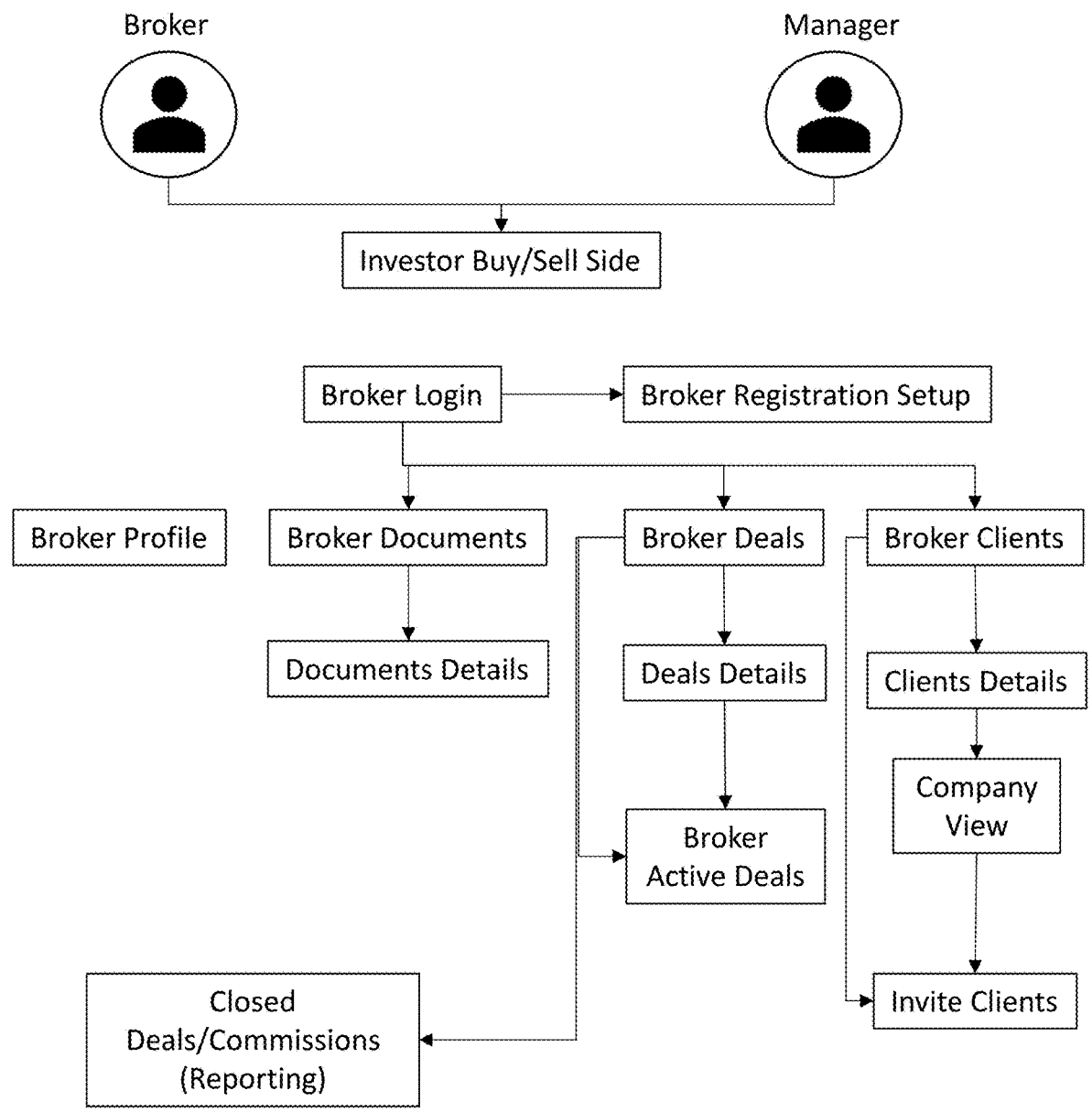

FIG. 156 illustrates a modeling workflow for brokers according to one embodiment of the present invention.

Figure 157:
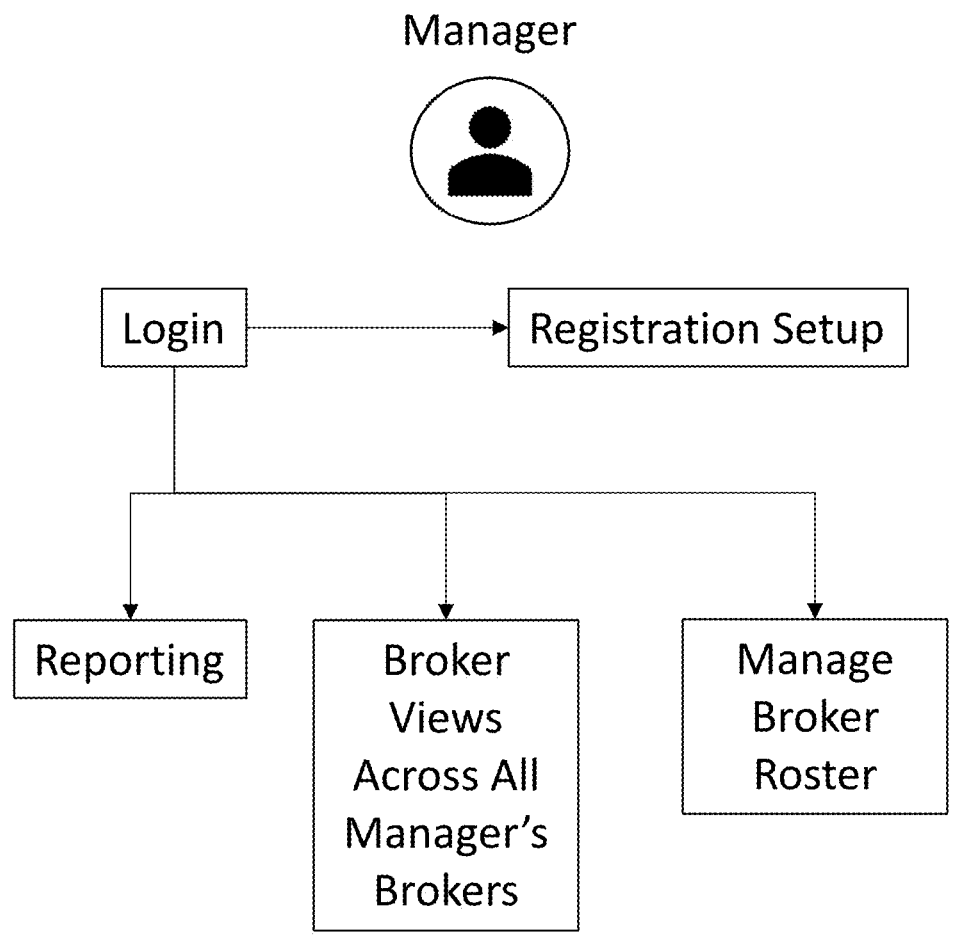

FIG. 157 illustrates a modeling workflow for a manager according to one embodiment of the present invention.

Figure 158:
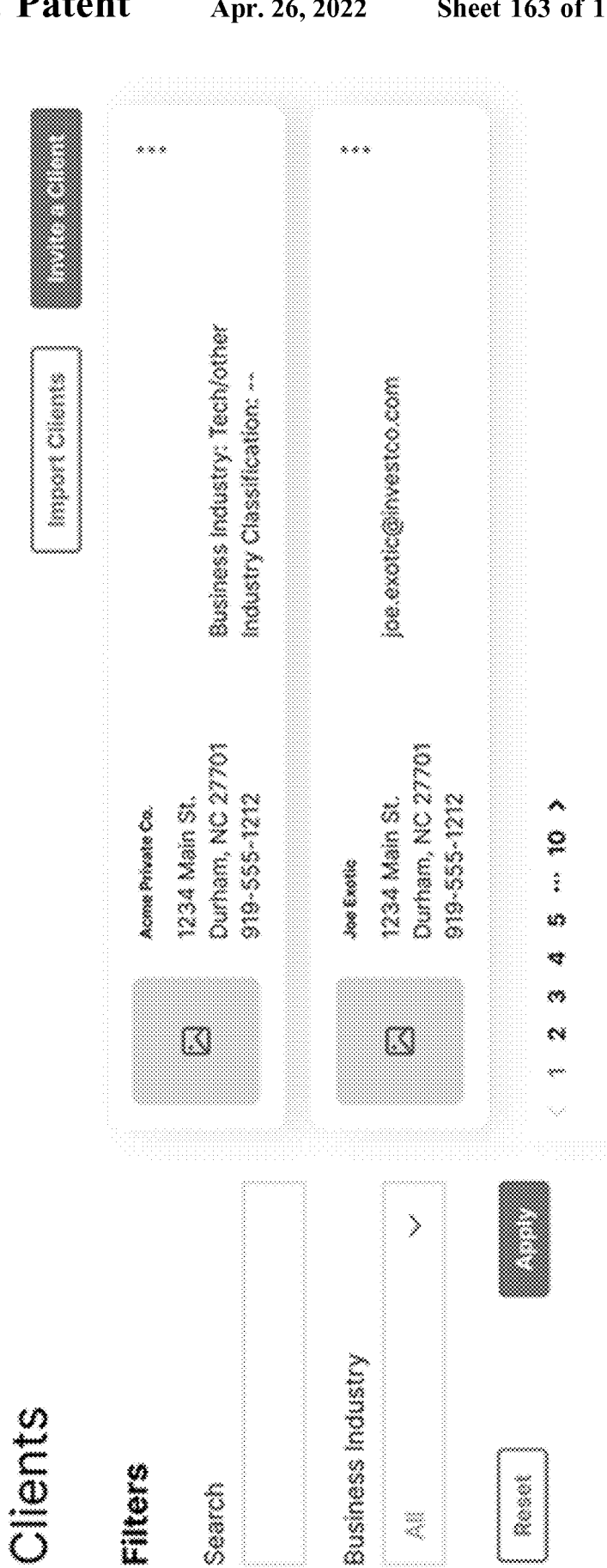

FIG. 158 illustrates an Advisor Client List GUI for an Advisor screen according to one embodiment of the present invention.

FIG. 159 illustrates an Advisor Client Detail GUI according to one embodiment of the present invention.

Figure 160:
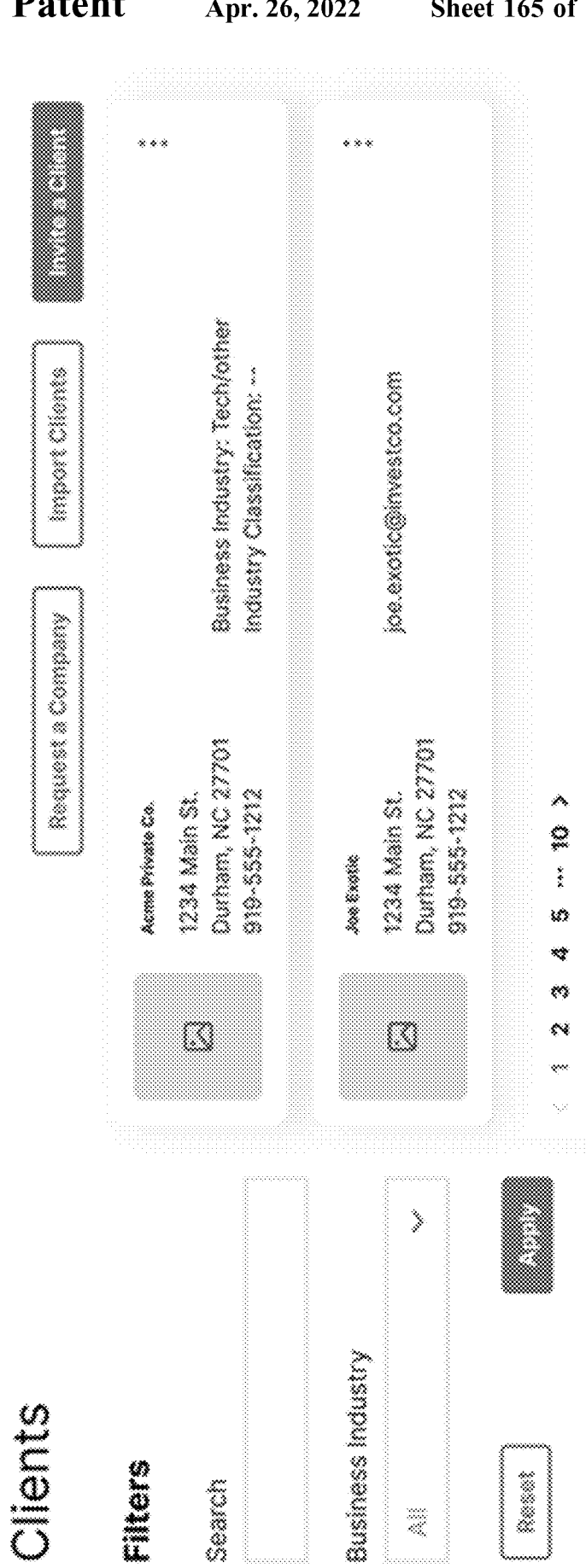

FIG. 160 illustrates a Broker Client List GUI for a Broker screen according to one embodiment of the present invention.

Figure 161:
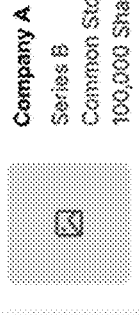

FIG. 161 illustrates a Broker Client Detail GUI according to one embodiment of the present invention.

FIG. 162 illustrates an Invite New Client GUI according to one embodiment of the present invention.

Figure 163:
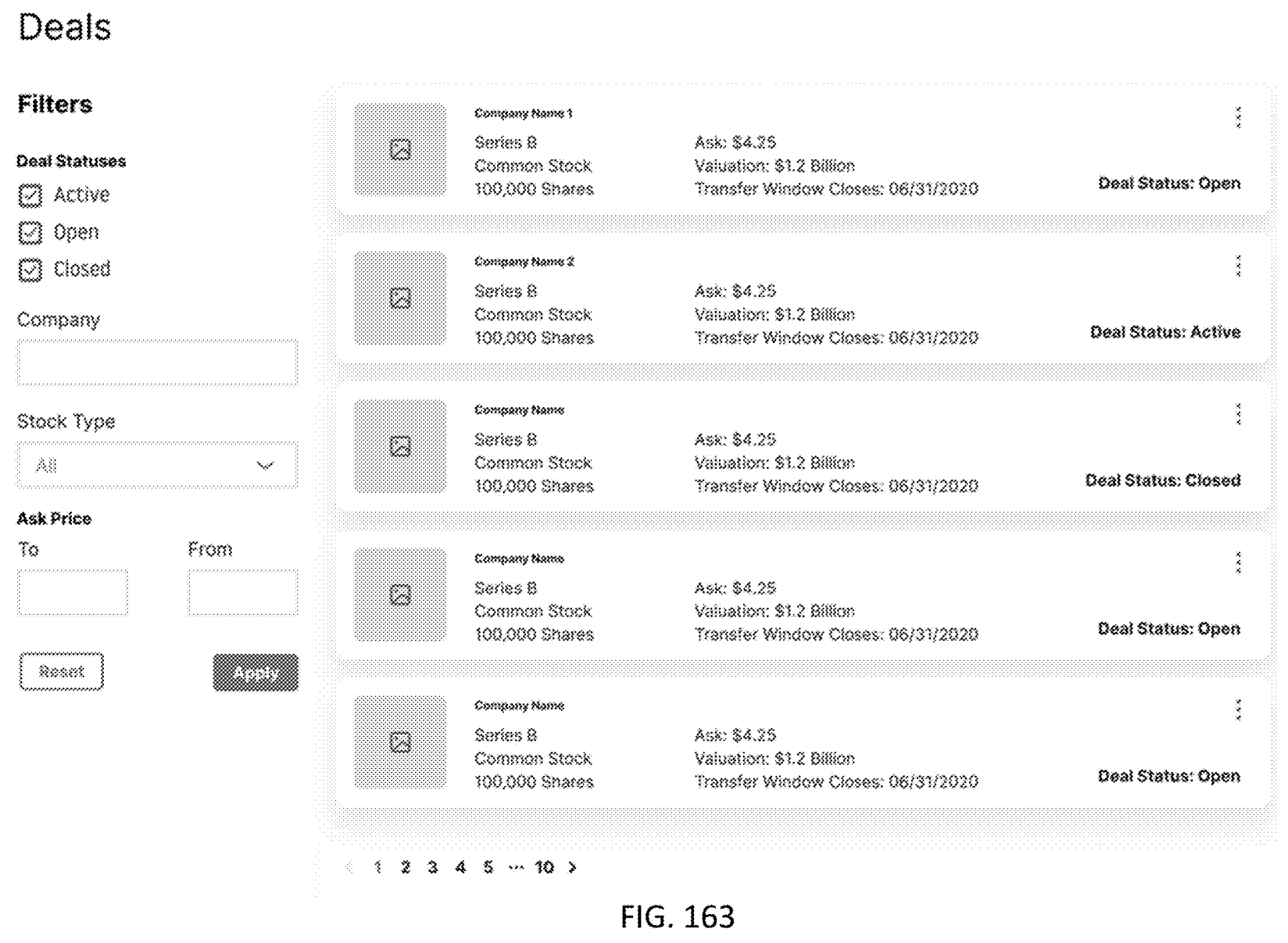

FIG. 163 illustrates a Broker Deals GUI according to one embodiment of the present invention.

Figure 164:
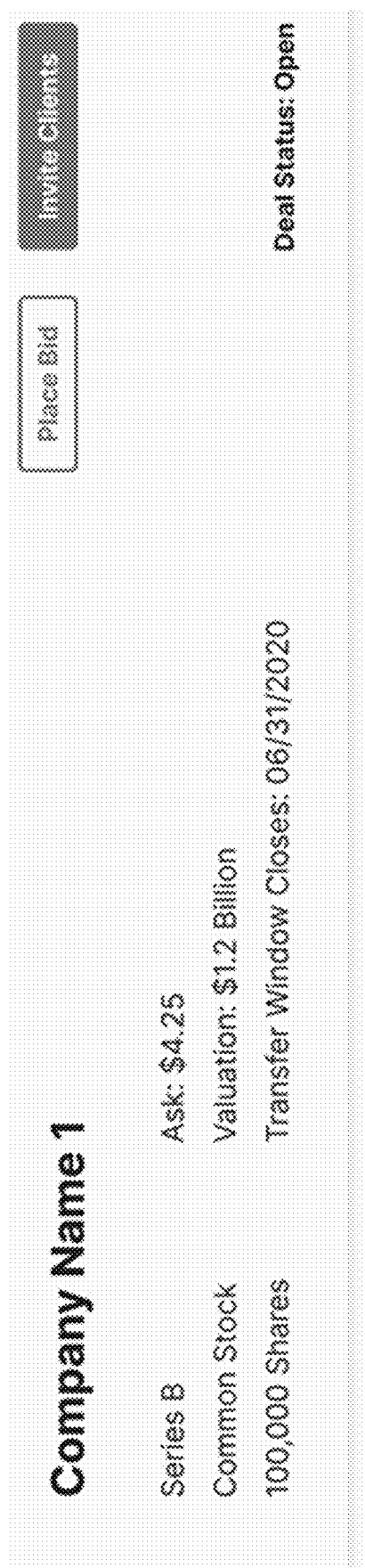

FIG. 164 illustrates a Deal Status GUI according to one embodiment of the present invention.

FIG. 165 illustrates an Invite Clients to This Deal GUI according to one embodiment of the present invention.

Figure 166:
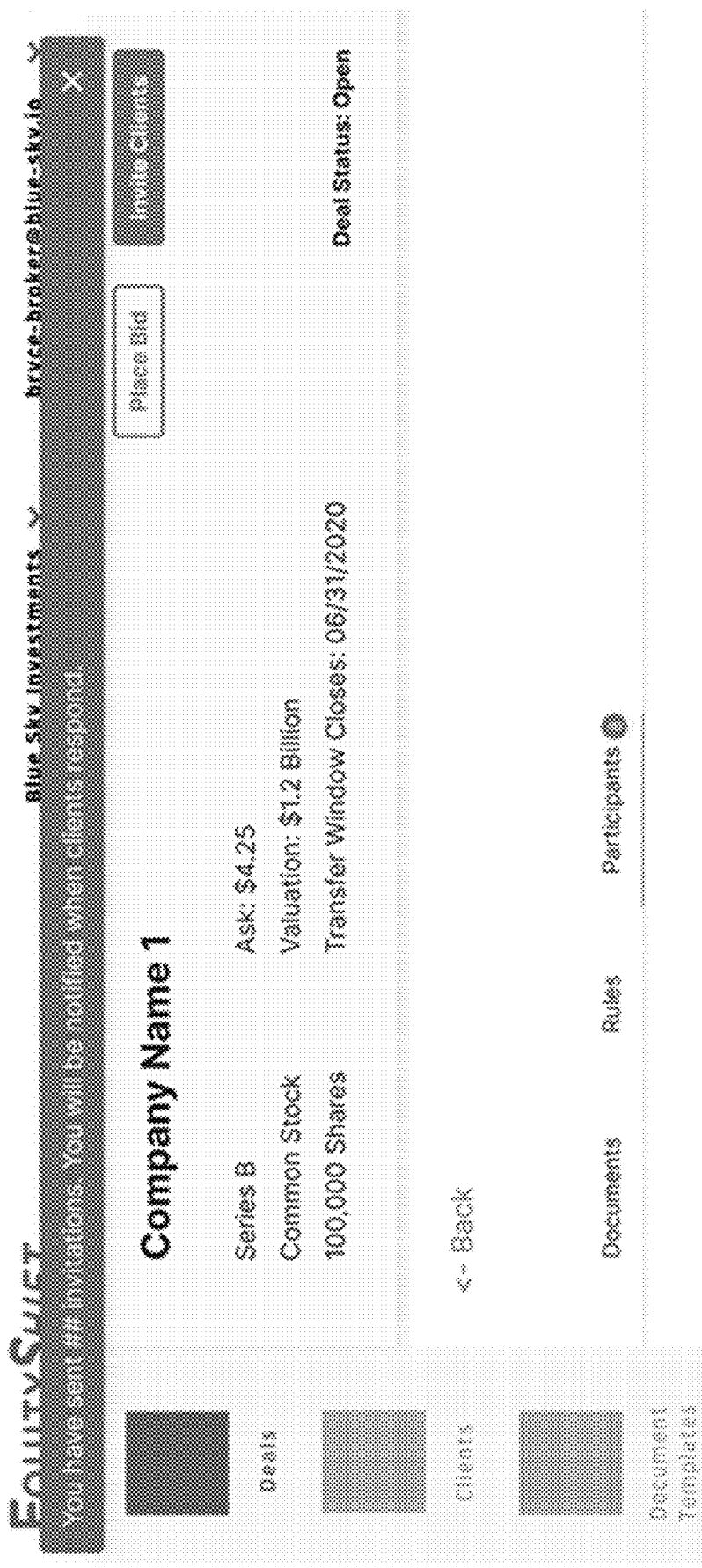

FIG. 166 illustrates an Invite Sent pop-up GUI for a Broker Detail GUI according to one embodiment of the present invention.

FIG. 167 illustrates a Broker Documents GUI according to one embodiment of the present invention.

FIG. 168 illustrates a Broker Administrator Employee Roster GUI according to one embodiment of the present invention.

Figure 169:

FIG. 169 illustrates a Broker Administrator Employee History Detail GUI according to one embodiment of the present invention.

Figure 170:
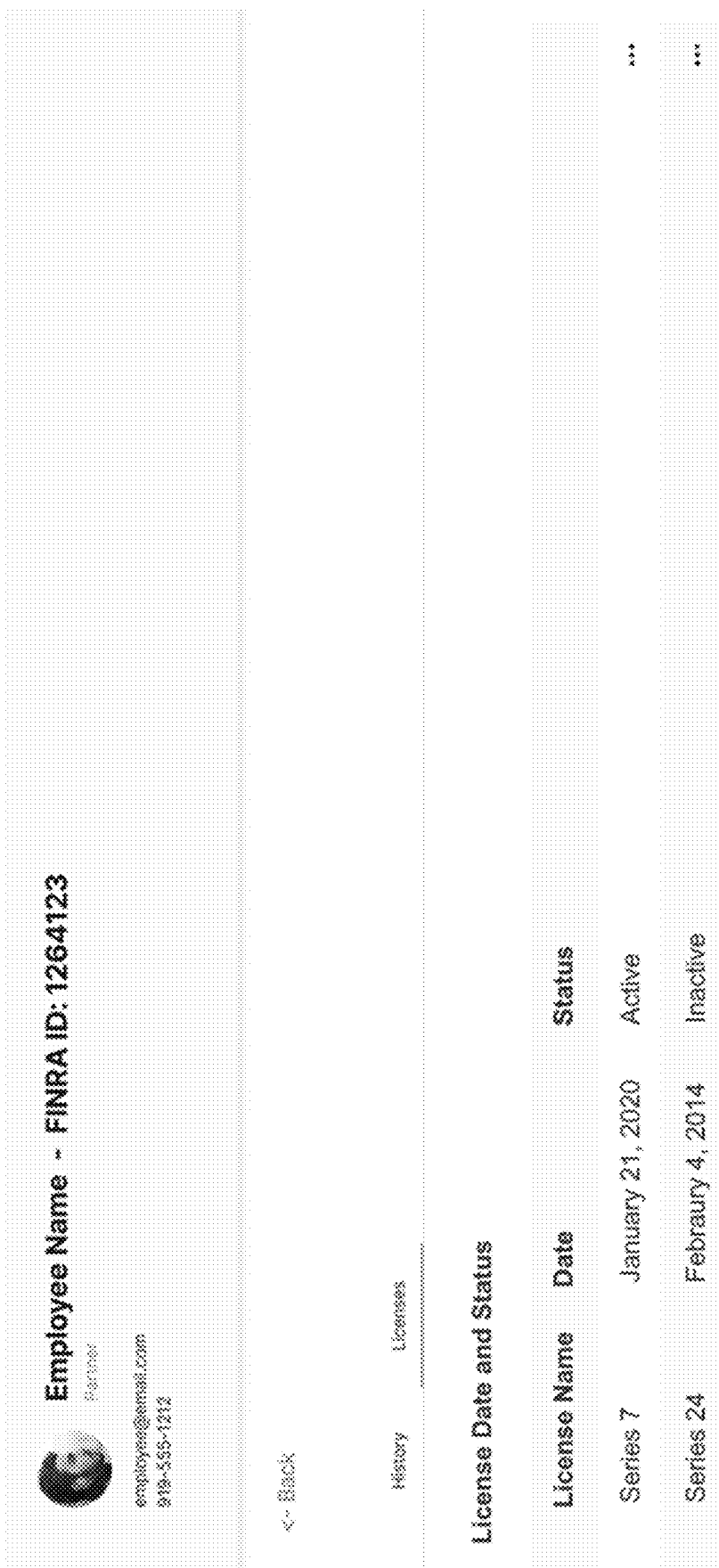

FIG. 170 illustrates a Broker Administrator Employee Licenses Detail GUI according to one embodiment of the present invention.

FIG. 171 illustrates a Broker Administrator Report GUI according to one embodiment of the present invention.

Figure 172:
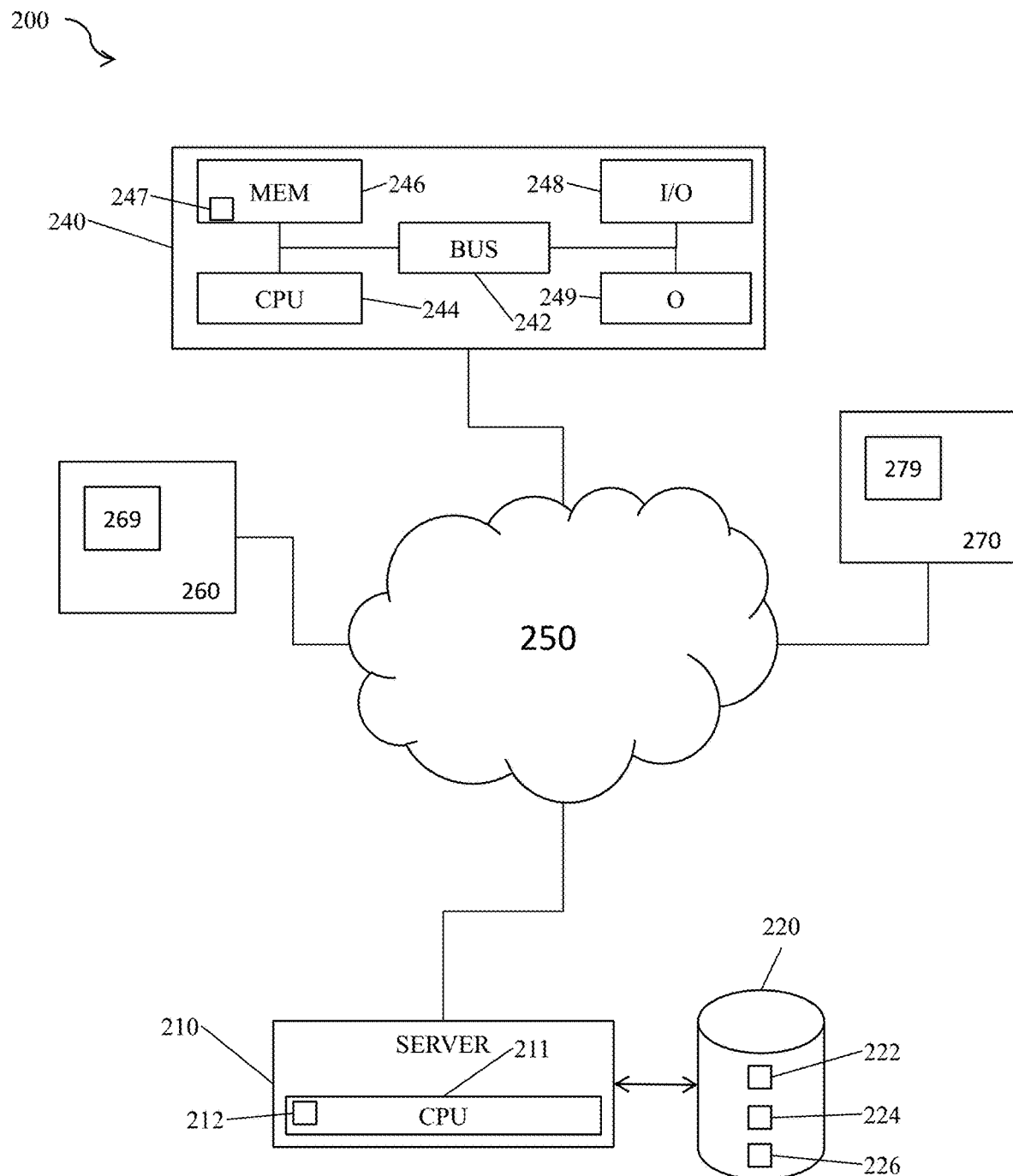

FIG. 172 is a schematic diagram illustrating a cloud-based system of the present invention.

Figure 173:
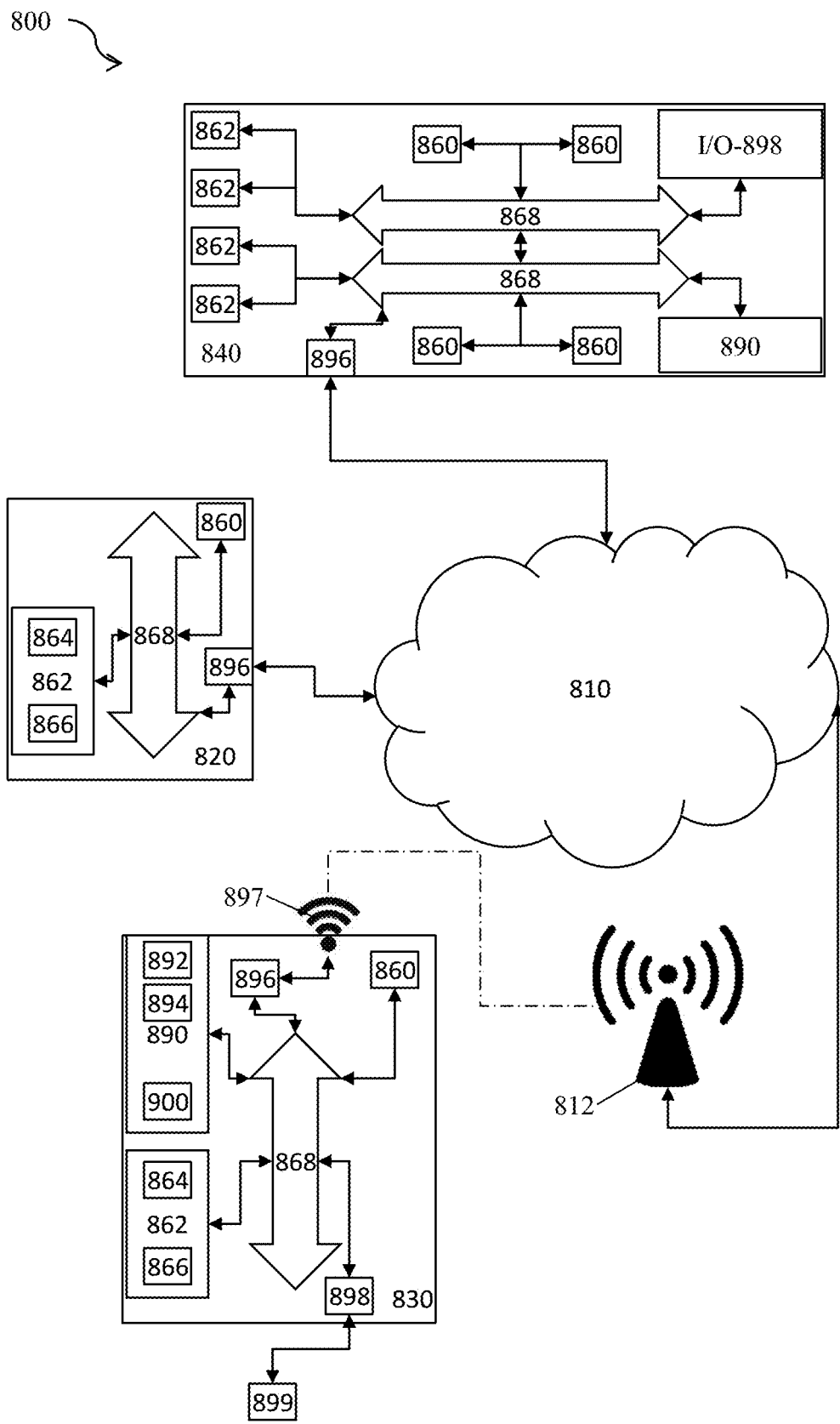

FIG. 173 is another schematic diagram illustrating a cloud-based system of the present invention.

DETAILED DESCRIPTION

The blockchain technology is based on existing communication protocols (e.g., HTTP, RPC), cryptography (grown from Public key cryptography in 1976), distributed peer-to-peer sharing mechanisms (e.g., Napster, bitTorrent), and a distributed set of databases kept in synchronization based on time. The blockchain technology is a technology that permanently records events or transactions on a network in a transparent, auditable, and irrefutable way. A blockchain ledger is stored on each blockchain node participating in or comprising a network. Blockchain nodes include, but are not limited to servers, mobile devices, work stations, or any networked client that can interface with an IP-based network and can operate an operating system capable of processing blocks. Blockchain is a loose specification rather than a specific implementation, which is capable of unlocking monopoly power over information in infrastructure systems for telecommunications, healthcare, finance, energy, and government. Blockchain also disintermediates "middle men" such as broker dealers, banks, transfer agents, or any third party in information or transactions that are utilized for trust in the transmittal of data or the execution of a transaction. In an introduction to blockchain applications in The Business of Blockchain by William Mougayar (2016), which is incorporated herein by reference in its entirety, it is established that just as the Web could not exist without the Internet, blockchains could not exist without the Internet, and thus, the use of blockchains within the systems and methods of the present invention provide that it is not merely an abstract idea, since it is inextricably tied to Internet technology.

A smart contract is a computer protocol intended to digitally facilitate, verify, or enforce the negotiation or performance of a contract. In the context of blockchain, smart contracts are self-executing codes on a blockchain that automatically implements the terms of an agreement between parties. Tokenized securities contracts deployed on a blockchain platform by a tokenized securities offering entity are based on the smart contract technology.

The present invention provides systems and methods for offering, purchasing, and reselling blockchain instruments for transferable equity. In one embodiment, the blockchain instruments for transferable equity are tokenized securities offered and purchased on a blockchain platform. In one embodiment, the blockchain instruments for transferable equity are tokenized securities held by an entity ("holder entity") that are available for sale by existing investors to purchasers on a blockchain platform. In one embodiment, the blockchain instruments for transferrable equity are tokenized securities, and each securities token is unique. Advantageously, the systems and methods in the present invention disintermediate brokers in buying and selling securities and other financial instruments.

In one embodiment of the present invention, systems and methods for offering, purchasing, and reselling tokenized securities on a blockchain platform are provided. At least one user device for at least one investor is in network communication with at least one server computer operable for use by a tokenized securities offering entity. The at least one user device transmits user input data to the at least one server computer operable for use by the tokenized securities offering entity via a graphical user interface (GUI). The at least one server computer operable for use by the tokenized securities offering entity transmits a link to at least one accreditation agency to the at least one user device for investor accreditation. The at least one server computer operable for use by the tokenized securities offering entity accesses and synchronizes with at least one database of the at least one accreditation agency in real time, and creates an up-to-date whitelist of accredited investors based on accreditation information obtained from the at least one database of the at least one accreditation agency. The at least one server computer operable for use by the tokenized securities offering entity verifies the accreditation status of the at least one investor and sends a link to at least one tokenized securities contract deployed on the blockchain platform. The at least one user device sends an acceptance message after the at least one investor reviews documents included in the at least one tokenized securities contract on the blockchain platform. The at least one user device transmits a predetermined amount of currency from a uniquely identified account or a digital wallet of the at least one investor to an escrow account of the tokenized securities offering entity on the blockchain platform. In one embodiment, the at least one tokenized securities contract has an escrow function. At least one securities token is sent to the uniquely identified account or the digital wallet of the at least one investor, and the predetermined amount of the currency is sent to a uniquely identified account or a digital wallet of the tokenized securities offering entity.

In one embodiment of the present invention, systems and methods for purchasing tokenized securities are provided. At least one server computer operable for use by the tokenized securities offering (or holding) entity receives input data from an investor for registration via a GUI on a user device. An offering entity is one selling securities to raise capital, a holding entity is one that has already used the securities to raise capital, which now "holds" the tokenized securities. The input data includes a legal name and an e-mail address and other required information. In one embodiment, other required information further includes investor accreditation status. In one embodiment, the at least one server computer operable for use by the tokenized securities offering entity provides a third-party agency link for investor accreditation via the GUI. Investor accreditation lasts a certain period of time and then expires. Renewal is needed in order to maintain accredited investor status. The at least one server computer operable for use by the tokenized securities offering entity is operable to access and synchronize with various data sources for investor accreditation information automatically. The at least one server computer operable for use by the tokenized securities offering entity creates and updates a whitelist of accredited investors based on the investor accreditation information from various data sources. The at least one server computer operable for use by the tokenized securities offering entity verifies the investor accreditation status of a registered user based on the up-to-date whitelist. If the investor accreditation status is included in the whitelist, the at least one server computer operable for use by the tokenized securities offering entity transmits a link to at least one tokenized securities contract including various documents to the user device for review. The at least one tokenized securities contract is deployed on a blockchain platform. In one embodiment, the link is sent to a cryptocurrency account or a digital wallet of the investor accessible by the user device. The user device transmits an acceptance message indicating the investor accepts the terms and conditions in the various documents included in the at least one tokenized securities contract to the blockchain platform. The user device is then operable to purchase at least one securities token via the cryptocurrency account or digital wallet of the investor. Thus, a purchase order is complete and the at least one tokenized securities contract is let. In one embodiment, tokenized securities are at rest for a certain period of time before being traded in order to forbid broker-dealer behaviors. A rest period is determined by a governing entity regarding securities law during which public or private trading of securities are prohibited. For example, SEC rule 144 specifies that "if the company that issued the securities is a "reporting company" in that it is subject to the reporting requirements of the Securities Exchange Act of 1934, then invested investors must hold the securities for at least six months. If the issuer of the securities is not subject to the reporting requirements, then invested investors must hold the securities for at least one year. In one embodiment, the at least one server computer operable for use by the tokenized securities offering entity is operable to burn securities tokens, which are tokenized securities, left after the offering period. In another embodiment, the sever computer of the tokenized securities offering entity provides a marketplace where tokenized securities contracts are traded on the blockchain platform. The at least one server computer operable for use by the at least one tokenized securities offering entity includes one or more server computers, which is standalone or network-based or cloud-based.

The description below provides details for steps of registering, verifying, reviewing, accepting, and investing according to one embodiment of a method of purchasing tokenized securities during a tokenized securities offering. In another embodiment, the order of the above-mentioned steps varies. For example, but not for limitation, the verification step is after the invest step.

Register

In one embodiment, participants in tokenized securities offerings or purchasing of existing tokenized securities include individuals, entities, joint tenancy, brokers, dealers, trusts and other legally recognized forms of organization or regulatory status. At the registering stage, information required from an investor by the server computer of the tokenized securities offering entity includes legal name, country of residence, and email address. A privacy notice is sent to the investor via a user device. At least one uniquely identified account is required for the investor to participate in the tokenized securities offering.

In one embodiment, the at least one uniquely identified account is a hash value generated by a hash algorithm in the blockchain. In one embodiment, the at least one uniquely identified account is a blockchain account, a cryptocurrency account, or a digital wallet. In one embodiment, the at least one uniquely identified account is generated by other mathematical algorithm (e.g., quantum mechanics).

In one embodiment, investor accreditation is required to participate in the tokenized securities offering. In one embodiment, accredited investor is defined in 17 CFR 230.501 (a). For example, accredited investors include certain institutional investors, private business development companies, entities with total assets in excess of $5,000,000, insiders, individuals with high net worth, individuals with high income, trusts having total assets in excess of $5,000,000, and entities owned entirely by accredited investors, according to specific rules in 17 CFR 230.501 (a). In one embodiment, a certificate ID for investor accreditation is required by the server computer for registration. If the certification ID is not provided, the server computer of the tokenized securities offering entity sends a link to at least one third-party accreditation agency (e.g., VerifyInvestor.com, EarlyIQ.com, SeedInvest.com) to the user device via e-mail, text message, a social media account, or any other communication method, preferably with two-step authentication for user accreditation. The user device gives the server permission to access the investor accreditation information from the at least one third-party accreditation agency. In another embodiment, the registered user is enabled for self-accreditation by providing qualification documents, and the server computer of the tokenized securities offering entity is operable to review the qualification documents and grant permission to the registered user for participating in the tokenized securities offering if the registered user is qualified as an accredited investor.

Under the federal securities laws in the US, a company or private fund may not offer or sell securities unless the transaction has been registered with the Securities and Exchange Commission (SEC) or an exemption from registration is available. Certain securities offerings that are exempt from registration may only be offered to, or purchased by, persons who are accredited investors.

In another embodiment, an investor is represented by a dealer or broker, and as such the dealer or broker will additionally provide their registration credentials such as their Financial Industry Regulatory Authority (FINRA) Central Registration Depository (CRD) numbers and SEC numbers.

Verify

The server computer of the tokenized securities offering or holding entity is operable to access and synchronize with various data sources for investor accreditation information. Investor accreditation status lasts a certain period of time and renewal is needed to keep the investor accreditation status alive. The server computer of the tokenized securities offering entity automatically creates and maintains an up to date whitelist of accredited investors based on the investor accreditation information obtained from various data sources. The server computer of the tokenized securities offering entity is operable to add self-accredited investors to the whitelist if they pass a review process conducted by the tokenized securities offering entity. The whitelist of accredited investors includes legal names, social security numbers (SSNs), tax identification numbers (TINs), uniquely identified accounts (e.g. cryptocurrency accounts or digital wallet addresses, fiat currency bank account information), accreditation expiration dates, and other information related to accredited investors. In one embodiment, the tokenized securities offering entity also creates and maintains a blacklist and blocks domain names, individuals, competitors and others with malicious intent from the token purchase or exchange.

The server computer of the tokenized securities offering entity compares the certificate ID and its issuing agency for the registered user with the up-to-date whitelist and blacklist of accredited investors for verification. Once the accreditation status of the registered user is verified, the server computer of the tokenized securities offering entity transmits a link to at least one tokenized securities contract including various document to a cryptocurrency account or digital wallet of the registered user accessible to the user device for review. In one embodiment, tokenized securities contracts are deployed on the ETHEREUM blockchain. An ETHEREUM account or an ETHEREUM wallet is required for purchasing securities tokens in the tokenized securities offering. In another embodiment, other blockchain platforms and/or other cryptocurrencies are used for offering and purchasing tokenized securities. In another embodiment, the tokenized securities contracts are deployed on another blockchain platform. The blockchain platforms for the tokenized securities contracts can be on a private and/or a public network.

To confirm investor accreditation, the server computer of the tokenized securities offering entity is operable to automatically access records related to accreditation in various databases, retrieve accreditation information automatically, and/or inquire financial institutions for investor accreditation status. In one embodiment, the tokenized securities offering entity requires at least $1 million worth of ETHER or any generally accepted cryptocurrencies or fiat currencies such as U.S. dollars in order to confirm accreditation. SEC regulations currently require accreditation based on U.S. dollars.

In one embodiment, if the investor is represented by a dealer or broker, the server computer of the tokenized securities offering entity is operable to use a blockchain oracle to confirm the dealer or broker's registration credentials and automatically whitelist the dealer or broker, if such representation is allowed in the offering or resale of tokenized securities.

In one embodiment, all accreditation information is recorded on various data sources over the Internet. The various data sources include but are not limited to databases for accreditation service agencies and blockchains recording accreditations and other data feeds requiring investor accreditation. In one embodiment, a blockchain oracle is applied to automatically retrieve accreditation information in real time from various data sources. An oracle, in the context of blockchains and smart contracts, is an agent that finds and verifies real world occurrences and submits this information to a blockchain to be used by smart contracts. This agent can be software, hardware, or human. In one embodiment of the present invention, the oracle is a software-based oracle and programmed to search for and parse text for accreditation information.

The server computer of the tokenized securities offering entity utilizes at least one blockchain oracle to retrieve accreditation information. Different data sources work differently for investor accreditation. Information retrieved from various data sources are normalized before the information is included in the whitelist. The server computer of the tokenized securities offering entity is operable to confirm the accreditation status of a registered user automatically based on the up-to-date whitelist of accredited investors.

Review

Once a party has been allowed to view the disclosure documents, the offering or holding entity manage which documents are mandatory to be reviewed and which are not. The various disclosure documents in the at least one tokenized securities contract include mandatory and non-mandatory documents. For example, but not for limitation, mandatory documents include Private Placement Memorandums (PPM) (including business plans, risks, and financial information), Contract of Securities Offering, Pricing Adjustments, and Purchase Agreements; non-mandatory documents include Company Bylaws, Contracts, Licensing Agreements, and Whitepapers. In one embodiment, mandatory documents are required to be downloaded. Mandatory documents include watermarks and other security features that the server computer of the tokenized securities offering entity requires to be reported back via the blockchain platform for automatic confirmation that the mandatory documents have been downloaded, which is an automated indication that the mandatory documents have been reviewed by the registered user. Alternatively, an input from the registered user is received by the blockchain platform indicating that the mandatory documents have been reviewed. In one embodiment, the disclosure documents are disclosed only to parties as desired by the offering entity or holding entity.

Documents reviewed by the registered user are hashed based on a secure hash algorithm (e.g., SHA-3) and each hash is stored in the blockchain. Hashes of the reviewed documents uniquely represent what the documents are. If a document is known, then the hash of it is known based on the secure hashing algorithm used. In one embodiment, the server computer of the tokenized securities offering or holding entity is operable to compare a hash representing a reviewed document by a registered user to the hashes of the documents provided by the tokenized securities offering entity to confirm that the registered user has reviewed the mandatory documents.

Accept

User information is required for SEC compliance from the registered user and recorded on the blockchain platform. For individuals, required information includes legal name, address, and SSN. For entities, required information includes company name, address, and TID. Other information for the registered user recorded on the blockchain include a uniquely identified account on a blockchain platform (e.g., a cryptocurrency account or a digital wallet address), automated clearing house account, bank account (e.g., source or receipt of payment information), accreditation expiration date, and the hash of reviewed documents.

After reviewing various documents in the at least one tokenized securities contract, the user device transmits an acceptance message regarding the terms and conditions in the tokenized securities offering. In one embodiment, the terms include not being a bad actor according to the Office of Foreign Assets Control (OFAC), not violating the securities laws, not being a broker or dealer, not intending to purchase to resell or any other broker or dealer activity, etc. The terms also include representations and warranties, private placement memorandum (PPM), anti-money laundering (AML), Know Your Customer (KYC). The AML and KYC terms can also be verified via third-party reporting agencies such as banks, US Treasury, etc. via a software oracle.

Purchase

At purchase stage, a purchase order is completed by the registered user paying a certain amount of cryptocurrency or fiat currency for at least one securities token specified in at least one tokenized securities contract. In one embodiment, the certain amount of currency is transferred from the unique identified account or digital wallet of the registered user to an escrow account for the tokenized securities offering entity on the blockchain platform. In one embodiment, the escrow account is a third-party escrow agency on the blockchain platform. In another embodiment, the escrow account is a third-party escrow agency in a banking system for fiat currency. In another embodiment, the tokenized securities contracts deployed on the blockchain platform provide an escrow function by holding cryptocurrencies or banking system representations of fiat currency, and securities tokens until a predetermined threshold is reached. The predetermined threshold can be a date, a number of investors invested, a minimum raise, or other metrics determined by the tokenized securities offering entity. After the predetermined threshold is reached, the certain amount of cryptocurrency paid by the registered user is released to a cryptocurrency account or a digital wallet of the tokenized securities offering entity, and the at least one securities token is released to the cryptocurrency account or digital wallet of the registered user corresponding to the at least one tokenized securities contract. Thus, the at least one tokenized securities contract is let and recorded on the blockchain platform. Once the at least one tokenized securities contract is completed, it is immutable.

A purchase agreement is a binding contract between the tokenized securities offering entity and investors. The purchase agreement defines what security is being acquired. During a purchase agreement process, an investor agrees to the terms and conditions in the purchase agreement and makes their representations (e.g., accredited investors, not a bad actor, not a foreign asset holder in restricted countries, not performing an illegal activity, etc.). A purchase order is the transfer of funds in exchange of securities) (e.g., equity, debt, option). During a purchase order process, the tokenized securities offering entity verifies that the investor is not on a blacklist (e.g., competitor, affiliate), passes the OFAC check, and is an accredited investor and that the seller is authorized to sell the security (e.g., not an executive, broker/dealer) by the offering or holding entity. How and when related information is gathered and processed vary in different embodiments of the present invention.

Rights of the Tokenized Securities Offering Entity

In an Initial Public Offering (IPO), a red herring prospectus issued by an issuing company to potential investors contains information associated with the issuing company and their IPO. Information in the red herring prospectus is not complete and may be changed. Similarly, documents provided in the tokenized securities offering are changeable by the tokenized securities offering entity with SEC compliance during the tokenized securities offering. Once a document is updated, it is a new document and will have a new hash based on the secure hash algorithm used by the tokenized securities offering entity. If a document is updated after reviewed by a registered user but before the purchase process is completed, the server computer of the tokenized securities offering entity redirects the registered user to go back to review the updated document via the GUI in order to complete the purchase process. In one embodiment, the GUI is operable to read and interpret blockchain messages. If a document is updated after a registered user completed a purchase order during the offering period, the server computer of the tokenized securities offering entity still provides the updated document to the registered user and the registered user is enabled to select to reverse or keep the purchase order. Contracts of tokenized securities purchased at different times during the tokenized securities offering may be different due to document updates.

The server computer of the tokenized securities offering entity is operable to change the registration process, change terms of offering, approve tokenized securities transferring, and make other updates in order to comply with rules and regulations in a certain jurisdiction. In one embodiment, systems and methods for offering and purchasing tokenized securities are compliant with the SEC. The server computer of the tokenized securities offering entity is operable to update the registrations process, update offering terms, and approve securities token transferring with SEC compliance.

The server computer of the tokenized securities offering entity has enforcement mechanisms to execute against securities tokens issued by the tokenized securities offering entity. In one embodiment, if the tokenized securities offering entity does not raise a predetermined minimum amount of funds (e.g., cryptocurrency and/or fiat currency) of liquid value, all the currency received from investors is reversed back to the investors. In one embodiment, if the tokenized securities offering entity does not sell a predetermined number of tokens, all the currency received from investors is reversed back to the investors. In one embodiment, after the tokens are sold, there is a uniform return price that is based upon a moving average of the value of ETHEREUM. For example, but not for limitation, if ETHEREUM is accepted by the tokenized securities offering entity, the moving average of the value of the ETHEREUM is a 90-day moving average. In one embodiment, if an investor does not comply with the terms and conditions as accepted by the investor, the server computer of the tokenized securities offering entity is operable to reject the noncompliant investor as a holder of the securities tokens issued by the tokenized securities offering entity by reversing the transactions with invested users and/or seizing the securities tokens purchased by noncompliant investors on the blockchain platform.

The enforcement mechanisms apply to accredited investors throughout an entire trading cycle. In one embodiment, if an investor has lost the accreditation status since renewal is required after a certain period of time, the server computer of the tokenized securities offering entity is operable to request the disaccredited investor to sell the securities tokens. In one embodiment, the securities tokens are sold by the disaccredited investor. In another embodiment, the server computer of the tokenized securities offering entity is operable to sell the securities tokens on behalf of the discredited investor on the blockchain platform. Optionally, the discredited investor can still retain the securities tokens with regulatory compliance. Section 12(g) of the Exchange Act requires an issuer with total assets of more than $10 million and a class of securities held of record by either 2,000 persons, or 500 persons who are not accredited investors, to register that class of securities with the Commission. However, securities issued pursuant to Regulation Crowdfunding are conditionally exempted from the record holder count under Section 12(g) if the following conditions are met: (1) the issuer is current in its ongoing annual reports required pursuant to Regulation Crowdfunding; (2) has total assets as of the end of its last fiscal year of $25 million or less; and (3) has engaged the services of a transfer agent registered with the SEC.

In one embodiment, the systems and methods of the present invention do not allow for buying and selling securities tokens at the same time or within a specified time period. The amount of securities tokens a registered user is planning to purchase is held in escrow on the blockchain while the registered user is in the process of purchasing, and the securities tokens held in escrow cannot be sold by the tokenized securities offering entity to prevent double-spending. Additionally, once a purchase is completed there are rules to be enforced such that the purchaser cannot resell the securities tokens for some period of time to comply with SEC rules for 'making a market' (i.e., a rest period).

Token Market for Token Transfer

In one embodiment, the tokenized securities offering entity provides a token market with a token transfer framework facilitating token exchanges after an offering period. In one embodiment, restrictions are introduced to prevent the tokenized securities offering entity functioning as a token marketplace during the offering period. For example, asks and bids are not allowed to be posted on a bulletin board, and the web site of the tokenized securities offering entity is not allowed to post the securities token prices. However, bids are operable to be made to securities token holders on the blockchain platform. For example, a bid for 5 securities tokens is made, a bidding message is sent to securities token holders, the securities token holders review the bidding message and the bid via their digital wallets and make counter offers or direct sales (e.g., swap tokens by fulfilling contract). This process creates visibility for SEC compliance. Tokenized securities purchased during the tokenized securities offering (or through existing manual means) are tradable on a secondary market usually after a rest period.

When the tokenized securities offering entity solicits to buy and sell, the entity creates a token market itself for token transfer or token exchange as the tokenizing securities offering entity will function as both a token holder and a token transactor. However, under current SEC rules at the time of the present invention, no solicitation is allowed outside allowed investors for SEC, State, and offering entity's compliance; as SEC provides for expansion, modification, or new rules, the platform of the present invention is intended to correspondingly provide for the same. In one embodiment, the tokenized securities offering entity also calculates taxes due to revenue department based on information including gross amounts of securities tokens and stored information of capital gains and losses by token holders. The information is transmitted to an IRS network, which receives the information and collects taxes from securities token holders.

The tokenized securities offering entity keeps a log of events impacting contracts. The token transfer framework is piggybacked on logging methods used by the tokenized securities offering entity. Notifications of what is available on the token market of the tokenized securities offering entity are created based on the logging methods and sent to all token holders. The notifications are not sent outside of the whitelist of allowed investors so that the notifications are not general solicitation but rather managed by the offering entity.

Books, records, contracts, and financials of the tokenized securities offering entity are accessible to invested investors for inspection. When new blockchain securities are created, the invested investors receive messages for inspection. Every invested investor has unique documents with personalized watermarks. Preferably, a web-based portal is provided, the portal having a GUI for at least one investor to manage its activity and initiate new activity within the immutable ledger-based platform. Contrary to a whitelist, the tokenized securities offering entity also creates and automatically maintains a blacklist that blocks domain names, individuals, competitors and others with malicious intent from the token purchase or exchange.

BITE Tokens

In one embodiment, tokenized securities offered by the tokenized securities offering entity are named as Blockchain Instrument for Transferrable Equity (BITE) tokens. BITE tokens can represent various forms of securities used by entities, such as common stock, preferred stock, options, warrants, convertible notes, restricted stock units and employee stock options. For example, the BITE tokens have, but is not limited to the following features:

(a) Individual Optional Conversion: At any time on or after the end of a purchase period, qualified holders are enabled to elect to convert their BITE tokens into shares of voting or non-voting stock. Initially each BITE token is convertible into one share of voting or non-voting common stock. In a preferred embodiment, the conversion is subject to later proportional increase or decrease to reflect any changes to the number of outstanding shares of common stock of the offering entity attributable to any stock dividend, split, reverse split recapitalization or similar event.

(b) Dividend and Distribution Equivalent Rights: qualified holders will receive payments equal to the dividends and other distributions that are paid to holders of any class of common stock on an as-converted basis.

(c) Majority Approved Financing: all outstanding BITE tokens will automatically convert into a new class of securities issued by the BITE offering entity in the event of (1) the BITE offering entity offers such conversion option to the holders of BITE tokens and (2) such conversion is approved by a majority of qualified holders. The majority of qualified holders are the qualified holders who own a majority of the then outstanding BITE Tokens held by all qualified holders.

(d) Liquidity Event Option: each qualified holder has the right to choose to receive other cash or non-voting common stock when a liquidity event (e.g., IPO or Change of Control) or dissolution occurs. If the liquidity event is an IPO, holders of BITE tokens will receive voting common stock instead of non-voting common stock.

(e) Automatic Conversion Upon a Qualified Equity Financing: If a qualified equity financing occurs, all outstanding BITE tokens will automatically convert into the same class of securities issued in the qualified equity financing, subject to holders executing qualified equity financing documents.

In one embodiment, the systems and methods are designed to comply with the regulation environment in the US. In other embodiments, the systems and methods can be used for unregulated environments or different regulation environments in other jurisdictions.

Figure 1:
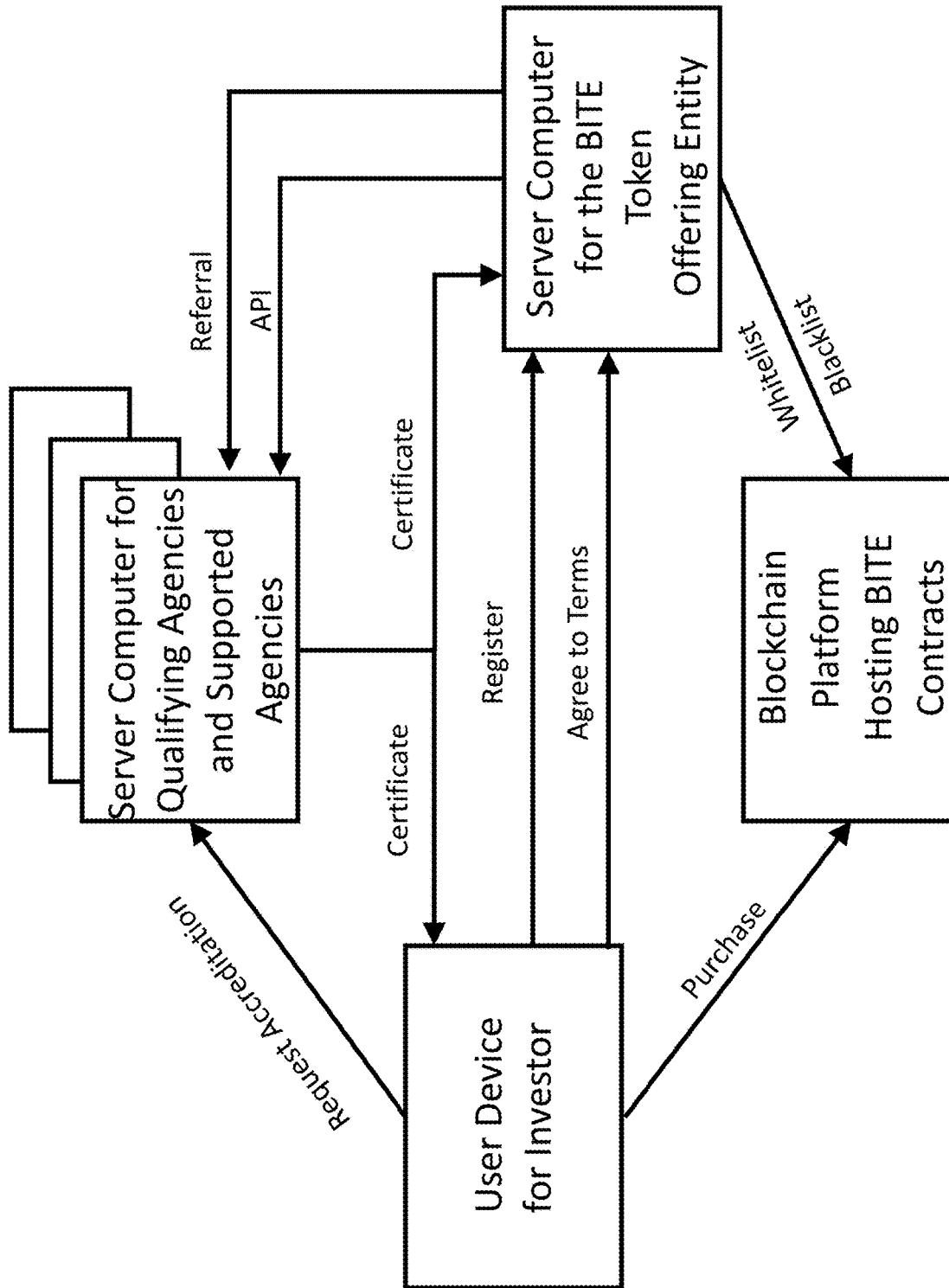
FIG. 1 illustrates a system of purchasing securities tokens according to one embodiment of the present invention.

FIG. 1 illustrates a system for purchasing securities tokens according to one embodiment of the present invention. The system includes at least the following components: a user device for at least one investor, server computers of qualifying agencies and their supporting agencies, a server computer of the BITE token offering entity, and a blockchain platform hosting BITE token contracts in network communication, wherein the components are operatively communicative over at least one network. A web-based portal having an interactive GUI is provided for facilitating interaction via the user device and/or server computer(s).

The user device for an investor sends an accreditation request message to a server computer of a qualifying agency via a GUI. The server computer of the qualifying agency issues an accreditation certificate based on information provided by the investor via the user device and information regarding the investor from supported agencies. The user device provides the accreditation certificate Identification (ID) and the qualifying agency name when registering with the server computer of the BITE token offering entity besides other required information including but not limited to legal name, address of residence, and e-mail address. In one embodiment, self-accreditation of the at least one investor is provided via the platform, based upon inputs received from the user device. The server computer of the BITE token offering entity is operable to access and synchronize with the accreditation information from different qualifying agencies via API and referral, and automatically create an up-to-date whitelist of accredited investors based on the accreditation information from different qualifying agencies. The whitelist of accredited investors includes legal names, addresses of residence, cryptocurrency accounts and/or wallet IDs, accreditation expiration dates and other essential information of the accredited investors. In one embodiment, non-accredited investors are enabled to participate under crowd-sourcing, or other alternatives as provided for based upon rules of the SEC or governing body. The server computer of the BITE token offering entity is operable to verify the accreditation certificate obtained by the investor by looking up in the whitelist of the accredited investors. In one embodiment, the whitelist is recorded and updated on the blockchain platform hosting BITE token contracts. In one embodiment, the tokenized securities offering entity also creates and maintains a blacklist and blocks domain names, individuals, competitors and others with malicious intent from the token purchase or exchange. In one embodiment, the blacklist is also recorded and updated on the blockchain platform hosting BITE token contracts. The user device for the investor is operable to send an "agree-to-terms" message if the investor intends to participate in the BITE token offering. Then the user device receives and reviews documents related to the BITE token contract deployed on the blockchain. The user device makes the purchase of the at least one BITE token contract on the blockchain platform by transmitting a required amount of currency.

In one embodiment, the terms in the BITE token offering include a maximum number of token holders, a minimum amount of investment, a number of days to rest, and a restocking fee. In one embodiment, the maximum number of token holders complies with SEC rules, for example, the maximum number of token holders is set at 1500. For example, the minimum amount of investment is an amount of cryptocurrency of $5000 equivalent value, or other value based upon another cryptocurrency or another currency. The number of days to rest defines a time period during which BITE tokens are not allowed to be resold for inside trading restriction. In one embodiment, the number of days to rest is 60. In another embodiment, the number of days to rest is not bounded by a date, but rather until all of the tokens have been sold. The number of days to rest ensures that the securities tokens are not resold after being purchased during the BITE token offering, unless allowed by the governing entity or rules body. The restocking fee is a percentage of the prices of BITE tokens being returned from an investor during a certain period of time due to various reasons with SEC compliance. For example, while the BITE token offering is open, an investor problem is identified after investment, the server computer of the BITE token offering entity is operable to reverse the BITE tokens held by the problem investor back to the BITE token offering entity, and the BITE tokens are reintroduced to the market. The server computer of the BITE token offering entity is operable to charge the problem investor for restocking the securities tokens into the market. In one embodiment, BITE tokens are returned from an investor up to 5 days before the BITE token offering is closed, and a 15% restocking fee is charged.

In one exemplary embodiment, the BITE token offering entity initially offers a predetermined number of tokenized securities, for example, 3000 tokenized securities, the maximum number of BITE token holders is 1000, the minimum investment of each investor is $5000 equivalent ETHERs, and the total investment is $15,000,000 equivalent ETHERs.

Figure 2:
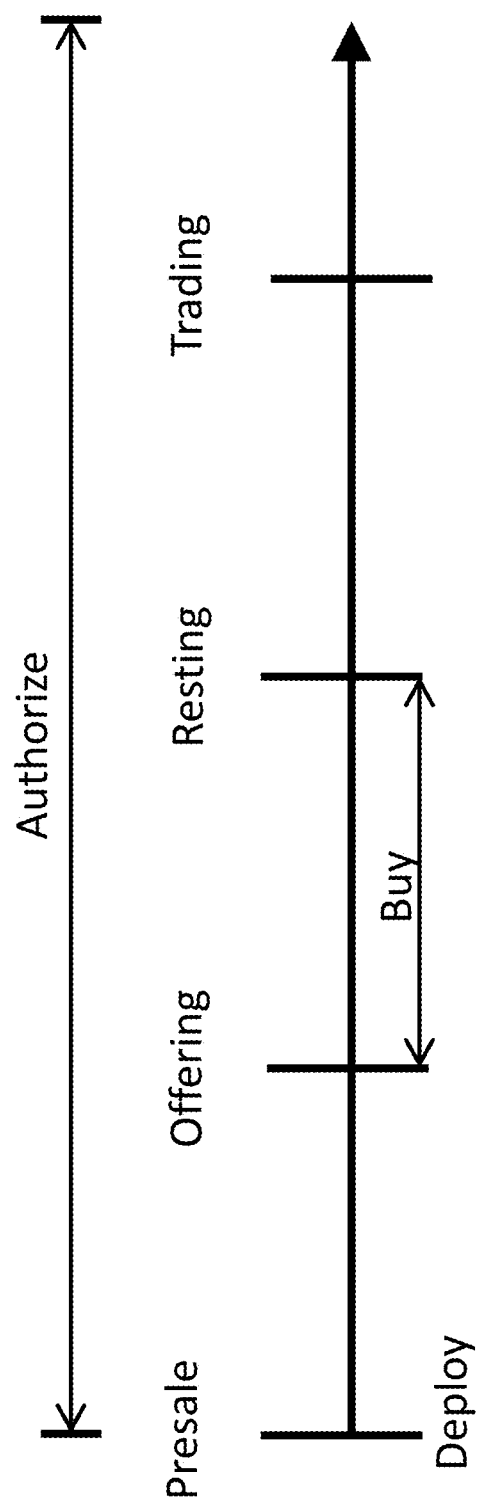
FIG. 2 is a timeline throughout a life cycle of BITE tokens according to one embodiment of the present invention.

FIG. 2 is a timeline throughout a life cycle of BITE tokens according to one embodiment of the present invention. The timeline starts with deploying BITE token contracts on a blockchain platform. There are four periods: presale period, offering period, rest period, and trading period. Dates for those periods are programmable based upon how they work together in the BITE token contracts. Variables regarding the BITE token offering are programmable on the blockchain platform. For example, the variables include start and stop dates for each period, presale prices, offering prices, minimum investment amount, and thresholds which trigger the next period. A threshold can be a date, a number of tokens purchased, or a number of investors invested.

The first period is a presale period. During the presale period, potential investors are enabled to register and review documents related to the BITE token offering, and a discount is offered for purchasing BITE tokens. An initial price for tokenized securities is set by the BITE token offering entity, and the discount is based on settings of price adjustment and adjustment frequency in the BITE token contracts deployed on the blockchain platform. In one embodiment, an initial price is set as 17 ETHERs per BITE token, price adjustment is set at 1 ETHER, and there are 4 adjustments during a four-week presale period. In another embodiment, accredited investors receive at least one discount rate based upon an initial price with at least one time factor; by way of example and not limitation, accredited investors automatically receive 15% off of the initial price during the first week of presale, 10% off during the second week of presale, 5% off during the third week of presale, and no discount during the fourth week.

The second period is an offering period. During the offering period, accredited investors are enabled to register for participation, review documents, accept terms, and purchase BITE tokens. BITE token contracts are let to invested investors and recorded on the blockchain platform. During the offering period, some investors may be rejected due to failed accreditation, being a competitor of the BITE token offering entity, or being affiliated with a competitor of the BITE token offering entity. Rejected investors are allowed to petition and demonstrate to the server computer of the BITE token offering entity that they are valid investors to the BITE token offering entity. The server computer of the BITE token offering entity is operable to verify and reinstate the rejected investors, and authorize them to participate in the BITE token offering.

After the offering period, there is a rest period. The rest period is to ensure that investors participated in the BITE token offering are not brokers or dealers as defined by the SEC rule 144, or other rules or regulations by the SEC or other governing authority.

After the rest period, it is a trading period, during which BITE tokens are tradable on a secondary market. This period may or may not be bounded by a time requirement. The server computer of the BITE token offering entity is still operable to enforce SEC rules for compliance on the blockchain platform. For example, the server computer of the BITE token offering entity is operable to suspend certain investors or trading activities for a certain time period.

In one embodiment, the BITE token offering entity is operable to trade BITE tokens as an exchange automatically based on terms in the BITE token contracts. In one embodiment, asks and bids are performed in order. There is only one bid or one ask per allowed investor at any given time such that they cannot sell tokenized securities that they no longer own, or attempt to purchase tokenized securities when they do not have available funds.

Once the BITE token contract is let, it is not changeable. However, terms within the contract that are executable are changeable, for example, parameters within the contract (e.g., suspension of trading or investor).

Figure 3:
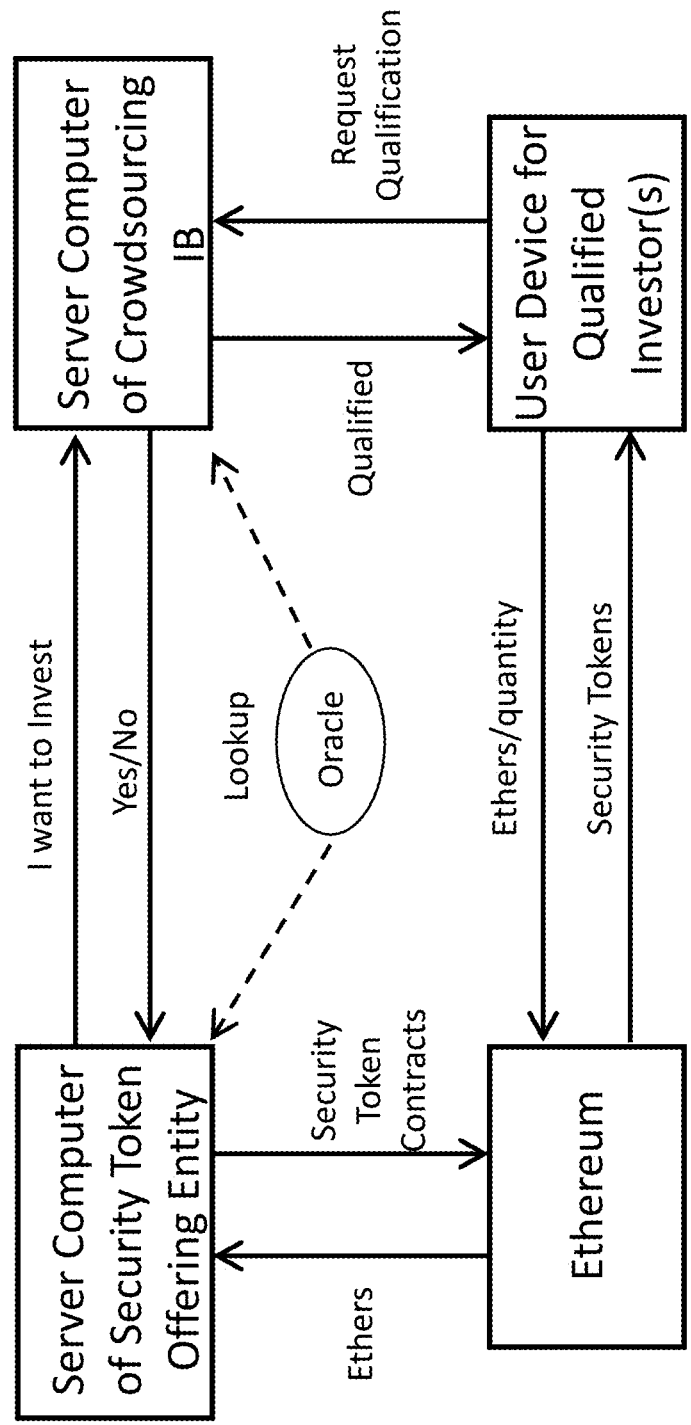
FIG. 3 illustrates interactions between different entities during a tokenized securities offering according to one embodiment of the present invention.

FIG. 3 illustrates interactions between different entities during a securities token offering according to one embodiment of the present invention. A server computer of the securities token offering entity deploys securities token contracts and raise ETHERs on ETHEREUM blockchain. The server computer of the securities token offering entity sends a request message to a server computer of crowdsourcing investor bulletin (IB) indicating that the token offering entity wants investment and access to investor information. The server computer of the crowdsourcing IB sends a reply message allowing or disallowing the token offering entity to access to the investor information. A user device for an investor who intends to participate in the securities token offering requests qualification from the crowdsourcing IB via a GUI. If the requesting investor is qualified as an approved (for example, if the investor's income must be verified) or accredited investor, the server computer of the crowdsourcing IB sends a qualification certificate to the user device for the investor. A blockchain oracle is utilized by the server computer of the token offering entity to look up investor qualification information from the crowdsourcing IB to verify investor accreditation status. Once the investor accreditation status is verified, the user device is operable to review and accept the securities token contract, and send ETHERs from an ETHEREUM account to finish purchasing securities tokens on the ETHEREUM blockchain.

Figure 4:
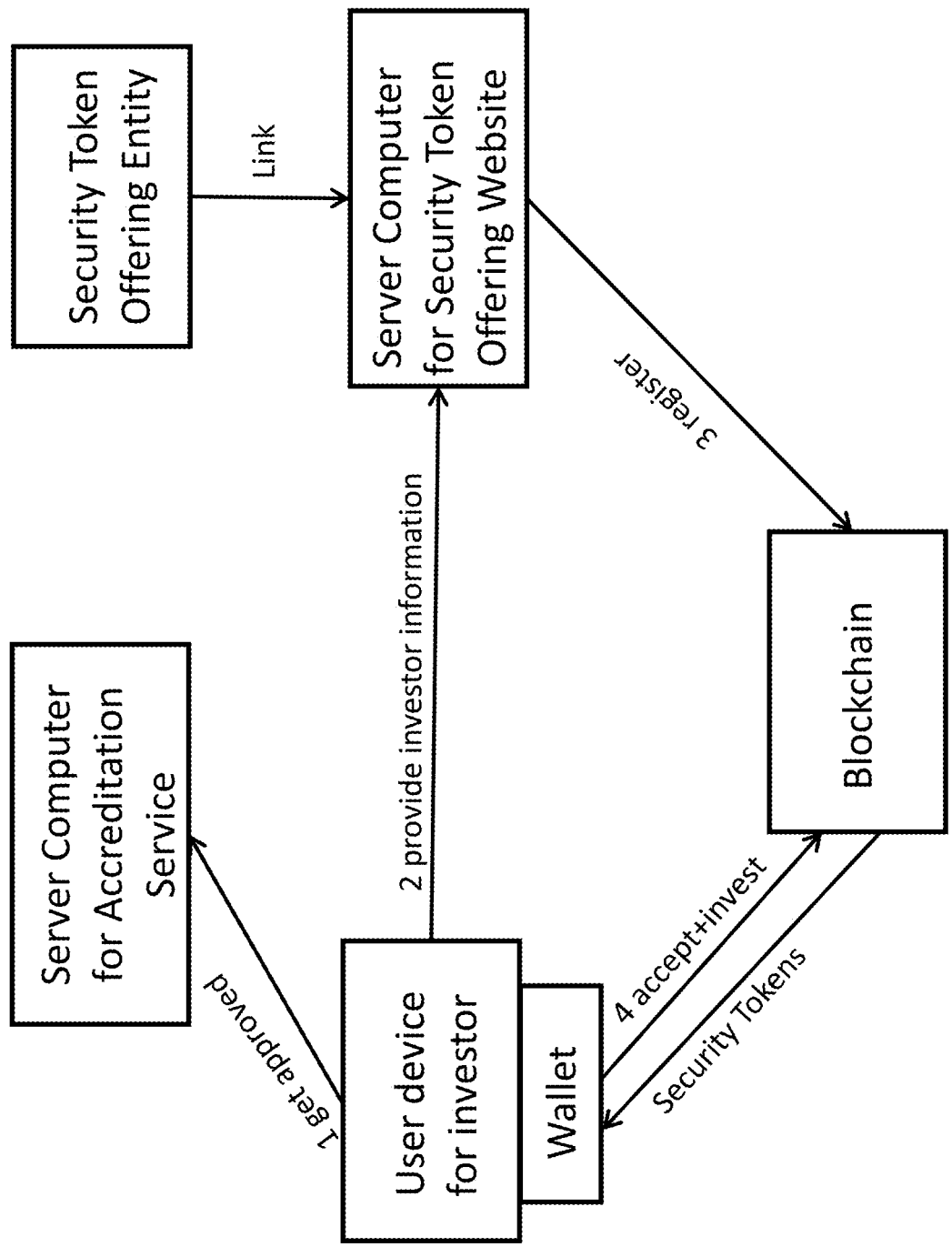
FIG. 4 illustrates a token purchasing process on blockchain during a tokenized securities offering according to one embodiment of the present invention.

FIG. 4 illustrates a token purchasing process on blockchain during a securities token offering according to one embodiment of the present invention. A user device for an investor communicates with a server computer of an accreditation service to get the investor approved as an accredited investor to participate in the securities token offering. The user device includes an ETHEREUM wallet of the investor. The ETHEREUM wallet includes a unique identifier from which ETHERS are sent for token purchasing on the ETHEREUM blockchain. The user device transmits investor information to the server computer of the tokenized securities offering website, with the investor information including an email address, a uniquely identified account, an encrypted code for accreditation status, and a third-party verifying agency that issued the encrypted code for accreditation status to the server computer of the tokenized securities offering website. The server computer of the tokenized securities offering website registers the accredited investor on the ETHEREUM blockchain with the information received from the user device. The user device receives documents included in a token contract after registering the investor with the sever computer of the tokenized securities offering website. For example, but not for limitation, the documents include PPM, subscription agreement, Intellectual Property, and Article(s) of Incorporation. The user device transmits an acceptance message after reviewing documents included in a securities token contract and sends ETHERs to purchase securities token contract on the blockchain.

Figure 5:
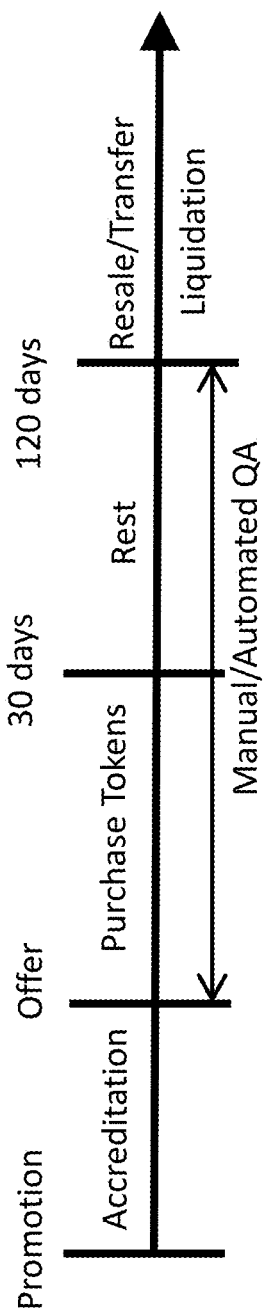
FIG. 5 is a timeline throughout a life cycle of tokenized securities according to one embodiment of the present invention.

FIG. 5 is a timeline throughout a life cycle of tokenized securities according to one embodiment of the present invention, wherein the life cycle includes at least one time interval. By way of illustration, there is a promotion period before the tokenized securities offering. The platform of the present invention is operable to receive applications by at least one intended investor for accreditation, in order to participate in the tokenized securities offering during the promotion period. During the offering period, the platform is operable to provide for the purchase of tokens on a blockchain platform by accredited investors. In one exemplary embodiment of a time interval, the offering period of the tokens lasts 30 days, with a rest period following the offering period that lasts 90 days.

A verification process is required in an electronic system for a tokenized securities offering to demonstrate that a potential investor is an accredited investor according to SEC rules. After a rest period, existing shareholders are enabled to sell to new investors who are not required to demonstrate an accredited investor status. In one embodiment, the systems and methods of the present invention allow self-verification by new investors (e.g., by checking a box "I'm an accredited investor based on income or assets . . . " and provide qualification documents), and the tokenized securities offering entity performs qualification assessment (QA) manually or automatically during the offering period and rest period instead of using a third-party service for verification. After the rest period, there is a resale period when tokens are traded between existing tokenized securities holders and new investors or other existing holders.

Figure 6:
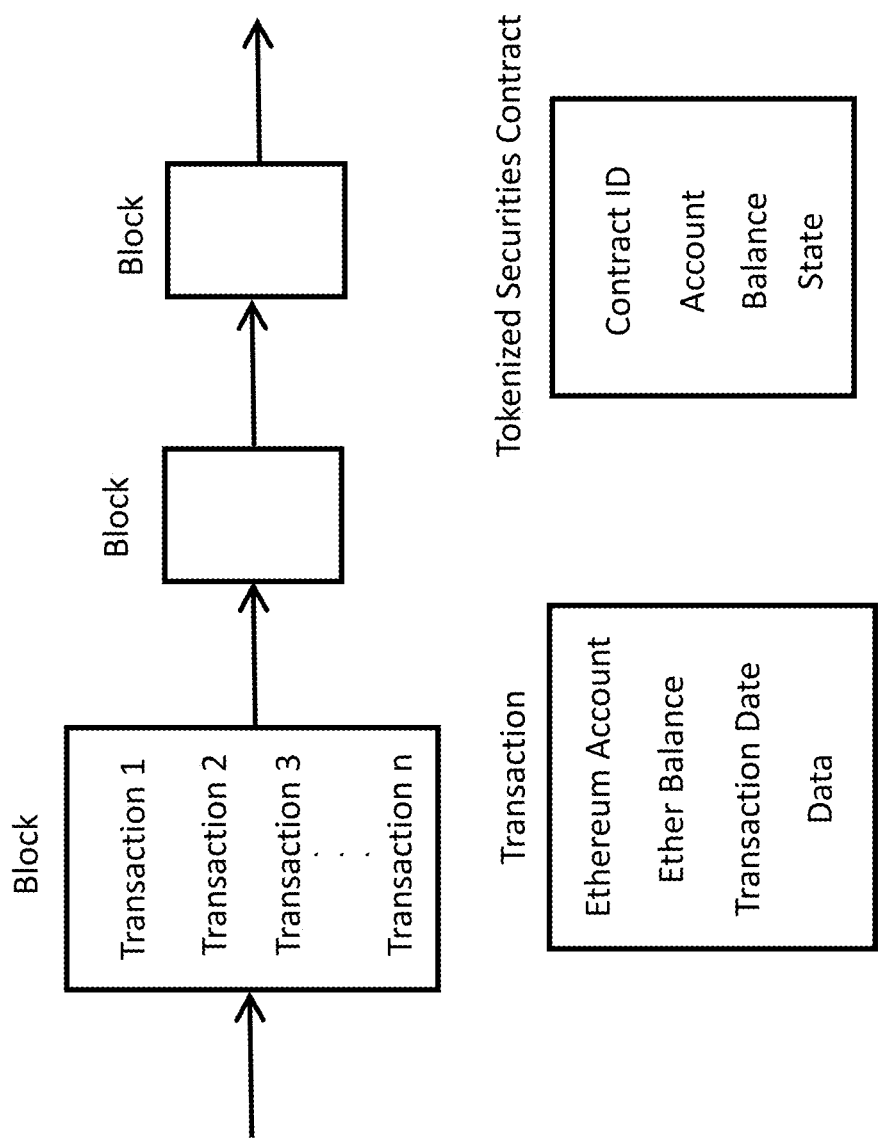
FIG. 6 illustrates transactions and contracts recorded in blocks on the ETHEREUM blockchain according to one embodiment of the present invention

FIG. 6 shows an exemplary illustration for transactions and contracts recorded in blocks on the ETHEREUM blockchain, although the present invention is operable for at least one blockchain, including other blockchain platforms. Continuing with the example of FIG. 6, the ETHEREUM blockchain, every block includes a multiplicity of transactions and a hash linked to a preceding block. Each transaction includes an account identifier, an ETHER balance, a transaction date, and data. In one embodiment, the data in each transaction includes securities token contracts deployed by the systems and methods of the present invention. Each tokenized securities contract includes a contract ID, an ETHER account, a balance of tokens in an escrow account for the tokenized securities offering entity on the blockchain, and a state of the token holder. The state of the token holder is based on the whitelist when the token contract is let. In one embodiment, each tokenized securities contract also include data and manipulation methods.

Figure 7:
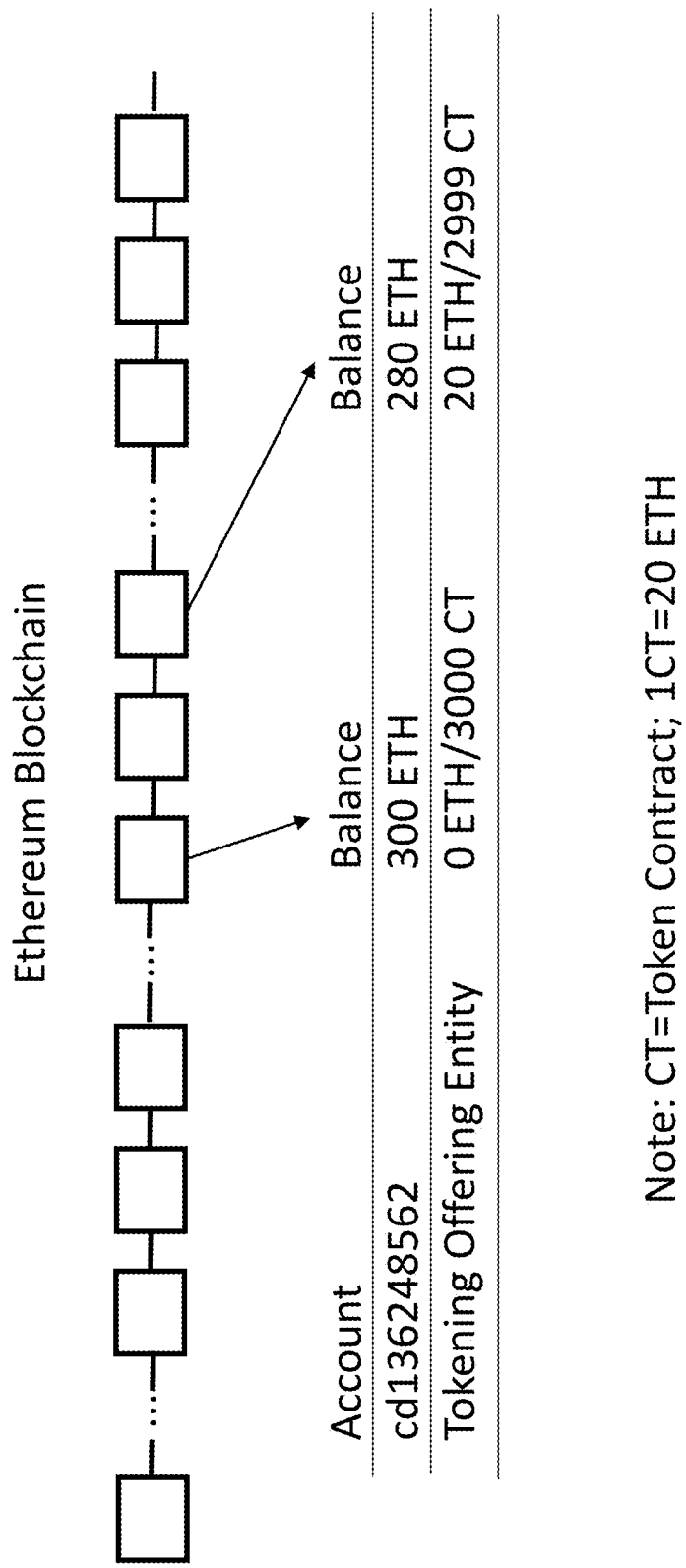
FIG. 7 illustrates transactions for taken contract between an investor and a tokenized securities offering entity on ETHEREUM blockchain according to one embodiment of the present invention.

FIG. 7 illustrates transactions for a token contract between an investor and a securities token offering entity on the ETHEREUM blockchain. In one embodiment, a token contract is 20 ETHERs at a time during a token offering. When token contracts offered by the token offering entity are deployed on the ETHEREUM blockchain, there are 3000 contracts available, and one of the at least one investor is identified as cd136248562, which has 300 ETHERs in his digital wallet, which are both recorded in one block on the ETHEREUM blockchain. Investor cd136248562 registers with the token offering entity for token purchase, one token contract is let to the investor, and the transaction is recorded in one block on the ETHEREUM blockchain. The transaction includes a balance of investor cd136248562 as 280 ETHERs, and the token contract. The token contract includes the balance of tokens in an escrow account for the token offering entity on the ETHEREUM blockchain.

Figure 9:
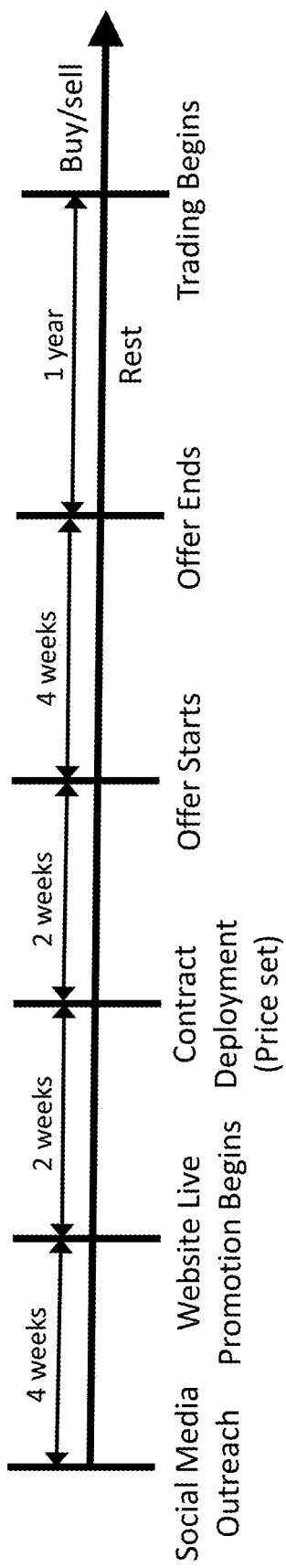
FIG. 9 is a tokenized securities offering timeline according to one embodiment of the present invention.

FIG. 8 lists investor documents in a token purchase process according to one embodiment of the present invention. When a user device registers an investor on the server of the tokenized securities offering entity website, the user device needs to send an acceptance message regarding a non-disclosure agreement and provide an e-mail address of the investor to the server of the tokenized securities offering entity. In order to proceed in the purchase process, the user device needs to provide information including a unique qualification ID for investor accreditation and its issuing agency to the server of the tokenized securities offering entity website. Meanwhile, the server of the tokenized securities offering agency provides investor documents available for download on a blockchain platform. After downloading the investor documents, the user device of the investor sends an agreeing message regarding the terms and conditions specified in an PPM and a subscription agreement, and provides a unique identifier address to make the purchase. Investor documents include PPM, subscription agreement, and inventor qualification documents. The PPM specifies risks, company charter, business plan, etc. The PPM is not required for investor signature. The subscription agreement includes introduction of the tokenized securities contracts offered by the tokenized securities offering entity and stock definition. The subscription agreement defines real legal requirements for investors, and it is the actual document provided to an actual purchaser. The subscription agreement is required for investor signature. The investor qualification documents provide proof of the investor's net income or annual income with investor signature for self-verification. In one embodiment, the server computer of the tokenized securities offering entity sends a message asking for an accreditation status of new investors participating in the tokenized securities offering. The new investors are enabled for self-verification by submitting qualification documents instead going through a third-party accreditation agency. In one embodiment, existing shareholders are required to confirm their accredited investor status on an annual basis. The server computer of the tokenized securities offering entity sends a message asking for renewed accreditation status of the existing shareholders. The existing shareholders are enabled for self-verification by submitting qualification documents instead going through a third-party accreditation agency FIG. 9 illustrates a tokenized securities offering timeline according to one embodiment of the present invention, showing exemplary timelines of promotion through offering and rest periods. Alternative timelines or intervals are provided in other embodiments. Social media outreach, press releases, and other marketing tools are utilized to raise awareness for the tokenized securities offering on the platform, and it lasts 4 weeks before a promotion starts. The promotion lasts 2 weeks, during which the tokenized securities offering website is live for promotion. Then token contracts are deployed on a blockchain platform and the price is set for the token contract. There is a 2-week presale period before a 2-week official tokenized securities offering. After the official offering, there is a rest period before the token contracts can be traded. In this embodiment, the rest period is 1 year. After a rest period, trading begins for buying and selling the token contracts. In one embodiment, the present invention provides an algorithm for price setting. Various variables are programmed in the token contracts on the blockchain platform. For example, the price is set at lowest at the beginning of the offering, but a minimum amount of purchase is required. Because of the volatility of cryptocurrencies and other currencies, the present invention provides an automated mechanism to dynamically set the price of token contracts based on the cryptocurrency price, by way of example and not limitation, the ETHER price, when the contract is about to let. The token contract price is locked in at the time of purchasing and not changeable afterwards even though ETHER price changes.

Figure 10:
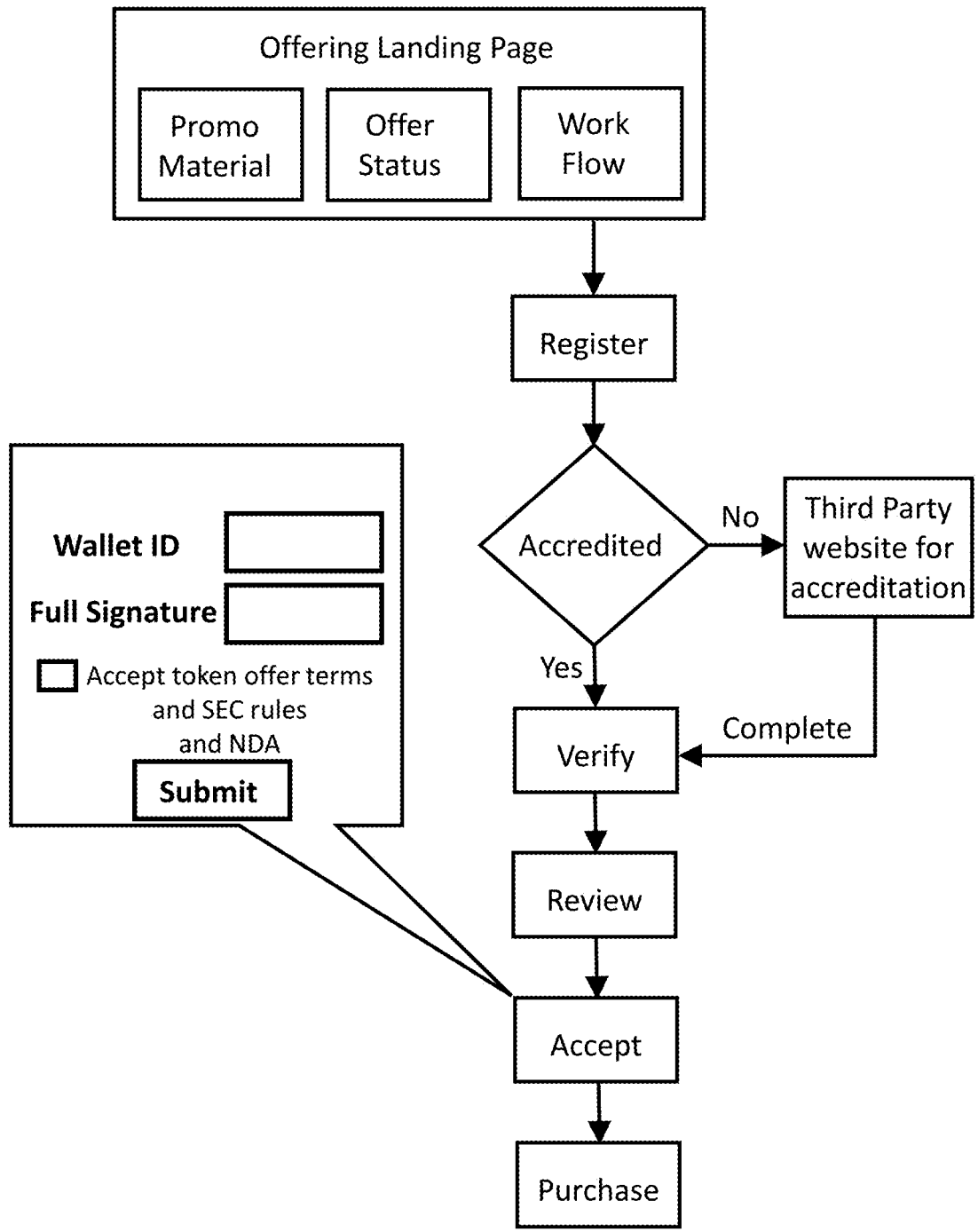
FIG. 10 is a flowchart of a token purchase process according to one embodiment of the present invention.

FIG. 10 is a flowchart of a token purchase process according to one embodiment of the present invention. A server computer of a tokenized securities offering entity provides a tokenized securities offering landing page, which includes promotion materials, offer status, and a work flow of token purchase. A user device for an investor transmits required investor information to the server computer of the tokenized securities offering entity and accepts terms of the offering website (e.g., non-disclosure and privacy). In one embodiment, the registration process includes 2-step authentication or other authentication protocols to effect security. In another embodiment, the registration is enabled with Open ID protocol. The user device is enabled to use a third-party login of the investor, and the third-party login preferably has 2-step authentication as well.

If the user device provides a qualification ID of the investor's accreditation status to the server computer of the tokenized securities offering agency, the server computer of the tokenized securities offering agency is operable to verify the investor's accreditation status by comparing information related to the investor to a whitelist and a blacklist the server computer of the offering entity maintains up to date. If the investor does not have a qualification ID when registering, the user device is redirected to a third-party website for accreditation, or self-accreditation. If the user obtains a qualification ID from the third-party website for accreditation, the offering website is able to verify his or her accreditation status based on the up to date whitelist and blacklist maintained by the offering. The whitelist includes information related to accredited investors, wherein the information includes but is not limited to investor names, addresses, at least one qualification ID and corresponding issuing agency. The blacklist includes affiliations, competitors and US addresses, other addresses the offering entity wants to block, predetermined foreign investors, and/or bad actors based on data obtained from OFAC and/or other databases.

Once the server computer of the offering entity verifies the investor as an accredited investor, the user device of the investor receives a link to documents included in a token contract for reviewing and accepting. The user device transmits a Wallet ID which is a uniquely identified account and a full signature and accepts token offering terms, SEC rules, and non-disclosure agreements (NDA) after reviewing the documents. The user device then makes transactions for purchasing the token contract by transmitting a certain amount of cryptocurrency from the investor's digital wallet to an escrow account for the token offering entity on a blockchain platform.

The process of purchasing tokenized securities contracts is executed automatically based on the contract deployment on the blockchain platform. In one embodiment, manual verification is needed for blocking competitors and other rule-complying purposes.

In one embodiment, the present invention provides systems and methods for implementing tokenized securities on a blockchain based on ERC20 token standard (or similar subsequent standard). The present invention requires at least one uniquely identified account on the blockchain platform for an investor to participate in the tokenized securities offering. Cryptocurrencies accepted by the offering entity are selected from the group consisting of Bitcoin, ETHEREUM, LITECOIN, and other cryptocurrencies of liquid value. Credit card, debit card, cash, or other traditional payment methods are not accepted during a cryptocurrency only offering. In one embodiment, the offering entity computer is in network communication with certain cryptocurrency exchanges or traditional banking system to facilitate token purchases via fiat currencies. In one embodiment, a centralized wallet and trustee is utilized as a special purpose vehicle to facilitate investors who do not have accepted cryptocurrencies, or uniquely identified accounts on the immutable ledger-based tokenized securities platform required to purchase tokenized securities during an offering as a single person entity. Investors who do not have accepted cryptocurrencies or uniquely identified accounts pay the centralized wallet and trustee by fiat currencies or other payment methods accepted by the centralized wallet and trustee via an off-chain transaction.

In one embodiment, securities tokens are tokenized securities. In one embodiment, securities tokens represent tokenized securities. In one embodiment of the present invention, tokenized securities contracts or securities token contracts represent securities. In one embodiment, the tokenized securities contracts are transformed into other formats during their life cycles after the tokenized securities offering is closed. In another embodiment, tokenized securities contracts can have children contracts. Children contracts are those that can manipulate or otherwise manage the tokenized securities created by the parent contract. An initial tokenized securities offering entity is operable to launch secondary tokenized securities offerings.

Contracts

A standard smart contract in any blockchain contains information including a contract owner, a contract address, contract data, and terms (e.g., rules and methods to act on the contract).

With ordinary blockchain smart contracts, the contract owner remains the same for the entirety of the contract lifecycle (i.e., from deployment until termination conditions). In contrast, the tokenized securities contracts in the present invention are transferrable. Every contract has a unique identifier. In one embodiment, the unique identifier is a hash value generated by a hash algorithm in the blockchain. In one embodiment, the unique identifier is generated by other mathematical algorithm (e.g., mathematical formulation of quantum mechanics).

Figure 11:
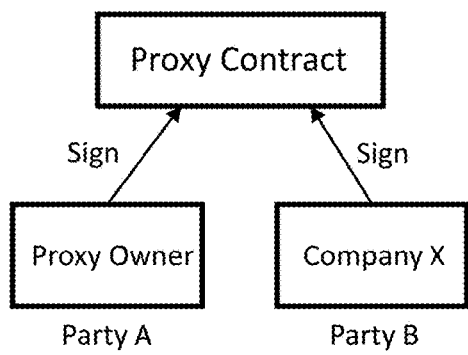
FIG. 11 illustrates a proxy contract according to one embodiment of the present invention.

In one embodiment, the immutable ledger-based tokenized securities platform of the present invention provides a proxy contract between party A and party B. FIG. 11 illustrates a proxy contract according to one embodiment of the present invention. Party A participates on the tokenized securities offering blockchain directly as the proxy owner. In one embodiment, party A is the platform owner who offers and/or trades tokenized securities as a proxy of party B. In one embodiment, party A is a broker/dealer offering and/or trading tokenized securities on the blockchain-based tokenized securities platform. Party B can be any company or entity intending to offer and/or trade tokenized securities on the blockchain-based tokenized securities platform via a proxy. A proxy contract includes a unique contract address, a unique address of the proxy owner, a unique address of the company X, contract data which is being proxied, and terms to act on the proxy contract. Terms of the proxy contract include a time the proxy contract is signed, renewals, terminations, and methods to act on the contract data. The methods to act on the contract data includes but not limited to changing ownership from the contract originating party to another party (e.g., company X) by changing the proxy owner unique identifier to company X. With the proxy contract, party A can represent party B for participating on the immutable ledger-based tokenized securities platform. The proxy contract allows for ownership to be exchanged on specific contract terms being met or contract completion (all the terms are met). The proxy contract provides the means to pass ownership of a contract from one party to another. In another embodiment, proxy contracts are used to form a multi-party transaction where the ownership of the contract is transferred to another party that represents a group of new owners that have been aggregated.

Figure 12:
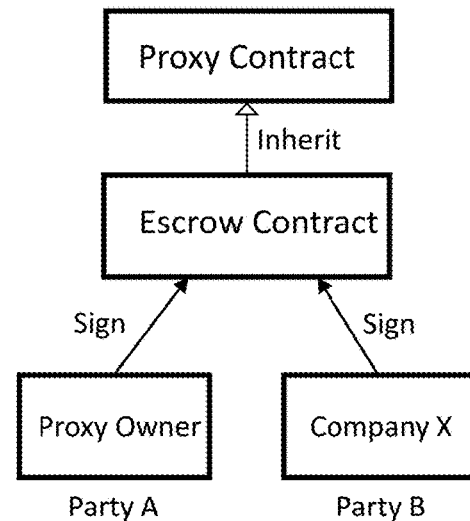
FIG. 12 illustrates an escrow contract according to one embodiment of the present invention.

With ordinary blockchain smart contracts, the data in the contract is visible to every node in the network, but only the contract owner can manipulate the data. In one embodiment, the immutable ledger-based tokenized securities platform of the present invention provides an escrow contract between party A (proxy owner) and party B (company X). An escrow contract encrypts the 'important data' using the owner's unique identifier address so that only the owner of the contract can use its private key and/or password to view the 'important' data. An escrow contract typically inherits the functionality of a proxy contract to enable the ownership of the escrow contract to change when terms of the escrow agreement between the parties have been met. An escrow contract holds onto valuable information (e.g., a digital key to a lockbox, account identifier, disclosure information). The owner of the escrow contract has access to the escrowed information. In one embodiment, a proxy contract is used in conjunction with an escrow contract (or other types of contracts identified below) to allow the escrowed information to be transferred from one party to another. For example, a proxy contract is made between two parties that are settling a BITE transaction outside of the blockchain, and the escrow contract is holding the bank account information from the buyer and is owned by the seller. Once the proxy contract changes ownership (e.g., because of release of information by the bank that funds are available as captured by a software oracle), the data is decrypted by the original owner and re-encrypted using the new owner's uniquely identified account which make the escrowed information visible to the new owner (buyer) when they use their key and/or password to access the escrowed information. FIG. 12 illustrates an escrow contract according to one embodiment of the present invention. The escrow contract ensures data security. In one embodiment, the escrow contract is used for off-chain transactions. For example, automated clearing house (ACH) transaction data can be held at the escrow contract with encryption and accessible only by an owner's decryption key and/or password.

Figure 13:
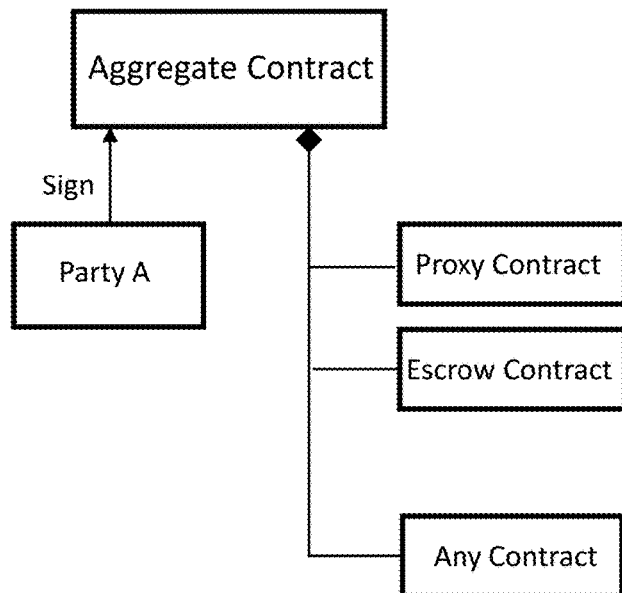
FIG. 13 illustrates an aggregate contract according to one embodiment of the present invention.

In one embodiment, the immutable ledger-based tokenized securities platform of the present invention provides an aggregate contract. FIG. 13 illustrates an aggregate contract according to one embodiment of the present invention. The aggregate contract is between a party A and a multiplicity of parties including investors and parties included in proxy contracts, escrow contracts, and any other contracts. The aggregate contract creates a group to act as a single entity represented by party A. The aggregate contract includes a list of uniquely identified accounts pointing to different individuals, aggregate contracts, or other contracts, and allows the multiplicity of parities and party A to have transactions in addition to the transactions that party A participates on behalf of the multiplicity of parties. For example, a group of tokenized securities holders could form an aggregate contract whereby Party A is a legal entity (such as an LLC), that can be used to sell the entirety of the group's tokenized securities for a single price to another party in a proxy contract. Once that transaction is complete, the aggregate contract between the multiplicity of parties and party A automatically exchanges the funds in the correct amounts from party A to each member of the group based on the tokenized securities they contributed to the aggregation, less any transaction fees, etc.

In one embodiment, an aggregate contract is operable to represent a multiplicity of levels of contracts, including but not limited to nested levels of aggregate contracts. An aggregate contract is operable to hold or retain a unique identifier to another aggregate contract, which in turn retains a unique identifier to another aggregate contract, and so on. An aggregate contract is further operable to represent an investor, who is actually an entity (i.e., private equity fund), which has many investors, of which one of those investors could represent another entity (i.e., trust fund), which is made up of several parties.

Figure 14:
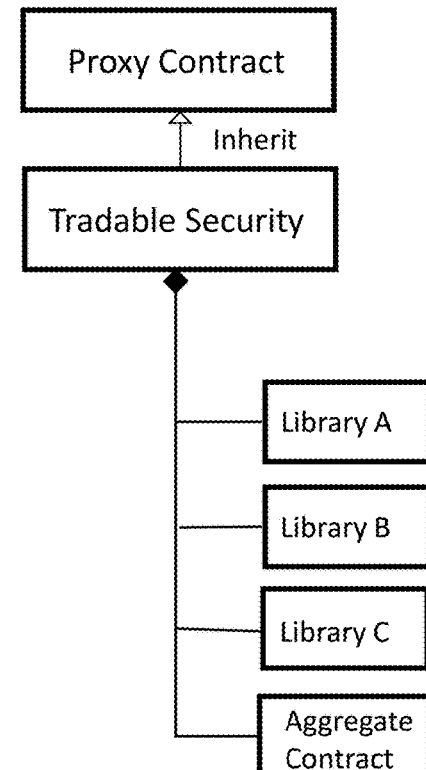
FIG. 14 illustrates a typical contract according to one embodiment of the present invention.

In one embodiment, a typical contract structure on the immutable ledger-based tokenized securities platform of the present invention is in the format of a proxy contract representing tradable securities. FIG. 14 illustrates a typical contract according to one embodiment of the present invention. In one embodiment, the typical contract is a tradable security (i.e., BITE) which inherits transfer ownership capabilities from a proxy contract. Tradable securities contain unique identifiers representing different contracts and libraries, including aggregate contracts, proxy contracts, and etc. In one embodiment, a tradeable security represents a common stock, which has an aggregate of investors. In one embodiment, some of the investors are nested levels of aggregates of investors (i.e., fund, legal entity), and other investors are represented by dealers or brokers in a proxy contract. Additionally, there is one or more libraries assisting the performance of data type checks, data storage, provide notification of events happening within the contracts, etc. The tradeable security has rules which govern allowed parties in the sale (e.g., whitelist and blacklist), timing of sales (e.g., rest periods), disclosure restrictions (i.e., who can view the documents and whether they are mandatory or not), allowed price boundaries (e.g., holding company allows sales over a predetermined price), transaction fees (e.g., platform, broker, dealer, discounts), and contract controls (e.g., start, suspend, resume, terminate).

In one embodiment, the immutable ledger-based tokenized securities platform of the present invention is operable to link contracts with the same owner by using one single proxy address, which can access to contract data and terms in the linked contracts. Linking contracts in this way allows deployment of different contracts at different times to work together on a single transaction. This capability essentially allows for rules to be added to a transaction after initial deployment without modification to the original contract.

In one embodiment, the immutable ledger-based tokenized securities platform of the present invention is also operable to suspend a contract. Suspending a contract disables the ability for a contract to be executed. In one embodiment, it enables an offering entity to halt the purchase of new tokenized securities because there has been a significant event or material change to the offering entity. In another embodiment, it enables a holding entity to suspend a proxy contract because the holding entity finds out that a broker or dealer is representing a competitor. Suspended contracts can be resumed (allowed to continue execution) or terminated (no longer able to execute). In yet another embodiment, it enables the SEC to halt a tokenized securities trading under investigation.

In one embodiment, the immutable ledger-based tokenized securities platform of the present invention also provides a voting contract between an entity and its shareholders/investors for proxy voting. In one embodiment, the voting contract inherits an aggregate contract. The voting contract includes a list of questions for shareholders/investors. The entity deploys voting contracts on the immutable ledger-based tokenized securities platform. Each investor who holds at least one tokenized security from the entity receives a voting contract with a unique address. Once the investor submits the answers to the list of questions in the voting contract, the voting contract is collected, processed, counted, and recorded on the blockchain. In one embodiment, the shareholders are aggregated, and the present invention provides for each of the nested votes to be counted with rules applied to determine whether a simple majority, super majority, or some other calculation is required to provide the vote for the represented party. In cases of proxy contracts, the rules in the proxy contracts govern whether the current owner of the proxy contract votes or whether the proxied party votes.

The immutable ledger-based tokenized securities platform of the present invention allows for peer-to-peering trading of tokenized securities, enables private equities transferrable, increases liquidity of private equities, automates regulatory compliance, enforces an entity's desire for limited disclosure, and reduces risk of non-compliance. In addition, proxy voting and self-accreditation enabled by the immutable ledger-based tokenized securities platform also facilitates engagement of peer shareholders among different issues.

In one embodiment, all tokenized securities contracts fulfill all the rules constructed by or established by the SEC for registration exemptions, for example, including but not limited to Section 4(a)(2), Regulation D, Regulation Crowdfunding, Regulation A/A+, Regulation S, Intrastate, and any subsequent rules created by the SEC.

In one embodiment, the tokenized securities contracts fulfill all state rules for compliance. For example, under Regulation D rule 506(c), a company raising private money preempts a state registration, but for Regulation D rule 504, the contract would also have to ensure the company has registered with the state.

In one embodiment, the tokenized securities contracts fulfill any arbitrary company rule. For example, it is required that a representative of a company approves an equity sale before payment and ownership of a tokenized securities contract can be exchanged.

In one embodiment, the tokenized securities contracts are grouped by certain rules applied to the tokenized securities contracts. For example, a company has several classes of securities (e.g., Series A, Series B, etc.) in the company's entire list of equities. A rule for a private company is that the maximum number of shareholders for all securities must be less than 2000. When offering tokenized securities contracts, the company groups the tokenized securities contracts based on the rule mentioned above.

In one embodiment, the tokenized securities contracts are linked by common ownership hashes and keys, which are operable to manage the contracts through their entire lifecycle including deployment, usage, and retirement. Thus, tokenized securities contracts deployed at different times are operable and can participate together in one transaction.

In one embodiment, the tokenized securities payments are made outside of the immutable ledger-based tokenized securities platform of the present invention. For example, an ACH payment can be executed outside of the immutable ledger-based tokenized securities platform and verified by the tokenized securities contract, and then the tokenized securities are transferred.

In one embodiment, the immutable ledger-based tokenized securities platform of the present invention comprises a blockchain recording securities token transactions from the first block (the genesis block) until the current block. In one embodiment, the blockchain is designed to retire as of a certain block such that nodes are synchronized without holding all the data from the retired part. In other words, a blockchain can be retired at a prescribed interval (e.g., block No. 10,000) and any new nodes added to the blockchain can start at the next node (e.g., block No. 10,001 with block No. 10,000 as the genesis block). Since a blockchain is immutable, there is no need to keep previous blocks active and synchronized on all nodes. This solves the problem of data growth on all the nodes.

In one embodiment, a company solicits investors, owners, and/or family members to approve certain actions of the executive team. Solicitations and responses thereto are recorded on the immutable ledger-based tokenized securities platform of the present invention to provide specificity to board meeting minutes and other communications.

In one embodiment, the immutable ledger-based tokenized securities platform is operable to create tokenized securities representing securities to previously offered to pre-existing shareholders. All the capabilities described for an initial offer apply, including, but not limited to, whitelist, blacklist, register, accepting terms, purchase agreement, purchasing, reselling. In one embodiment, BITE tokens can be offered and/or assigned to pre-existing shareholders and/or new shareholders.

In one embodiment, the present invention enables existing shareholders/proxies to update their accreditation statuses on a periodic basis. For example, SEC Act of 1934, Section 12(g) requires a company with more than $10 million in assets desiring to remain private is limited to 2,000 investors, of which only 500 can be non-accredited. Thus, for a company to remain private it must track how many of its investors are accredited on an annual basis.

In one embodiment, the present invention provides federated purchases of tokenized securities. For example, a BITE token represents securities from two companies, BITE owners are enabled to exchange ownership in a like-kind exchange (e.g., no payment is made).

In one embodiment, the present invention provides aggregated purchases of tokenized securities on the immutable ledger-based tokenized securities platform. For example, a purchaser of BITE tokens is enabled to purchase BITE tokens from two different owners with a single payment. For example, owner A has 200 BITE tokens for $550, and owner B has 300 BITE tokens for $800, a purchaser can buy both sets of BITE tokens in a single transaction for $1,350.

In one embodiment, the present invention provides aggregated sales of tokenized securities on the immutable ledger-based tokenized securities platform. For example, two sellers are enabled to offer their BITE tokens together with the same unit price.

Figure 15:
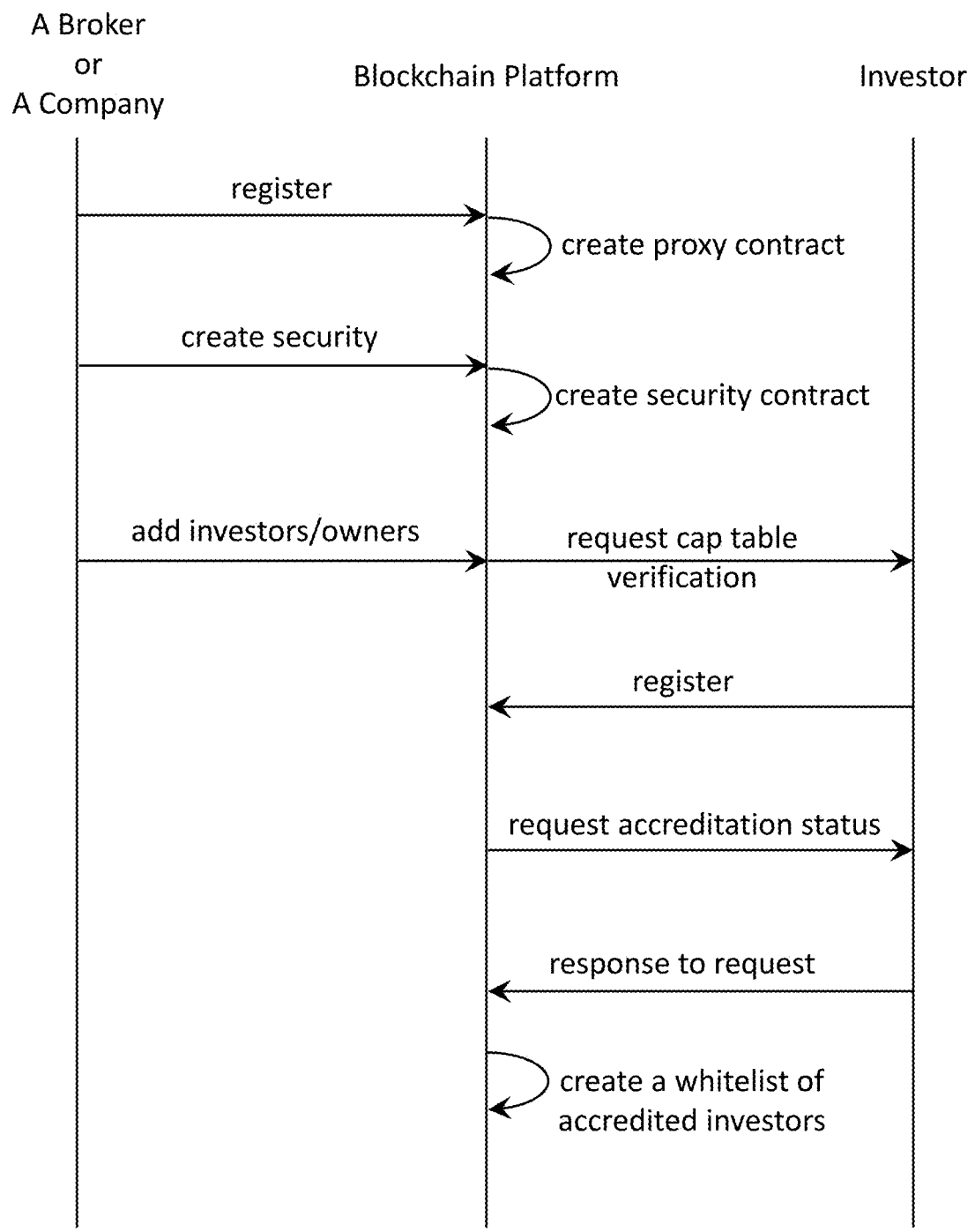
FIG. 15 is a diagram illustrating a signup process for offering tokenized securities on a blockchain platform according to one embodiment of the present invention.

FIG. 15 is a diagram illustrating a signup process for offering tokenized securities on a blockchain platform according to one embodiment of the present invention. A tokenized securities offering entity (e.g., a broker or a company) registers on the blockchain-based tokenized securities platform. The blockchain-based tokenized securities platform then creates a proxy contract with the broker or company for a tokenized securities offering. The tokenized securities offering entity then creates tokenized securities on the blockchain-based tokenized securities platform, which deploys tokenized securities contracts for the tokenized securities offering entity. The tokenized securities offering entity then adds its investors and/or owners to the blockchain-based tokenized securities platform, which requests a capitalization table for verification from the investors and/or owners. Interested investors can register on the blockchain-based tokenized securities platform for participating in the tokenized securities offering. The blockchain-based tokenized securities platform then requests an up-to-date accreditation status from the registered investors. The registered investors respond by answering questions that demonstrate their accreditation status. In one embodiment, the blockchain-based tokenized securities platform creates a whitelist of accredited investors based on data extracted from multiple investor accreditation related databases.

Figure 16:
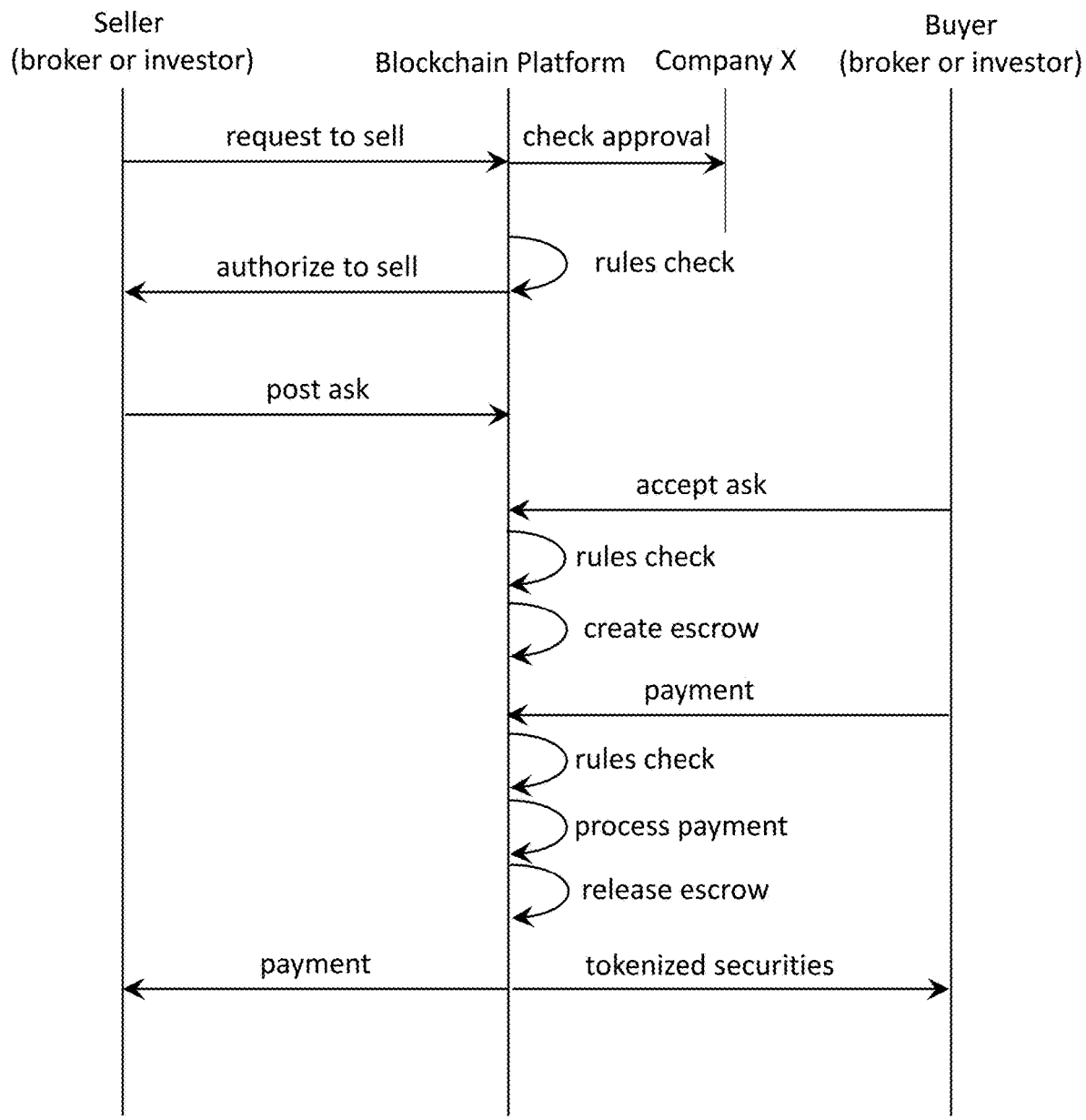
FIG. 16 is a diagram illustrating a trading process for a tokenized securities seller on a blockchain platform according to one embodiment of the present invention.

FIG. 16 is a diagram illustrating a trading process for a tokenized securities seller on a blockchain platform according to one embodiment of the present invention. The tokenized securities seller (e.g., a broker, an investor) makes a request on the blockchain-based tokenized securities platform to sell tokenized securities. The blockchain-based tokenized securities platform then checks approval from the company that offered/issued the tokenized securities, checks rules for trading tokenized securities for compliance, and authorizes the seller to sell. The tokenized securities seller then posts an ask on the blockchain-based tokenized securities platform, a buyer (e.g., a broker, an investor) accepts the ask on the blockchain-based tokenized securities platform. If a buyer doesn't agree with the ask price, they can post a bid price back to the seller. The seller and buyer can send bid and ask prices back and forth until there is a mutual agreement where one party accepts the price of the other party. Once agreement has been made with the acceptance of an ask or bid price, the blockchain-based tokenized securities platform then checks rules and creates an escrow contract with the seller and the buyer, performing as an escrow account for the seller and the buyer. The buyer makes payment to the escrow account, and the seller transfers the tokenized securities the buyer intends to buy to the escrow account. The escrow account checks rules and processes the payment, and then release the payment to the seller and the tokenized securities to the buyer.

In one embodiment of the present invention, the immutable ledger-based tokenized securities platform is operable to modify a lifecycle of a contract, including but not limited to start, suspend, resume, or terminate. In one embodiment, the proxy contract enables the contract ownership transfer from one unique identifier to another unique identifier based on individual contractual terms being met or the contract completion. In one embodiment, an escrow contract securely hides information from participating parties other than the owner. In one embodiment, during the trading or transferring stage, the server computer of the tokenized securities offering entity is operable to set minimum and/or maximum prices, timing, and approval on sales (or resales) of the tokenized securities. In one embodiment, the server computer of tokenized securities offering entity is operable to manage access control for the information related to the offering, trading, and transferring, for example but not for limitation, if a potential tokenized securities purchaser can view or have access to disclosure documents including, but not limited to, accreditation, brokers, dealers, employees, corporate officers, competitors, location country, location state, and/or income level.

The immutable ledger-based securities token platform of the present invention is operable to configure data visibility for different groups during securities token offerings and subsequent selling and buying of those tokenized securities. Different data visibility categories provide data privacy and regulation compliance, and enables data sharing and transparency among participants within a group. In one embodiment, participants on the immutable ledger-based securities token platform include investors, brokers, and company officers.

In one embodiment, the immutable ledger-based securities token platform is operable to group participants based on geographic location, income, age, and other factors. In one embodiment, the immutable ledger-based securities token platform is operable to provide a blacklist and a whitelist for data visibility management. In one embodiment, the immutable ledger-based securities token platform is operable to redact the data visibility settings and provide partial data accessibility for certain participants.

In one embodiment, investors include internal investors and external investors. Internal investors are enabled to access to their tokenized securities contracts by class, view recent trading activities, and sell tokenized securities. External investors are enabled to access to a data room for tokenized securities, view recent trading activities, and buy tokenized securities. Both internal and external investors are enabled to negotiate prices.

In one embodiment, company officers are enabled for tokenized securities management, including enacting and enforcing company rules, by-laws, and shareholder agreements, and managing shareholder capitalization tables. The company officers are also enabled for approving tokenized securities trading. In one embodiment, the company rules comprise timings, prices, and diligence information. The diligence information includes contracts, visibility, and risk. The diligence information is stored in the data room.

In one embodiment, brokers are on the buyer side on the immutable ledger-based platform of the present invention. The brokers take margin opportunities, and have unique inventories. In one embodiment, there is an automated process for the brokers to trade tokenized securities on the immutable ledger-based platform of the present invention. In one embodiment, the brokers are connected to a backend database of the immutable ledger-based securities token platform of the present invention.

Figure 17:
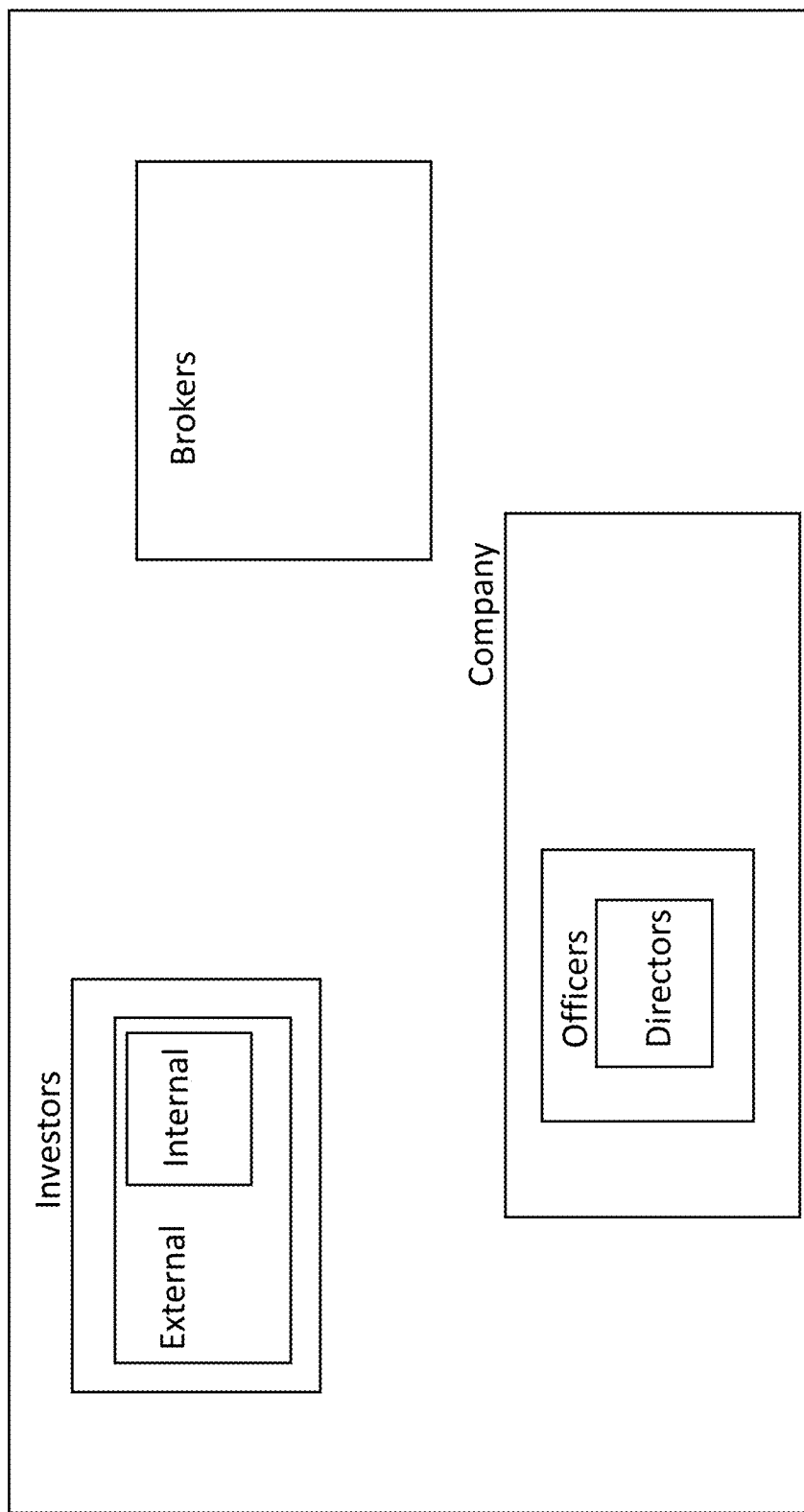
FIG. 17 illustrates a data visibility scheme according to one embodiment of the present invention.

FIG. 17 illustrates a data visibility scheme according to one embodiment of the present invention. Directors of a company have exclusive access to certain company data, which is not available to other officers. Internal investors have exclusive access to certain data, which is not available to external investors. Brokers have their exclusive data as well.

Figure 18:
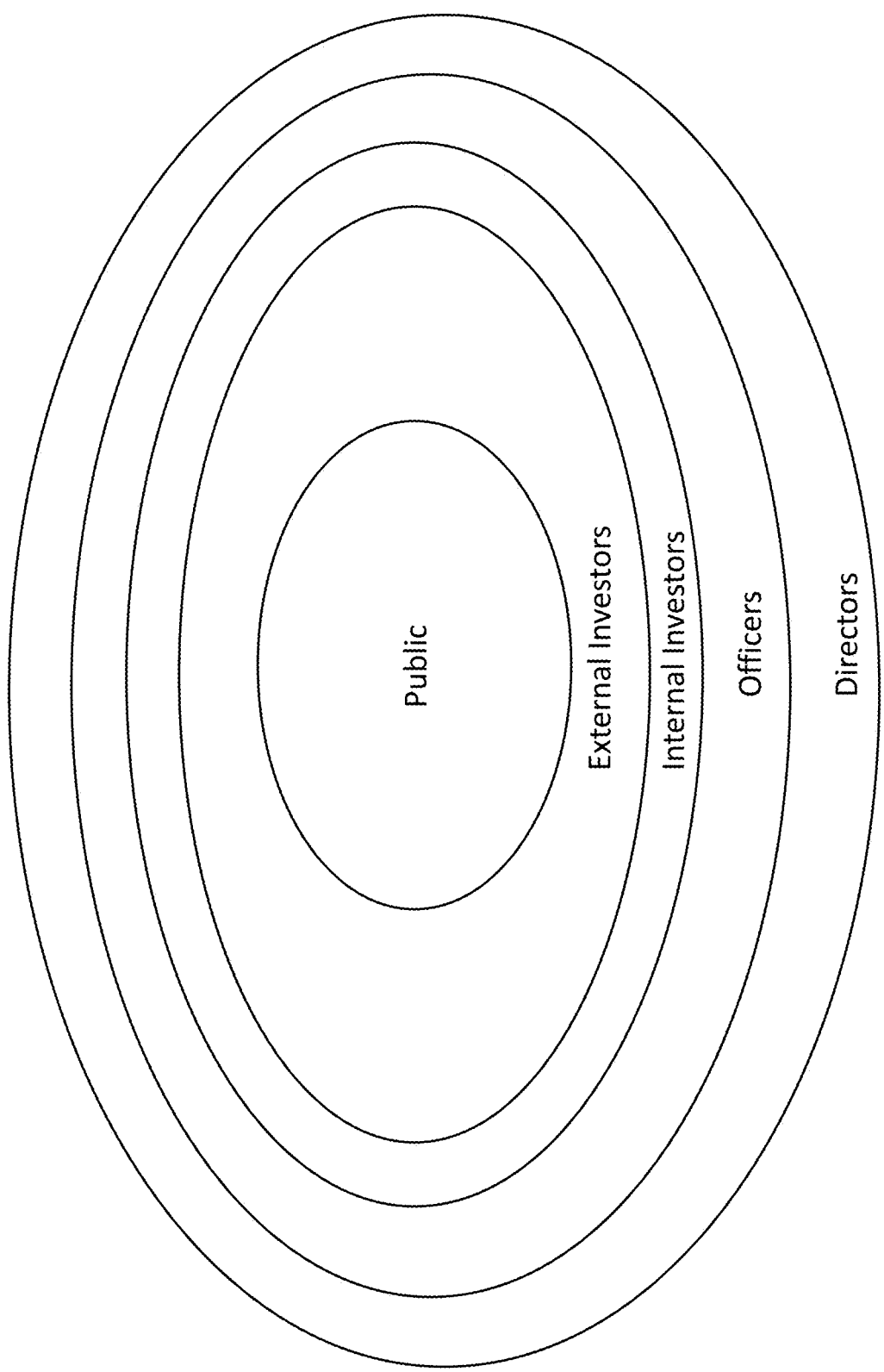
FIG. 18 illustrates a data visibility hierarchy related to one company according to one embodiment of the present invention.

FIG. 18 illustrates a data visibility hierarchy related to one company according to one embodiment of the present invention. Directors of a company have access to all data related to the company; and company officers can access most data related to the company. Internal investors have access to more data than external investors do. The public have access to certain data related to the company.

In one embodiment, the immutable ledger-based securities token platform provides document templates for participants (e.g., investors, brokers) to compare information between different securities token offerings and/or exchanges. For example, but not limitation, document templates include Profit and Loss (P&L), balance sheets, cash flow analysis, Generally Accepted Accounting Principles (GAAP), Human Resource (HR) documents (e.g., contracts with key employees), risk documents, PPM, and price management.

In one embodiment, the immutable ledger-based securities token platform provides time windows for various actions by investors, including but not limited to reviewing and signing documents, selling securities tokens (i.e., ask), purchasing securities tokens (i.e., bid), subsequent ownership exchange (i.e., custody), and trading securities tokens. In one embodiment, the time windows are compliant with regulations. In one embodiment, the time windows coincide with certain business practices, for example but not limitation, mergers, acquisitions, and other material events.

In one embodiment, the immutable ledger-based securities token platform of the present invention is configured to meet and enforce bylaws (e.g., for Corporation) or operating agreements (e.g., for Limited Liability Corporation) rules so as to provide different types of rights for a company (e.g., a securities token offering entity) and its shareholders. For example, a right of approval, a right of first refusal, call rights redemption, put rights, tag-along rights, and drag-along rights. The right of approval is the right of a company and/or a certain class of stockholders to approve of a sale of shares by a shareholder. The right of first refusal means that a company or a certain class of stockholders have the right to purchase prior to someone outside the company purchasing a seller's shares. The call rights redemption is the right of a company to force a shareholder or debt holder to convert or sell their equity. The put rights means a company gives a shareholder the right, but not the obligation to sell the shares. The tag along rights grant a minority shareholder the right to sell shares at the same price as majority shareholders do. The drag along rights provide majority shareholders the right to force minority shareholders to sell at the same price as the majority shareholders sell their shares.

In a preferred embodiment, the platform is an immutable ledger-based tokenized securities platform. In one embodiment, the immutable ledger-based tokenized securities platform is a blockchain-based tokenized securities platform. In one embodiment, the platform utilizes at least one distributed ledger. In one embodiment, the platform utilizes at least one acyclic graph ledger. In one embodiment, the at least one acyclic graph ledger is at least one tangle and/or at least one hashgraph. In one embodiment, the platform utilizes at least one quantum computing ledger.

Alternatively, the platform is not an immutable ledger-based tokenized securities platform. In one embodiment, the platform utilizes at least one centralized database, at least one federated database, and/or at least one distributed database.

Securities operable to be issued and/or traded on the tokenized securities platform include, but are not limited to, debt securities (e.g., notes, bonds, debentures), equity securities (e.g., common stock, preferred stock, units, interest units, restricted stock, employee stock options, stock appreciation rights), convertibles (e.g., convertible debt, convertible stock, synthetic convertible), and/or derivatives (e.g., options, warrants, futures, forwards, swaps). For example, equity sharing in Limited Liability Companies (LLCs) may include profit interest units that are a share of the increase in the value of the LLC over a period of time.

Furthermore, the present invention provides aggregated sales of equity for a plurality of share classes on a tokenized securities platform. Advantageously, the platform provides a single location for managing equity transactions from beginning to end, whether users are participating as new investors, existing owners, issuers, proxies (e.g., Broker/Dealer, Authorized Agents) in capacities of authorizers, buyers, and/or sellers. This is accomplished through a plurality of administrator and investor functions relating to equity transactions including, but not limited to, equity management, assessment, monitoring, and/or transacting functionalities.

Thus, the platform provides companies, investors, sellers, buyers, shareholders, brokers, and/or users with the ability to manage all aspects of an equity transaction process. This includes, but is not limited to, managing documents, managing a data room, determining authorized participants, determining individuals and/or entities who are not authorized to participate, managing board and shareholder approvals to legally allow transactions, establishing when transactions are allowed to begin, end, pause, or resume, enabling brokers to manage and engage customers in transactions, enabling price discovery by potential investors and/or sellers, providing tools for participants to value equity, enabling views of previous transactions and histories of actions taken by participants, enabling issuers to establish transfer rules for all classes of securities, providing automation of all transfer rules to ensure compliance, following Federal and State rules for timing and participation in transactions, ensuring automated payments for purchases of securities using controlled escrow accounts, and/or enabling manual overrides for human errors.

The tokenized securities platform provides these advantages to three main classes of users: (1) Issuers (i.e., the entity and/or organization that has custody of the securities), (2) Investors/Owners of the securities, and (3) Services Users (e.g., FINRA registered Broker/Dealers, Securities Lawyers, Data information providers, Back office and valuation vendors, Financial advisors, Media analyst).

Typical transactions performed by Issuers include, but are not limited to, new issuance transactions (also known as primary offering transactions), tender offer or buy back transactions (referred to in the present invention as aggregate sale transactions), secondary transactions (i.e., buying and/or selling of previously issued securities (e.g., stocks, bonds, options, futures)), liquidity transactions, and/or conversion transactions (e.g., options, warrants, restricted stock, convertible debt). While some of these transactions are available and supported on traditional marketplace platforms, these existing platforms require issuers to operate independently or participate in a marketplace to have these processes performed for them. This often results in issuers hiring bankers and/or brokers in order to perform transactions using a third-party marketplace.

However, these third-party marketplaces suffer from a common issue: third-party marketplaces rely on one set of rules and one process in order to facilitate transactions. In the case of these third-party marketplaces, uniformity across all transactions is a major disadvantage, as not all transactions requirements are the same for every issuer and/or for each of an issuer's share classes whether managed by themselves or a custody provider. The requirements for sales and purchases are governed by internal issuer documents (e.g., bylaws for Corporations, operating agreements for Limited Liability Company, partnership agreements for Partnerships), and these internal company documents are unique to each issuer. Each type of entity formation (e.g., C-Corporation, Limited Liability Company, Sole Proprietorship, Partnership, Management Investment Company) has different legal rules in the transfer of ownership interest from one party to another. For example, in a transfer of common stock interest in a C-Corporation, the transfer rights are automatically transferred to the new owner; however, in an LLC transfer of interest, the transfer rights are only transferred by contract, so rights of the existing owner are not automatically transferred to the new owner. This makes it difficult for the issuer to determine which owners have rights and which owners do not, which often prevents the transfer of interest in an LLC. Further, each type of offering has rules associated with the offering and secondary transfer of the securities. For example, Section 4(a)(2), Regulation D Rule 506(b), Regulation D Rule 506(c), Regulation D Rule 504, Regulation Crowdfunding, Regulation A Tier 1, Regulation A Tier 2, Intrastate Section 3(a)(11), Intrastate Rule 147, and Intrastate Rule 147A securities all have different rules. (See, e.g., "Overview of Exemptions", Securities & Exchange Commission, https://www.sec.gov/smallbusiness/exemptofferings/exemptoofferingschart, last accessed Jun. 12, 2020, and "Rule 144: Selling Restricted and Control Securities", Securities & Exchange Commission, https://www.sec.gov/reportspubs/investor-publications/investorpubsrule144htm.html, last accessed Jun. 12, 2020, each of which is incorporated herein by reference in its entirety.) Thus, most issuers do not participate in these types of third-party marketplaces because of their ownership rule uniqueness and the potential loss of control of who purchases their shares and what rights the new shareholder(s) will obtain.

Advantageously, the tokenized securities platform of the present invention enables every issuer to define their own rule set for each class of security and for each transaction type such that rights can always be transferred and enforced on future owners. In addition, the rule sets are operable for further modification on a transaction-by-transaction basis. There is a long felt, unmet need for a tokenized securities platform that allows every issuer to modify a rule set for each transaction type and on a transaction-by-transaction basis. Additionally, there is a need for a tokenized securities platform that records each transaction on an immutable ledger (e.g., blockchain).

An important factor throughout all of these various transaction types is the element of risk. The risk related to each transaction differs based on the issuer and type of shares. To mitigate this risk, issuers provide special rights to purchasers of their securities. These rights primarily deal with transfer (i.e., sell or buy existing owned shares), new issuance (i.e., sale of new shares that dilutes existing shareholders), and liquidation (i.e., how proceeds are divided at time of issuer entity sale), but rights are not limited to these areas (e.g., voting rights). The present invention, unlike traditional marketplaces, advantageously enables issuers to manage these rights in addition to SEC, State, and other regulations. The platform advantageously is operable to manage rights related to restricted and non-restricted shares (note: non-restricted shares require complete disclosure on a quarterly basis (i.e., full disclosure)).

Some platforms use peer-to-peer networks to transfer securities. However, this presents several problems. In peer-to-peer networks, rights are confused as restrictions. For example, if a share class has a right of first refusal, a peer-to-peer system would have to disallow the sale of a security if the buying party is not one of the parties in the peer-to-peer exchange, as those systems do not work with a plurality of participants (by their nature they are a one party to one party transaction—peer to peer). This limitation of only incorporating two parties prevents many transactions from occurring because additional parties who may have rights cannot participate. If all rights cannot be exercised, the security cannot be sold. By contrast, in the present invention, an owner's interest is represented as rights, not restrictions, and therefore the platform allows a plurality of buyers and sellers to participate in a single transaction. Meaning, in the present invention the discovery of whether the owners wish to exercise their rights is part of the transaction. Because all parties with rights are allowed to participate and are notified of their rights, the platform of the present invention advantageously allows transactions to occur that would not be allowed using a peer-to-peer network.

Moreover, traditional marketplaces often ignore shareholder's rights as previously discussed, which enables Broker/Dealers that create a market in an issuer's shares to operate outside of an issuer's control (and potential desires). Typical rights that get trampled are refusal rights, first sale rights, co-sale rights, etc. Unlike these marketplaces, the present invention changes how these well-known rights are constructed and enforced. Well-known rights have been in use since prior to the formation of the Securities and Exchange Commission in 1934. The reason rights have not varied is because of the difficulty in enforcing rights (e.g., contacting every shareholder in a class to get their approval) and the complex legal language necessary to define the rights. Hence, when most entities are formed, rights are copied from template documents produced by law firms or industry groups (See, e.g., National Venture Capital Association—https://nvca.org/model-legal-documents/, last accessed Jun. 12, 2020, which is incorporated herein by reference in its entirety), or those template documents found on the Internet.

However, the present invention also enables the creation of custom rights. As will subsequently be described, the platform enables communication and responses of multiple parties at once, performs real-time computations of ownership interest and automates workflows that are beyond the capabilities of humans to simultaneously manage. To solve these issues, and others, the present invention creates unique methods for designing and executing shareholder rights.

The immutable ledger-based platform is configured to construct blocks of rights, wherein the blocks of rights represent dynamic rights of shareholders and/or dynamic rights of an issuer. Each of the blocks of rights (e.g., transfer rights, liquidation rights) includes, but is not limited to, at least one triggering participant that triggers one or more of the at least one right, at least one rights participant that receives one or more of the at least one right, at least one triggering event, an acquiring method (e.g. first to act, based on pro rata share ownership), a time to execute, and/or at least one participation limit. Each of the blocks of rights is combined into a sequence (e.g., linear, tree) where each of the blocks of rights in the sequence is operable to be arranged in various orders to produce desired outcomes. An individual block of rights in the sequence is referred to as a "step". A series of steps within a classification of rights is generically termed 'right steps' or specifically termed 'transfer steps' for a transfer, 'new issuance steps' for a new issuance, 'liquidation steps' for a liquidation, etc.

The GUI of the platform is configured to provide for editing of the blocks of rights in real time, adding additional blocks of rights in real time, and/or deleting of one or more of the blocks of rights in real time. The editing the blocks of rights in real time, the adding additional blocks of rights in real time, and/or the deleting of the one or more of the blocks of rights in real time enables, disables, and/or modifies transactions of the tokenized securities on the immutable ledger-based platform in real time.

Advantageously, the platform tracks the participants required for each step. For example, participants that are the outcome of a particular step in the sequence are operable to be the input participants in the next step in the sequence that trigger or receive rights.

This results in a common interface across each step, whether the platform is handling one or more seller participants, one or more buyer participants, and/or dealing with proxies (i.e., someone acting on behalf of a user) for sellers and/or buyers. In one embodiment, a sale includes at least two seller participants and/or at least two buyer participants. As previously described, peer-to-peer networks are unable to execute a sale with more participants than a single seller and a single buyer.

An example of a right is a co-sale right. In one example, the participants that trigger the event are founders selling their shares, and there are also right receiving participants (e.g., Seed Round investors) that are allowed to sell up to their pro rata share ownership along with the founders. In the tokenized securities platform, the co-sale participants receive an Activity (see details about activities infra) and are allowed to sell some (e.g., up to pro rata amount) of their interest within a pre-determined amount of time. The co-sale participants may choose to participate or not. Advantageously, the tokenized securities platform creates a dynamic seller's list in real time which includes the original seller, and any co-sale participants, that can be used as input for the next right step in the sequence.

To facilitate each of the aforementioned transaction types and operations, the platform is operable to gather all of the associated rights for a particular transaction and break them down into the blocks of rights, enabling companies and/or entities to create dynamic rights. By enabling the creation of dynamic rights, the platform of the present invention enables the companies and/or the entities to create their own unique procedure(s) for managing the rights of shareholders and how those rights are operable to be executed. Advantageously, this enables the companies and/or the entities to ensure that rights offered to shareholders (i.e., interest owners) are implemented automatically, further decreasing the complexity of the various activities and/or transactions available on the platform. In addition, this ensures fairness as all rights always work the same way for each shareholder and are executed as instructed. When these processes are performed in traditional marketplaces, companies are required to change their bylaws so that the previous rights of shareholders are removed or else be unable to participate in the marketplace (which is more common). Changing bylaws (or operating agreements) is a long process and often requires constant back-and-forth communications and negotiations between parties. The platform of the present invention solves this issue by enabling shareholder rights to continue throughout the lifecycle of associated shares (i.e., as they are transferred from one party to another), further reducing the potential for abuse.

In addition to exacting well-known rights, the platform is operable to exact custom rights. Custom rights are operable to be put in a sequence as a building block or a step. An example of a custom right is a right to participate in a bidding process if the price of an offer is over a certain amount. This custom right is not the same as a Refusal or a First Offer, and is not something entities or individuals (e.g., Brokers) have demonstrated the ability to execute. This type of right requires a system that is (1) capable of multi-step participation to properly track and enable shareholders that agree to participate and (2) able to include a next step that allows real-time bidding based on a prior step. Advantageously, both of these requirements are enabled with the tokenized securities platform of the present invention.

Moreover, the steps for managing shareholder rights (e.g., well-known rights, custom rights) are implemented discretely and/or continuously. Steps are operable to be added and/or removed based on prior steps. The platform of the present invention retains all knowledge of what steps have been previously performed. This enables the platform to provide users with additional information, assisting companies and/or entities with what makes reasonable sense for buyers and/or sellers when it comes to participating in transactions and/or activities.

Rights are managed within the context of a transaction. Transaction types include, but are not limited to, an Issuer's New Issuance, Secondary Transfer, Liquidation, and Conversions (e.g., derivatives like options, warrants, and convertible debt). Rights within a Transfer Window to manage securities rules within a timeframe are discussed in detail below. The platform is operable to create blocks of rights in a sequence for all types of issuer transactions.

The platform is operable to end a sequence of the blocks of rights early, if proper conditions exist. For example, if the third step is a bidding process, but during its execution there are no bidders, and hence no buyers, if the remaining steps are related to buyer rights, then the sequence of steps could end at that point. However, if there was a subsequent right step that allowed for a selection of a buyer, then the sequence would continue. During the execution of a sequence of blocks of rights, each step is aware of prior and/or future steps.

In one embodiment, a trigger event (e.g., a shareholder wants to sell their shares) invokes a workflow process in the platform. The platform generates at least one activity request to at least one participant (e.g., issuer, investor) to perform at least one requested action (e.g., make a selection, enter data). At least one response to the at least one action is processed by the platform and, if necessary, a subsequent at least one activity request is sent to at least one subsequent participant. This process continues until the workflow process is complete. All investor participants in the workflow are unaware of other participants or what action(s) those participants are taking (or have taken). The platform allows administrator participants to be aware of each investor participant's action(s) and/or non-action(s). Each activity request has at least one participant (the at least one actor who needs to take action), data that provides information regarding the at least one requested action (e.g., "John Smith is selling 100 Common Shares of ABC Gloves at $12.50"), at least one expected action (which can be as simple as a selecting a close button, or as complex as a complete data entry process), and/or a timeframe to complete the at least one requested action.

Figure 19:
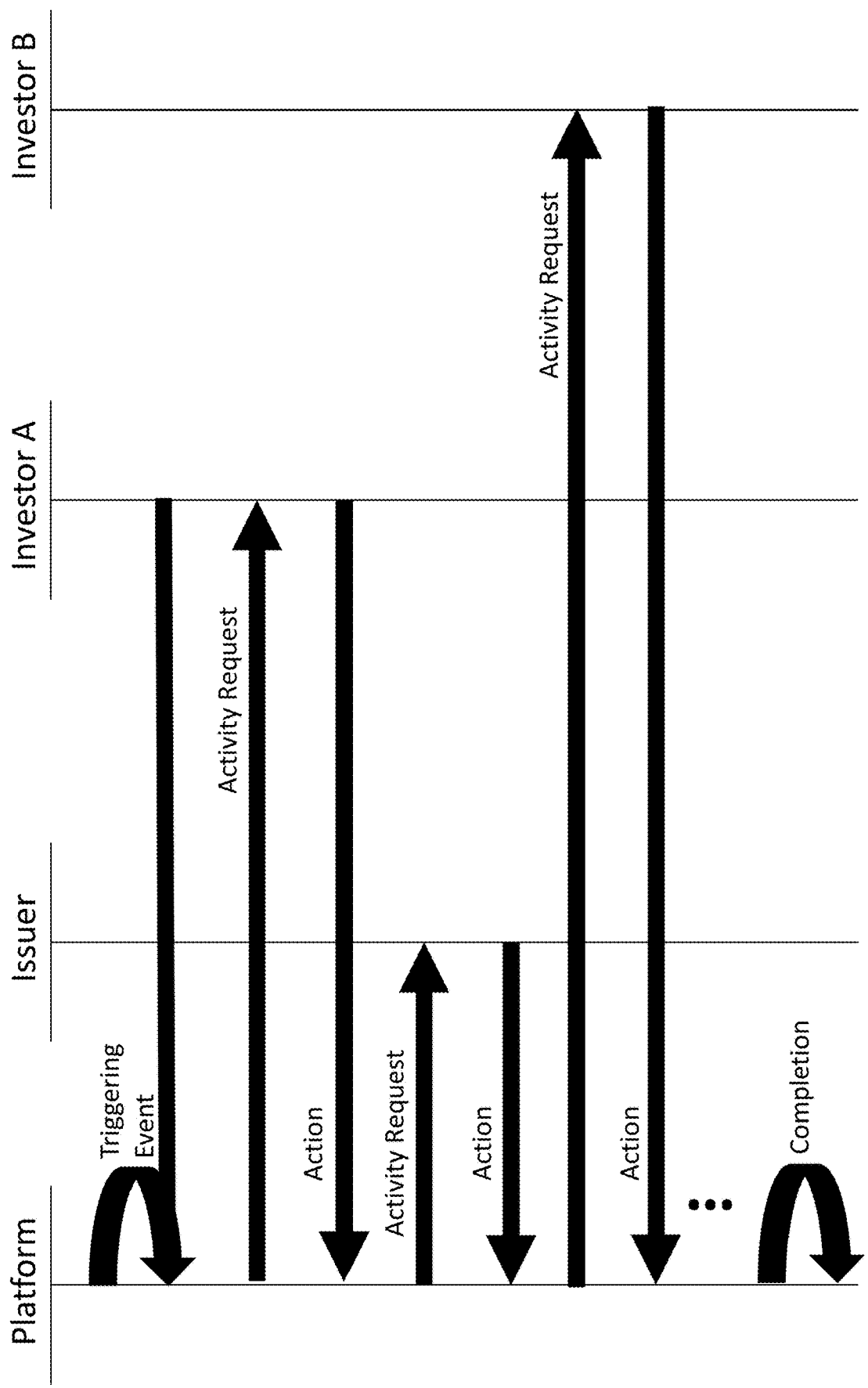
FIG. 19 illustrates one embodiment of a sample workflow process within the tokenized securities platform.

FIG. 19 illustrates one embodiment of a sample workflow process within the tokenized securities platform. In FIG. 19, the trigger event is initiated by Investor A (e.g., select button to sell shares). The platform generates at least one first activity request to Investor A (e.g., fill out Request to Sell form). Investor A then completes at least one first activity (e.g., completes form). The platform generates at least one second activity request to the Issuer (e.g., approve request to sell shares). The Issuer then completes at least one second activity (e.g., approval). The platform then generates at least one third activity request to Investor B (e.g., view ask). Investor B then completes at least one third activity (e.g., bids on the ask). This process of providing participants activities continues until the workflow is completed.

Figure 20:
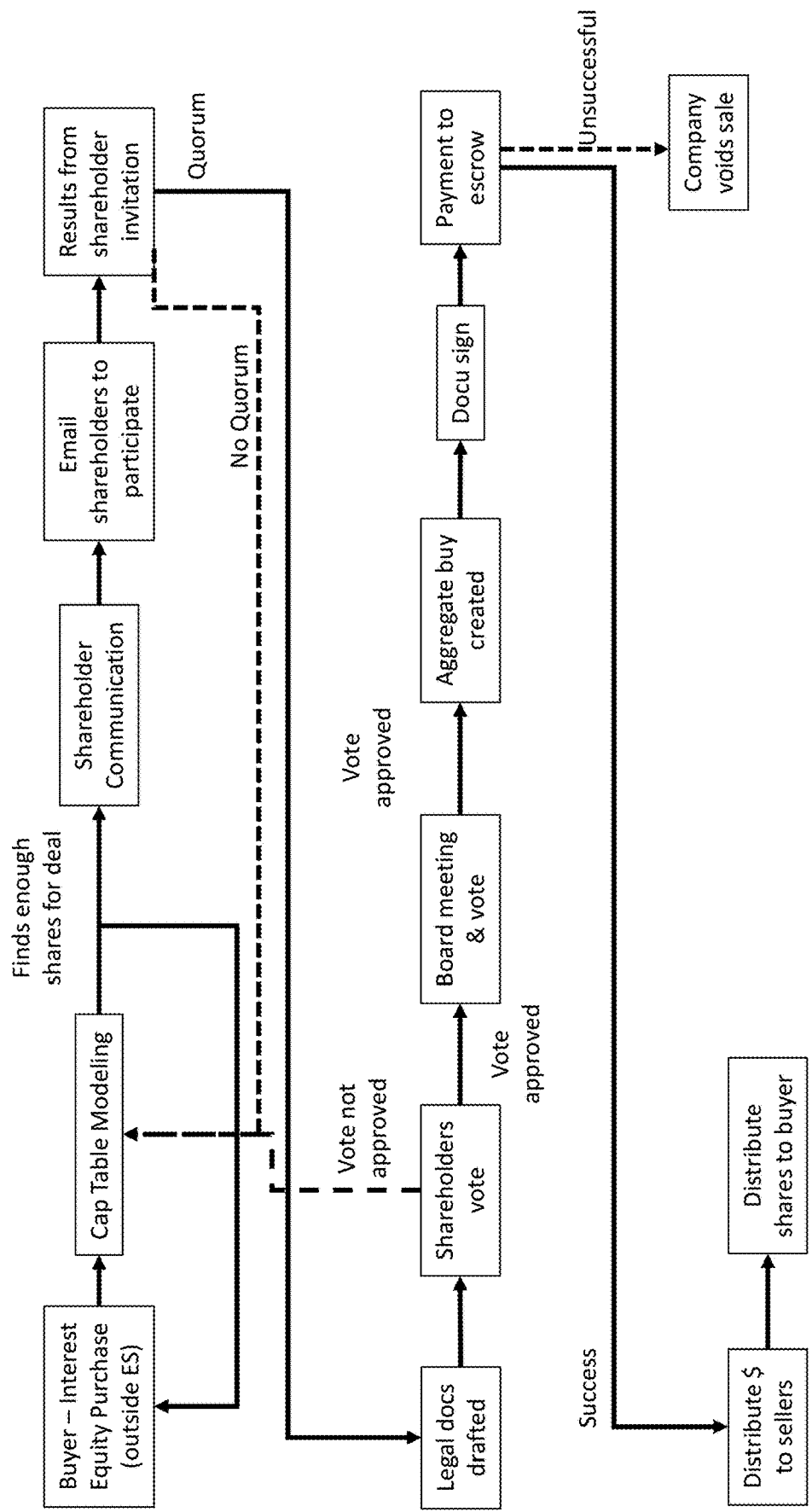
FIG. 20 illustrates a deal management flow diagram for a tokenized securities platform according to one embodiment of the present invention.

FIG. 20 illustrates a deal management flow diagram for a tokenized securities platform according to one embodiment of the present invention. Deal management is the entire workflow of an issuer transaction (e.g., new issuance, secondary transfer). For a secondary transfer, the deal management process begins with at least one buyer interested in an equity purchase either inside or outside of the issuer. For example, once the at least one buyer's interest is established and/or communicated to an issuer, the process moves to a capitalization ("cap") table modeling. During the modeling stage, the issuer determines if it is an appropriate time for a sale. Timing can be based on whether the company has audited financials available for disclosure, or if the company is contemplating an acquisition or other internally known (by officers or directors) issues that might have a significant impact on the company's value (e.g., legally referred to as a material event). Assuming it makes sense for the issuer to proceed, the issuer will determine if there is shareholder(s) willingness to sell interest to match the buying interest. Assuming there is interest, then the next step is to establish Board of Director's ("Board") (or Membership approval for an LLC) approval. This approval may require voting by one or more classes of shareholders. Assuming there is approval, the Board will authorize the executive team to execute the transfer(s). Once Board authorization is complete, the executive team, in participation with legal counsel, draft the appropriate documents (e.g., subscription agreement, latest operating agreement) for the buyers, sellers, agents, and the issuer to sign at closing. The secondary sale process executes based on the transfer steps previously described.

A new issuance deal follows a similar process as a secondary transfer, but typically has a different trigger at the beginning, and the new issuance steps are different. Specifically, a new issuance starts with an officer or Board member recommending to raise additional funds for the issuer. Again, cap table modeling is done to understand the potential dilution and other impacts of selling shares at various prices. The officers typically then make a recommendation to the Board with regards to the number of shares to sell, and the range of possible prices for the fund raise. The next steps are Board authorization, and shareholder (or members if LLC) approval if necessary, then the new issuance steps would be followed. New issuance steps typically involve the executive team identifying appropriate investors (e.g. accredit investors, qualified institutional buyer) and adding them to the participation list upon appropriate vetting. After passing appropriate vetting, potential investors are then provided legal documentation describing the offer. These documents could include, but are not limited to, a placement memorandum, an offering circular, business plans, financial information, a subscription agreement, and/or a purchase agreement. There may also be documents included that are not strictly legally required for the deal including, but not limited to, patent listings, white papers, and/or a customer list that are provided to assist possible investors of the value of the issuer's entity. As investors make investments and sign the required documents, the investor's money is held in escrow until a minimum raise is achieved, at that point the issuer can exchange ownership interest for the money (i.e., this exchange point is referred to as a first closing). As more investment is made by investors, subsequent rolling closes are made which exchanges money and signed documents by investors for interest in the issuer's business. The rolling close continues until either a prearranged date is reached or the total amount of shares authorized by the Board have been sold, and then there is a final close date established which ends the new issuance deal.

Another type of deal management is for a liquidation. A liquidation is when an issuer is selling more than 50% of the entity (i.e., majority control). Liquidations follow the same trigger as new issuance, in that usually an officer or Board member initiates the process. However, liquidation can also occur with bankruptcy, and may be 'ordered' through arbitration or a court ruling. In that case, a Trustee or similar will be appointed to sell the assets of the company, and any funds available after creditors and other legal requirements are paid, then the remaining cash is divided among the share classes based on the operating agreement or bylaws of the issuer. If the liquidation is the result of a sale to another entity, then again, the proceeds that are available to the shareholders (or owner's interest) is divided among the share classes based on the operating agreement or bylaws of the issuer.

These deal management processes involve a plurality of administrator and/or investor platform functionalities and Graphical User Interfaces (GUIs), accommodating the entire equity transaction workflow including, but not limited to, setting up and/or creating activities by administrators, creating and/or managing board meetings, sending, receiving, and/or analyzing investor polls, sending and/or receiving messages relating to equity transactions, and/or uploading, editing, and/or managing documents associated with equity transactions. The platform provides a plurality of different account types, enabling users to access only those functionalities corresponding to the account type.

Issuer

As a company and/or an entity evolves, it is important to control the evolution of associated shares. This presents several issues that prevent companies and/or entities from participating in traditional marketplaces. Companies and/or entities want to manage growth and the shareholder base over time to maximize the value and effectiveness of the company and/or the entity. A lower number of shareholders in the shareholder base means that individual shareholders have more control and/or influence over the company and/or the entity, so the company and/or the entity wants to control who is allowed to purchase securities and rights associated with those securities. However, traditional marketplaces reduce the overall control available to individual issuers. Moreover, traditional marketplaces are often operated by only large corporations. To solve these issues, and others, the present invention enables issuers to control the entire lifecycle of shares, enabling issuers to control the timing of when their shares are being sold and/or traded, as well as other activities that impact their shares. This element of control is what separates the present invention from traditional marketplaces, which merely take custody of issuances.

Figure 21A:
FIG. 21A illustrates an Edit Company GUI for a tokenized securities platform according to one embodiment of the present invention.
Figure 21B:
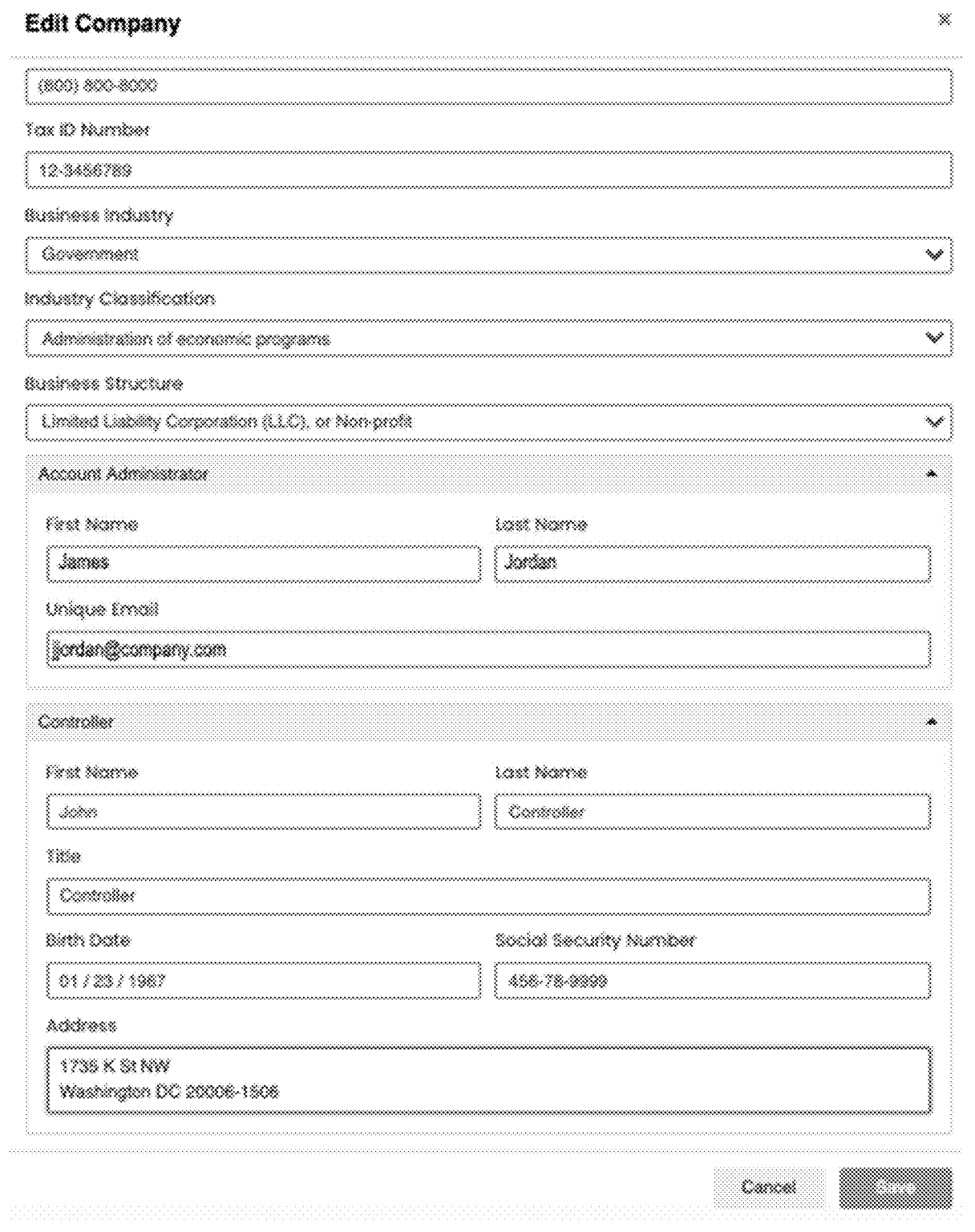

The platform requires that the issuer register and provide relevant information. FIGS. 21A-21B illustrate an Edit Company GUI for a tokenized securities platform according to one embodiment of the present invention. The Edit Company GUI includes, but is not limited to, a Legal Entity Name text box, a Doing Business as Name text box, an Administrators text box, a Billing Email text box, an Address text box, a Phone Number text box, a Tax ID Number text box, a Business Industry drop down menu, a Business Structure drop down menu, Account Administrator Details, Controller Details, a Cancel GUI button, and/or a Save GUI button. The Account Administrator Details include, but are not limited to, a First Name text box, a Last Name text box, and/or a Unique Email Address text box. The Controller Details include, but are not limited to, a First Name text box, a Last Name text box, a Title text box, a Birth Date text box, a Social Security Number text box, and/or an Address text box.

Further, all users (e.g., administrators, officers, investors, etc.) must register for an account. FIG. 22 illustrates an Account Registration GUI for a tokenized securities platform according to one embodiment of the present invention. The Account Registration GUI includes, but is not limited to, a First Name, a Last Name, an Email Address, and/or a register GUI button. Additionally, there is a checkbox to accept a Privacy Notice and Terms and Conditions of Use. In a preferred embodiment, the Account Registration GUI provides a link to the Privacy Notice and Terms and Conditions of Use.

The platform requires each user to set up a user profile. The user profile includes, but is not limited to, a first name, a last name, a job title, an email address, a phone number, a signature, banking information, a social security number or a taxpayer identification number, a license number (e.g., a FINRA Central Registration Depository (CRD) ID #for a securities professional, a state bar number for an attorney), and/or user preferences (e.g., contact preferences).

Figure 23:
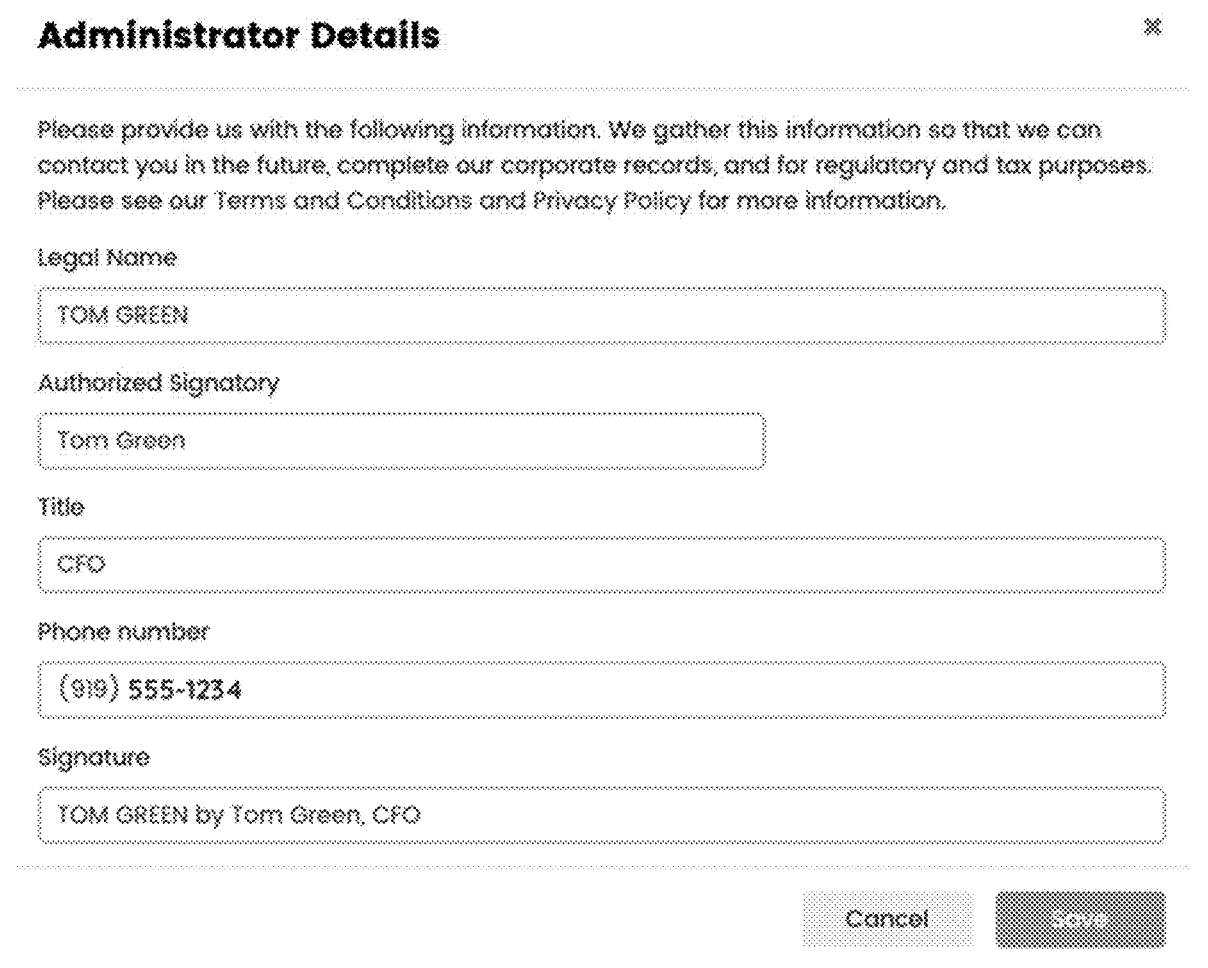

FIG. 23 illustrates an Administrator Profile GUI for a tokenized securities platform according to one embodiment of the present invention. The Administrator Profile GUI includes, but is not limited to, a Legal Name text box, an Authorized Signatory text box, a Title text box, a Phone Number text box, a Phone Number text box, a Signature text box, a Back GUI button, and/or a Done GUI button.

FIG. 24 illustrates an Account Details GUI for a tokenized securities platform according to one embodiment of the present invention. The Account Details GUI includes, but is not limited to, a First Name text box, a Last Name text box, an Email Address text box, an Add Email Address GUI button, a Mobile Phone Number text box, a Verify GUI button, at least one communication preference (e.g., notifications by email and verification code by text message, notification by text message and verification code by email), and/or a Next GUI button.

Figure 25:
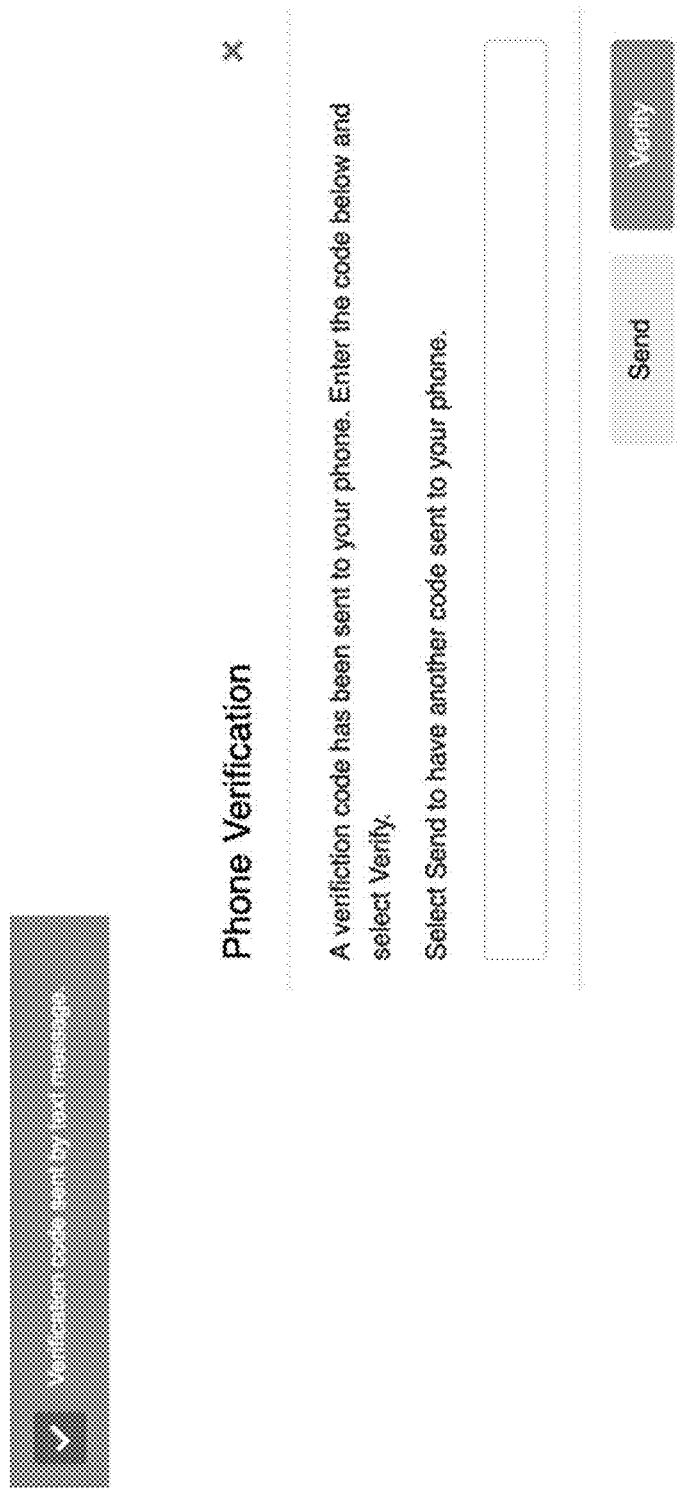
FIG. 25 is an example of a Phone Verification GUI for a tokenized securities platform according to one embodiment of the present invention.
Figure 26:
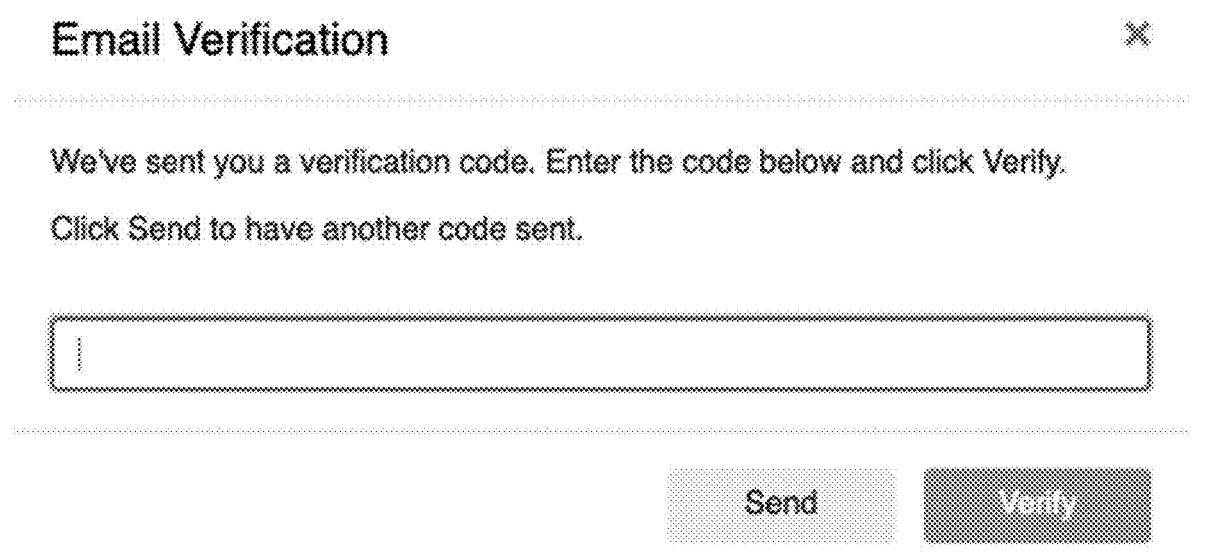

After the Verify GUI button is pressed, a verification code is sent via the at least one communication preference including, but not limited to, phone verification and/or email verification. FIG. 25 is an example of a Phone Verification GUI for a tokenized securities platform according to one embodiment of the present invention. The Phone Verification GUI includes, but is not limited to, a Verification Code text box, a Send GUI button to send another verification code, and/or a Verify GUI button. FIG. 26 is an example of an Email Verification GUI for a tokenized securities platform according to one embodiment of the present invention. The Email Verification GUI includes, but is not limited to, a Verification Code text box, a Send GUI button to send another verification code, and/or a Verify GUI button.

Figure 27:
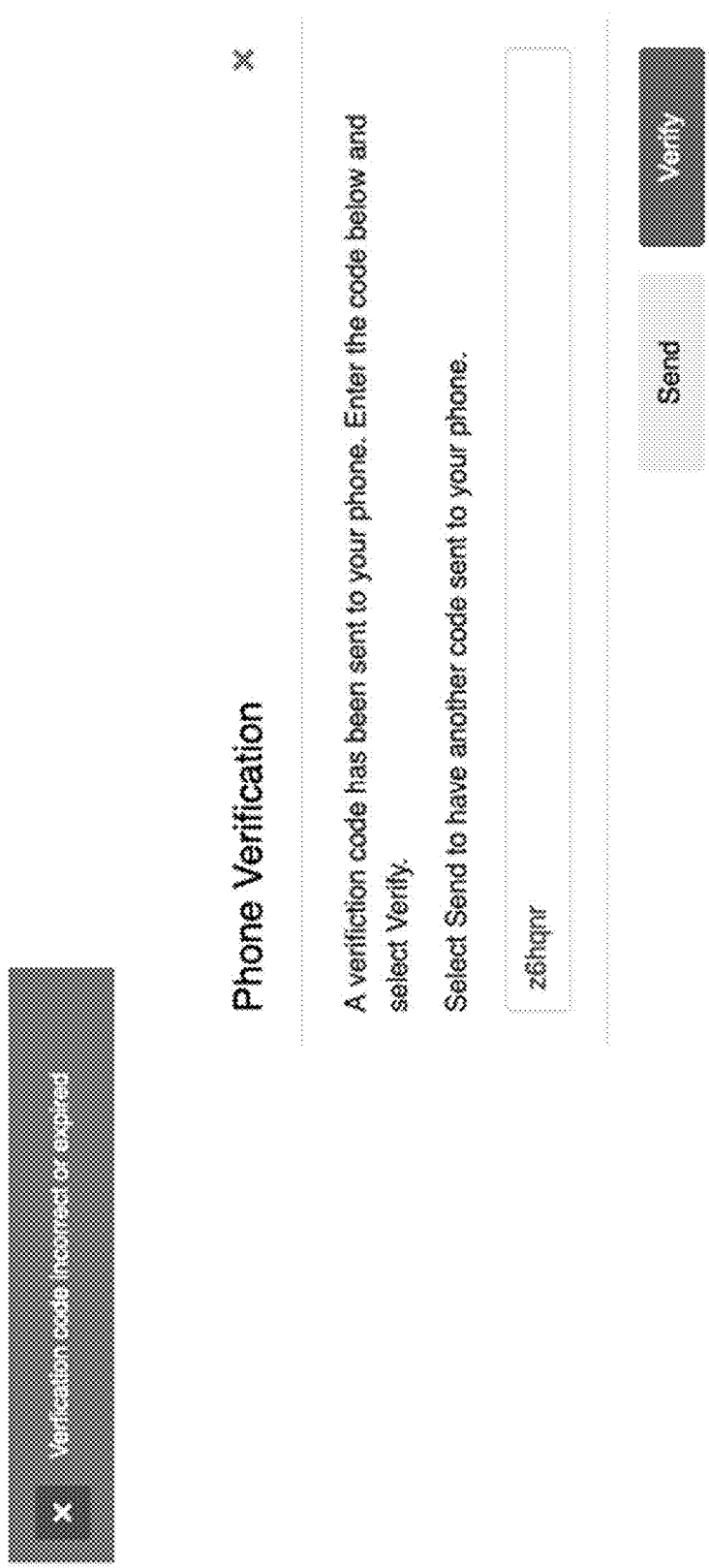
FIG. 27 is an example of an error message that states a verification code has expired for a tokenized securities platform according to one embodiment of the present invention.

In a preferred embodiment, the verification code has an expiration time (e.g., 10 min., 15 min., 30 min., 45 min., 1 hour, etc.). If the expiration time has passed, the platform is operable to display an error message that states the verification code has expired as shown in FIG. 27. If the verification code is entered correctly within before the expiration time passes, the platform is operable to display a message that the verification was success (e.g., phone verified) as shown in FIG. 28. Additionally, the platform allows a user to make keystroke entry errors (e.g., up to three errors) entering the code without rejecting access to the user.

In a preferred embodiment, the tokenized securities platform includes multi-factor authentication (e.g., two factor authentication) for security. Additional factors of authentication provide further evidence of the identity of the user. Additionally, or alternatively, the tokenized securities platform includes at least one biometric authentication method (e.g., fingerprint, retinal scan, haptic vein scan, facial recognition, voice recognition, ear recognition) for security.

It is possible that a potential user of the platform has not yet been given access by a member company, but attempts to access the platform. The platform will not let a guest see any ownership interest or transactional data, but will give them an opportunity to identify themselves and to request access to the platform as shown in FIGS. 29-31.

Figure 29:
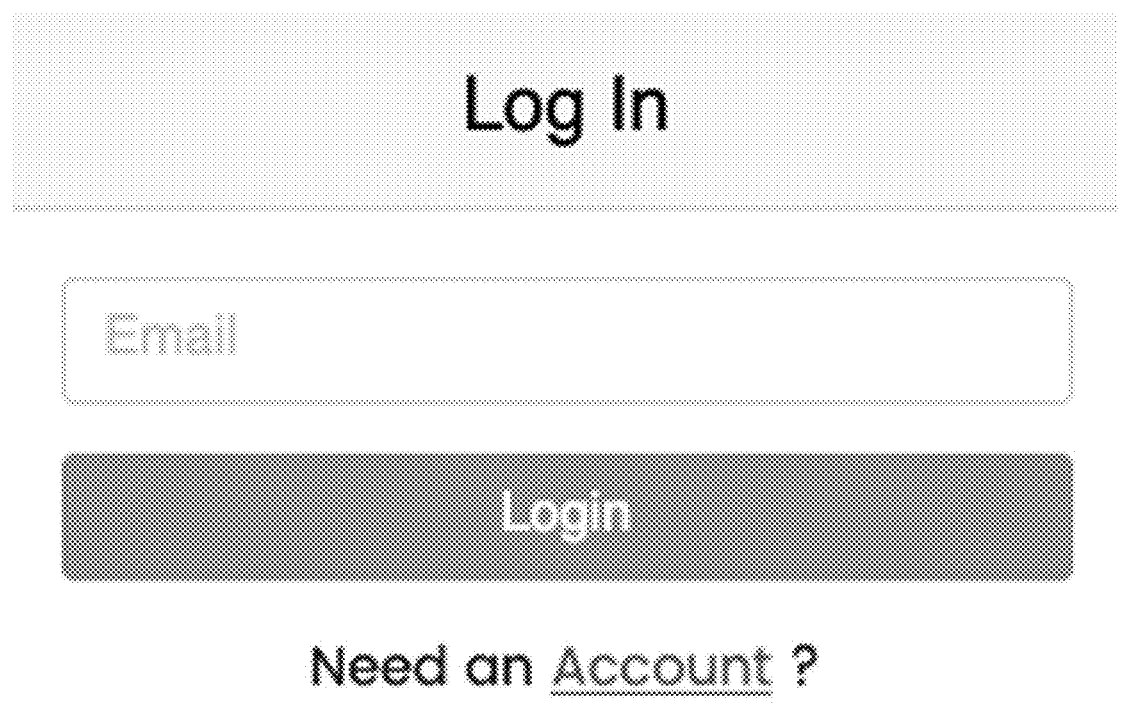

FIG. 29 illustrates a Login GUI for a tokenized securities platform according to one embodiment of the present invention. The Login GUI includes, but is not limited to, an Email text box, a Login GUI button, and/or an Account Creation Link.

FIG. 30 illustrates an example of a Guest GUI for a tokenized securities platform according to one embodiment of the present invention. The Guest GUI is for accounts without access to any member companies. The Guest GUI includes, but is not limited to, an Edit button to edit profile details (e.g., First Name, Last Name, Email Address, Phone Number), a descriptor drop down menu (e.g., board member of a private company, venture capital investor, officer of a private company, broker of private securities, other (please describe)), a preferred contact method drop down menu (e.g., phone, text, email), a message text box (e.g., How can EquityShift help you?), and/or a Send GUI button.

Figure 31:
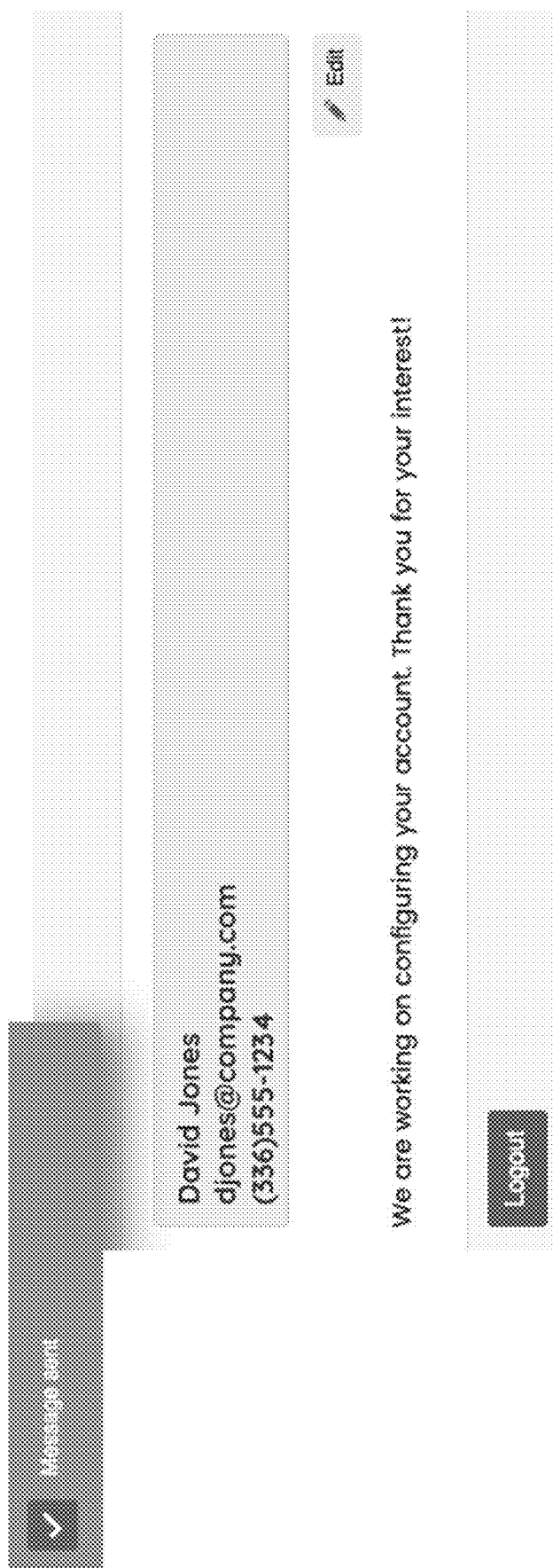
FIG. 31 illustrates an example of a Message Sent GUI for a tokenized securities platform according to one embodiment of the present invention.

After the Send GUI button is pressed, the platform is operable to display a Message Sent GUI as shown in FIG. 31. The Message Sent GUI includes, but is not limited to, the profile details, a message that account configuration is underway, and/or a Logout GUI button.

FIG. 32 shows an Information page for a Company Details GUI for a tokenized securities platform according to one embodiment of the present invention. The Information page includes, but is not limited to, a company name, a tax identifier, a parent company, banking information, and/or an add company GUI button. Banking information includes, but is not limited to, a bank name, a name on account, an account number, and an American Bankers Association (ABA) routing number that is operable to be used with at least one third party Automated Clearing House (ACH) service for billing and/or receipt purposes.

Figure 33:
FIG. 33 illustrates an Event Details Graphical User Interface (GUI) for a tokenized securities platform according to one embodiment of the present invention.

FIG. 33 illustrates an Event Details GUI for the tokenized securities platform according to one embodiment of the present invention. The Event Details is how an issuer's administrator triggers and manages one or more workflow. These workflows are for various stages of deal management (e.g., voting/polling) or types of transfers (e.g. new issuance, secondary) previously identified. The Event Details GUI is operable to display information including, but not limited to, an event name, an event date, a table containing a plurality of activities, an edit event name GUI button, a mark complete GUI button, and/or an add activity GUI button. Each of the plurality of activities includes, but is not limited to, an activity name, an activity date, and/or an activity status. The add activity GUI button enables activities to be added to the table containing the plurality of activities including, but not limited to, a transfer event activity, an aggregate sale activity, a message and files activity, a poll activity, and/or a board meeting activity.

To support the plurality of activities, the tokenized securities platform advantageously allows for issuers to create dynamic groups, whitelists, and blacklists. Further, the platform allows for issuers to manage investors and different share classes. The platform further allows for issuers to create a new issuance and manage trading windows for already issued securities. The platform further allows for management of documents related to the securities, including data rooms with visibility limited to a selected group. The platform is operable to send messages (e.g., via email and/or text) to at least one user to notify the at least one user of an activity (e.g., offer, ask, bid accepted, action required, poll) that is available to the at least one user. Additionally, the platform allows for recording documents related to meetings (e.g., board meetings). The platform also allows for polling of users and recording votes related to the poll. Each of these functions are described in detail below.

The platform of the present invention further enables the creation of dynamic groups. For example, if users only want certain participants who have accepted a prior offer to participate in an upcoming bid while restricting participation for those users who have not accepted the prior offer. This functionality enables users to restrict participation in future steps to only users who have actively participated in previous steps.

In addition, the tokenized securities platform enables performance of various functions including, but not limited to, viewing board members and group members, viewing officers, adding new board members and group members, linking individual members to existing groups, and/or creating custom groups. FIGS. 34-39 illustrate example GUIs related to group management on the tokenized securities platform.

FIG. 34 illustrates a Board Member GUI for a tokenized securities platform according to one embodiment of the present invention. The Board Member GUI captures the data necessary to identify Board Members as participants in Deal Management as previously described. The Board Member GUI is operable to display information including, but not limited to, a plurality of email addresses, where each of the plurality of email addresses includes a corresponding name, title, and/or description. The Board Member GUI is further operable to enable addition of new board members via an add board member GUI button. In addition, as the plurality of email addresses grows, the Board Member GUI adjusts by expanding the plurality of email addresses to multiple GUI pages.

FIG. 35 illustrates an Officer List GUI for a tokenized securities platform according to one embodiment of the present invention. Officers serve at the leisure of the Board or Membership to execute operations of the company. The platform identifies Officers for participating in Board meetings as requested, and to approve and/or execute actions of the employees, shareholders, and/or Board. The Officer List GUI is operable to display information including, but not limited to, a plurality of officers associated with a company, where the information for each of the plurality of officers includes an email address, an officer name, and/or an officer title. The Officer List GUI is operable to expand across multiple GUI pages as the plurality of officers associated with the company grows.

FIG. 36 illustrates an Add Custom Group GUI for a tokenized securities platform according to one embodiment of the present invention. The Add Custom Group GUI enables functions including, but not limited to, naming a custom group and/or selecting at least one existing group to be associated with the custom group. Custom Groups are used to identify external parties to the company that are allowed participate in Events (e.g., primary offerings or secondary transactions). The platform enables a custom group to be created using multiple existing groups.

FIG. 37 illustrates a Custom Group GUI for a tokenized securities platform according to one embodiment of the present invention. The Custom Group GUI enables functions including, but not limited to, editing a group name for a group, adding members to a custom group, linking the custom group to at least one other existing group, and/or viewing group members associated with the custom group. The Custom Group GUI is further operable to display individual member information including, but not limited to, an email address or domain address associated with a group member, a name associated with a group member, and/or an associated share class corresponding to a group member. The Custom Group GUI further includes a link group GUI button and/or an add member GUI button. The link group GUI button enables a group to be linked to at least one existing group. The add member GUI button enables new members to be added to a custom group.

Figure 38:
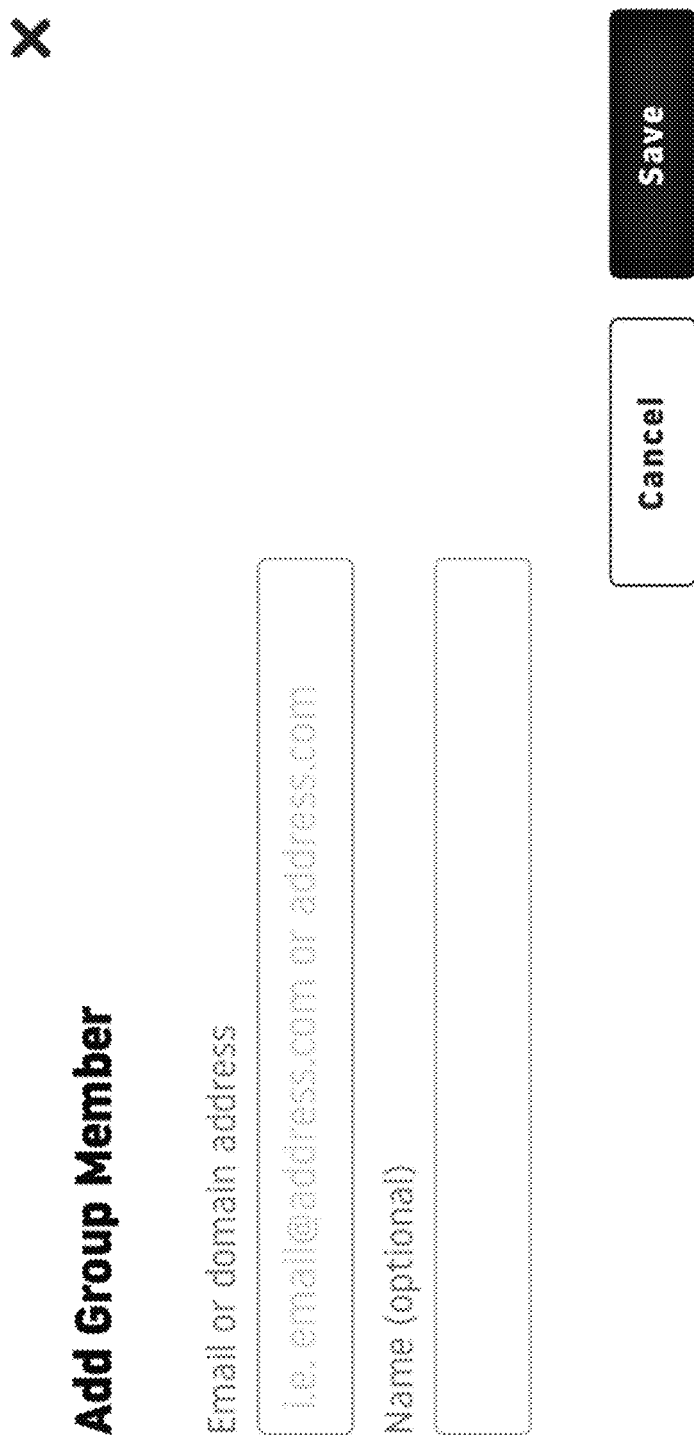
FIG. 38 illustrates an Add Group Member GUI for a tokenized securities platform according to one embodiment of the present invention.

FIG. 38 illustrates an Add Group Member GUI for a tokenized securities platform according to one embodiment of the present invention. The Add Group Member GUI enables entering information including, but not limited to, an email address or domain address and/or a name corresponding to the email address or domain address. Once this information has been entered, the Add Group Member GUI provides at least two GUI buttons, where the at least two GUI buttons include, but are not limited to, a cancel GUI button and/or a save GUI button. The cancel GUI button exits the display from the Add Group Member GUI. The save GUI button enables the entered information to be saved and a new group member to be added.

FIG. 39 illustrates a Group Link GUI for a tokenized securities platform according to one embodiment of the present invention. The Group Link GUI enables linking a user to at least one existing group. The Group Link GUI further supports the linking of the user to multiple existing groups. The Group Link GUI further includes a cancel GUI button and/or a save GUI button.

As previously described, the tokenized securities platform is operable to include a whitelist and/or a blacklist to govern which parties are allowed access to information (e.g., who can be a party to a sale). One of the ways to manage a whitelist and/or a blacklist is by linking a user to at least one existing group as shown in FIG. 39. In one embodiment, the whitelist includes a group selected to participate in a transaction. FIGS. 40-41 include example GUIs related to blacklists.

FIG. 40 illustrates a Blacklist GUI for a tokenized securities platform according to one embodiment of the present invention. The Blacklist GUI includes a table containing a plurality of email addresses. Each of the plurality of email addresses is further associated with a custom group name and/or a custom group description.

FIG. 41 illustrates an Add-to-Blacklist GUI for a tokenized securities platform according to one embodiment of the present invention. Blacklists enable a domain to be added to a blacklist, blocking any user with an account from that domain from performing actions including, but not limited to, seeing company information, documents, and/or participating in any transfer events. The platform is operable to store information including, but not limited to, an email address or domain, a name, and/or a description when a new email address and/or domain is added to the blacklist. Advantageously, the platform allows the blacklist to be specific to a company. For example, User A works as an executive for Company A, invests in Company B, and is on a blacklist for Company C. User A is able to view information for Company A and/or Company B, but is restricted from viewing information related to Company C on the platform.

The platform supports a variety of activities related to an approval, a disapproval, an offering, a closing, a bid, an ask, a document (e.g., acknowledge, sign, view, download), a poll, an execution of a right (e.g., a right of refusal, an offer right, a co-sale right, an undersubscribed right, a custom right), banking registration, payments (e.g., a request for payment, a payment request in progress, a payment failure), fee submission, refunds (e.g., failed refund), canceling or voiding transactions (e.g., closing), request for access to a company (e.g., potential investors, agents, brokers), sale completion, and/or vetting potential investors (e.g., self-accreditation, third party accreditation). In support of these activities, the platform is operable to provide GUIs related to activities. Example GUIs showing some of these features related to issuers are shown in FIGS. 42-48.

Because the sale of securities can span several days or weeks, the platform of the present invention advantageously allows activities to be managed asynchronously. In addition to viewing activities on web pages, users of the platform are notified by email and/or short message service (SMS) or multimedia message service (MMS) messages that they have activities that require action. These notifications provide the context of the request (e.g., details regarding the user and the related securities), and have deep links (HTTP URLs) that, when selected on a device (e.g., a desktop computer, a laptop computer, a tablet, a smartphone), direct a user to the requested activity on a web page. Thus, users do not have to monitor the platform to know if they need to respond or take action; rather, the platform informs them when to take action. For example, if a potential investor is making a bid, and gets outbid, the platform sends the potential investor a notification that they have been outbid. Another example is when an administrator must approve a particular transaction, the administrator is notified and can respond at their leisure. Additionally, the platform sends follow-up notifications for an activity if the deadline for completion is approaching. For example, if an investor has a co-sale right that expires after five business days, the platform notifies the investor when there is one business day remaining if they have not already taken action.

FIG. 42 illustrates an Action Requested page for an Activity GUI for a tokenized securities platform according to one embodiment of the present invention. The Action Requested page shown in FIG. 42 displays that there is no recent activity to report.

Figure 43:
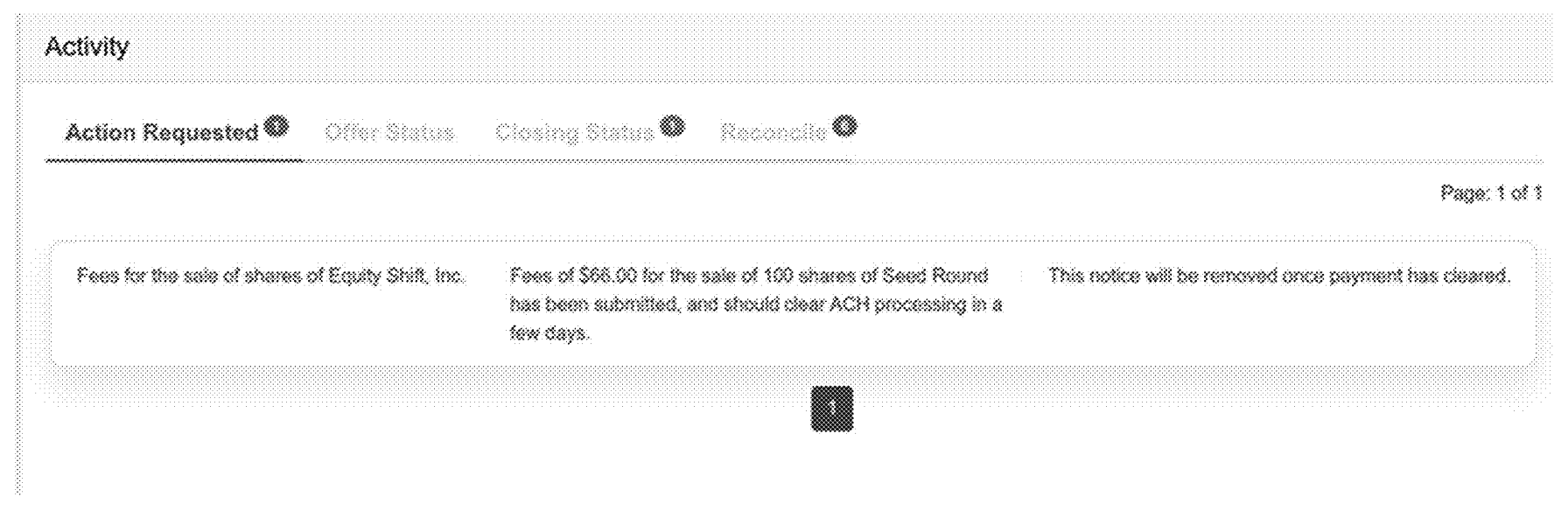

FIG. 43 illustrates an Action Requested GUI for a tokenized securities platform according to one embodiment of the present invention. The Action Requested GUI is operable to display information including, but not limited to, a description of the activity, additional details regarding the activity, and/or a requested action. In the embodiment shown in FIG. 43, the description of the activity is fees for the sale of shares; the additional details regarding the activity describes the fees, the number of shares, the share class, and expected clearance of payment; and the requested action is a notification that the notice will be removed after the payment clears. Advantageously, the platform keeps track of payments for the company administrator.

FIG. 44 illustrates an Action Requested GUI for a tokenized securities platform according to another embodiment of the present invention. In the embodiment shown in FIG. 44, the description of the activity is a request for approval or disapproval of an equity sale; the additional details regarding the activity describes the seller, the number of shares, the share class, and the share price; and the requested action is an approval or disapproval of the sale. Advantageously, the platform allows an issuer to control sales of shares between investors.

The platform maintains a history of all the activities presented to a system user (e.g., investor, administrator, broker) and the action that was taken (e.g., approved sale, accepted Co-Sale pro rata right, bid on shares, downloaded a document, signed a document). In situations where the user did not take an action within the necessary time, the platform records that the action expired. This history provides an advantageous detailed audit trail of activity that demonstrates legal compliance and exceeds SEC/FINRA rules for retention. In one embodiment, the audit trail includes a name of at least one activity, a description of the at least one activity, a status of the at least one activity, a date of the at least one activity, a time of the at least one activity, data related to the at least one activity, and/or a party who completed the at least one activity. The data related to the at least one activity includes, but is not limited to, data entered by a user to complete the at least one activity. For example, if a user decides to buy 50 of 100 shares offered with respect to refusal rights, the platform records the data entered by the user (e.g., 50) to complete the purchase.

Figure 45:
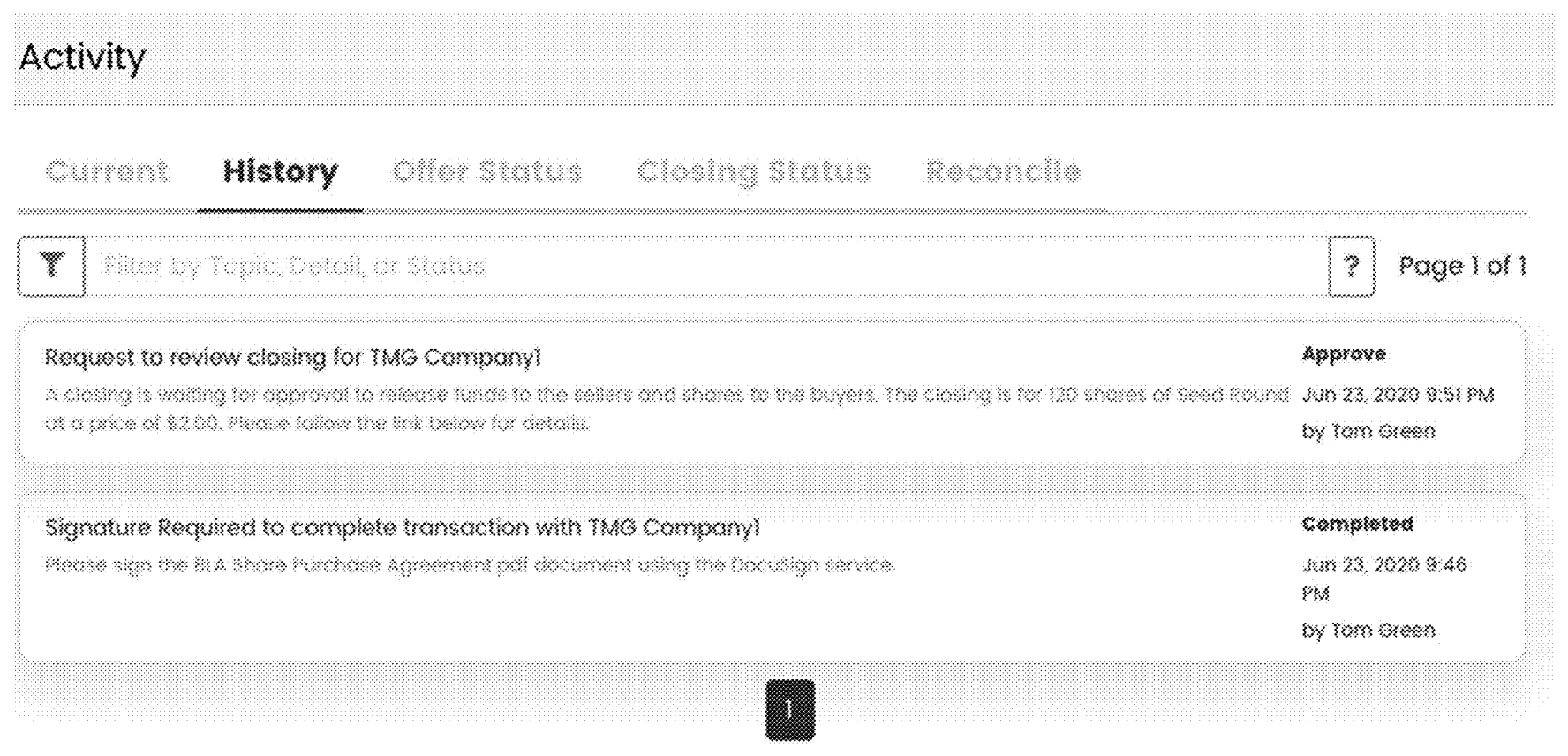

FIG. 45 illustrates an Issuer Activity History GUI for a tokenized securities platform according to one embodiment of the present invention. The Issuer Activity History GUI displays information including, but not limited to, a name of at least one activity, a description of the at least one activity, a status of the at least one activity, a date of the at least one activity, a time of the at least one activity, and/or a party who completed the at least one activity. In the example shown in FIG. 45, the at least one activity includes a Request to review closing for TMG Company 1 and a Signature Required to complete transaction with TMG Company 1. The description of the Signature Required to complete transaction with TMG Company 1 is "Please sign the BLA Share Purchase Agreement.pdf document using the DocuSign service." In the example shown in FIG. 45, the status of the at least one activity is Approve or Completed. Further, the Issuer Activity History GUI is operable to filter by topic, detail, or status. Advantageously, this allows the issuer to review all completed activities on the platform.

In existing marketplaces, issuers do not have the ability to cancel a closing once they have allowed the shares to be sold. Unfortunately, transactions may take many days or weeks to complete, and the issuer's situation may have changed since approval was granted. Advantageously, the platform of the present invention allows the closing to be canceled prior to closing. The platform also has preferences for an issuer to specify how many days to hold up the closing for final allowance.

Figure 46:
FIG. 46 illustrates an Action Requested GUI for a tokenized securities platform according to yet another embodiment of the present invention.

FIG. 46 illustrates an Action Requested GUI for a tokenized securities platform according to yet another embodiment of the present invention. In the embodiment shown in FIG. 46, the description of the activity is a request to review closing; the additional details regarding the activity describes the number of shares, the share class, and the share price; and the requested action is an approval or disapproval of the closing. In one embodiment, additional details regarding the closing are available via a link.

Figure 47:
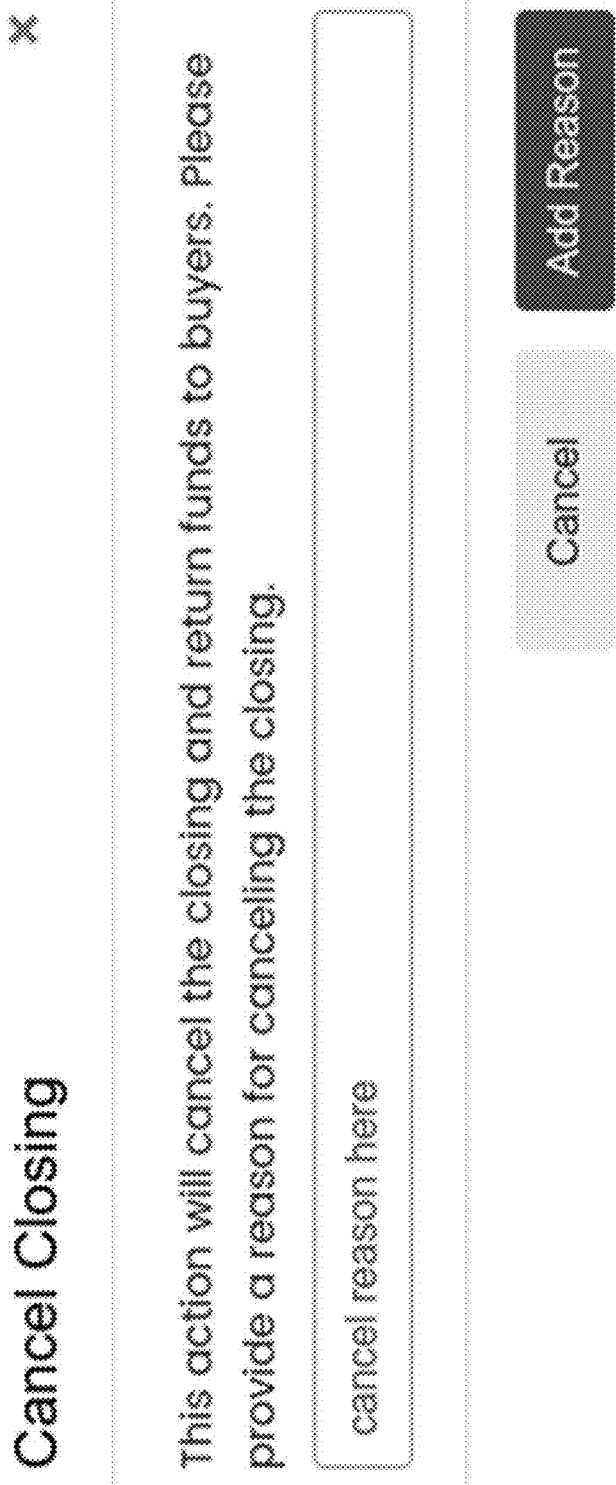
FIG. 47 illustrates a Cancel Closing GUI for a tokenized securities platform according to one embodiment of the present invention.

FIG. 47 illustrates a Cancel Closing GUI for a tokenized securities platform according to one embodiment of the present invention. The Cancel Closing GUI includes a text box to add a reason for canceling the closing. The platform advantageously allows an issuer to cancel closing when a material event occurs and to record the material event.

Figure 48:
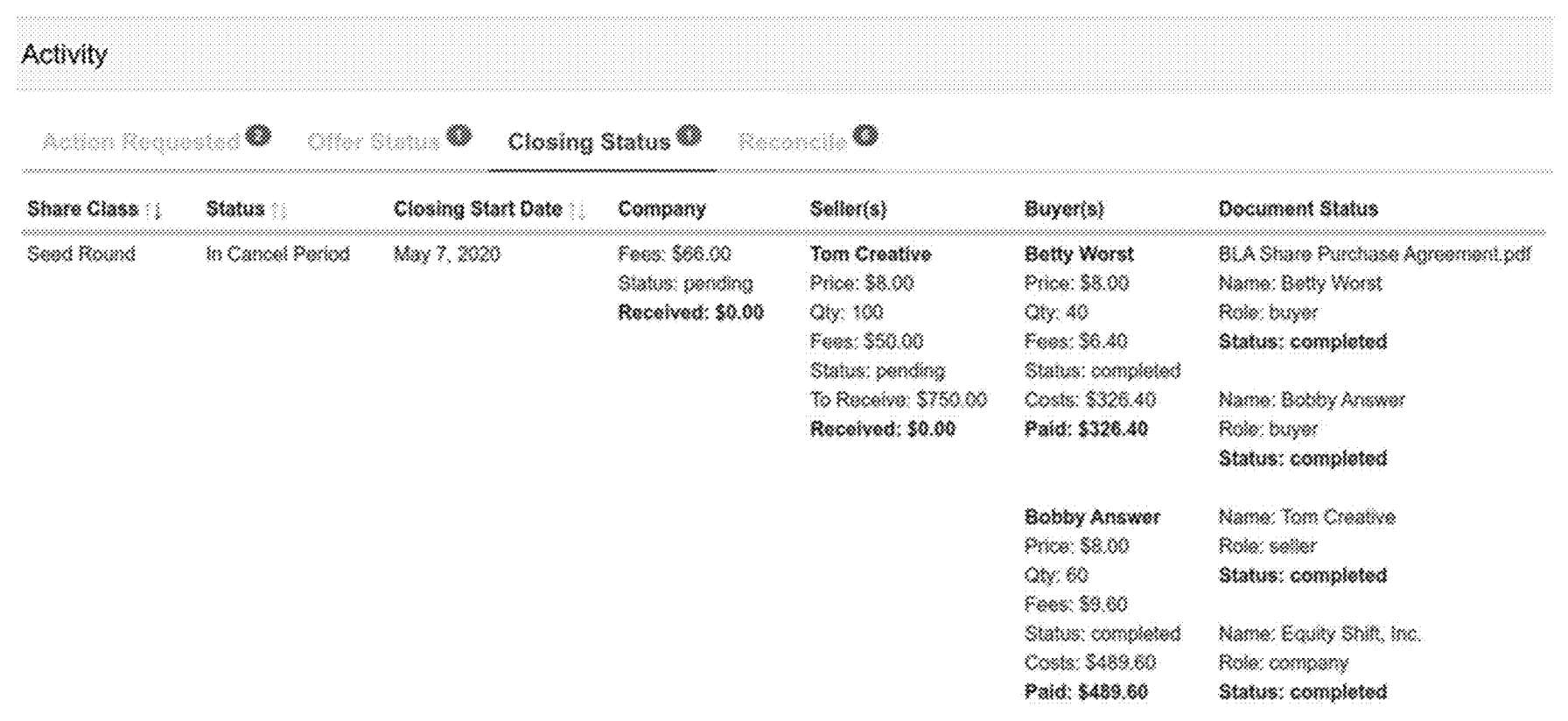

FIG. 48 illustrates a Closing Status GUI for a tokenized securities platform according to one embodiment of the present invention. The Closing Status GUI is operable to display information including, but not limited to, a share class, a status, a closing start date, a company, at least one seller, at least one buyer, and/or at least one document status. In one embodiment, the company information includes information regarding fees, status, and/or received payments. In one embodiment, the at least one seller information includes at least one seller name, at least one price, at least one quantity, at least one fee, at least one status, at least one amount to receive, and/or at least one amount received. In one embodiment, the at last one buyer information includes at least one buyer, at least one price, at least one quantity, at least one fee, at least one status, at least one cost, and/or at least one payment. In one embodiment, the at least one document status includes at least one document, at least one signor, at least one role related to the at least one signor, and/or at least one status.

Further, the platform allows for voiding a close. Once a closing completes, meaning the at least one buyer has ownership rights of the at least one security, and the at least one seller has received payment, the platform allows the closing to be voided by the issuer. Voiding a transaction reverses the transaction in its entirety such that the at least one seller gains ownership of the at least one security, the at least one buyer is refunded any payment, and all signed documents are voided. In existing marketplaces, once a transaction has been completed, there is not an opportunity for voiding. The reasons for a voided transaction are many, and include, but are not limited to the following: a misrepresentation by a buyer, a material change to the issuer's financials, and/or a buyer showing up on the US Treasury Office of Foreign Asset Control list. As previously stated, this is not possible in traditional marketplaces. There is a long standing, unmet need for a platform operable to void a transaction after closing.

The platform allows administrators to assess, review, and/or manage investors and share classes associated with a registered company associated with the administrator. Advantageously, the platform provides all of this functionality and visibility to the administrator in one location, without the need for the administrator to rely on multiple platforms for assessing, reviewing, and/or managing investors and share classes. Additionally, the platform allows administrators to manage the vesting of shares. Example GUIs illustrating these features to manage investors and share classes are shown in FIGS. 49-62.

Figure 49:
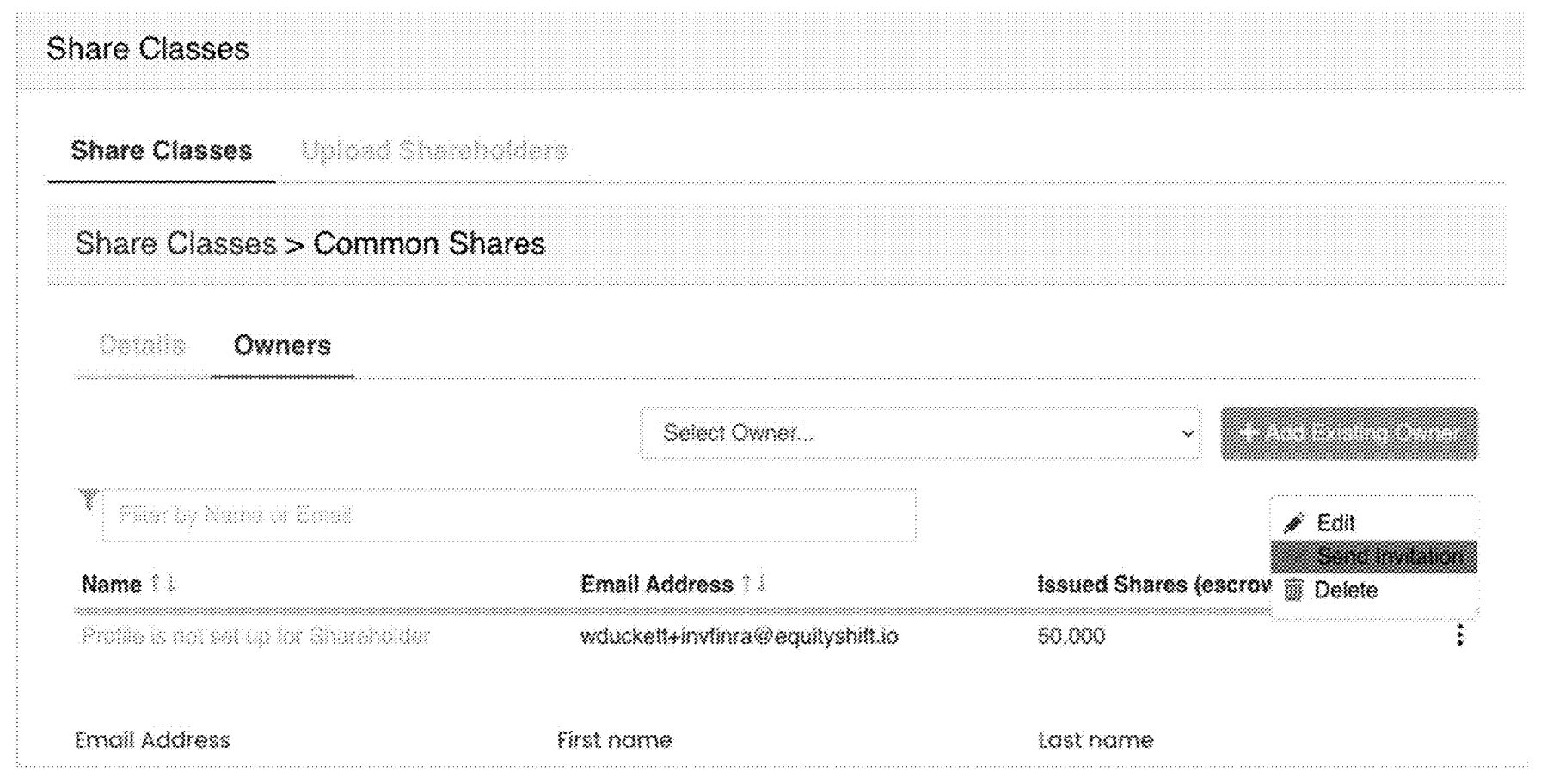

FIG. 49 illustrates a Share Class Owners GUI for a tokenized securities platform according to one embodiment of the present invention. The Share Class Owners GUI includes, but is not limited to, a name (e.g., first name, last name), an email address, a number of issued shares, and/or an add existing owner GUI button. The Share Class Owners GUI is operable to allow an administrator to edit share class owner details, send an invitation to join the platform to manage shares, and/or delete the share class owner's profile from the share class owners (e.g., share class owner sells all shares). The Share Class Owners GUI is preferably operable to filter the share class owners by name and/or email address.

Figure 50:
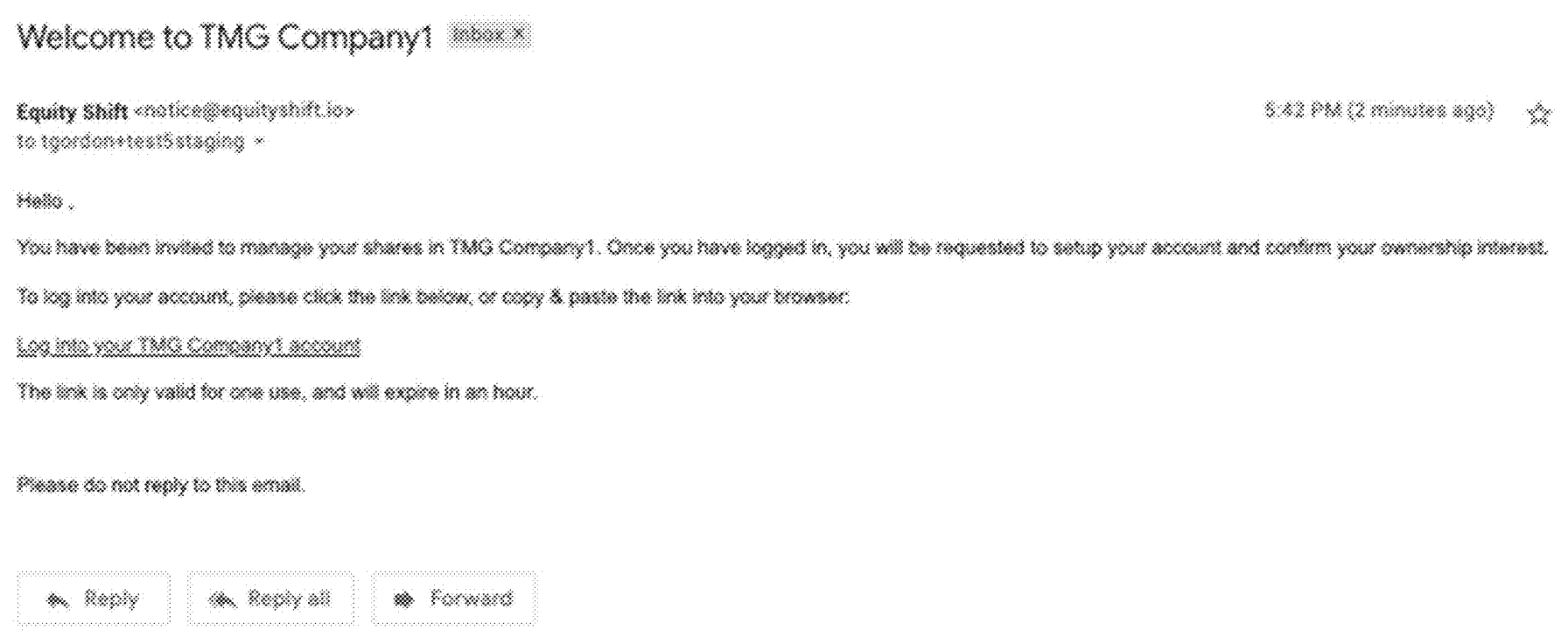

FIG. 50 illustrates an example of an email inviting an investor to manage shares on the platform. In a preferred embodiment, the email includes a link to log into the investor's account. In one embodiment, the link is valid for only one use and/or has an expiration time (e.g., 10 min., 15 min., 30 min., 45 min., 1 hour, etc.).

The platform enables viewing and/or modifying information relating to specific share classes. FIG. 51 illustrates a Share Classes GUI for a tokenized securities platform according to one embodiment of the present invention. The Share Classes GUI is operable to display elements including, but not limited to, an add share class GUI drop-down list, and/or a table containing a plurality of share classes. Each of the plurality of share classes includes, but is not limited to, a share class name, a share class type, a share class authorized value, a share class issued value, an outstanding share class value, and/or a date closed. In addition, the Share Classes GUI enables performing further operations on each of the plurality of share classes including, but not limited to, editing the plurality of share classes, deleting the plurality of share classes, viewing and/or setting rules for the plurality of share classes, and/or viewing and/or editing shareholders for the plurality of share classes.

Figure 52:
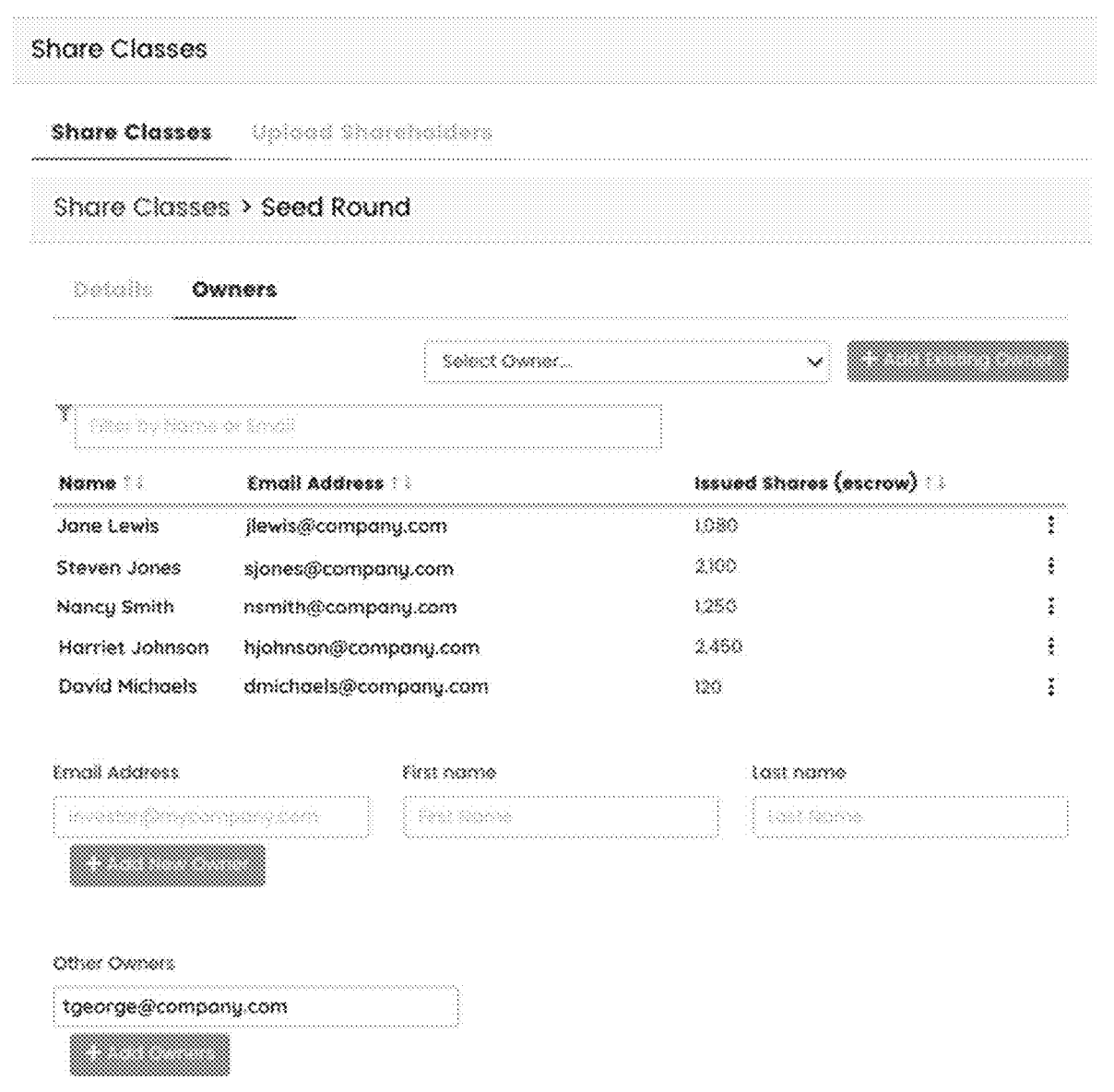

FIG. 52 illustrates a Shareholders page for a Share Class List GUI for a tokenized securities platform according to another embodiment of the present invention. The Shareholders page for the Share Class List GUI includes, but is not limited to, a shareholder filter input field, a bulk upload GUI button, an add shareholder GUI button, and/or a table containing a plurality of shareholders. Each of the plurality of shareholders includes, but is not limited to, a shareholder name, a shareholder email address, an issued shares value, an issued shares percentage, and/or a shareholder status. In one embodiment, the shareholder status is set to "active," indicating the shareholder is active on the platform. In one embodiment, the shareholder status is set to "incomplete profile," indicating that a user still needs to complete a corresponding user profile before additional platform functionality is available to the user.

FIG. 53 illustrates a Share Class Information GUI for a tokenized securities platform according to one embodiment of the present invention. The Share Class Information GUI displays input fields including, but not limited to, a share class name input field, a number of authorized shares input field, an issued shares input field, an outstanding shares input field, and/or a date closed input field. The input fields enable entering information associated with a specific share class and saving this data to the platform.

Figure 54:
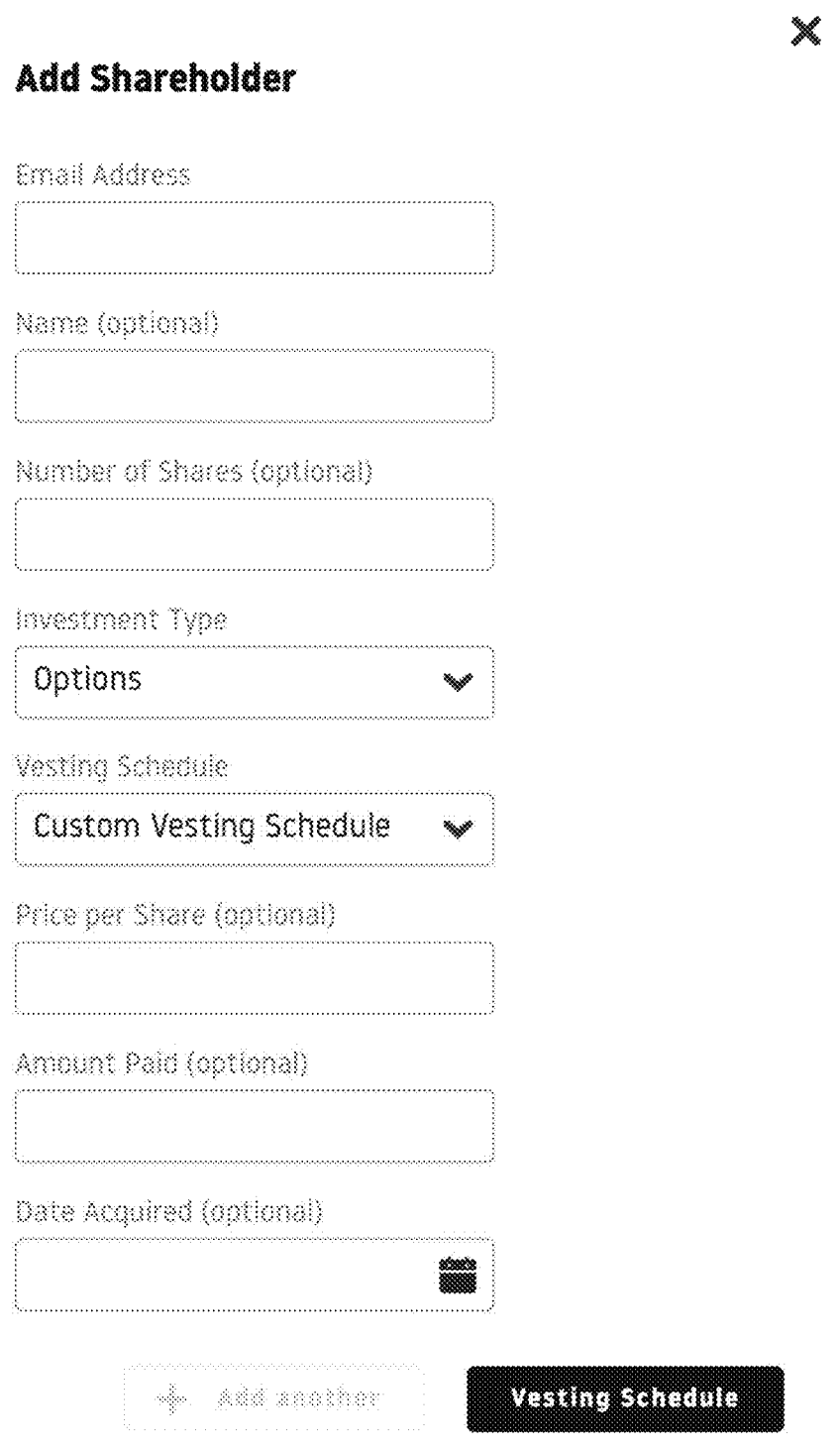

FIG. 54 illustrates an Add Shareholder GUI for a tokenized securities platform according to one embodiment of the present invention. The Add Shareholder GUI contains a plurality of input fields including, but not limited to, an email address input field, a name input field, a number of shares input field, a price per share input field, an amount paid input field, and a date acquired input field. In addition, the Add Shareholder GUI further includes an investment type GUI drop-down box, where the investment type GUI drop-down box includes a plurality of investment type selections. Moreover, the Add Shareholder GUI also includes a vesting schedule GUI drop-down box, where the vesting schedule GUI drop-down box includes a plurality of schedule selections including, but not limited to, none, a 100% grant, a default vesting schedule, and/or a custom vesting schedule selection. For employee options, the platform captures whether the options are qualified (i.e., meet regulatory requirements for incentive stock options), non-qualified, or are part of an employee stock ownership plan. The Add Shareholder GUI also includes an add another GUI button and/or an add shareholder GUI button. The add another GUI button enables adding an additional shareholder to a share class without needing to exit out from the Add Shareholder GUI. The add shareholder GUI button displays the plurality of input fields and/or drop-down boxes and allows the addition of a new shareholder to a share class. In one embodiment, the add shareholder GUI button simultaneously closes the Add Shareholder GUI while allowing the addition of the new shareholder to the share class.

Figure 55:
FIG. 55 illustrates an Add Shareholder GUI for a tokenized securities platform according to another embodiment of the present invention.

FIG. 55 illustrates an Add Shareholder GUI for a tokenized securities platform according to another embodiment of the present invention.

Figure 56A:
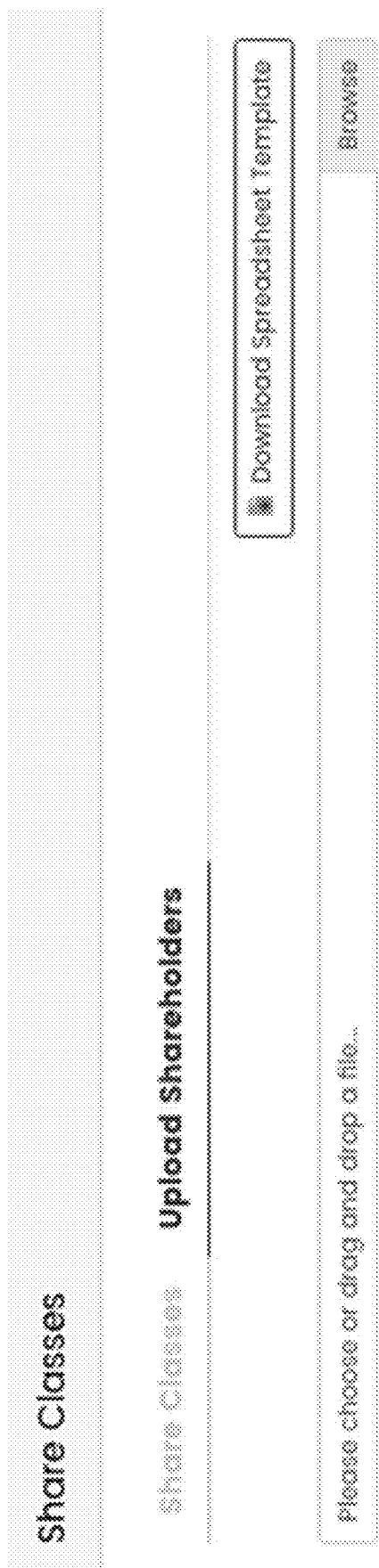
FIG. 56A illustrates an Upload Shareholders GUI for a tokenized securities platform according to one embodiment of the present invention.

FIG. 56A illustrates an Upload Shareholders GUI for a tokenized securities platform according to one embodiment of the present invention. The Upload Shareholders GUI is operable to upload a spreadsheet (e.g., as a comma-separated values file, MICROSOFT EXCEL file) with information regarding shareholders including, but not limited to, at name, at least one share class, a number of shares in each of the at least one share class, an email address, a telephone number, a title, a company, and/or other profile details. The Upload Shareholders GUI includes a Download Spreadsheet Template GUI button that provides a template for the information regarding shareholders. The Upload Shareholders GUI is preferably operable to choose a file and/or drag and drop the spreadsheet to upload to the platform.

Figure 56B:
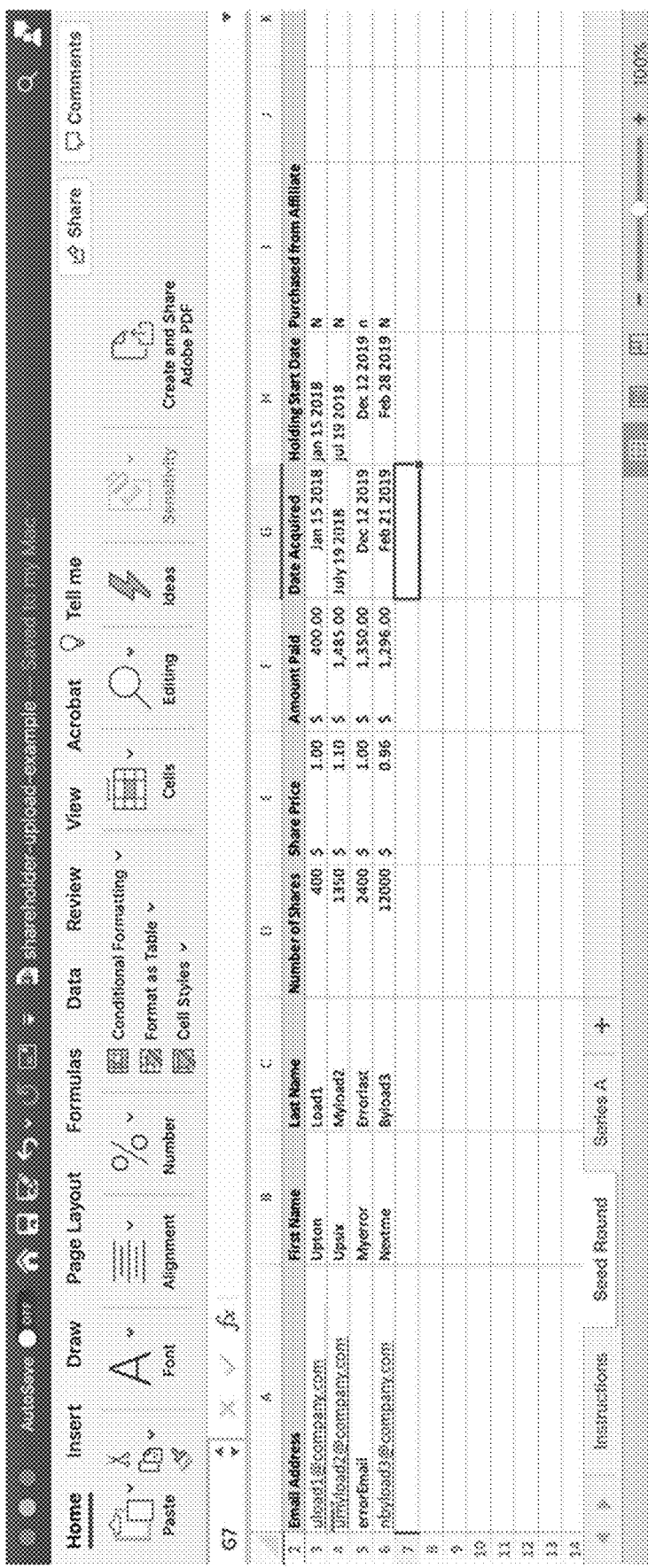
FIG. 56B illustrates an example of an Upload Shareholder Template.

FIG. 56B illustrates an example of an Upload Shareholder Template. The example shown in FIG. 56B is a spreadsheet template that was downloaded from the platform and populated with information from four shareholders. The template was dynamically generated in real time and has a tab for each of the share classes for the company along with the data collected for each share class. Each share class may have different data based on the type of share class (e.g., employee options have a strike price, and common shares do not). Additionally, there is a tab in the spreadsheet with instructions for completing the worksheet. Advantageously, the template is unique to each issuer, and uses the information in the platform to generate the template in real time. This is unlike traditional systems that use a common template for every issuer.

Figure 56C:
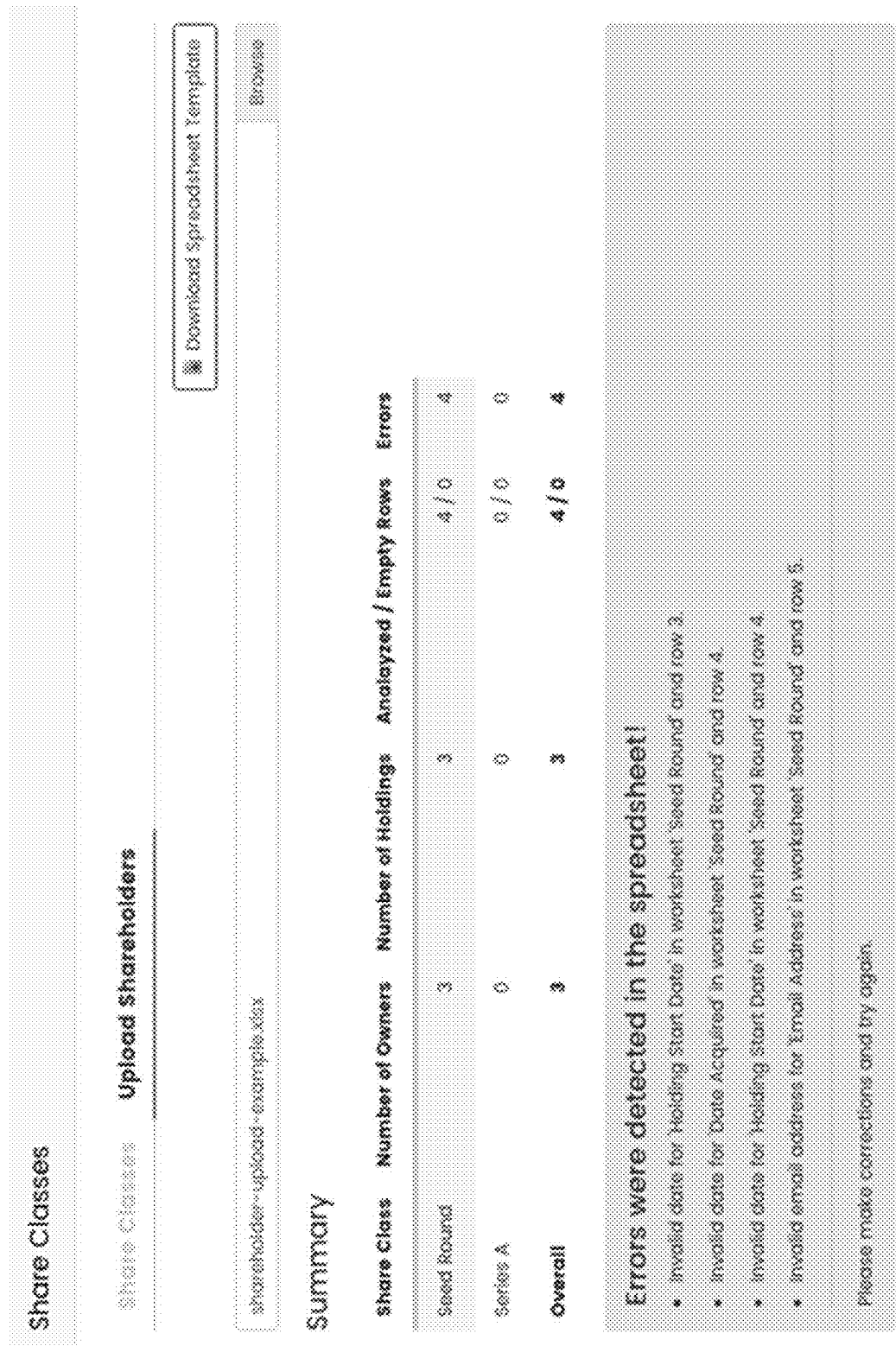
FIG. 56C illustrates an example of a result from adding the populated template data into the Upload Shareholder GUI.

FIG. 56C illustrates an example of a result from adding the populated template data into the Upload Shareholder GUI. The platform advantageously list summary statistics to allow the user to know the number and the names of share classes that were located in the spreadsheet, the number of shareholders (i.e., owners) found in the spreadsheet, the number of holdings by those shareholders, and the number of rows processed (with data and without), and the number of errors found in the data. The platform advantageously lists the individual errors found in the data based on their location in the spreadsheet, which makes it easy for the user to identify and resolve the issue(s). The platform advantageously allows the user to repeat the process of adding templates and providing the data to the platform as many times as desired (e.g., as many iterations as it takes to remove all the errors in the populated template). This allows the issuer to verify that new data entered into the platform is without errors prior to modifying the current information in the platform.

FIG. 56D illustrates a populated template without errors.

Figure 56E:
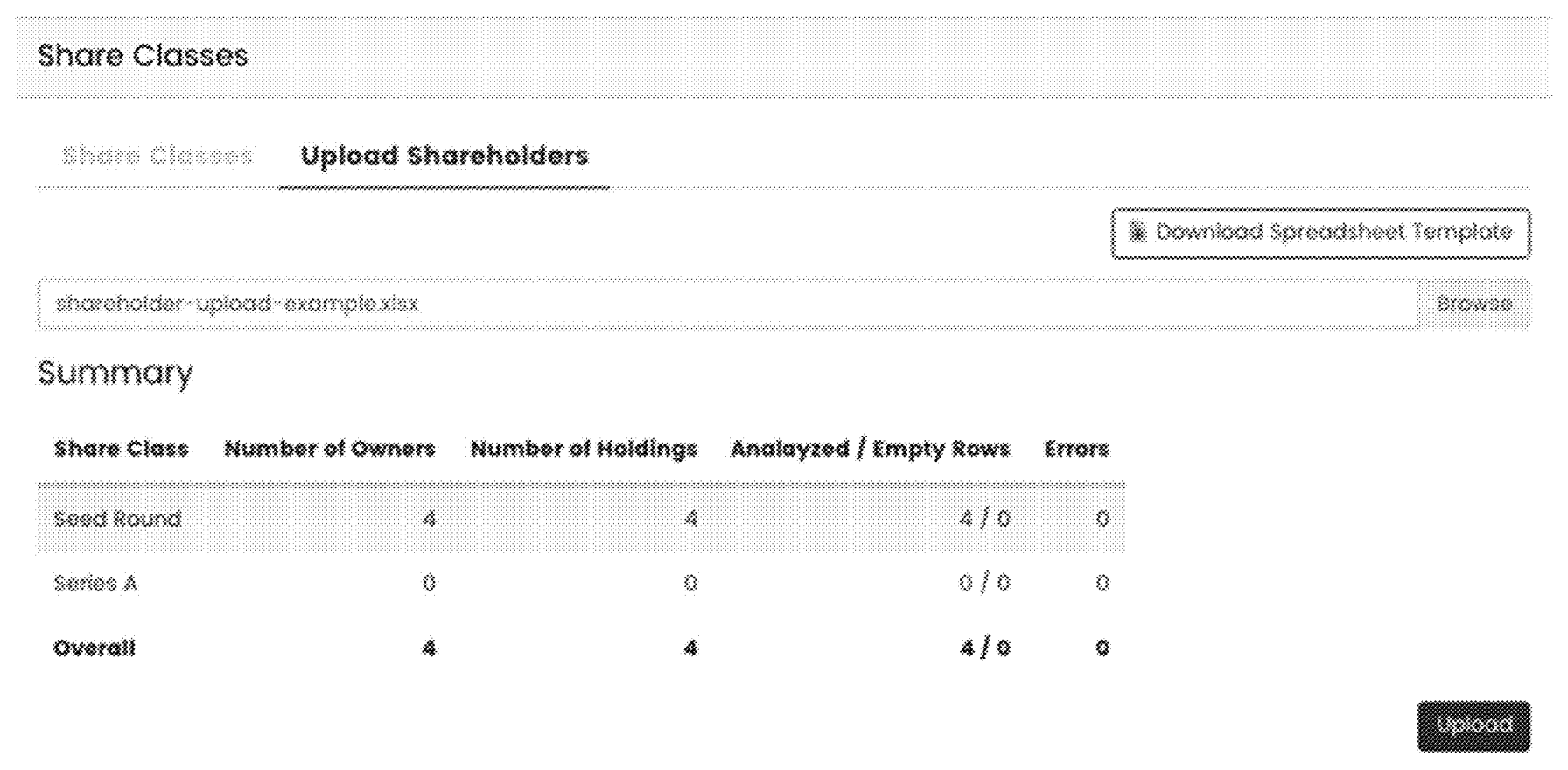

FIG. 56E illustrates the results of adding a populated template without errors into the Upload Shareholder GUI. When a spreadsheet without errors is added, the platform provides an Upload GUI button to upload the data into the platform. The platform advantageously caches the spreadsheet data, and persists it to the platform when the Upload GUI button is selected.

FIG. 56F illustrates the results of the user selecting the Upload GUI button on the Upload Shareholder GUI. The platform advantageously indicates the number of new owners and how many holdings (tranches of a share class) of those owners that were uploaded.

Figure 56G:
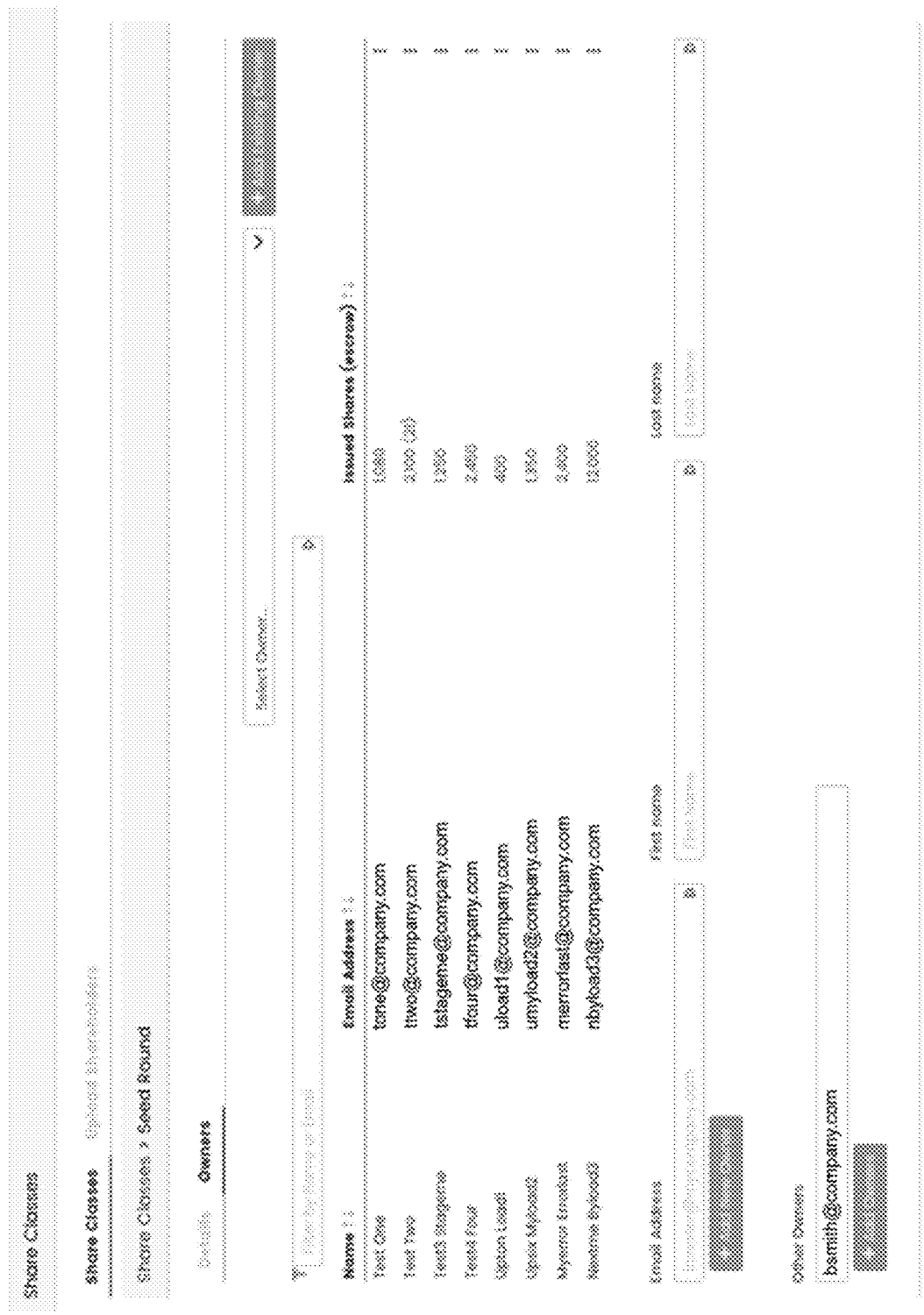
FIG. 56G illustrates the newly added data from the populated template being persisted into the Share Class Owners GUI.

FIG. 56G illustrates the newly added data from the populated template being persisted into the Share Class Owners GUI (described supra).

Figure 57:
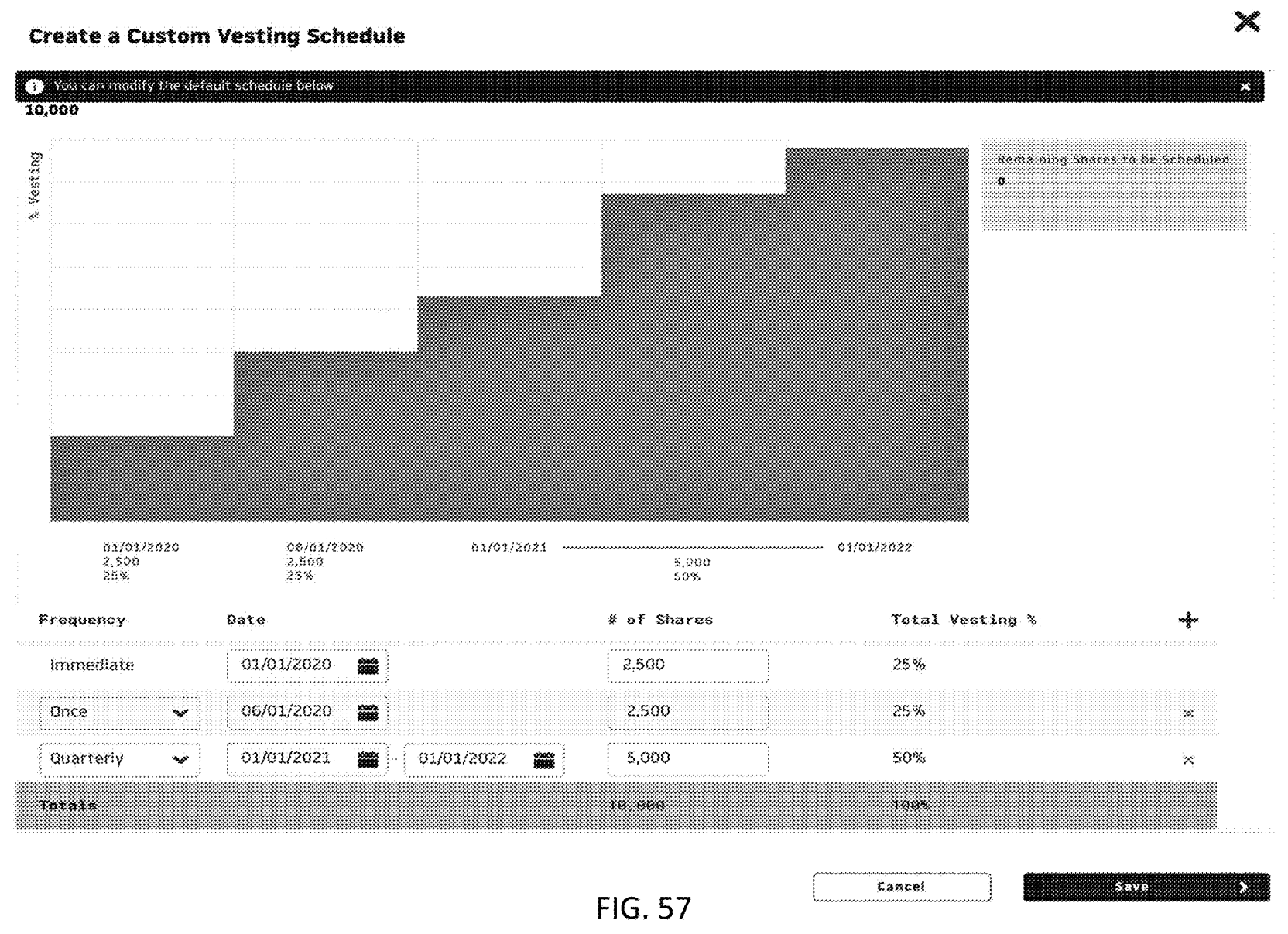

FIG. 57 illustrates a Create a Custom Vesting Schedule GUI for a tokenized securities platform according to one embodiment of the present invention. The Create a Custom Vesting Schedule GUI is operable to display a graphic visualization corresponding to a vesting percentage over time. The Create a Custom Vesting Schedule GUI is further operable to indicate a total number of shares available and/or remaining shares to be scheduled value. In addition, the Create a Custom Vesting Schedule GUI further includes a table containing a plurality of vesting data. Each of the plurality of vesting data includes, but is not limited to, a frequency, a date, a number of shares, and/or a total vesting percentage. Moreover, the Create a Custom Vesting Schedule GUI is operable to indicate if a user has permission to modify a displayed default vesting schedule. In one embodiment, the graphic visualization corresponding to the vesting percentage over time is updated in real-time or near-real-time. The platform provides a plurality of selectable options for the frequency including, but not limited to, immediate, once, quarterly, and/or annually. Moreover, the Create a Custom Vesting Schedule GUI is operable to indicate a total number of shares available and a corresponding vesting percentage.

FIG. 58 illustrates a Share Class Details GUI for a tokenized securities platform according to one embodiment of the present invention. The Share Class Details GUI is operable to display information including, but not limited to, a share class name, a number of authorized shares, a date closed, a number of issued shares, a number of outstanding shares, a number of fully diluted shares, a reporting exemption drop down menu, a number of votes per share, a vesting schedule, an add vesting schedule GUI button, a conversion ratio, a converts into share class drop down menu, a cancel GUI button, and a save GUI button.

Figure 59:
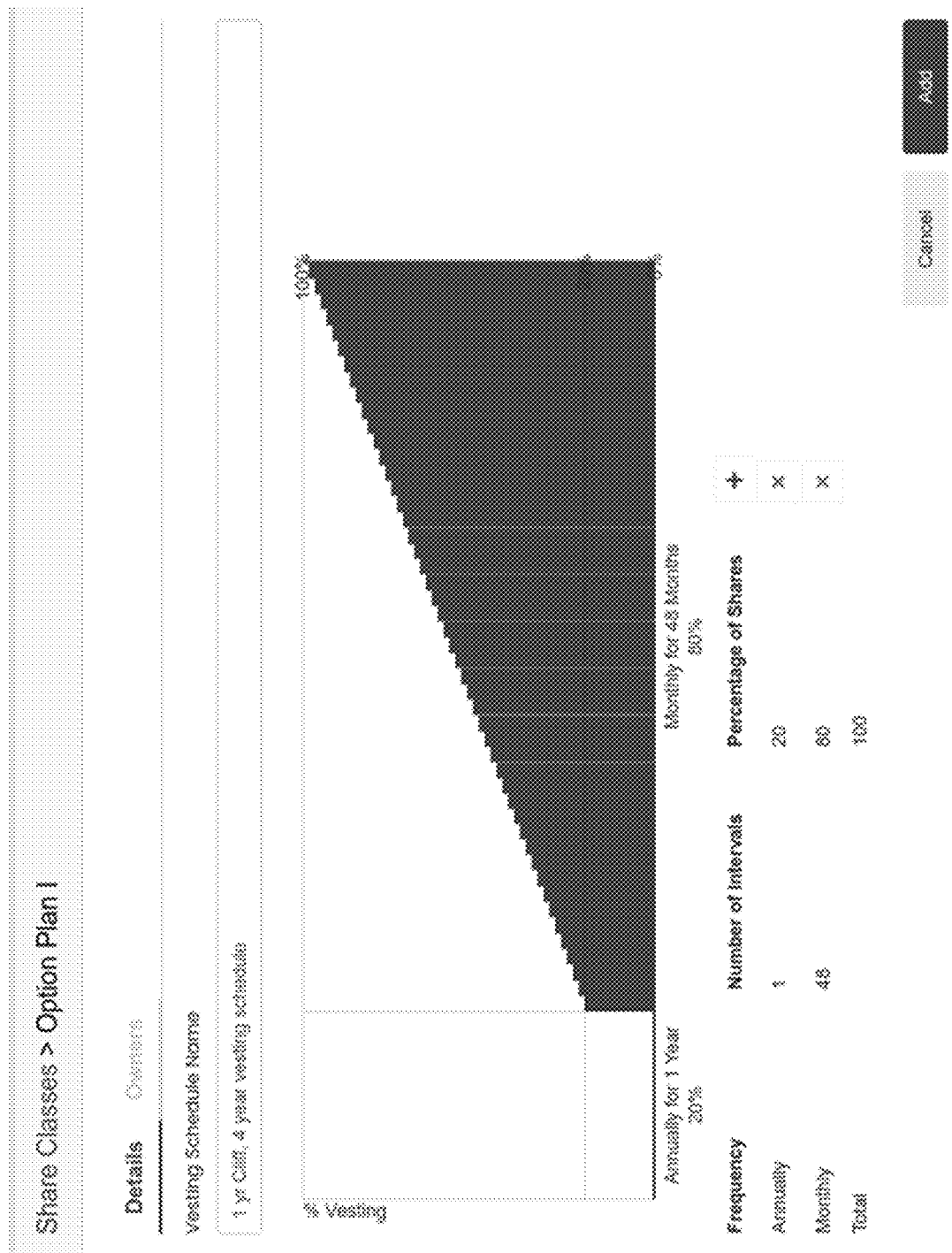
FIG. 59 illustrates a Share Class Details GUI for a tokenized securities platform according to another embodiment of the present invention.

FIG. 59 illustrates a Share Class Details GUI for a tokenized securities platform according to another embodiment of the present invention. The Share Class Details GUI is operable to display information including, but not limited to, a graph of percent vesting, a frequency of vesting (e.g., annually, monthly), a number of intervals, a percentage of shares, a cancel GUI button, and/or an add GUI button.

FIG. 60 illustrates a Share Class Owners GUI for a tokenized securities platform according to one embodiment of the present invention. The Share Class Owners GUI is operable to display information including, but not limited to, a total number of shares granted, a date granted, a holding period commencement date, an affiliate shares checkbox, a strike price, initial vested grants, a vesting schedule, a view GUI button, an expiration date, a cancel GUI button, and a save GUI button.

Figure 61:
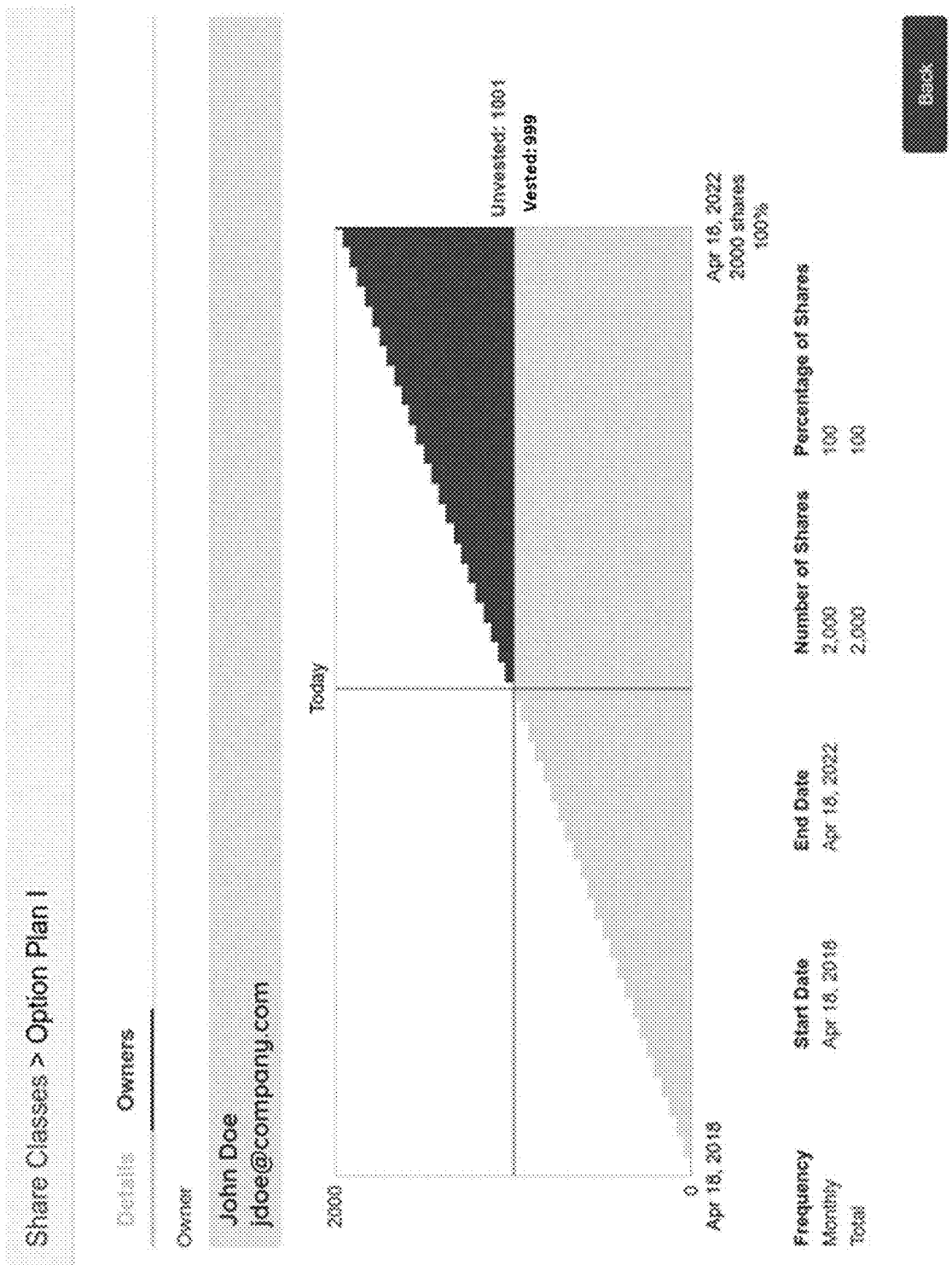
FIG. 61 illustrates a Vesting Schedule GUI for a tokenized securities platform according to one embodiment of the present invention.

FIG. 61 illustrates a Vesting Schedule GUI for a tokenized securities platform according to one embodiment of the present invention. The Vesting Schedule GUI is preferably displayed when the view GUI button in FIG. 60 is clicked. The Vesting Schedule GUI is operable to display information including, but not limited to, a graph of vested and unvested shares over time, a frequency of vesting, a start date, an end date, a number of shares, a percentage of shares, and a back GUI button.

Figure 62:
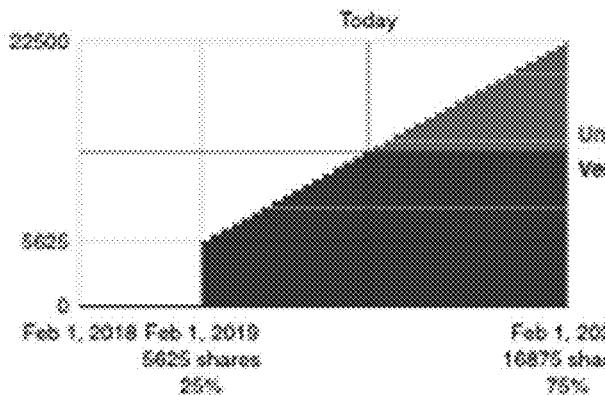
FIG. 62 illustrates a Shareholder Vesting Schedule GUI for a tokenized securities platform according to one embodiment of the present invention.

FIG. 62 illustrates a Shareholder Vesting Schedule GUI for a tokenized securities platform according to one embodiment of the present invention. The Shareholder Vesting Schedule GUI includes, but is not limited to, a granted date, a vesting schedule graph, a number of Initially Granted Shares, a number of Vested Shares, a number of Unvested Shares, a number of Total Shares, and/or a vesting table. The vesting schedule graph is operable to distinguish between currently vested shares and shares not currently vested. In one embodiment, the vesting schedule graph is a 2D bar graph, where each bar corresponds to a specific date, a share number, and/or a share percentage. In one embodiment, the vesting schedule graph is a 2D graph other than a bar graph. In another embodiment, the vesting schedule graph is a 3D graph. The vesting table is operable to display information including, but not limited to, a vesting date, a number of shares for each vesting date, and/or an indicator of whether the shares were vested (e.g., checkmark).

In addition to facilitating secondary transfers, liquidation, and conversions, the platform enables participation in new issuances as described above. With new issuances, the most important date is the "start date." With regard to transfer window steps within new issuances, a company must make the starting point known. In addition, the platform provides controls available to issuers including, but not limited to, the ability to pause or end a currently in-progress transfer window. Moreover, while a new issuance is occurring, the platform further enables aggregate sales and tender offer and/or buybacks to all occur simultaneously. Typical marketplaces require that these processes be handled manually. This makes management difficult, and extends the overall sale process to months and/or years as all shareholders must agree to each sale. This means that these sales rarely occur with every rule enforced and/or followed. Advantageously, the platform of the present invention provides not only shareholder protection against the aforementioned situations, but also provides a greater level of transparency to all shareholders when companies are taking these actions. This further enables a company's board members to operate in compliance with all regulations and/or rules, ensuring that each and every transaction is compliant. Examples of GUIs showing the functionality of the tokenized securities platform related to new issuances are shown in FIGS. 63-71.

Figure 63:
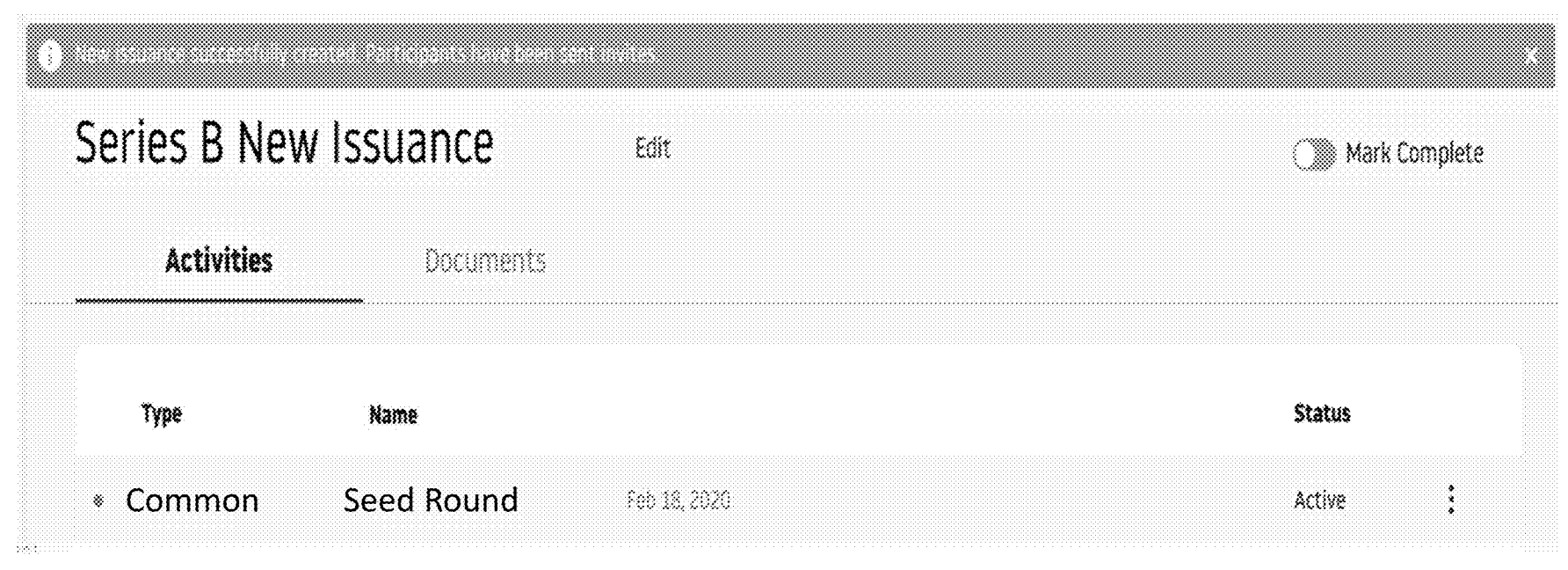

FIG. 63 illustrates a New Issuance GUI for a tokenized securities platform according to one embodiment of the present invention. The platform enables creation of a new issuance by a company administrator via the New Issuance GUI. Each new issuance includes an issuance type, a name, a date, and/or a status. In addition, the New Issuance GUI is operable to notify company administrators that new issuances have been successfully created via a pop-up in real-time or near-real-time.

Figure 64:
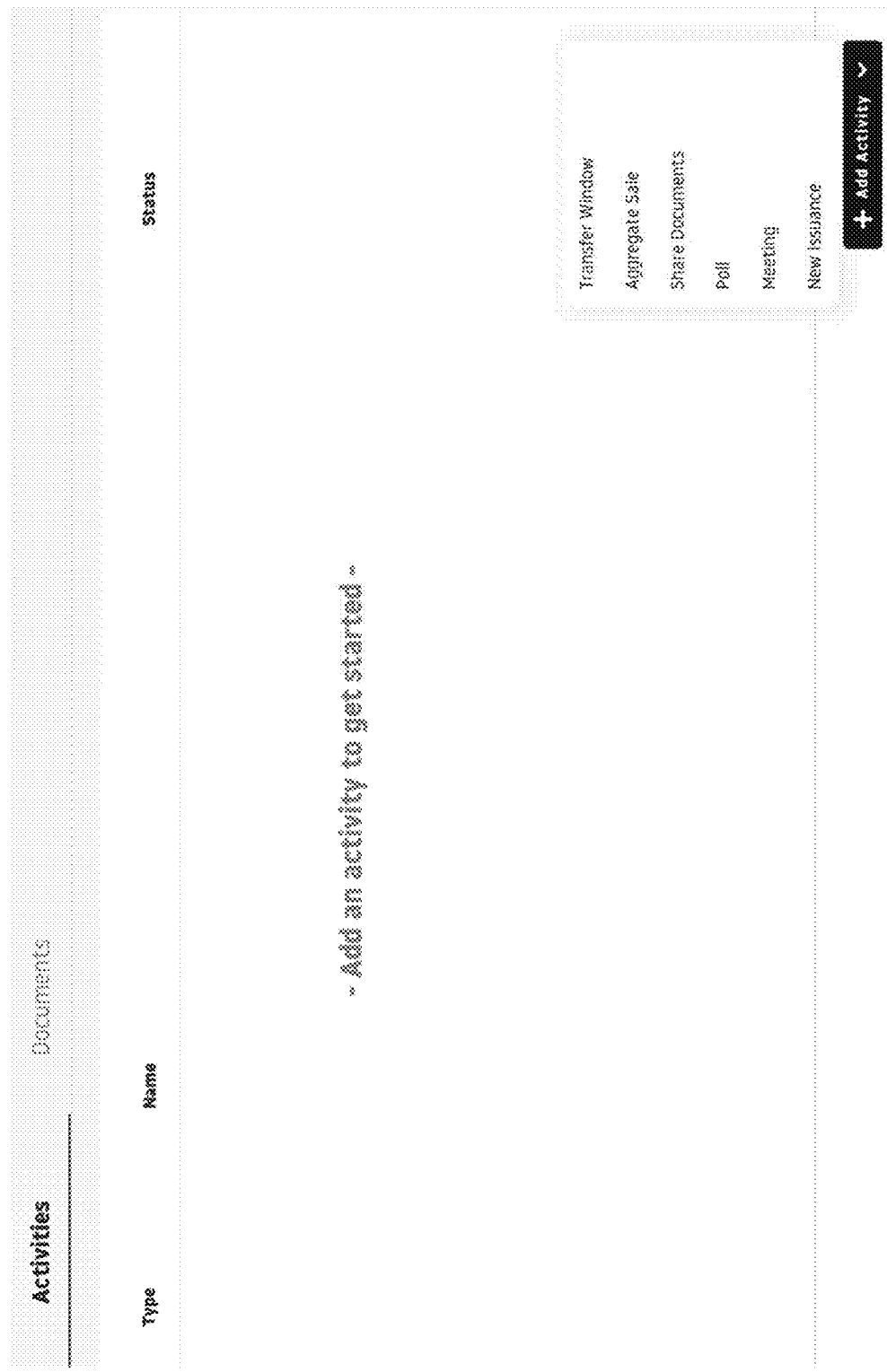
FIG. 64 illustrates a New Issuance GUI for a tokenized securities platform according to another embodiment of the present invention.

FIG. 64 illustrates a New Issuance GUI for a tokenized securities platform according to another embodiment of the present invention. An add activity GUI button enables a new activity to be added to the New Issuance GUI. New activities include, but are not limited to, transfer windows, aggregate sales, share documents, polls, meetings, and/or new issuances.

FIG. 65 illustrates a Create New Issuance GUI for a tokenized securities platform according to one embodiment of the present invention. The Create New Issuance GUI enables specification of at least one new issuance target. The Create New Issuance GUI is operable to display elements including, but not limited to, a total raise goal, a price, a minimum raise amount, a close date, a minimum quantity price, and/or minimum participation guidelines. In one embodiment, the minimum participation guidelines are selectable via a drop-down list. In one embodiment, the minimum participation guidelines are a dollar amount and/or a share amount.

Figure 66:
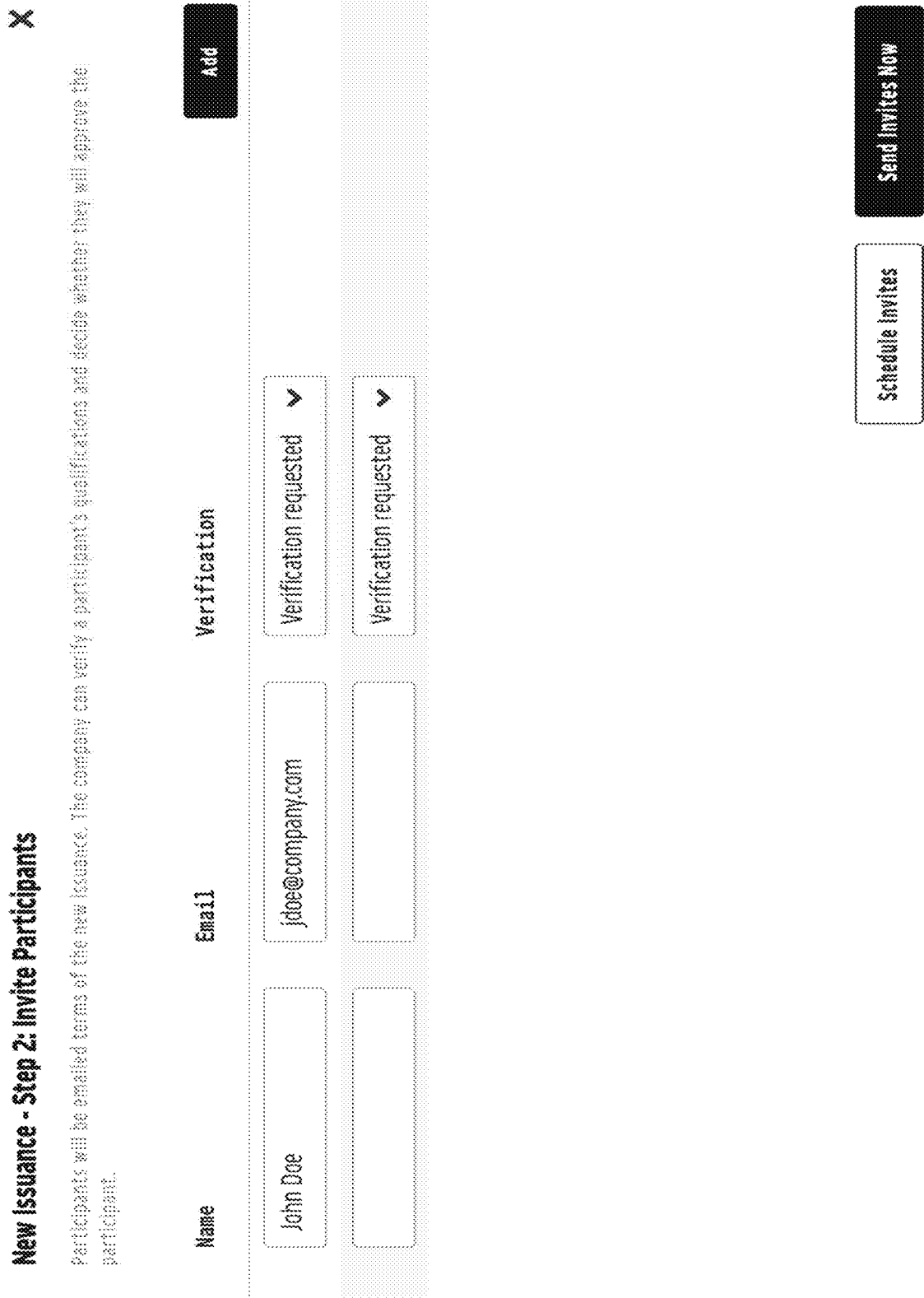
FIG. 66 illustrates a New Issuance Invite GUI for a tokenized securities platform according to one embodiment of the present invention.

FIG. 66 illustrates a New Issuance Invite GUI for a tokenized securities platform according to one embodiment of the present invention. The New Issuance Invite GUI enables invitation of new investors for a new issuance. Investor information including, but not limited to, an investor name, an investor email, and/or a verification request indicator, must be entered before a new investor is added and/or allowed to participate in the new issuance. In addition, the New Issuance Invite GUI includes a schedule invites GUI button, where a predesignated date and/or time is set for the platform to send out new issuance invites, and/or a send invites now GUI button, where the platform sends out the new issuance invites when a the send invites now GUI button is selected.

Figure 67:
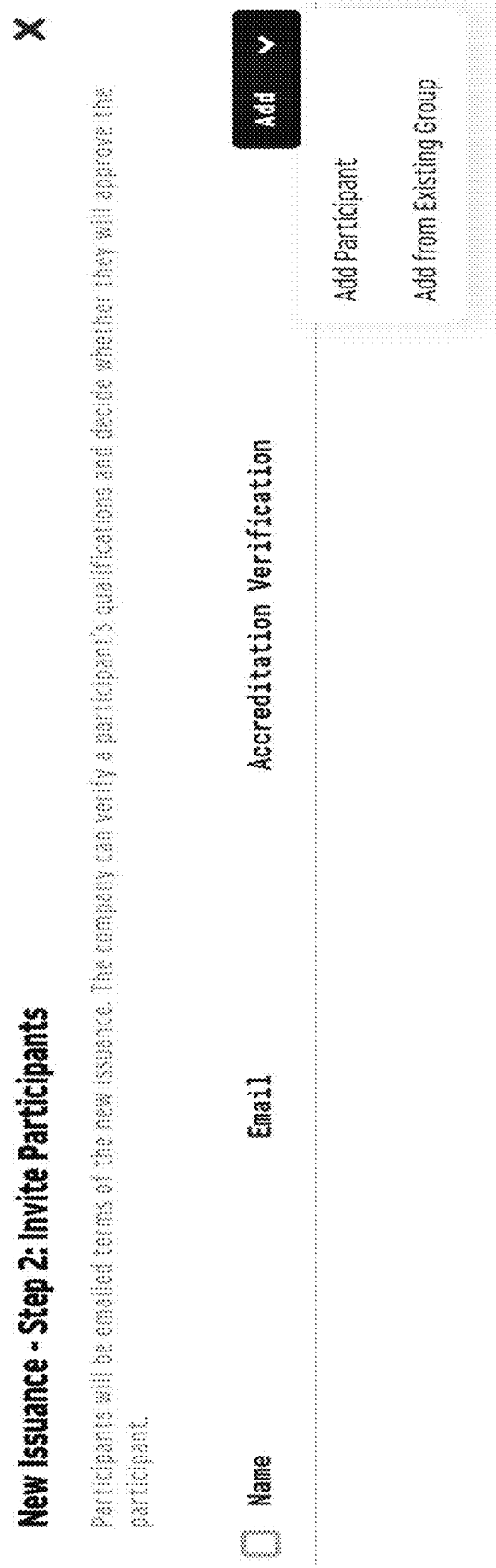
FIG. 67 illustrates a New Issuance Invite GUI for a tokenized securities platform according to another embodiment of the present invention.

FIG. 67 illustrates a New Issuance Invite GUI for a tokenized securities platform according to another embodiment of the present invention. The New Issuance GUI is operable to enable addition of new investors individually, via an add participant GUI selection, and/or addition of new investors from an existing group, via an add from existing group GUI selection.

Figure 68:
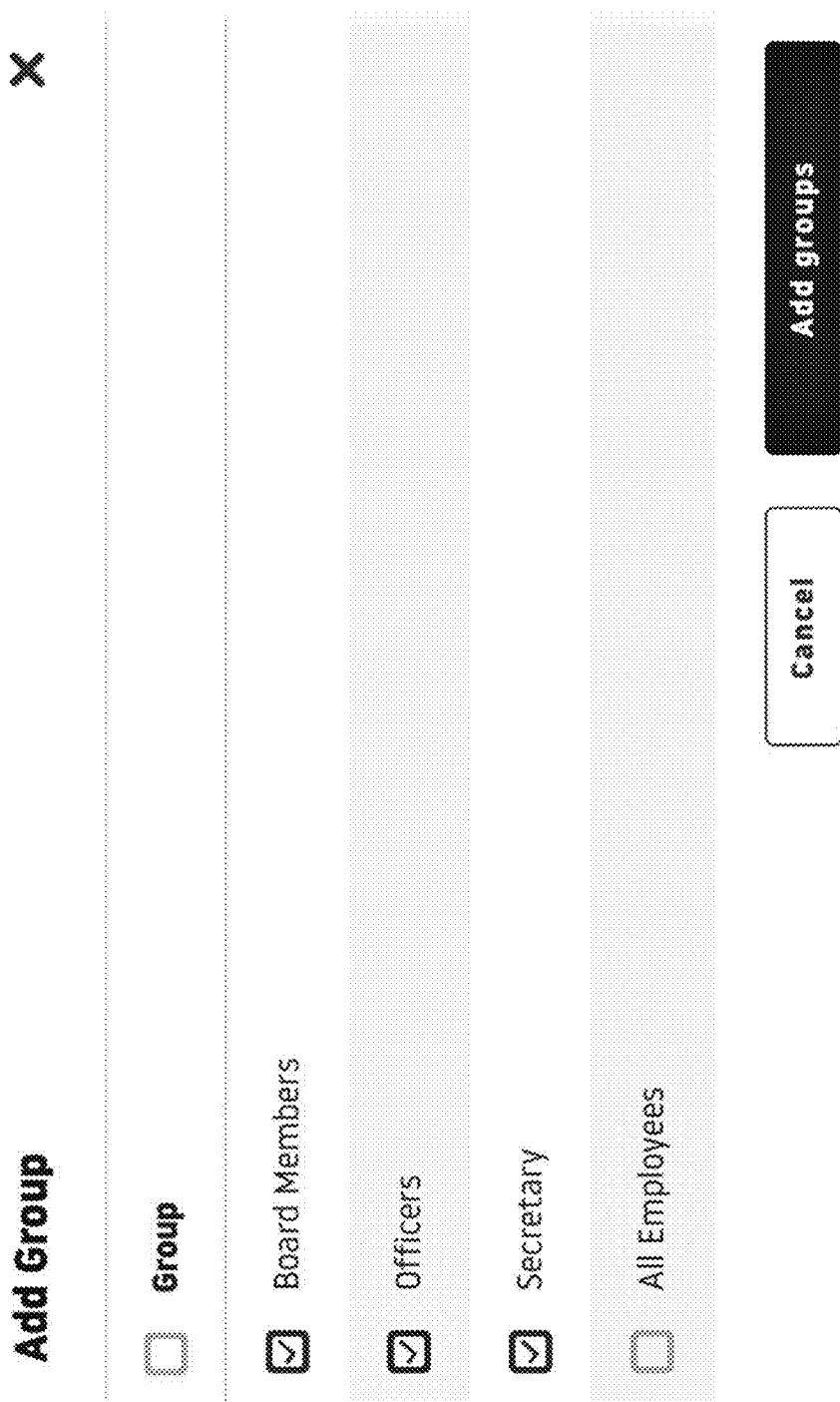
FIG. 68 illustrates an Add Group GUI for a new issuance for a tokenized securities platform according to one embodiment of the present invention.

FIG. 68 illustrates an Add Group GUI for a new issuance a tokenized securities platform according to one embodiment of the present invention. The Add Group GUI for the new issuance enables selection of at least one group to add to the new issuance. Options available for the at least one group include, but are not limited to, board members, officers, a secretary, and/or all employees. Once at least one group has been selected, the platform is operable to add the at least one selected group to the new issuance via an add group GUI button.

Figure 69:
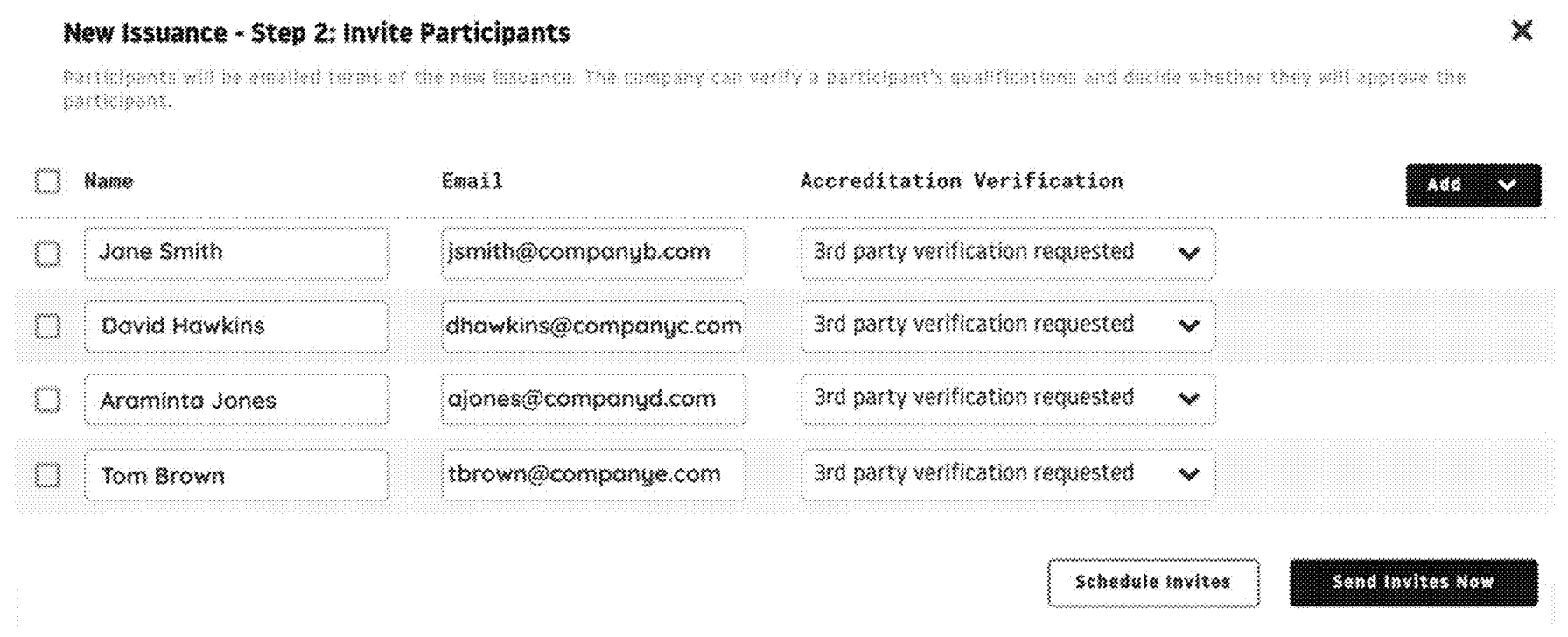

FIG. 69 illustrates a new group addition for a New Issuance GUI for a tokenized securities platform according to one embodiment of the present invention. If an add group function is used for a new issuance, all of the group members corresponding to any selected group are added to the new issuance. Each of the group members include, but are not limited to, a group member name, an email address, and/or an accreditation verification indicator.

FIG. 70 illustrates an accreditation verification drop-down list for a New Issuance GUI for a tokenized securities platform according to one embodiment of the present invention. The accreditation verification drop-down list displays a list of accreditation verification options including, but not limited to, third-party verification request, self-verification, and/or a company waived verification. Third-party verification requests are often associated with lenders, loan brokers, health insurance providers, regulators, and other various agencies to confirm client information.

FIG. 71 illustrates a New Issuance Details GUI for a tokenized securities platform according to one embodiment of the present invention. The New Issuance Details GUI is operable to display information including, but not limited to, a total raise goal value, a price per share value, a minimum raise amount, a start date, a close date, a guideline, a minimum quantity value, and/or an increment value. In addition, the New Issuance Details GUI is operable to display help text corresponding to each of the previously mentioned values.

The platform also enables management and viewing any transfer windows corresponding to equity transactions. Advantageously, the transfer window functionality of the present invention enables a company and/or entity to control which securities are potentially available for sale at any one particular time. Furthermore, transfer window functionality assists in the identification of what securities are available, when securities are available and/or the price of securities in the marketplace. A common issue faced by companies is that often if their shares are sold at a particular price, the value of the company is set at that price (e.g., the last price of a share multiplied by the number of outstanding shares). This practice reduces the overall control any one company has over what the value of their company actually is, as typically companies want to control the share price using price boundaries (or referred to as price collars). The elements of the transfer window functionality including, but not limited to, pricing, timing, and/or participating share class(es) enable companies and/or entities to efficiently manage their value. Example GUIs related to transfer window management are shown in FIGS. 72-80.

FIG. 72 illustrates a Transfer Window GUI for a tokenized securities platform according to one embodiment of the present invention. The Transfer Window GUI is operable to display information including, but not limited to, a transfer window date range, a set of participating share classes within a transfer window, an ask number, a completed transactions number, a filter input field, a filter by activity GUI drop-down list, and/or a plurality of equity transactions. Each of the plurality of equity transactions includes, but is not limited to, a transaction type, a transaction status, a transaction time, a transaction data, a number of shares, an ask value, a cost per share value, a total cost value, a transaction party, and/or a transaction bank. By using the filter input field and/or the filter by activity GUI drop-down list, the platform enables filtering the plurality of equity transactions down to a specific equity transaction and/or a specific set of equity transactions.

In one embodiment, the tokenized securities platform of the present invention provides a set of transfer steps for users. The set of transfer steps is operable for both visual and non-visual representations. Furthermore, the set of transfer steps are operable for implementation in the context of orchestrating a company's rule set that the company must follow, where the rule set is determined using the company's operating agreement as described above. Each and every transfer window is operable to have its own set of behaviors. For example, in one period a shareholder is selling common shares, which require approval before the sale is finalized. During the next period, that same shareholder is then able to sell common shares with a completely new set of approval settings. Every transfer window is operable to have its own set of rules.

Each transfer step functions around the concept of timing, which is always managed via the platform. Rules are created and enforced, via the platform, in relation to timing, based on which transfer step is currently in-progress. In addition, this timing element is modifiable for every individual transfer step. Unlike traditional marketplaces, the platform of the present invention enables buyers and/or sellers to vary timing with every sale.

FIG. 73 illustrates a Past Windows page for a Transfer Window GUI for a tokenized securities platform according to one embodiment of the present invention. The Past Windows page for the Transfer Window GUI includes, but is not limited to, an add transfer window GUI button and/or a table containing a plurality of participating share classes. Each of the plurality of participating share classes includes, but is not limited to, at least one share class name, a share class start date, a share class end date, an asks value, and/or a completed transactions value.

Further, past transfer windows are operable to be copied to create new transfer windows for a new date range. Advantageously, this reduces the amount of time needed to create a new transfer window.

FIG. 74 illustrates a Current Transfer Windows GUI for a tokenized securities platform according to one embodiment of the present invention. The Current Transfer Windows GUI is operable to display information including, but not limited to, at least one share class, at least one status, at least one start date, at least one end date, at least one number of open closings, at least one number of finished closings, and/or an Add Transfer Window GUI button. Current transfer windows are those transfer windows that are planned in the future or are in progress. In one embodiment, once a transfer window has started (i.e., based on its start date), the transfer window can no longer be modified, but the platform is operable to allow the transfer window to be viewed, paused, restarted, and/or terminated. Transfer windows for the future are operable to be fully modified to reflect the desires of the issuing entity.

FIG. 75 illustrates a Prior Transfer Windows Closings GUI for a tokenized securities platform according to one embodiment of the present invention. The Prior Transfer Windows Closings GUI is operable to display information including, but not limited to, at least one share class, at least one status, at least one closing start date, at least one closing end date, at least one company, at least one seller, at least one buyer, and/or at least one document status. In one embodiment, the company information includes information regarding fees, status, and/or received payments. In one embodiment, the at least one seller information includes at least one seller name, at least one price, at least one quantity, at least one fee, at least one status, at least one amount to receive, and/or at least one amount received. In one embodiment, the at last one buyer information includes at least one buyer, at least one price, at least one quantity, at least one fee, at least one status, at least one cost, and/or at least one payment. In one embodiment, the at least one document status includes at least one document, at least one signor, at least one related to the at least one signor, and/or at least one status.

As previously described, the platform allows blocks of rights to be combined into a sequence where each right in the sequence is operable be arranged in various orders to produce desired outcomes. Each block of rights in the sequence is referred to as a "step". A series of steps within a classification of rights is termed 'transfer steps' for a transfer, 'new issuance steps' for a new issuance, 'liquidation steps' for a liquidation, etc.

Further, the series of steps is unique to each company. Advantageously, the platform allows each step in a series (e.g., transfer window) to be customized to a company's needs. Every company operates under a set of rules that differs from company to company. There is a long standing, unmet need for companies to be able to customize steps in a series (e.g., transfer window) according to their needs. Additionally, the platform dynamically updates the series in real time when a change (e.g., edits, additions, deletions) to any step occurs. FIGS. 76-87 illustrate example GUIs related to creation and/or management of steps within the tokenized securities platform.

Figure 76:
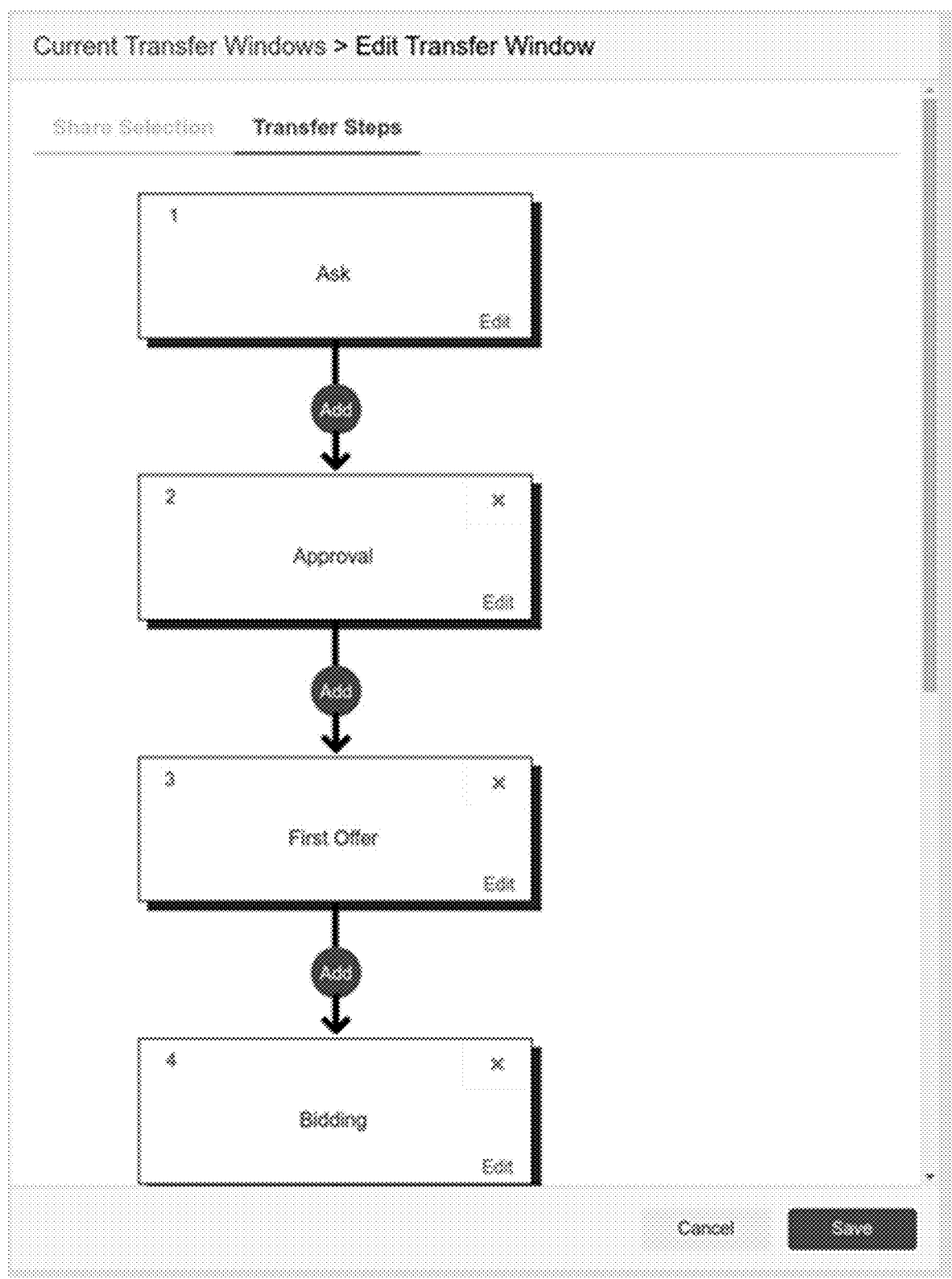
FIG. 76 illustrates an Edit Transfer Window GUI for a tokenized securities platform according to one embodiment of the present invention.

FIG. 76 illustrates an Edit Transfer Window GUI for a tokenized securities platform according to one embodiment of the present invention. The Edit Transfer Window GUI is operable to display steps for a transfer window. In the example shown in FIG. 76, the transfer steps include Ask as step 1, Approval as step 2, First Offer as step 3, and Bidding as step 4. An add GUI button appears between each step (e.g., between step 1 and step 2, between step 2 and step 3). The add GUI button is operable to add a step between two other steps. The Edit Transfer Window GUI includes a cancel GUI button and a save GUI button.

Figure 77:
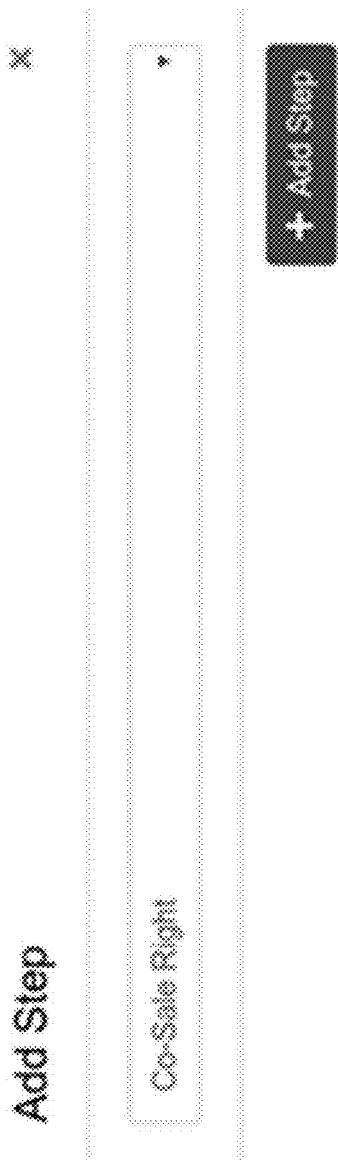
FIG. 77 illustrates an Add Step GUI for a tokenized securities platform according to one embodiment of the present invention.

FIG. 77 illustrates an Add Step GUI for a tokenized securities platform according to one embodiment of the present invention. The Add Step GUI includes a drop-down list of steps (e.g., Co-Sale Right) and an Add Step GUI button.

Figure 78:
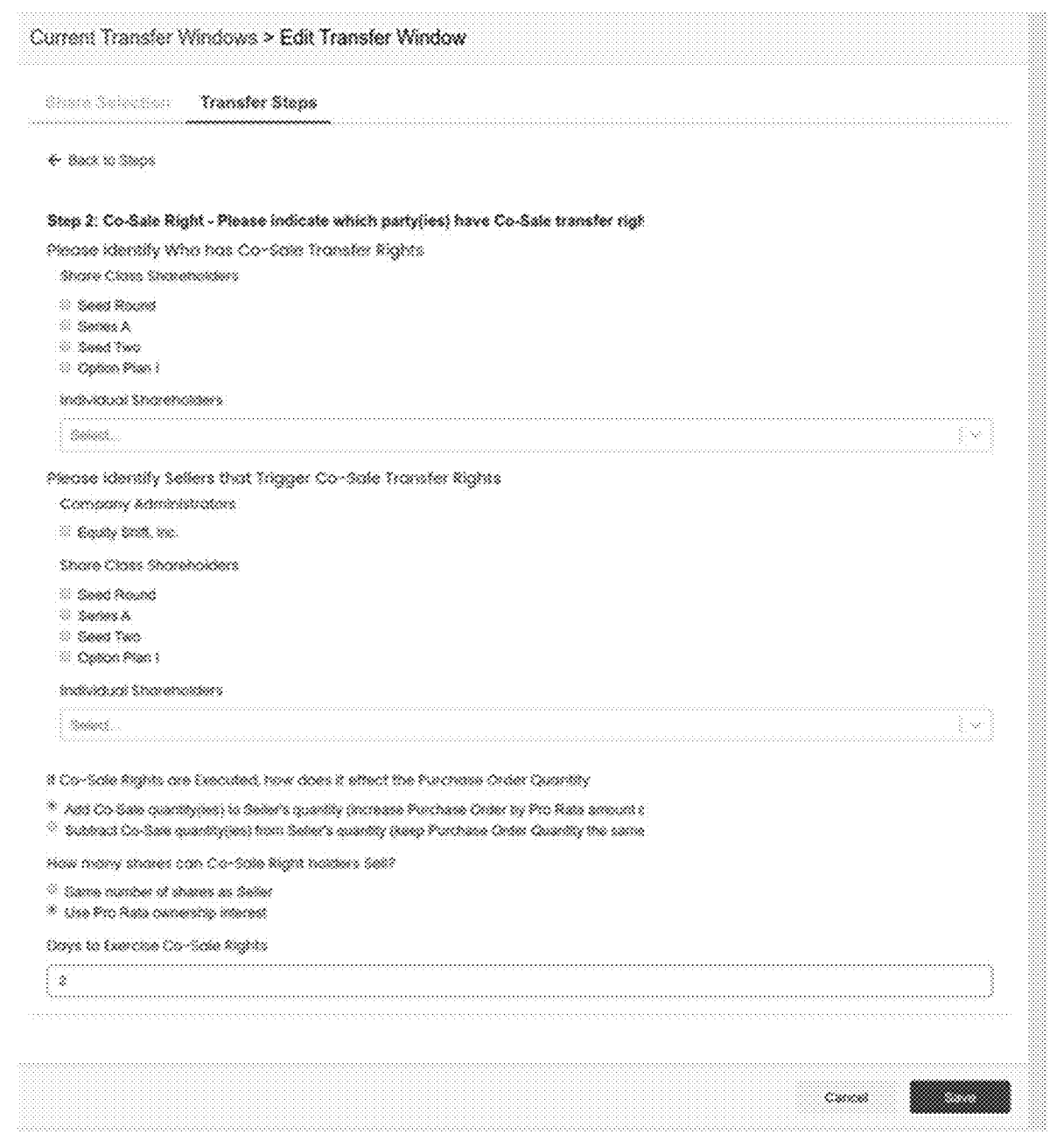

FIG. 78 illustrates an Edit Transfer Window GUI for a tokenized securities platform according to another embodiment of the present invention. In the embodiment shown in FIG. 78, the Edit Transfer Window GUI is operable to display information related to co-sale rights including, but not limited to, shareholders with co-sale rights (e.g., by share class, individual shareholders), sellers that trigger co-sale rights (e.g., company administrators, by share class, individual shareholders), how purchase order quantities are effected if co-sale rights are executed (e.g., add co-sale quantity, subtract co-sale quantity), how many shares co-sale right sellers can sell (e.g., same, pro rata), and/or days to execute co-sale rights. The Edit Transfer Window GUI includes a cancel GUI button and a save GUI button.

Figure 79:
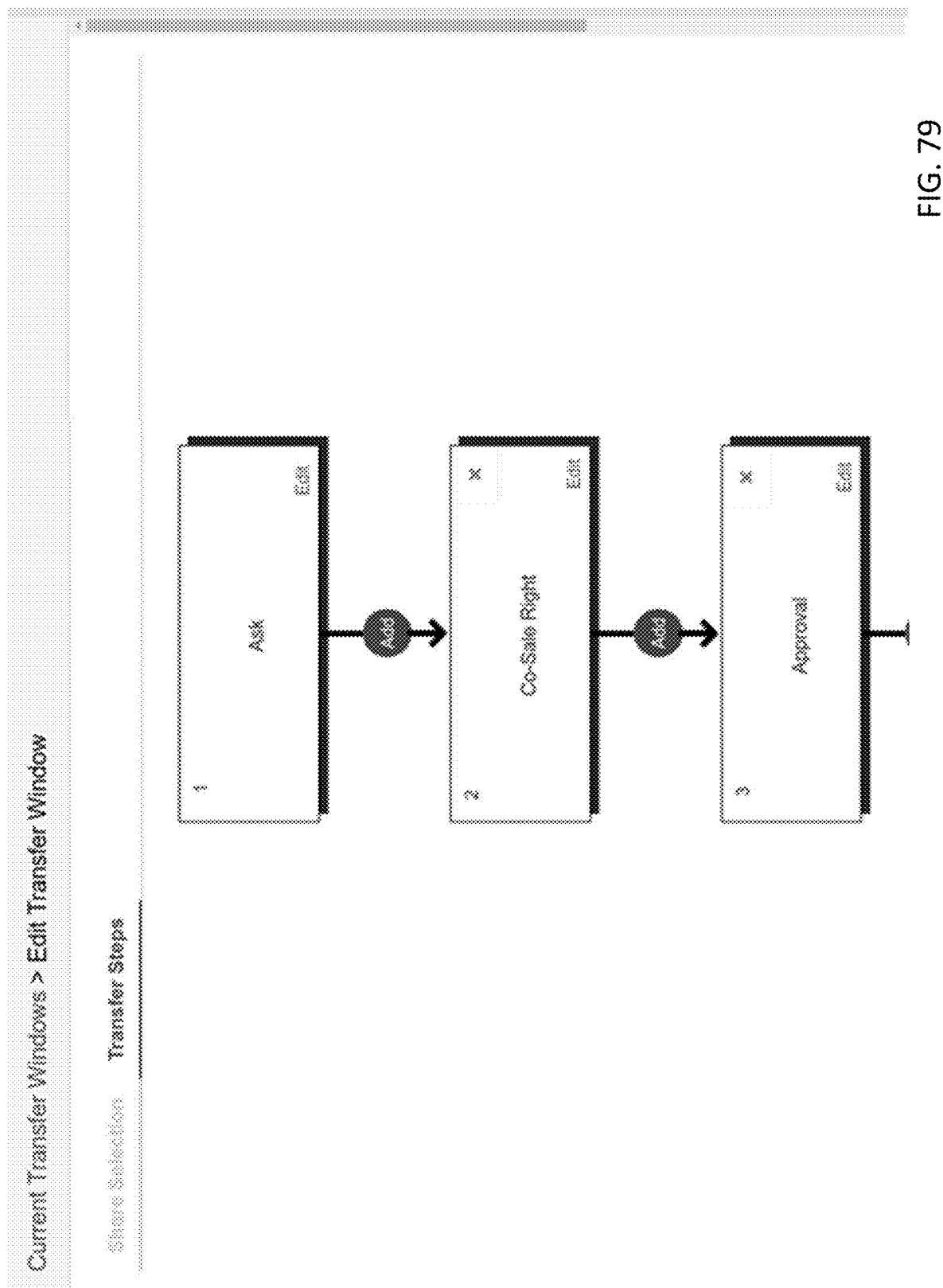
FIG. 79 illustrates an Edit Transfer Window GUI for a tokenized securities platform after inserting a step according to one embodiment of the present invention.

FIG. 79 illustrates an Edit Transfer Window GUI for a tokenized securities platform after inserting a step according to one embodiment of the present invention. The embodiment shown in FIG. 79 now includes a Co-Sale Rights step between Ask (step 1) and Approval (now step 3). The Approval step was shown as step 2 in FIG. 76.

Figure 80:
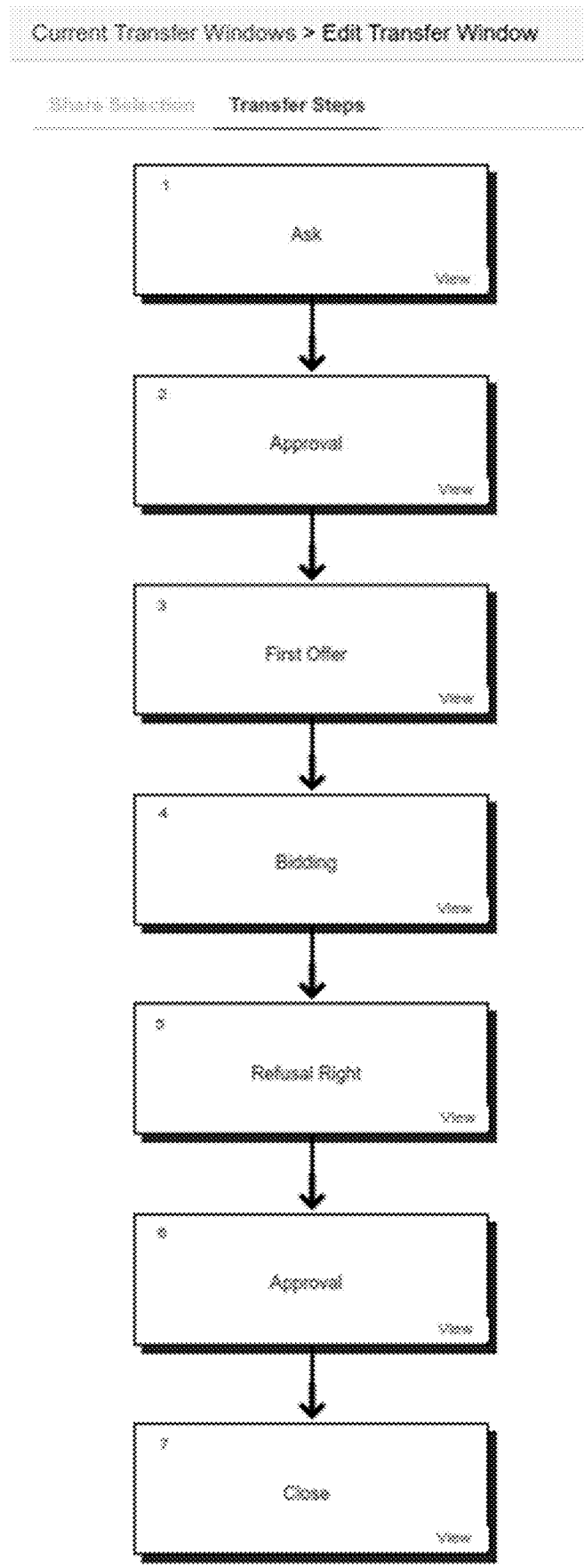
FIG. 80 illustrates an Edit Transfer Window GUI for a tokenized securities platform according to yet another embodiment of the present invention.

FIG. 80 illustrates an Edit Transfer Window GUI for a tokenized securities platform according to yet another embodiment of the present invention. The Edit Transfer Window GUI is operable to display steps for a transfer window. In the example shown in FIG. 80, the transfer steps include Ask as step 1, Approval as step 2, First Offer as step 3, Bidding as step 4, Refusal Right as step 5, Approval as step 6, and close as step 7.

Figure 81:
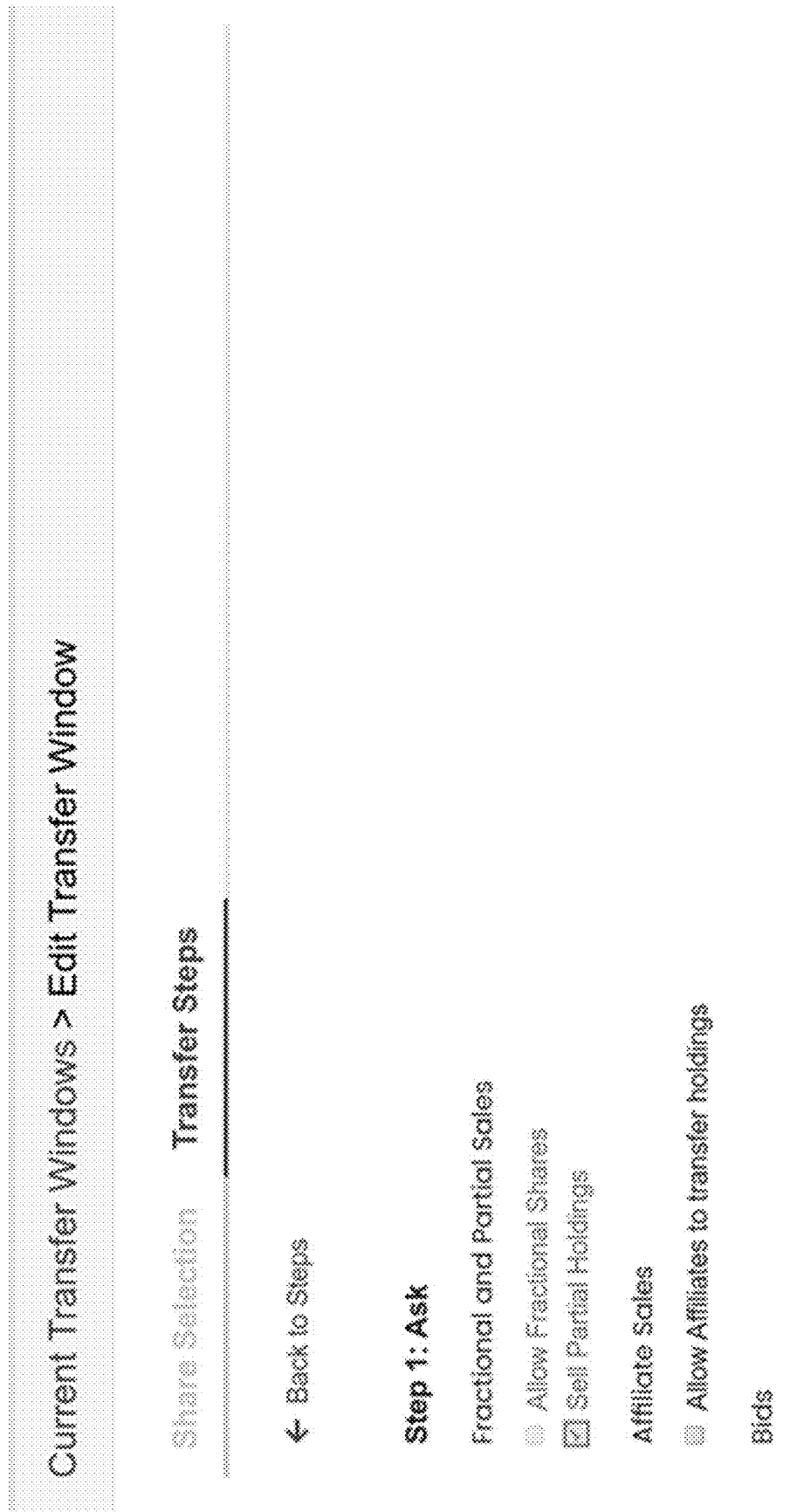
FIG. 81 illustrates an Ask Transfer Step GUI for a tokenized securities platform according to one embodiment of the present invention.

FIGS. 81-86 illustrate detail view screenshots of the steps shown in FIG. 80. FIG. 81 illustrates an Ask Transfer Step GUI for a tokenized securities platform according to one embodiment of the present invention. The Ask Transfer Step GUI is operable to display information including, but not limited to, allowing fractional shares, allowing partial sales, allowing affiliate sales, and/or allowing unsolicited bids. Again, the platform advantageously allows the company to make decisions based on its rules. Additionally, the platform advantageously allows the company to change the requirements for each transfer window.

FIG. 82 illustrates an Approval Step GUI for a tokenized securities platform according to one embodiment of the present invention. The Approval Step GUI is operable to display information including, but not limited to, which parties need to approve a sale (e.g., company administrators, share class shareholders, individual shareholders) and/or a number of days to approve.

Figure 83:
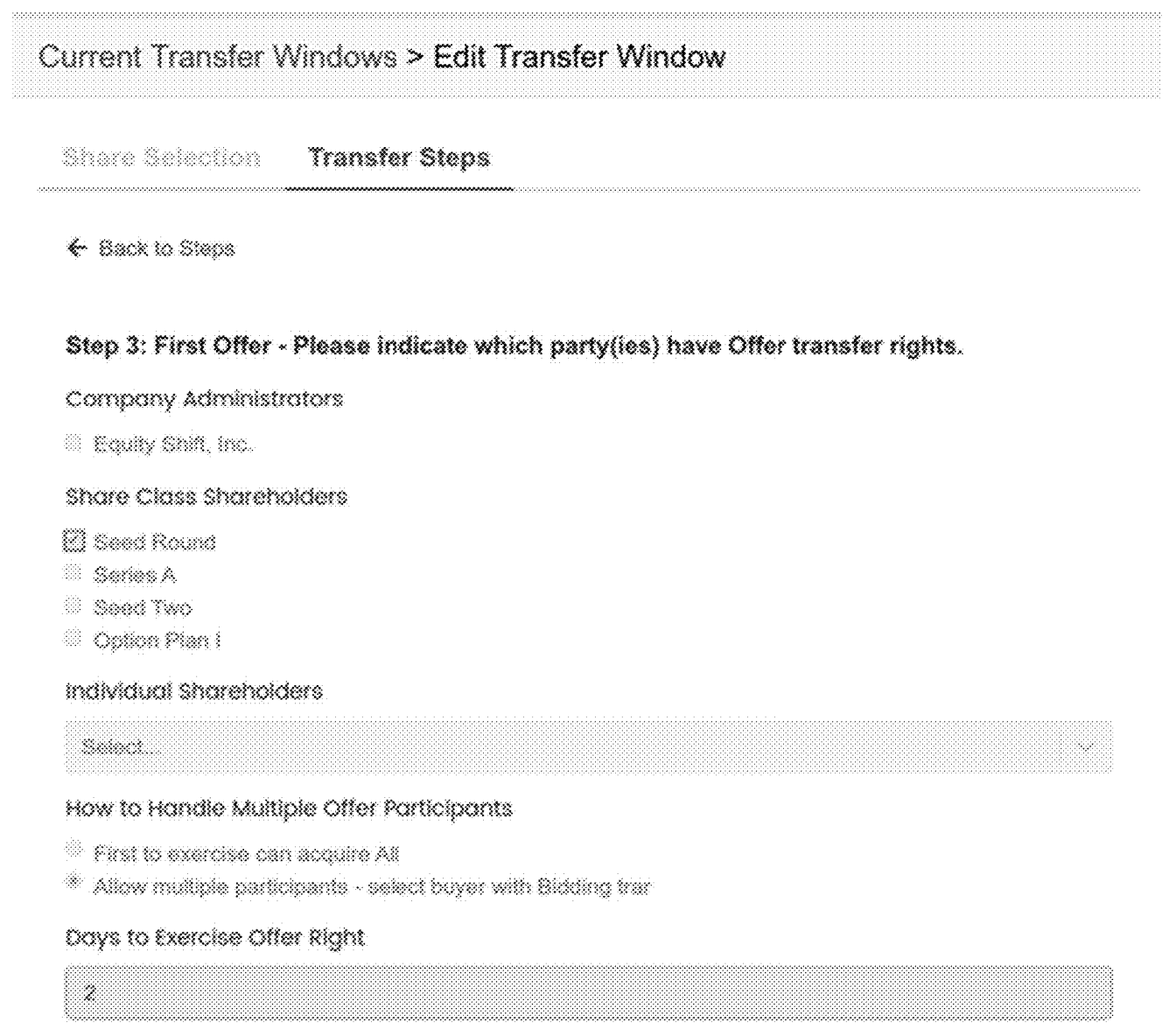

FIG. 83 illustrates a First Offer Step GUI for a tokenized securities platform according to one embodiment of the present invention. The First Offer Step GUI is operable to display information including, but not limited to, which parties have offer transfer rights (e.g., company administrators, share class shareholders, individual shareholders), how to handle multiple offer participants (e.g., first to exercise, allow multiple participants), and/or a number of days to exercise rights.

FIG. 84 illustrates a Bidding Step GUI for a tokenized securities platform according to one embodiment of the present invention. This Bidding Step is an example of a custom right. The Bidding Step GUI is operable to display information including, but not limited to, a use previous offer participants in this step check box, a set minimum bid at seller ask price check box, a require seller to accept highest bid check box, an allow bidders to bid a different quantity than was asked by the seller check box, a minimum bid price increment (e.g., percentage, flat amount), a number of days to bid, and/or a number of minimum hours to keep bidding open after the latest bid.

FIG. 85 illustrates a Refusal Rights Step GUI for a tokenized securities platform according to one embodiment of the present invention. The Refusal Rights step GUI is operable to display information including, but not limited to, which parties have right of first refusal rights (e.g., company administrators, by share class, individual shareholders), how to handle multiple first refusal participants (e.g., first to exercise, pro rata), and/or a number of days to execute refusal right. Additionally, the platform is operable to allow prospective transferees to participate in pro rata and/or undersubscribed to participate.

Figure 86:
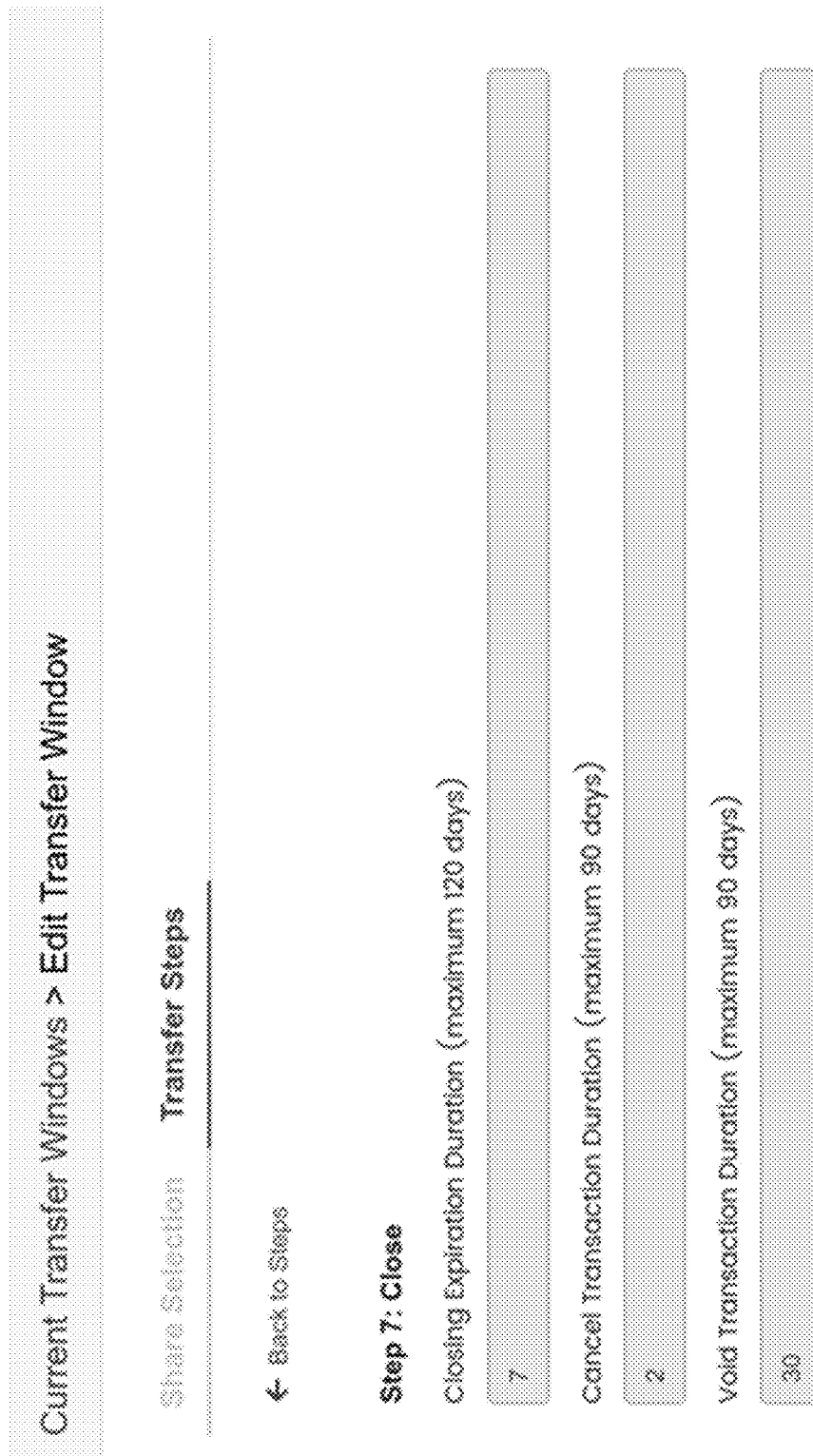
FIG. 86 illustrates a Close Step GUI for a tokenized securities platform according to one embodiment of the present invention.

FIG. 86 illustrates a Close Step GUI for a tokenized securities platform according to one embodiment of the present invention. The Close Step GUI is operable to display information including, but not limited to, a closing expiration duration, a cancel transaction duration, and a void transaction duration. Advantageously, the platform allows the customization of the closing expiration duration, the cancel transaction duration, and the void transaction duration. In one embodiment, the closing expiration duration is not greater than 120 days, the cancel transaction duration is not greater than 90 days, and the void transaction duration is not greater than 90 days.

As previously mentioned, the platform allows for undersubscription rights when the issuer does not get enough participant interest with refusal or other buyer rights. For example, if a share class has refusal rights, but only half of the shareholders participate, the platform allows the remaining balance of shares to be offered to those that did participate in what is termed an undersubscription right. FIG. 87 illustrates an Undersubscription Right GUI for a tokenized securities platform according to one embodiment of the present invention. The Undersubscription Right GUI includes, but is not limited to, Refusal Right Participants, How to Handle Multiple Undersubscribed Participants (e.g., first to exercise can acquire all, use pro rata for multiple exercising participants), a Number of Days to Exercise Undersubscribed Rights text box, a Cancel GUI button, and/or a Save GUI button.

Figure 90:
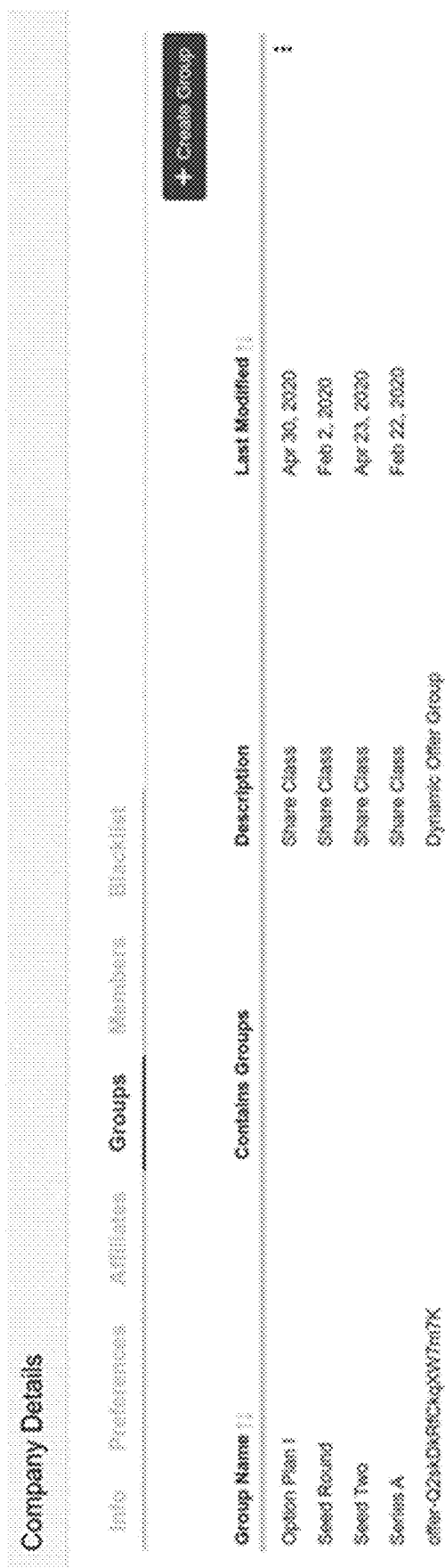
FIG. 90 illustrates a Company Details Groups GUI for a tokenized securities platform according to one embodiment of the present invention.

The platform is further operable to manage company preferences. For example, the platform allows a company to choose a calendar, fees (e.g., banking fees, transaction fees), and durations for closings, cancelling closings, and voiding closings. Additionally, the platform allows a company to set preferences for corporate logos (desktop and mobile) and color schemes (primary and secondary). Example GUIs related to managing company preferences are shown in FIGS. 88-90.

FIG. 88 illustrates a Company Details Preferences GUI for a tokenized securities platform according to one embodiment of the present invention. The Company Details Preferences GUI is operable to display information including, but not limited to, a duration in days calculation (e.g., business calendar, Gregorian calendar), banking fees (e.g., fixed value, percentage), transaction fees, and/or a save GUI button. The transaction fees preferably include at least one name (e.g., buyer, seller), at least one party responsible for payment (e.g., buyer, seller), a method of determining fees (e.g., fixed value, percentage), and/or an amount.

FIG. 89 illustrates a Company Details Affiliates GUI for a tokenized securities platform according to one embodiment of the present invention. The Company Details Affiliates GUI is operable to display information including, but not limited to, shareholders, an add GUI button to add a shareholder, a list of affiliates, and/or an affiliate termination date. The platform allows the issuer to determine if Affiliates are able to participate in transactions, and provides notification to potential investors that they are purchasing Affiliate shares. Affiliate shares have different holding period requirements than non-Affiliate shares that are managed by the platform. Affiliate shares are also legally referred to as Controlled Shares.

As previously described, the platform is operable to create and manage groups. FIG. 90 illustrates a Company Details Groups GUI for a tokenized securities platform according to one embodiment of the present invention. The Company Details Groups GUI is operable to display information including, but not limited to, at least one group name, at least one description, at least one last modified date, and/or a create group GUI button. In a preferred embodiment, the Company Details Groups GUI displays whether a first group contains a second group (i.e., all members of the second group are included in the first group).

Figure 91:
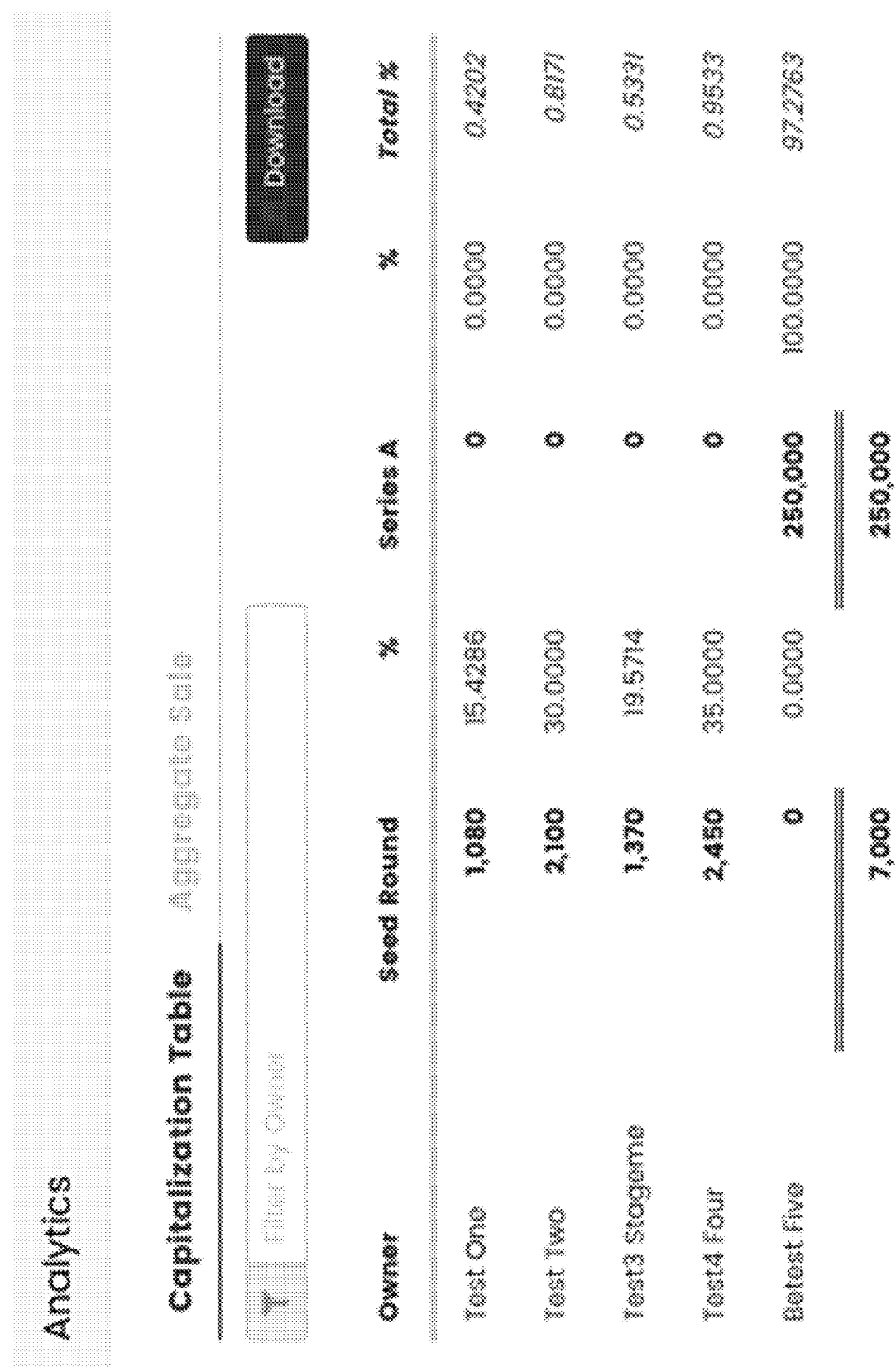
FIG. 91 illustrates an Analytics Capitalization Table GUI for a tokenized securities platform according to one embodiment of the present invention.
Figure 92:
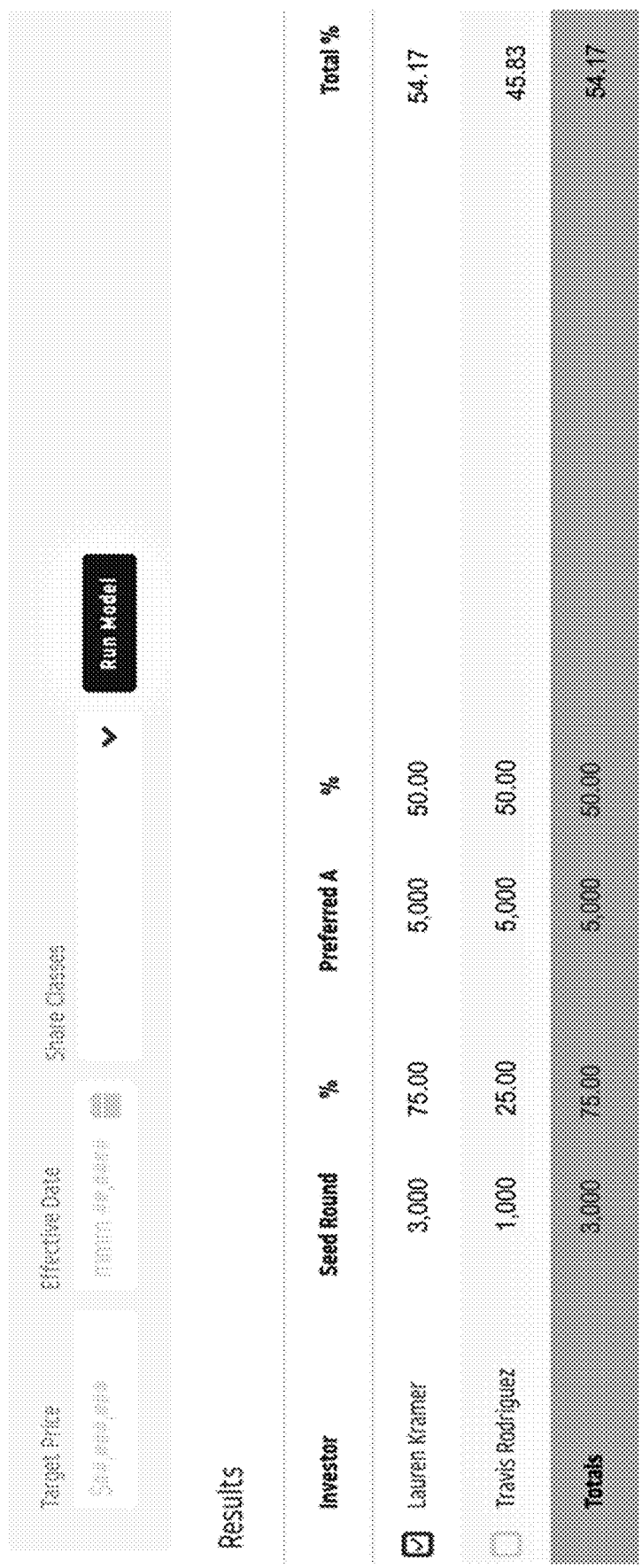
FIG. 92 illustrates an Aggregate Sale Modeling page for a Capitalization Table GUI for a tokenized securities platform according to one embodiment of the present invention.
Figure 93:
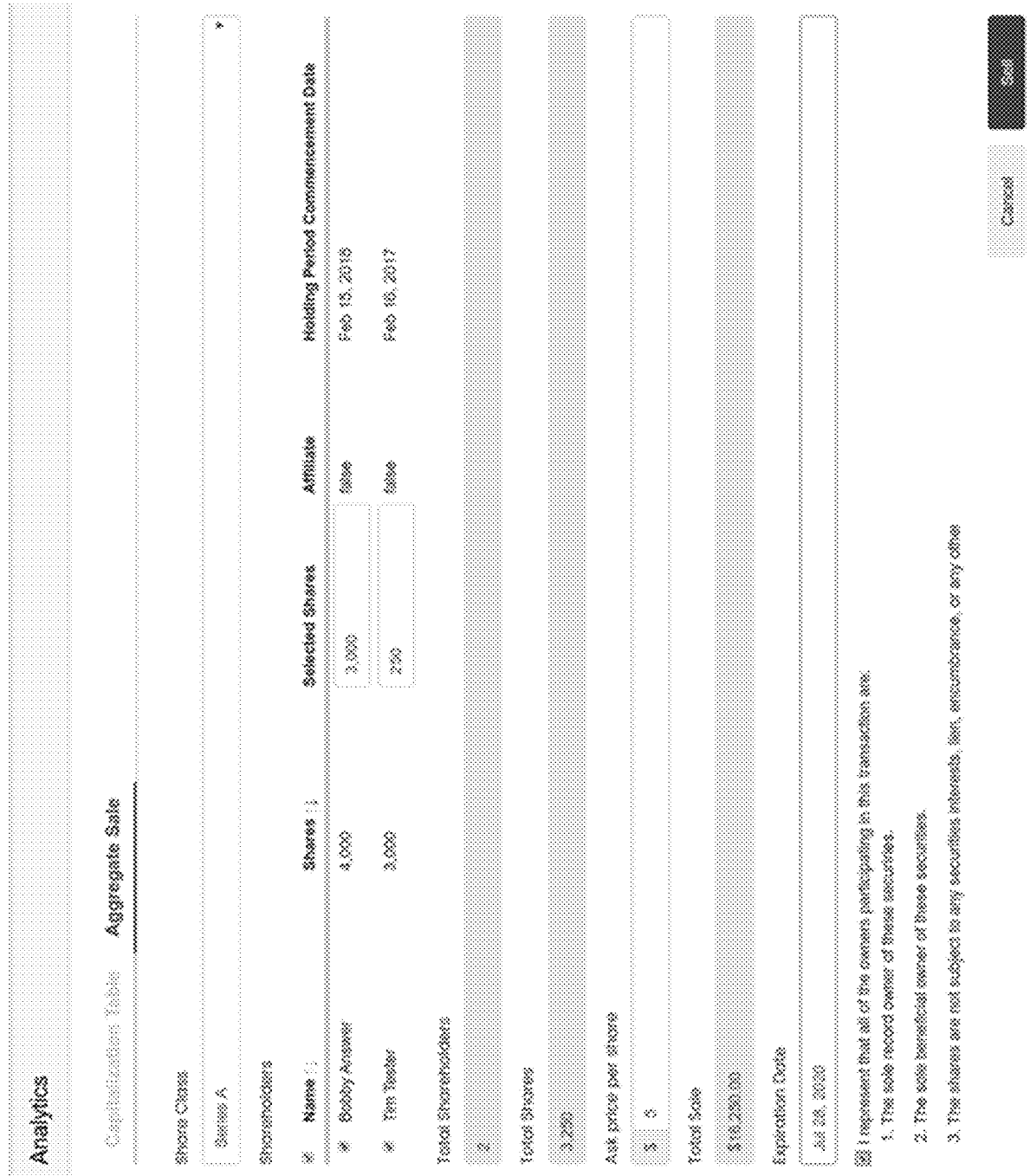
FIG. 93 illustrates an Analytics Aggregate Sale GUI for a tokenized securities platform according to one embodiment of the present invention.

The capitalization table represents the details of ownership interest in one or more companies on an issued, outstanding, and fully diluted basis using US Generally Accepted Accounting Principle (GAAP) standards for capital structure. The platform is operable to dynamically create the capitalization table in real time based on the latest state of transactions or any manual adjustments. FIGS. 91-93 illustrate example GUIs related to capitalization tables.

FIG. 91 illustrates a Capitalization Table GUI for a tokenized securities platform according to one embodiment of the present invention. The Capitalization Table GUI is operable to display at least one owner, at least one share class (e.g., Seed round, Series A, Seed Two, Option Plan I), a number of shares for each of the at last one owner in each of the at least one share class, a percentage of shares for each of the at last one owner in each of the at least one share class, and a total percentage of outstanding shares for each of the at least one owner. The Capitalization Table GUI is further operable to allow the information in the capitalization table to be downloaded for further processing, for example, as a comma-separated values file, a spreadsheet file (e.g., MICROSOFT EXCEL file), or a database file (e.g., MICROSOFT ACCESS file).

FIGS. 92-93 are example GUIs related to aggregate sales. An aggregate sale provides an issuer the ability to execute a 'cap table cleanup' or tender offer. Specifically, an aggregate sale creates a proxy contract to sell an aggregate set of owner's interests in the issuer's entity either to a separate entity (or plurality of entities) or to be purchased by the issuer itself. A 'cap table cleanup' is the process of selling small interest in the company (normally seed or first round investor's interest) to a larger, more sophisticated entity that assists the issuer with future fund raising or access to customers. A tender offer is when an issuer believes that the market price for its shares is below value, and wants to buy back shares from at least one existing owner's interest.

FIG. 92 illustrates an Aggregate Sale Modeling page for a tokenized securities platform according to one embodiment of the present invention. The Aggregate Sale Modeling page includes a plurality of GUI buttons including, but not limited to, a run model GUI button, a download GUI button, and/or a poll shareholders GUI button. In addition, the Aggregate Sale Modeling page further includes a set of input fields associated with the run model GUI button. The set of input fields includes, but is not limited to, a target price input field, an effective date input field, and/or a share classes input field. In one embodiment, the share classes input field is a GUI drop-down box with a plurality of selectable share classes. Furthermore, the Aggregate Sale Modeling page is operable to display a results table containing a plurality of investors. Each of the plurality of investors includes, but is not limited to, an investor name, a seed round value, a seed round percentage, a share class value, a share class percentage, and/or a total percentage. The table containing the plurality of investors is operable to display a totals row which includes, but is not limited to, a total seed round value and/or a total share class value. In the example shown in FIG. 92, the first investor is checked and the totals row includes only the information from the first investor. For example, if the second investor was also checked, the totals row would include percentages equaling 100%.

FIG. 93 illustrates an Aggregate Sale GUI for a tokenized securities platform according to one embodiment of the present invention. An Aggregate Sale is one where the issuer acts as a proxy to sell shares on their shareholder's behalf as discussed above. The Aggregate Sale GUI is operable to display a share class drop down menu, shareholder information, a total number of shareholders, a total number of shares, an ask price per share, a total sale amount, an expiration date, a representation check box, a cancel GUI button, and a sell GUI button. The shareholder information includes a name, a number of shares, a number of selected shares, an affiliate status, and/or a holding period commencement date for each shareholder.

As previously mentioned, the platform is operable to store and manage a plurality of documents, as well as support a plurality of data rooms. In a preferred embodiment, the platform is operable to provide a timestamp for each action associated with a document (e.g., upload, view, sign) for each user that interacts with the document. Advantageously, this timestamp provides a complete and detailed history of each interaction with a document, which can be used to verify compliance with all rules and regulations.

FIG. 94 illustrates an Upload New Document GUI for a tokenized securities platform according to one embodiment of the present invention. The Upload New Document GUI enables a new document to be uploaded to the tokenized securities platform with functionality including, but not limited to, a file selection button, a document name input, and/or a document requirements option. Document requirements options include, but are not limited to, an optional requirement, a read requirement, and/or a signature requirement. Selecting "optional" indicates that reviewing and/or signing a document relating to an equity transaction is optional, requiring no additional user action. Selecting "read required" indicates that the document must be opened and/or read before an equity transaction proceeds to the next stage. Selecting "signature required" indicates that a signature is required on the document before an equity transaction proceeds to the next stage. In one embodiment, the signature is a physical signature. In another embodiment, the signature is an electronic signature. In one embodiment, the electronic signature is provided via an electronic signature service. The electronic signature service is preferably compliant with the Electronic Signatures in Global and National Commerce Act of 2000. In one embodiment, the electronic signature service is DOCUSIGN.

Figure 95:
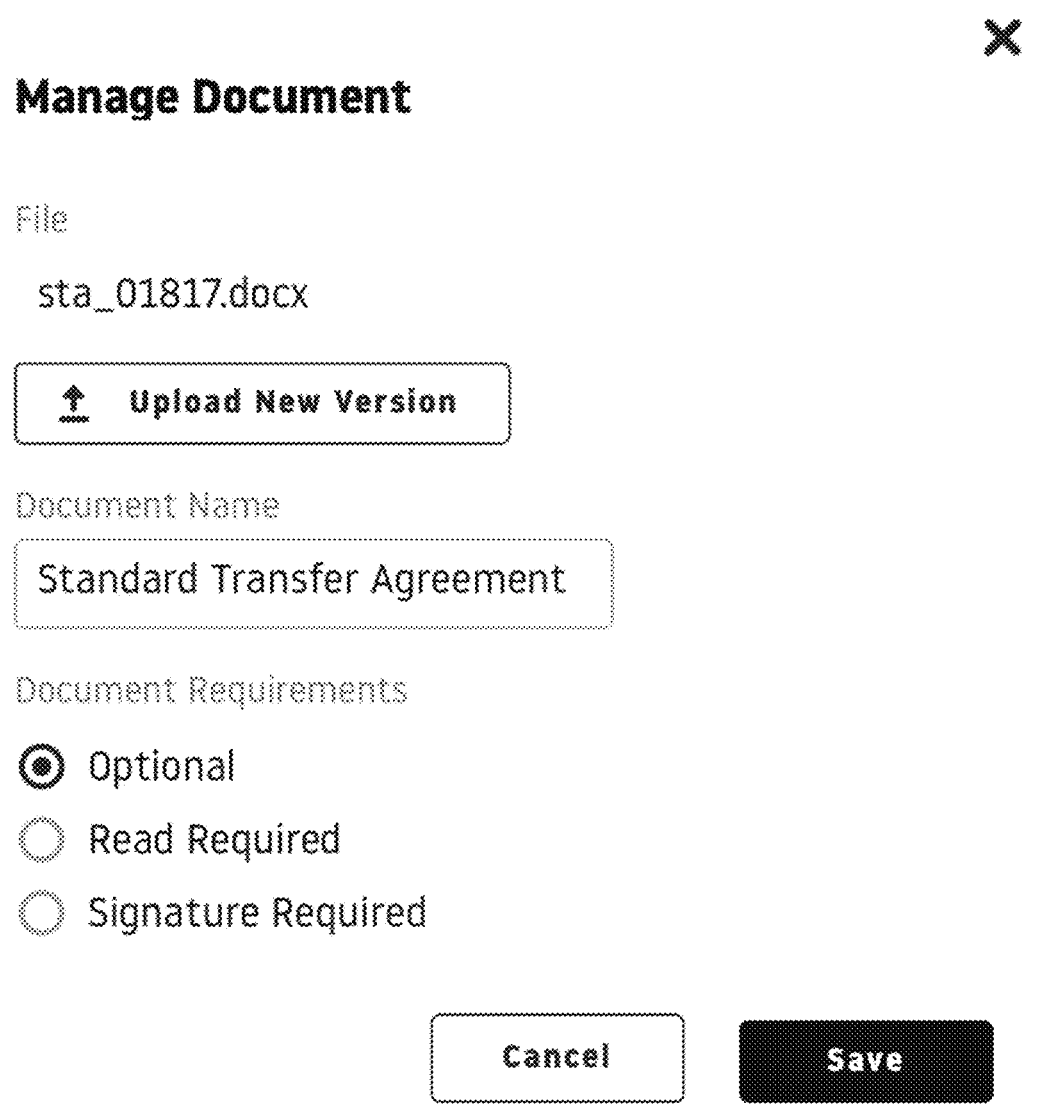

FIG. 95 illustrates a Manage Document GUI for a tokenized securities platform according to one embodiment of the present invention. The Manage Document GUI enables a document already uploaded to the tokenized securities platform to be managed by providing functionality including, but not limited to, uploading a new version of a document, changing the name of a document, and/or selecting at least one document requirement. Document requirement options include, but are not limited to, an optional requirement, a read requirement, and/or a signature requirement. If a selected document has an optional requirement, the selected document does not need to be opened and/or read in order to proceed with an operation on the tokenized securities platform. If a selected document has a read requirement, the selected document must first be opened and read in order to proceed with an operation on the tokenized securities platform. In one embodiment, the platform requires an acknowledgement (e.g., checkbox) to verify that the selected document was read. If a selected document has a signature requirement, an electronic signature and/or a physical signature must be provided in order to proceed with an operation on the tokenized securities platform. In one embodiment, the electronic signature is provided via an electronic signature service. The electronic signature service is preferably compliant with the Electronic Signatures in Global and National Commerce Act of 2000. In one embodiment, the electronic signature service is DOCUSIGN.

Figure 96:
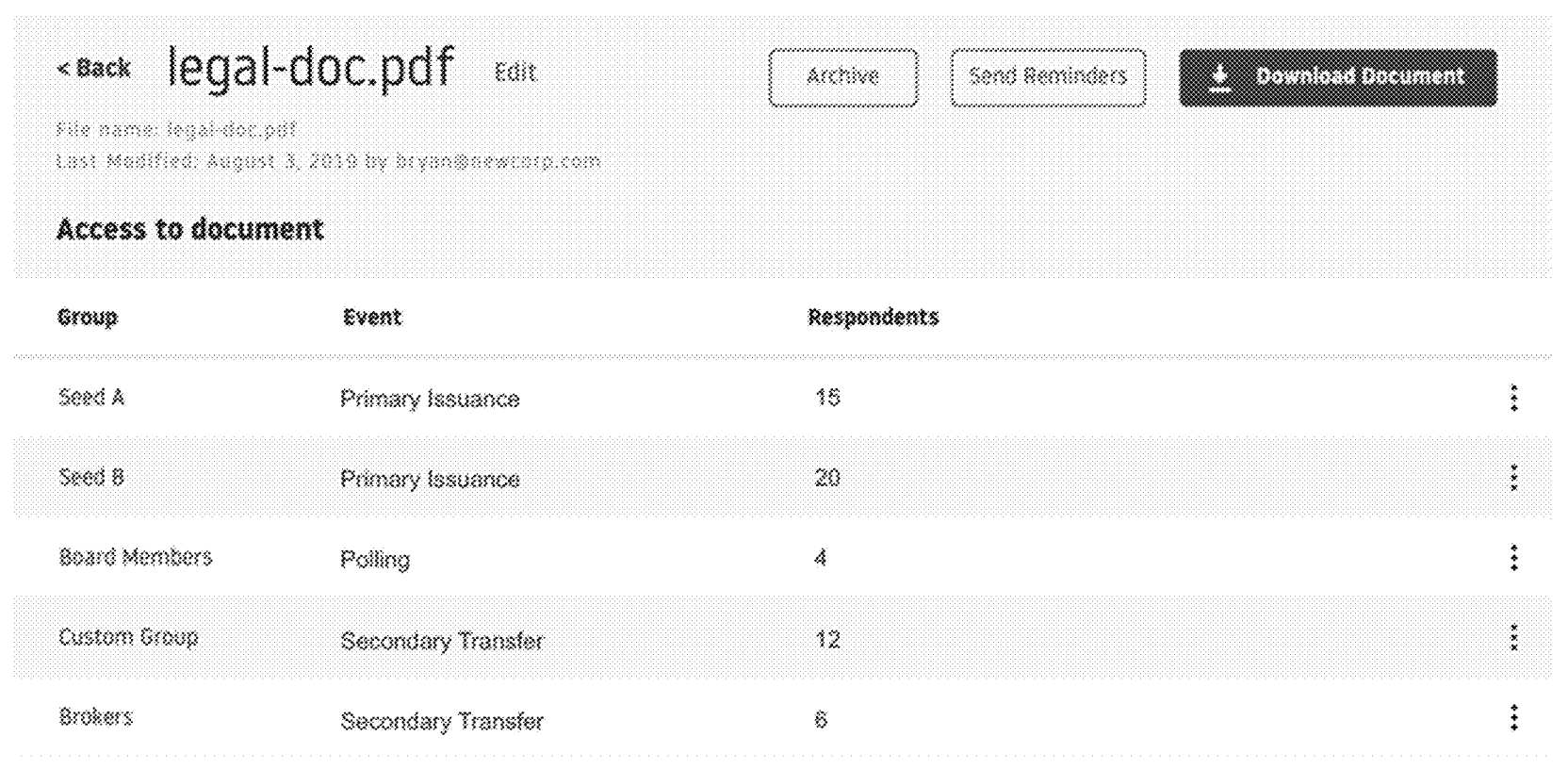

FIG. 96 illustrates a Legal Document GUI for a tokenized securities platform according to one embodiment of the present invention. The Legal Document GUI enables at least one legal document to be downloaded and viewed (e.g., legal documents associated with an equity purchase). The Legal Document GUI is operable to display a legal document name, a file name, a last modified date, and/or a last modified author. The Legal Document GUI includes a table containing a plurality of access groups. Each of the plurality of access groups includes, but is not limited to, a group name, a group event name, and/or a set of respondents. Additionally, the Legal Document GUI is further operable to enable a legal document to be archived and/or at least one reminder to be sent relating to the legal document (e.g., a reminder to sign by a date). Advantageously, the platform is operable to restrict access to the legal document to relevant individuals using the access groups.

FIG. 97 illustrates a Data Room GUI for a tokenized securities platform according to one embodiment of the present invention. The Data Room GUI is operable to display information corresponding to any documents uploaded to a data room. In one embodiment, the Data Room GUI is operable to display this information in a list displaying a plurality of documents, where each of the plurality of documents includes a document name, at least one document requirement, and/or a last modified date. In addition, the Data Room GUI is further operable to enable searching of the plurality of documents displayed in the list. Searching is performed by methods including, but not limited to, filtering the list of the plurality of documents using a document name, filtering the list of the plurality of documents using a drop-down box, and/or viewing archived documents. Moreover, the Data Room GUI enables management of documents, archival of documents, upload of documents, view of a version history for each of the plurality of documents, and/or deletion of documents.

Within a data room, the platform is operable to include folders and subfolders to hold documents. The platform also allows documents to be copied or moved from a first data room to a second data room using a dropdown list and/or drag and drop user interface controls.

The platform requires signatures on relevant documents, payments to be made, and funds held in escrow to reach closing. Advantageously, the platform is aware of when a closing is ready and is operable to notify relevant parties (e.g., issuer, investor) in real time, and the aforementioned management of documents is part of that capability. Traditional closings require a manual checklist and someone to keep track of each step. This system is time consuming and requires manual verification of each step. This often prevents actions from occurring in parallel because a list is followed, and movement between steps cannot be done in real time due to the manual verification required. In contrast, the platform of the present invention advantageously allows for tasks to be completed in parallel and notifies relevant parties in real time when an action must be taken. Verification is done automatically in real time via the platform, which reduces the time necessary to complete closing.

The platform of the present invention allows users to take action immediately when available via activities. Moreover, the platform is operable to alert offline users when participation becomes available. In one embodiment, the platform is operable to alert users via notifications. The notifications are both modifiable and/or asynchronous. Thus, whether users are available online or are offline, the platform is operable to inform users of upcoming events and/or what actions are available to the users. This enables the platform to respond to users contextually, based on how other users have acted and/or responded.

In a preferred embodiment, a message contains at least one templated item. Specifically, a templated item is unique information stored about an audience member in the platform. As messages are generated for the audience member, their specific domain information including, but not limited to, a name, at least one securities class held, a number of securities held in each of the at least one securities class, a date of acquisition for all held securities, an amount vested (if a vesting type security), and/or any other data known about the audience member is dynamically inserted into the message that is provided to the audience member. Meaning, each audience member receives a unique message as their ownership and profile data in the platform is unique when the at least one templated item is included. FIGS. 98-101 illustrate example GUIs related to messaging functionality of the tokenized securities platform.

Figure 98:
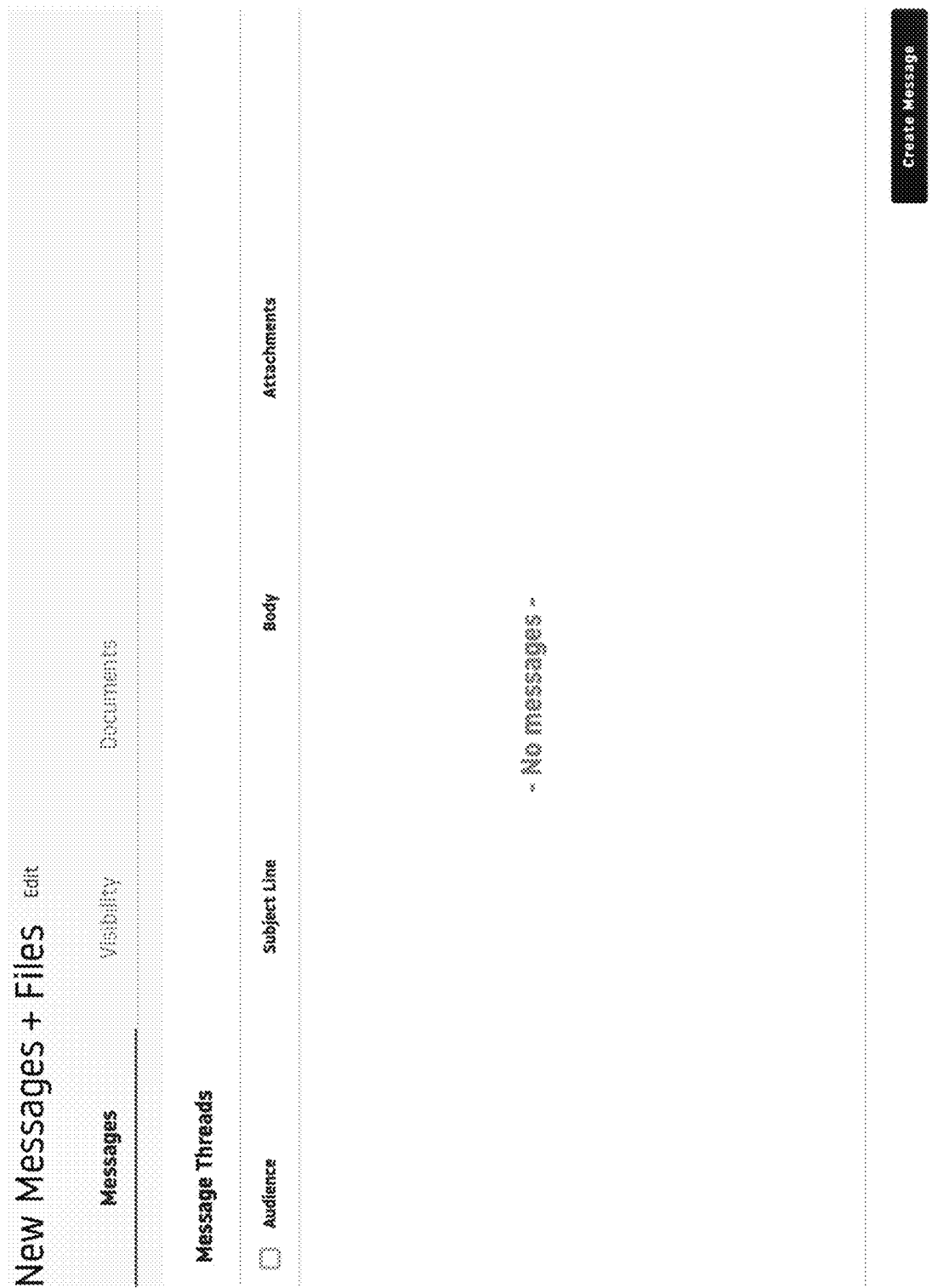
FIG. 98 illustrates a Messages page for a New Message GUI for a tokenized securities platform according to one embodiment of the present invention.

FIG. 98 illustrates a Messages page for a New Message GUI for a tokenized securities platform according to one embodiment of the present invention. The Messages page for the New Message GUI is operable to display a page name, a page name edit GUI button, a create message GUI button, and/or a table containing a plurality of message threads. Each of the plurality of message threads includes a set of audience names, a message subject line, a message body, at least one attachment, a message thread date, and/or a message thread time.

Figure 99:
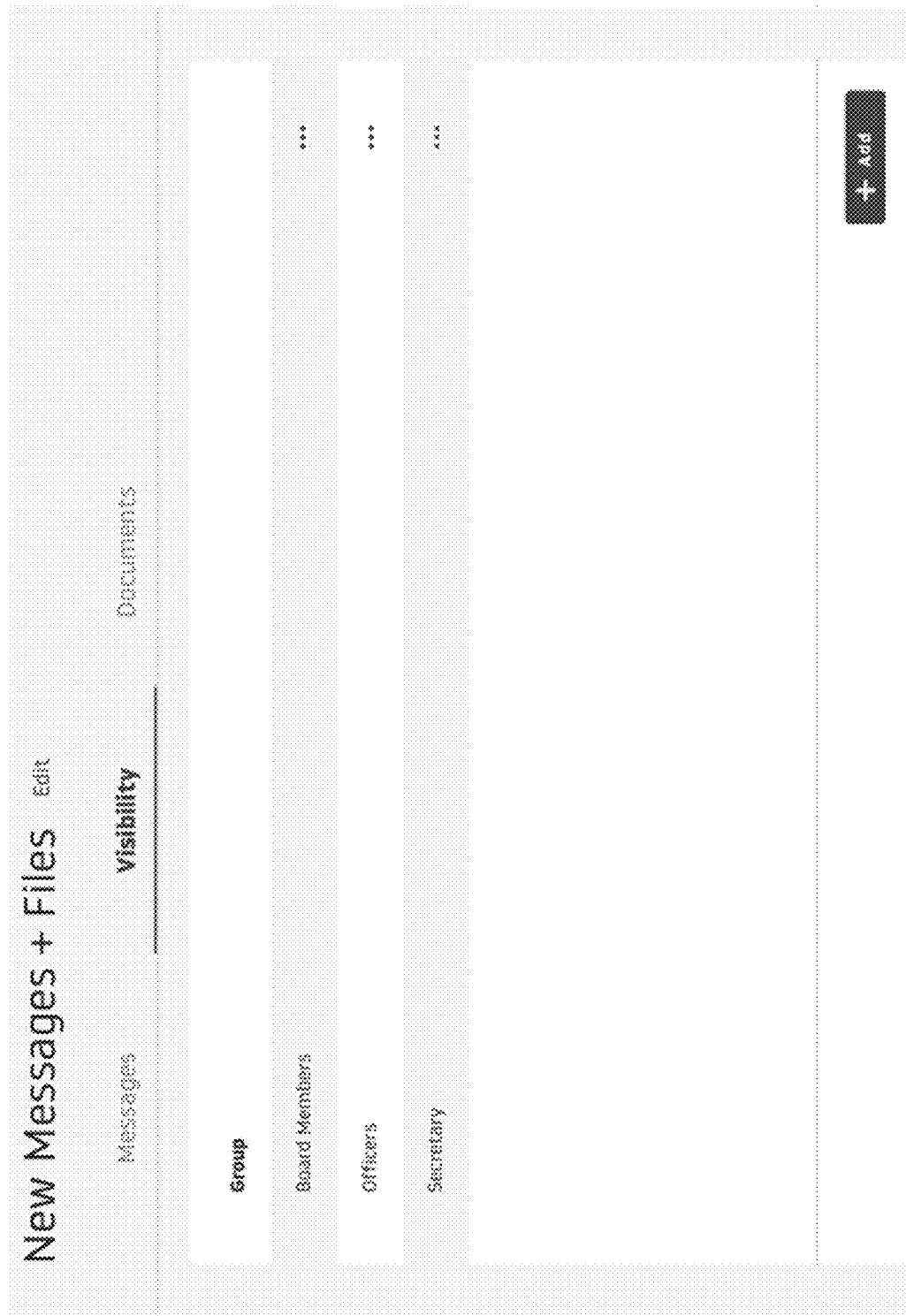
FIG. 99 illustrates a Visibility page for a New Message GUI for a tokenized securities platform according to one embodiment of the present invention.

FIG. 99 illustrates a Visibility page for a New Message GUI for a tokenized securities platform according to one embodiment of the present invention. The Visibility page for the New Message GUI is operable to display a message name, an add message and/or file GUI button, and/or a table containing a plurality of groups. Each of the plurality of groups includes, but is not limited to, a group name and/or a group status.

FIG. 100 illustrates an Add Group GUI for a New Message GUI for a tokenized securities platform according to one embodiment of the present invention. The Add Group GUI for the New Message GUI enables at least one new group to be added to the New Message GUI. The Add Group GUI includes, but is not limited to, a group selection table containing a plurality of group names. The platform enables selection of at least one group from the Add Group GUI and addition of the at least one group to the New Message GUI.

FIG. 101 illustrates a Documents page for a New Message GUI for a tokenized securities platform according to one embodiment of the present invention. The Documents page for the New Message GUI is operable to display a table containing a plurality of documents, where each of the plurality of documents includes a document name, a date added, and/or a response required indicator.

Figure 102:
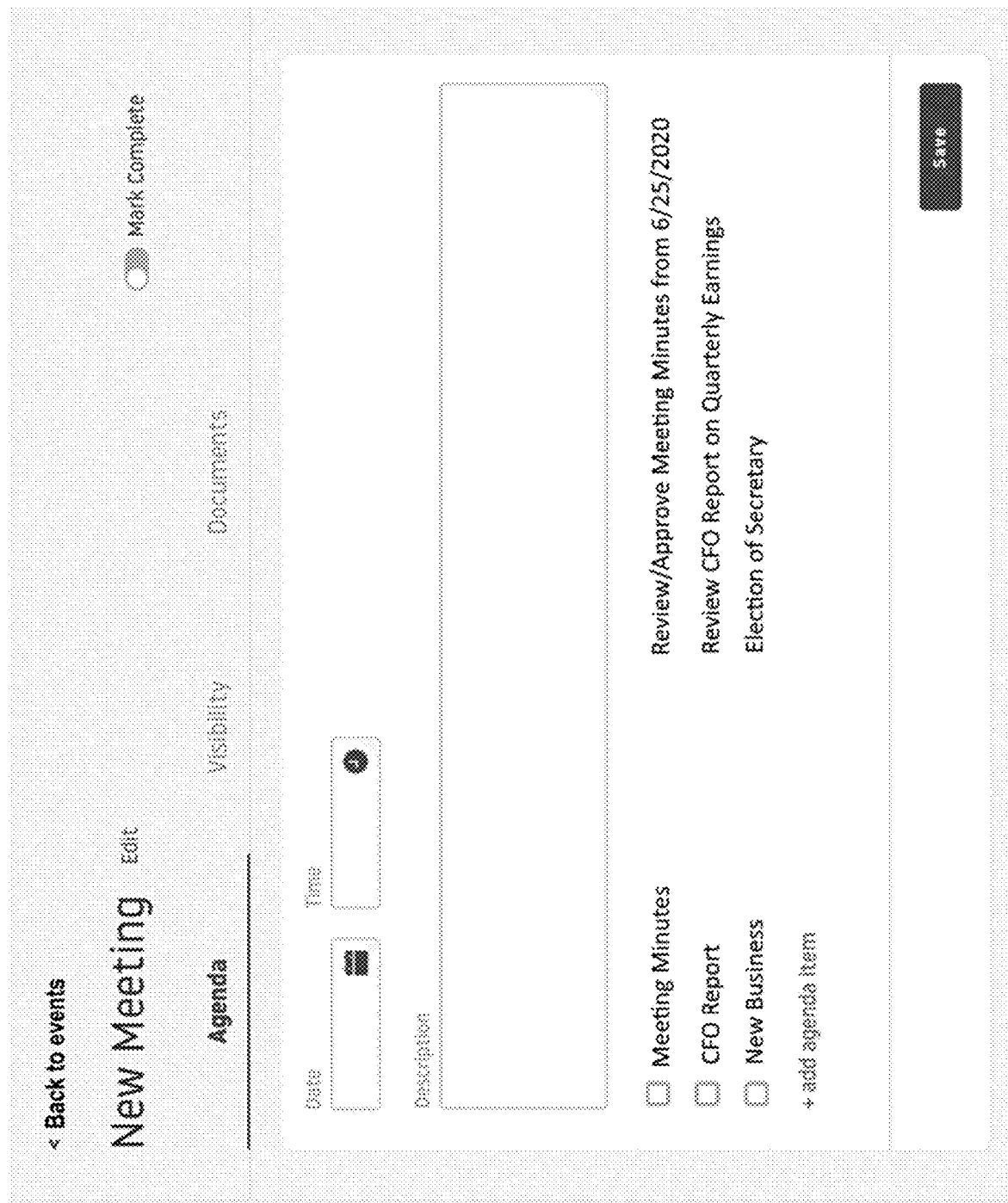
FIG. 102 illustrates an Agenda page for a New Meeting GUI for a tokenized securities platform according to one embodiment of the present invention.
Figure 103:
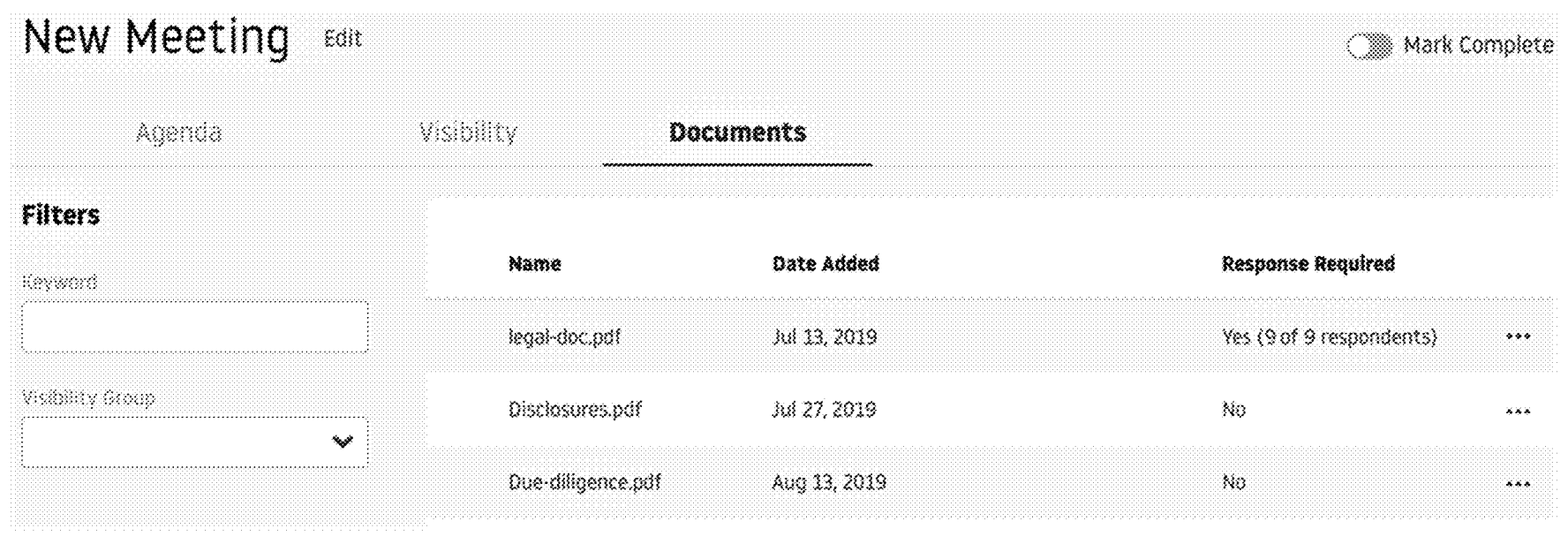
Figure 104:
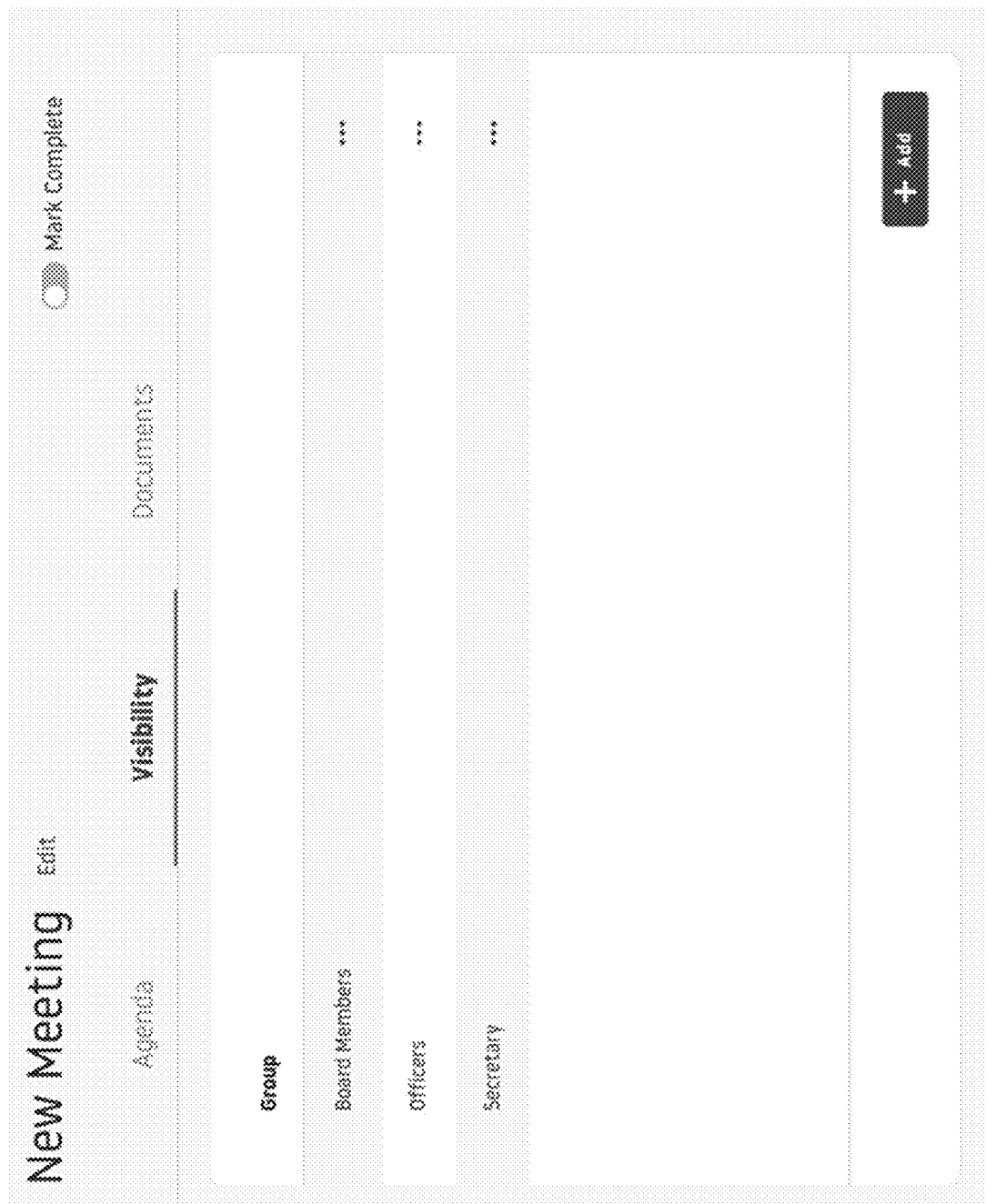
FIG. 104 illustrates a Visibility page for a New Meeting GUI for a tokenized securities platform according to one embodiment of the present invention.

The tokenized securities platform is also operable to manage information related to a meeting. For example, the platform is operable to manage visibility to information (e.g., documents, agendas) related to the meeting. FIGS. 102-104 illustrate example GUIs related to management of meetings within the tokenized securities platform.

FIG. 102 illustrates an Agenda page for a New Meeting GUI for a tokenized securities platform according to one embodiment of the present invention. The Agenda page enables a new agenda item to be created, edited, and/or saved. The new agenda item contains information including, but not limited to, an agenda date, an agenda time, an agenda description, and/or a plurality of agenda items where each of the plurality of agenda items includes an agenda item description. The New Meeting GUI further includes an edit button, a save button, and/or an add agenda item button.

FIG. 103 illustrates a Visibility page for a New Meeting GUI for a tokenized securities platform according to one embodiment of the present invention. The Visibility page for the New Meeting GUI includes a table containing a plurality of groups and/or an add group GUI button. Each of the plurality of groups includes a group name. The add group GUI button enables the addition of a new group to the table containing the plurality of groups via user input.

FIG. 104 illustrates a Documents page for a New Meeting GUI for a tokenized securities platform according to one embodiment of the present invention. The Documents page for the New Meeting GUI includes a table containing a plurality of documents and/or a set of filter options for filtering the table containing the plurality of documents. Filter options include, but are not limited to, a keyword, a date, an expiration date, a time, a name, and/or a visibility group. Each of the plurality of documents includes a document name, a date added, and/or a response required indicator.

Figure 105:
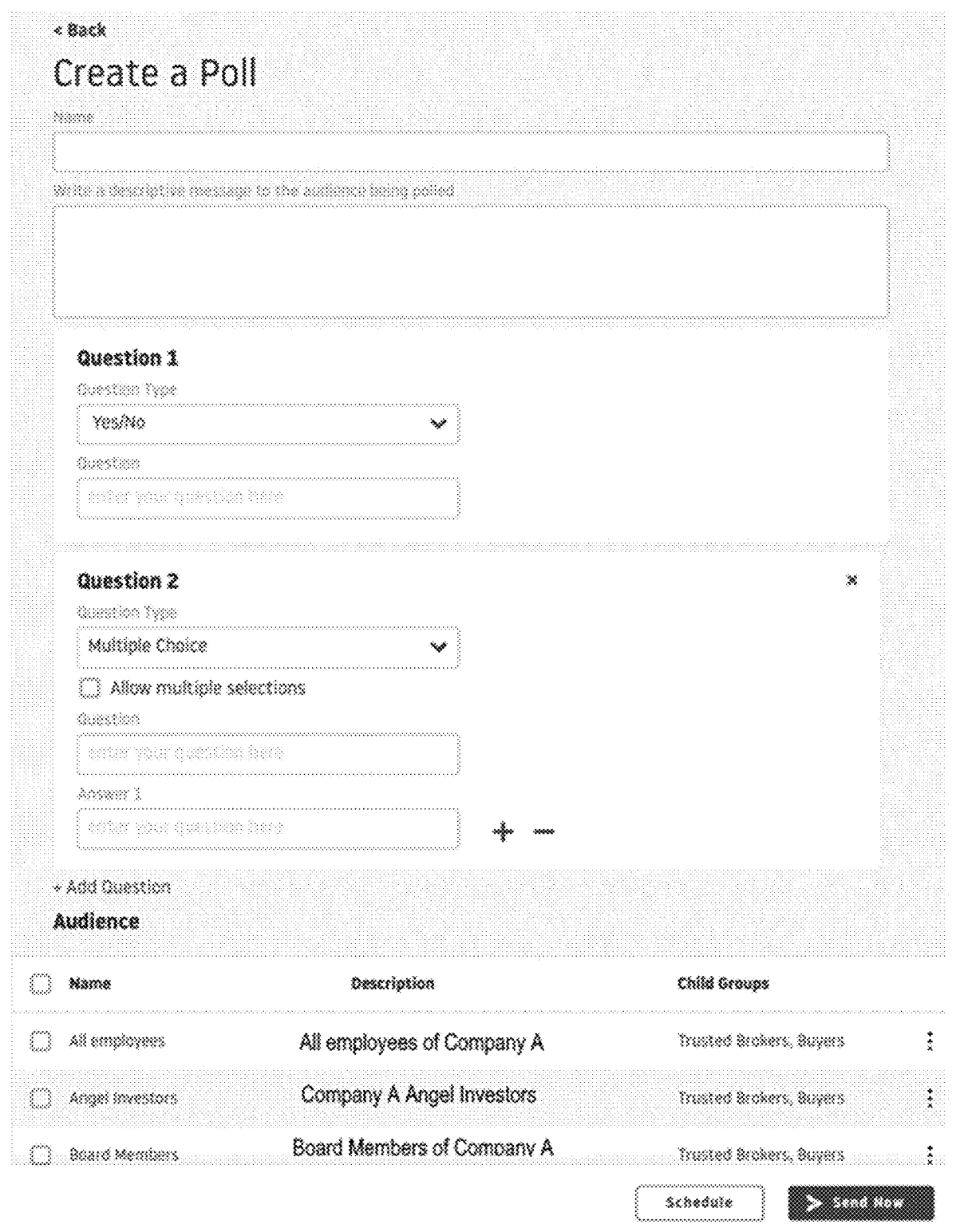

The tokenized securities platform is operable to perform polling of groups within the platform (e.g., shareholders, board members, officers). In a preferred embodiment, a poll question or set of poll questions contains at least one templated item. Specifically, a templated item is unique information stored about an audience member in the platform. As questions are generated for the audience member, their specific domain information including, but not limited to, a name, at least one securities class held, a number of securities held in each of the at least one securities class, a date of acquisition for all held securities, an amount vested (if a vesting type security), and/or any other data known about the audience member is dynamically inserted into the poll question that is provided to the audience member. Meaning, each audience member receives a unique question as their ownership and profile data in the platform is unique when the at least one templated item is included. FIGS. 105-107 are example GUIs related to poll creation and results.

FIG. 105 illustrates a Poll Creation GUI for a tokenized securities platform according to one embodiment of the present invention. Each poll includes, but is not limited to, a poll name, a poll description, at least one poll question with a corresponding poll question type, and/or at least one target audience. The platform is further operable to enable multiple answer selections per poll question. Poll question types include, but are not limited to, a yes/no question, a true/false question, a multiple-choice question, a multiple selection question, a scale question, a rank order question, and/or a user input question. The Poll Creation GUI further enables the adding of an additional poll question via user input. In addition, the Poll Creation GUI includes an audience table containing a plurality of audiences. Each of the plurality of audiences includes an audience name, an audience description, and/or a set of child groups. Furthermore, the Poll Creation GUI is operable to enable a poll to be scheduled for a predetermined time and/or sent out immediately.

FIG. 106 illustrates a Poll Results GUI for a tokenized securities platform according to one embodiment of the present invention. The Poll Results GUI is operable to display a name of a poll and/or a corresponding poll description. The Poll Results GUI includes a list containing a plurality of audience members and a list containing a plurality of questions. Each of the plurality of audience members includes, but is not limited to, an audience name and/or a number of audience respondents. Each of the plurality of questions includes, but is not limited to, a question title, a question number, a question, and/or a set of question result data. In one embodiment, the set of question result data displays a percentage corresponding to the number of shareholders who selected a particular answer to a question.

In another embodiment, the set of question result data displays a percentage corresponding to the shareholder's ownership interest. For example, if a single shareholder owns 25% of the entity, then the platform displays that 25% of the result reflects the single shareholder. In one embodiment, the platform displays votes of each shareholder in a different color. For example, votes from a first shareholder are displayed in a first color, votes from a second shareholder are displayed in a second color, votes from a third shareholder are displayed in a third color, votes from a fourth shareholder are displayed in a fourth color, etc. Additionally, or alternatively, voting results are presented in a table. In one embodiment, the platform allows voting results to be filtered by shareholder.

The platform is further operable to display results of voting by a particular share class and/or across share classes based on the voting rights of the share class. For example, if preferred shareholders have a 2:1 voting right, then the total votes for the preferred shareholders is multiplied by two for every share held. In one embodiment, the platform displays votes from preferred shareholders in a first color and votes from common shareholders in a second color. In another embodiment, the platform displays each share class in a different color. For example, votes from a first share class are displayed in a first color, votes from a second share class are displayed in a second color, votes from a third share class are displayed in a third color, votes from a fourth share class are displayed in a fourth color, etc. Additionally, or alternatively, voting results are presented in a table. In one embodiment, the platform allows voting results to be filtered by share class.

This is an important distinction from commonly available electronic polling methods, which generally only tally one vote per person. Shareholders often own more than one share, and each share class may have different voting rights. For example, if Shareholder 1 owns 80 shares of common stock and Shareholder 2 owns 60 shares of preferred stock with a 2:1 voting right, Shareholder 1 has 80 votes and Shareholder 2 has 120 votes. Commonly available electronic polling methods would count 1 vote each for Shareholder 1 and Shareholder 2, which does not accurately reflect each shareholder's voting rights.

Further, commonly available electronic polling methods are not able to update information in real time. In one embodiment, the platform presents results that accurately reflect dynamic changes in ownership that occur between a time the poll opens and a time the poll closes. For example, if a poll is open and a shareholder purchases additional shares while the poll is open, the platform is operable to dynamically adjust voting results in real time by altering the number of shares and/or the voting rights of the share class (e.g., preferred stock with a 2:1 voting right). These capabilities of the platform advantageously allow polling to be used for voting for board members, share classes approving board resolutions, and/or other governance questions that require feedback from the owners of the company.

FIG. 107 illustrates a Poll Shareholders GUI for a tokenized securities platform according to one embodiment of the present invention. The Poll Shareholders GUI includes, but is not limited to, a poll description, an expiration date input field, and an approval requirement GUI drop-down box containing a plurality of selectable approval requirement options. In addition, the Poll Shareholders GUI further includes, but is not limited to, a cancel GUI button and/or a send poll GUI button. The cancel GUI button cancels an initiated shareholder poll and closes the Poll Shareholders GUI. The send poll GUI button is operable to initiate a poll with constraints from the expiration date input filed and/or the approval requirements GUI drop-down box. The initiated poll is preferably sent to all users who have access to a current cap table.

Investors

In addition to supporting a plurality of administrator account GUIs and operations, the tokenized securities platform provides investors with a plurality of investor-related GUIs that are updated in real time or near-real time. The plurality of investor-related GUIs provides valuable insights relating to a company, business, individual, or other entity that the user wants to enter into a share class transaction with.

The tokenized securities platform allows investors to manage their shares in various companies and reminds investors when action is required (e.g., signature on a document, payment due). Further, the tokenized securities platform allows for investors to participate in a secondary market of securities, including bidding, asking, accepting, signing documents, and/or remitting payment. The tokenized securities platform also provides a Valuation Estimator for investors to estimate the value of a number of shares. The tokenized securities platform further enables investors to locate and/or participate in transactions with Broker/Dealers. Additionally, the tokenized securities platform is operable to display a vesting schedule and assist investors in conversion processes.

As previously described, the platform requires each user to set up an account and a user profile. The process for creating an Investor Account is similar to that for an administrator, which is detailed in FIGS. 24-27. Investors receive an email invitation to register on the platform as previously described in FIG. 50.

FIG. 108 illustrates an Investor Profile GUI for a tokenized securities platform according to one embodiment of the present invention. The Investor Profile GUI includes an Individual GUI button and/or an Entity or Trust GUI button. If the Individual GUI button is selected, the platform displays a First Name text box, a Last Name text box, a Birth Date text box, a Social Security Number text box, an Email Address text box, an Address text box, a Cancel GUI button, and/or a Save GUI button. In a preferred embodiment, the platform is operable to autocomplete the address text box to populate the Address text box.

Figure 109A:
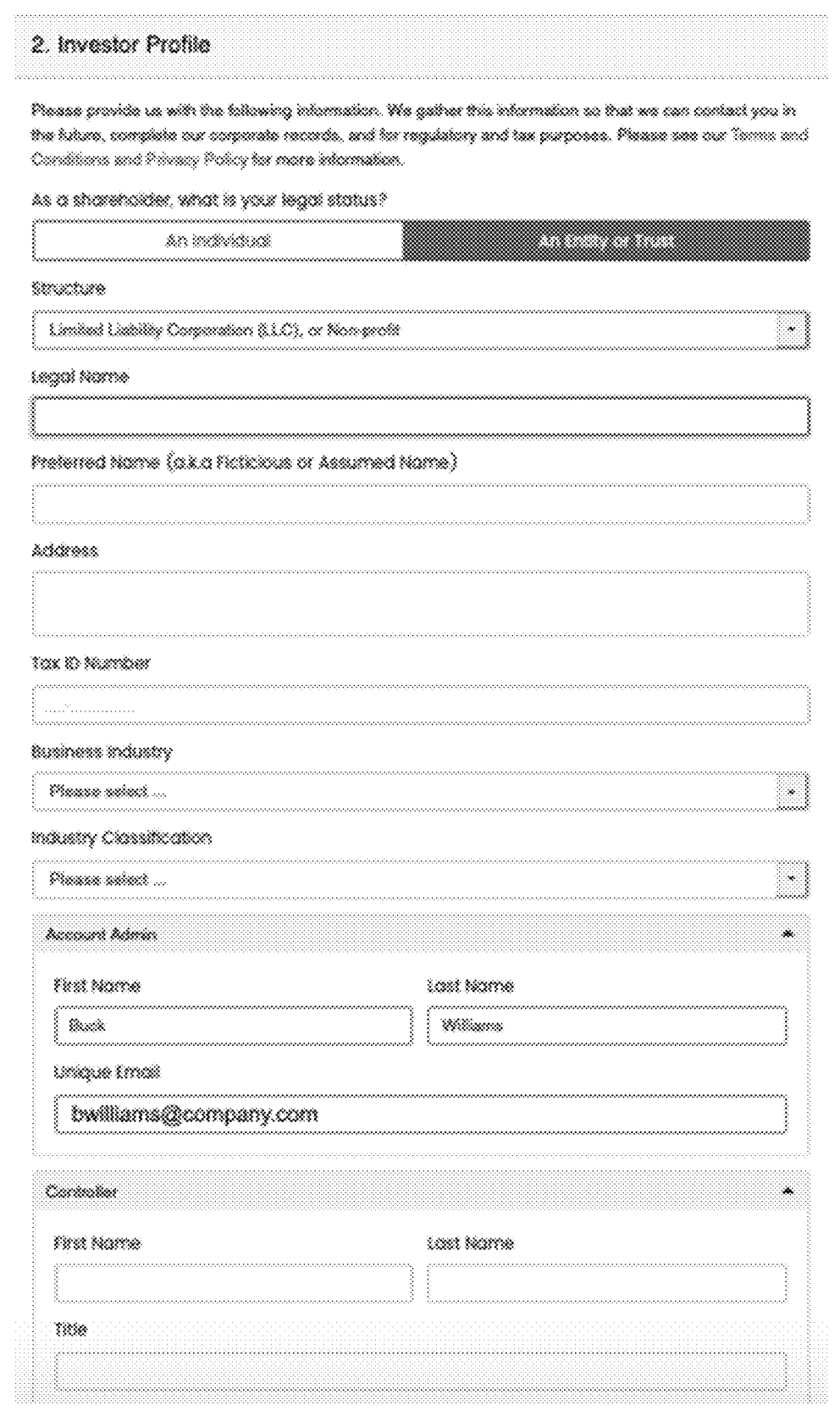
Figure 109B:
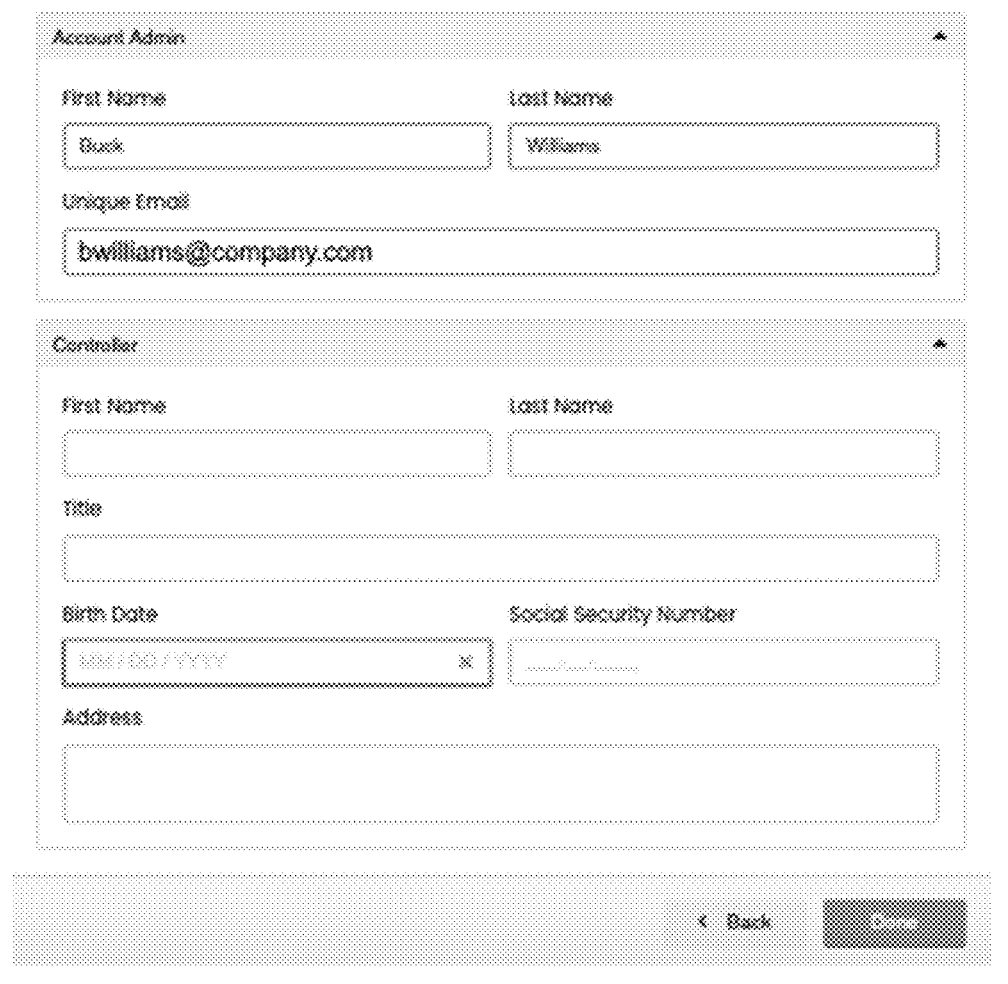

FIGS. 109A-109B illustrate an Investor Profile GUI for a tokenized securities platform according to another embodiment of the present invention. The Investor Profile GUI includes an Individual GUI button and/or an Entity or Trust GUI button. If the Entity or Trust GUI button is selected, the platform displays a Legal Entity Name text box, a Doing Business as Name text box, an Administrators text box, a Billing Email text box, an Address text box, a Phone Number text box, a Tax ID Number text box, a Business Industry drop down menu, a Business Structure drop down menu, Account Administrator Details, Controller Details, a Cancel GUI button, and/or a Save GUI button. The Account Administrator Details include, but are not limited to, a First Name text box, a Last Name text box, and/or a Unique Email Address text box. The Controller Details include, but are not limited to, a First Name text box, a Last Name text box, a Title text box, a Birth Date text box, a Social Security Number text box, and/or an Address text box.

The platform is operable to display an investor's portfolio, which includes all securities owned across various issuers. FIG. 110 illustrates a My Shares GUI for a tokenized securities platform according to one embodiment of the present invention. The My Shares GUI is operable to display a table containing information corresponding to a plurality of owned shares by an investor. Each of the plurality of owned shares includes, but is not limited to, a company name, a company's logo, a share class, a share type, a number of shares, a transfer window, and/or an investor action GUI button. In one embodiment, the platform is operable to filter the table is operable to be filtered using the company name, the share class, the share class type, the number of shares, and/or the transfer window. In addition, the investor action GUI button is operable to update in real-time or near-real-time. For example, if one of the plurality of owned shares is no longer in a holding period, the investor action GUI updates to a sell shares GUI button, enabling the investor to sell the number of shares owned by the investor.

FIGS. 111-123 illustrate example GUIs for activities for a tokenized securities platform. Activities on the platform available to an investor relate to activities including, but not limited to, accepting an offer, placing a bid, placing an ask, a poll response, an approval, a disapproval, a refusal right, an offer right, an undersubscribed right, a co-sale right, signing of a document, request for a payment, a payment request in progress, a retry of a buyer payment, a retry of a seller payment, a failed payment, a fee submission, a completed sale, a completed purchase, acknowledging receipt of a document, downloading of a document, a failed refund, platform registration, and/or banking registration.

Figure 111:
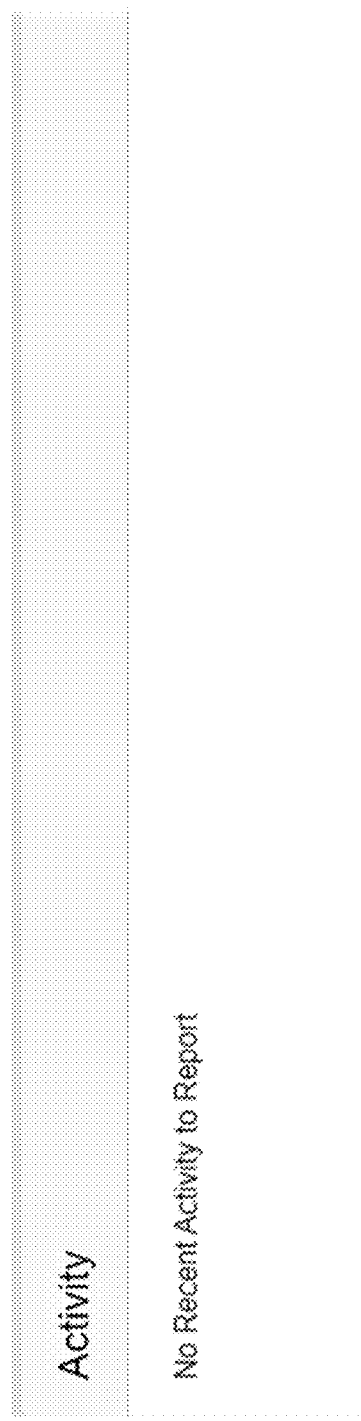
FIG. 111 illustrates an Activity GUI for a tokenized securities platform according to one embodiment of the present invention

FIG. 111 illustrates an Activity GUI for a tokenized securities platform according to one embodiment of the present invention. The Activity GUI is operable to display that there is no recent activity for the platform to report.

FIG. 112 illustrates an Activity GUI for a tokenized securities platform according to another embodiment of the present invention. The Activity GUI includes, but is not limited to, a plurality of activities requiring user action and/or an action GUI button operable to perform the user action for each of the plurality of activities. Each of the plurality of activities includes, but is not limited to, an action description, a transacting party, and/or an action request. In one embodiment, the action description corresponds to a signature required in order for a transaction to be completed, where the transacting party is included in the description. In one embodiment, the action request is a request for at least one document to be reviewed and/or signed by the user. In one embodiment, the at least one document is reviewed and/or signed using the DOCUSIGN service. In another embodiment, the action description is a payment request to purchase shares from the transacting party. In another embodiment, the action request includes a request to send a payment to purchase a number of shares, where the action GUI button enables the payment to be made for the purchase. The Activity GUI is operable to update in real-time or near-real-time.

Figure 113:
FIG. 113 illustrates an Action Required page for an Activity GUI for a tokenized securities platform according to one embodiment of the present invention.

FIG. 113 illustrates an Action Required page for an Activity GUI for a tokenized securities platform according to one embodiment of the present invention. The Action required page is operable to update in real-time or near-real-time. In addition, the Action Required page is further operable to display a plurality of information relating to a plurality of transaction events on the platform. In one embodiment, the plurality of information relating to the plurality of transaction events includes, but is not limited to, a signature required indication, where the signature required indication includes a list of documents that require a user signature, and/or a transfer window schedule, where the transfer window schedule includes, but is not limited to, a start date, an end date, and/or a contact email address. In one embodiment, the signature required indication includes, but is not limited to, a signature expiration date and/or a signature expiration time. In one embodiment, the transfer window includes, but is not limited to, a view transfer rules GUI button, a view documents GUI button, and/or a view participating share classes GUI button.

Figure 114:
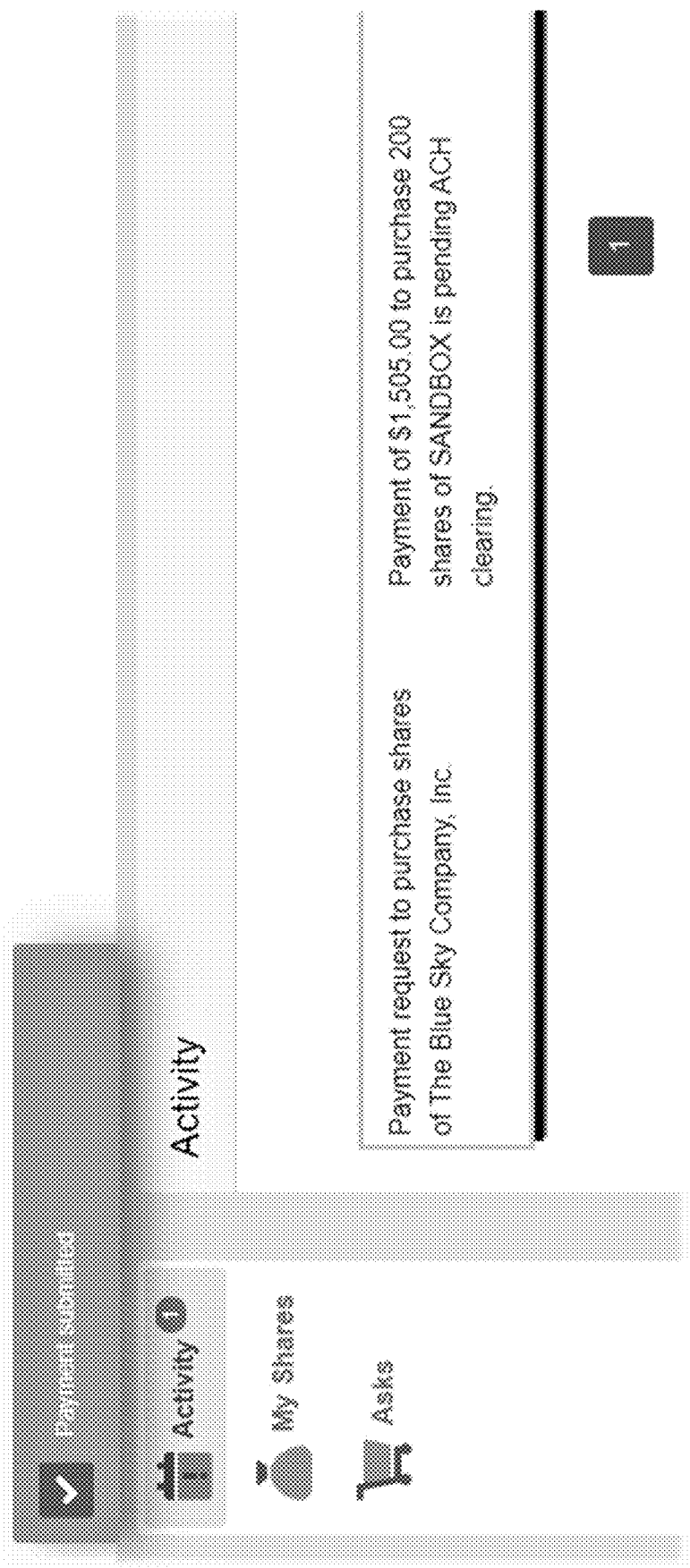
FIG. 114 illustrates an Activity GUI for a tokenized securities platform according to yet another embodiment of the present invention.

FIG. 114 illustrates an Activity GUI for a tokenized securities platform according to yet another embodiment of the present invention. The Activity GUI is operable to display an activity number corresponding to the number of activities requiring user action. The activity number updates in real-time or near-real-time. In addition, the Activity GUI is operable to display updates via a pop-up notification. In one embodiment, the pop-up notification corresponds to submitting a payment. In one embodiment, the pop-up notification corresponds to receiving a payment. In another embodiment, the pop-up notification corresponds to a document being signed via an electronic signature service. The electronic signature service is preferably compliant with the Electronic Signatures in Global and National Commerce Act of 2000. In one embodiment, the electronic signature service is DOCUSIGN.

FIG. 115 illustrates an Attachments GUI for a tokenized securities platform according to one embodiment of the present invention. The Attachments GUI includes a table with a plurality of documents. Each of the plurality of documents includes, but is not limited to, a document name and/or a response required indicator. Each of the plurality of documents is operable to be downloaded from the platform when the document name is clicked. In addition, the Attachments GUI further includes a close GUI button to exit from the Attachments GUI.

FIG. 116 illustrates an Activity GUI for a tokenized securities platform according to one embodiment of the present invention. The Activity GUI is operable to display information including, but not limited to, a description of the activity, additional details regarding the activity, and/or a requested action. In the embodiment shown in FIG. 116, the description of the activity is execute an offer; the additional details regarding the activity describes the number of shares, the share class, the share price, a right to purchase, and a description of what happens if multiple parties accept the offer; and the requested action is an execution of the offer right to purchase the shares via a yes GUI button or a no GUI button.

FIG. 117 illustrates a Make Payment GUI for a tokenized securities platform according to one embodiment of the present invention. When submitting a payment, an Investor is presented with exactly what they are buying (e.g., company, share class, number of shares, price) and a selected banking account (e.g., bank name, account name) to authorize transfer of funds from the selected banking account to the holding or escrow account until closing. The Make Payment GUI is operable to display a company name, a share class, a number of shares, a price per share, a share cost, fees, a total cost, a payment authorization checkbox, a cancel GUI button, and/or a submit GUI button. The payment authorization checkbox corresponds to a payment authorization of a payment equal to the total cost. The cancel GUI button is operable to close the Make Payment GUI. The submit GUI button is operable to submit the total cost as payment for acquiring the number of shares.

Figure 118:
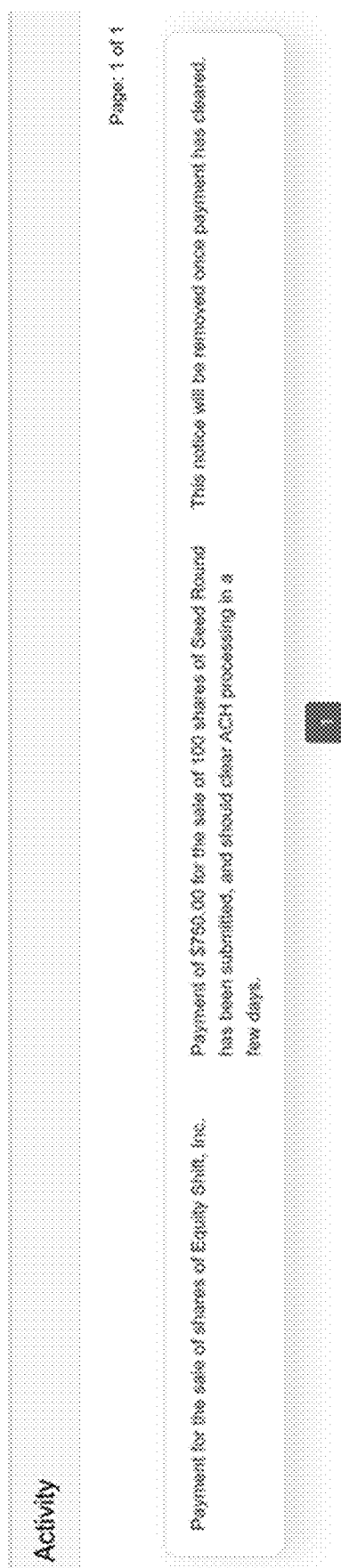

FIG. 118 illustrates an Activity GUI for a tokenized securities platform according to another embodiment of the present invention. In the embodiment shown in FIG. 118, the description of the activity is payment for the sale of shares; the additional details regarding the activity describes the payment amount, the number of shares, the share class, and expected clearance of payment; and the requested action is a notification that the notice will be removed after the payment clears. Advantageously, the platform keeps track of payments for the seller.

Figure 119:
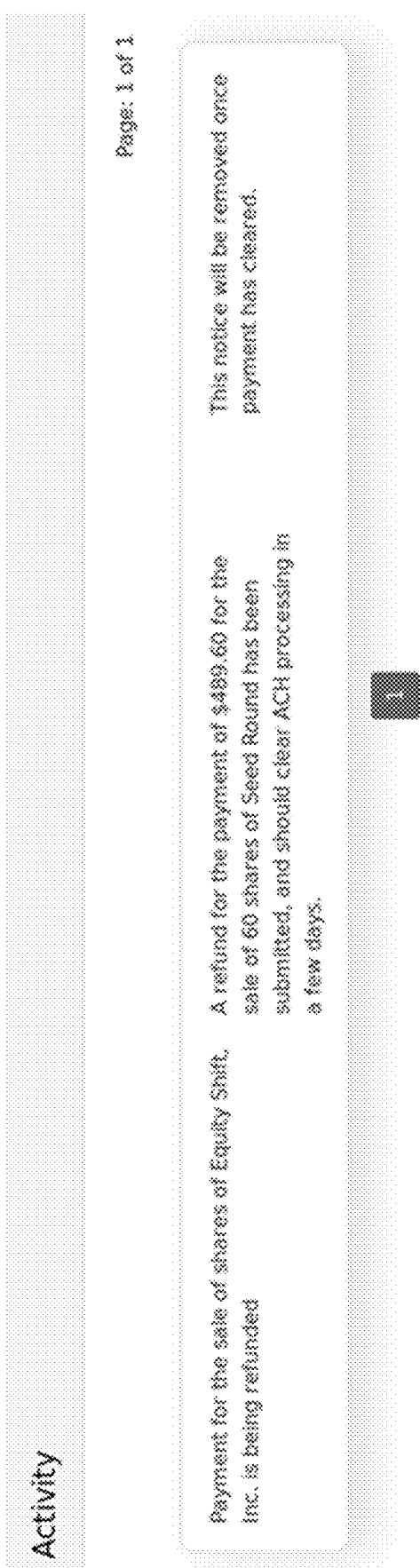

FIG. 119 illustrates an Activity GUI for a tokenized securities platform according to yet another embodiment of the present invention. In the embodiment shown in FIG. 119, the description of the activity is a payment refund; the additional details regarding the activity describes the refund amount, the number of shares, the share class, and expected clearance of the refund; and the requested action is a notification that the notice will be removed after the refund clears. Advantageously, the platform keeps track of refunds for the buyer.

Figure 120:
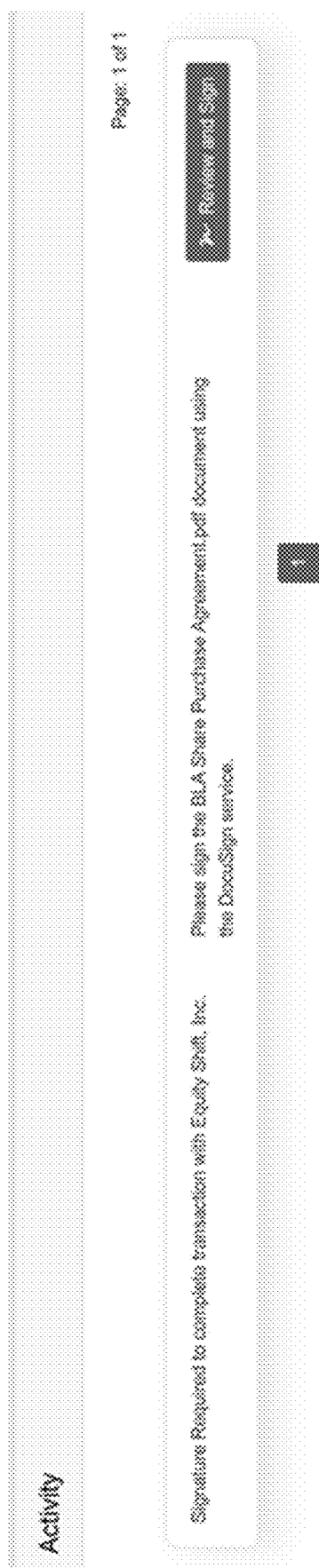

FIG. 120 illustrates an Activity GUI for a tokenized securities platform according to still another embodiment of the present invention. In the embodiment shown in FIG. 120, the description of the activity is a signature request on a document; the additional details regarding the activity describes the document name; and the requested action is to review and sign the document.

FIG. 121 illustrates an Activity GUI for a tokenized securities platform according to another embodiment of the present invention. In the embodiment shown in FIG. 121, the description of the activity is execute a right of first refusal; the additional details regarding the activity describes the number of shares, the share class, the share price, and a right of first refusal; and the requested action is an execution of the right of first refusal via a yes GUI button or a no GUI button.

Figure 122:
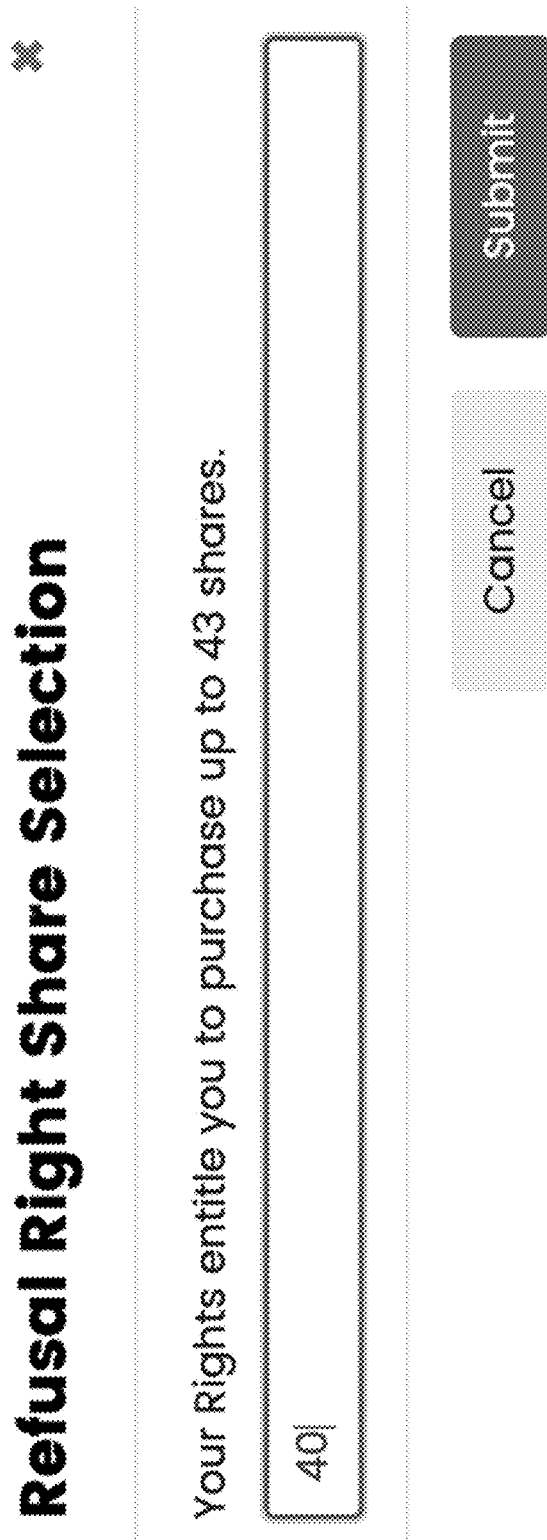

FIG. 122 illustrates a Refusal Right Share Selection GUI for a tokenized securities platform according to one embodiment of the present invention. The Refusal Right Share Selection GUI is operable to display information including, but not limited to, a number of shares the user is entitled to purchase, a text box to enter a number of shares, a cancel GUI button, and a submit GUI button. In a preferred embodiment, the platform does not allow a user to enter a number of shares in the text box that is greater than the number of shares the user is entitled to purchase.

Figure 123:
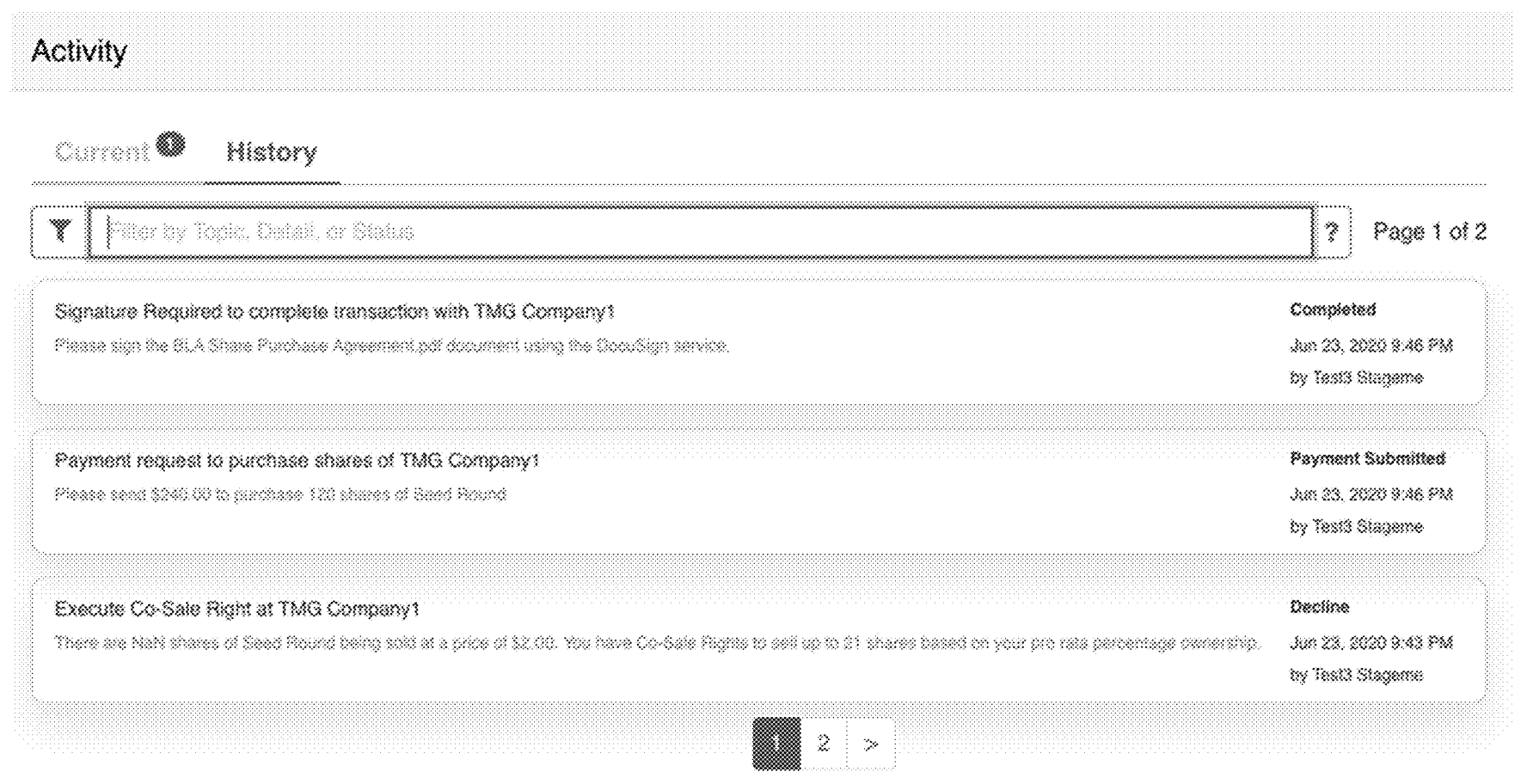

As previously described, the platform is operable to display an activity history that provides an advantageous detailed audit trail of activity that demonstrates legal compliance and exceeds SEC/FINRA rules for retention. FIG. 123 illustrates an Investor Activity History GUI for a tokenized securities platform according to one embodiment of the present invention. The Investor Activity History GUI displays information including, but not limited to, a name of at least one activity, a description of the at least one activity, a status of the at least one activity, a date of the at least one activity, a time of the at least one activity, and/or a party who completed the at least one activity. In the example shown in FIG. 123, the at least one activity includes a Signature Required to complete transaction with TMG Company 1, a Payment request to purchase shares of TMG Company1, and an Execute Co-Sale Right at TMG Company1. The description of the Signature Required to complete transaction with TMG Company1 is "Please sign the BLA Share Purchase Agreement.pdf document using the DocuSign service." In the example shown in FIG. 123, the status of the at least one activity is Completed, Payment Submitted, or Decline. Further, the Investor Activity History GUI is operable to filter by topic, detail, or status. The Investor Activity History GUI allows an investor to review all completed activities on the platform.

Figure 124:
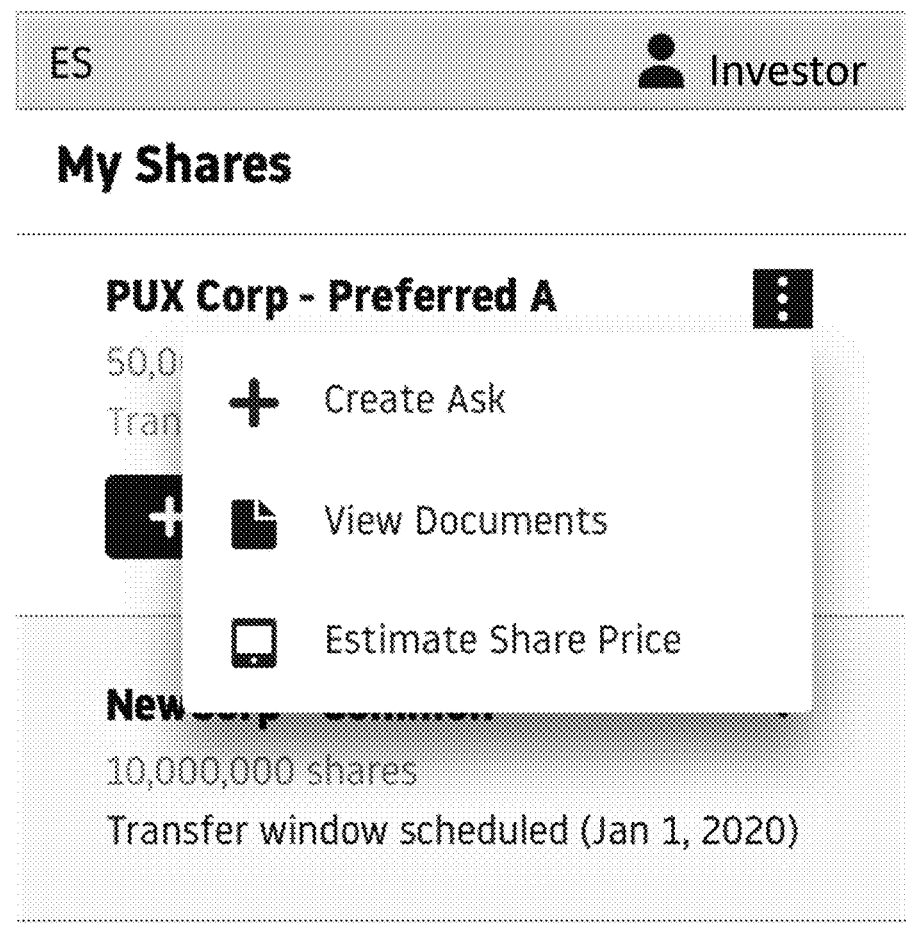

Once an investor has acquired shares from a company, the holding period has expired, and the issuer has made the shares available to be in a secondary transfer, the platform enables the investor to create an ask (i.e., sell shares) for the acquired shares. FIG. 124 illustrates a My Shares GUI for a tokenized securities platform on a mobile device according to one embodiment of the present invention. The My Shares GUI is operable to display a pop-up menu corresponding to specific shares owned by an investor. The pop-up menu provides platform functionality including but not limited to, create ask, view documents, and/or estimate share price.

Figure 125:
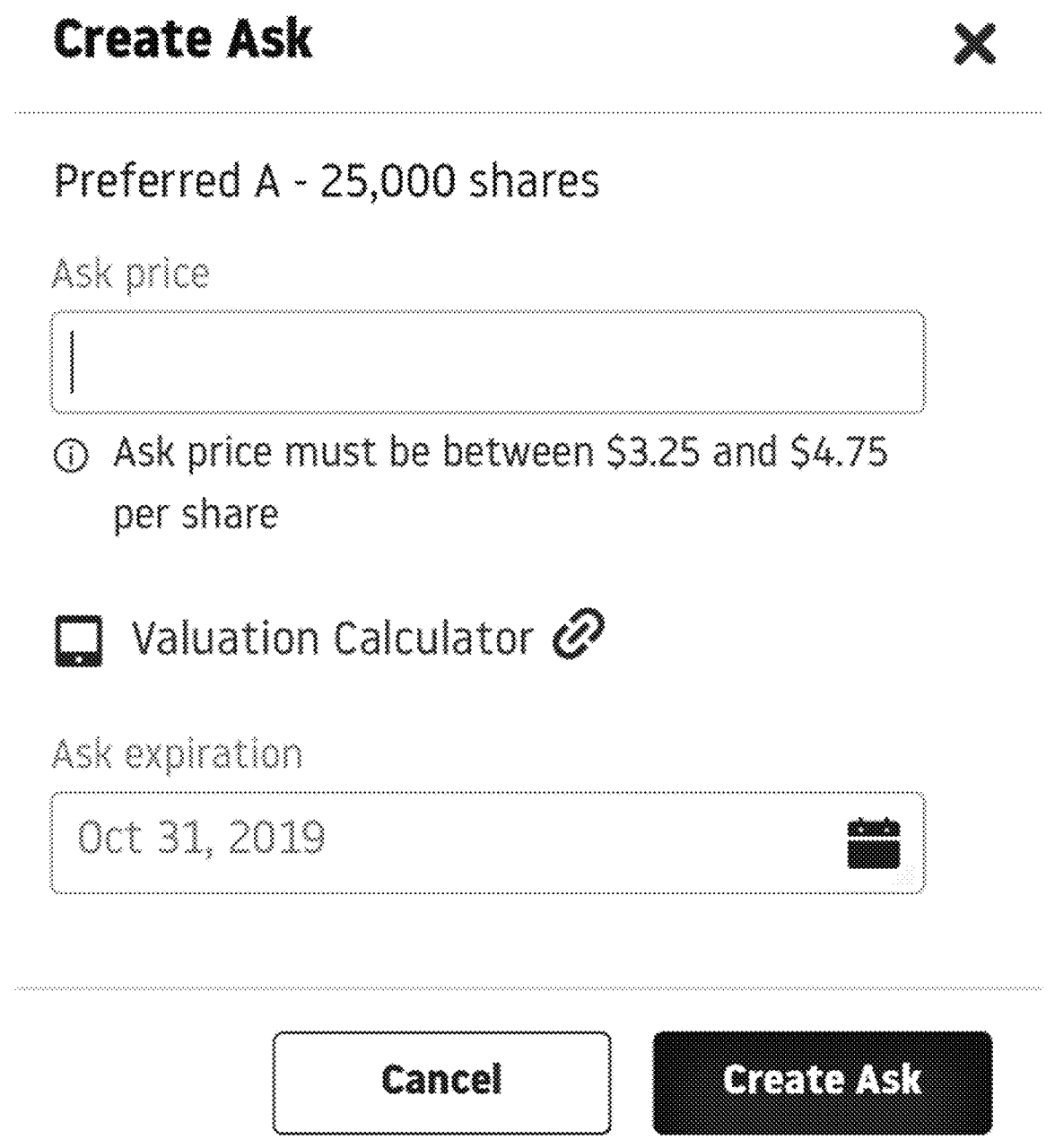

FIG. 125 illustrates a Create Ask GUI for a tokenized securities platform according to one embodiment of the present invention. The Create Ask GUI is operable to display elements including, but not limited to, a share class type, a number of shares to sell, an ask price input field, an ask price range, a legal confirmation that the owner has not entered an agreement elsewhere for the shares, banking information for receiving payment, a valuation calculator GUI button, an ask expiration date input field, a cancel GUI button, and/or a create ask GUI button. In one embodiment, the ask price range is set by a company corresponding to the specific shares for which the investor is creating an ask. Advantageously, this allows the company to control the price of the shares such that the company's shares are not overvalued or undervalued.

Figure 126:
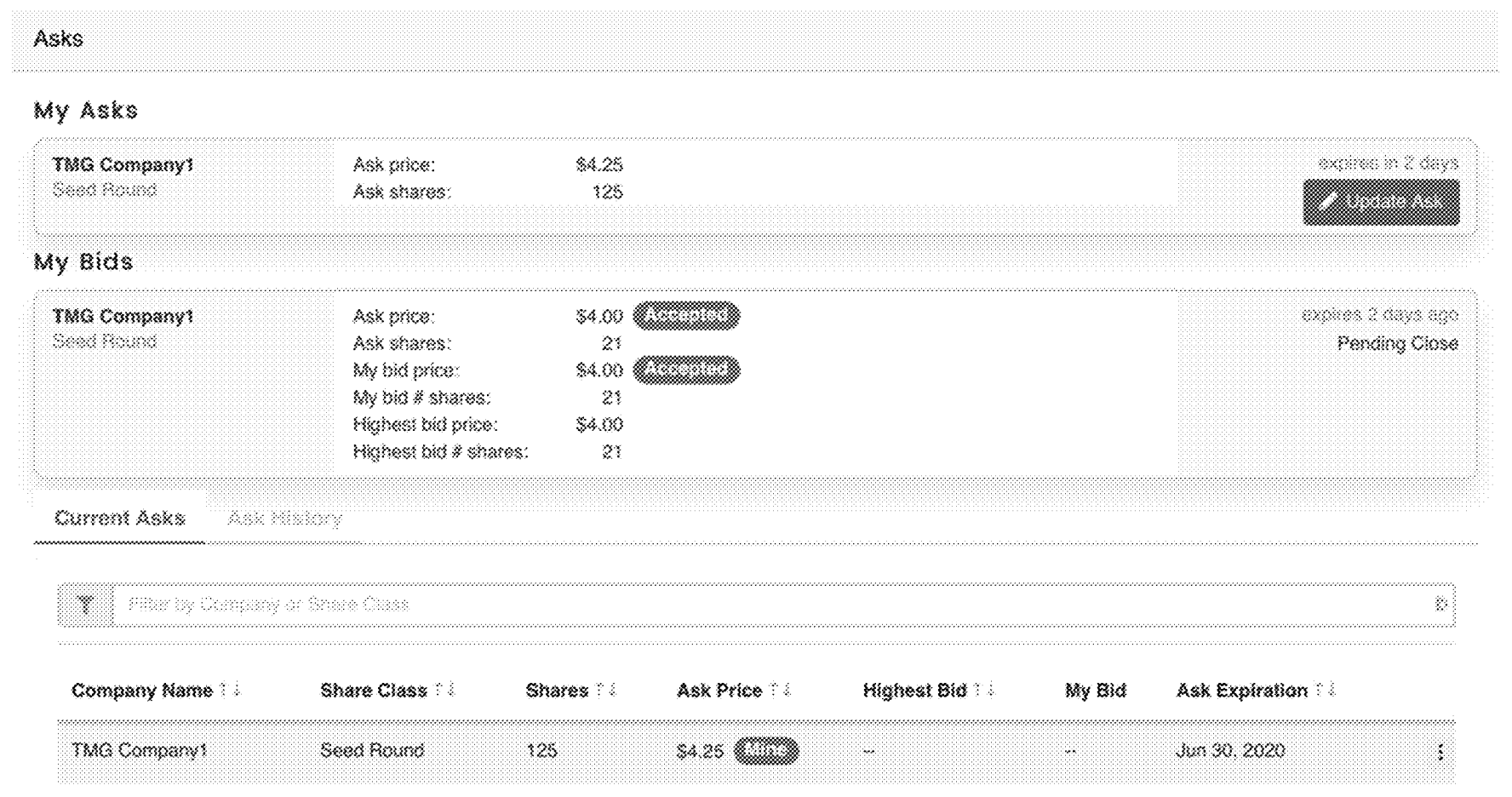

FIG. 126 illustrates an Investor Asks GUI for a tokenized securities platform according to one embodiment of the present invention. The Investor Asks GUI is operable to display any current asks or bids by the investor user, which includes, but is not limited to a company name, a company logo, a share class name, a share price, a number of shares being offered, a highest price offered, a transaction status (e.g., pending, closed). The Investor Asks GUI is also operable to display any available share class asks and bids for which an investor user has access based on visibility provided by the issuer of those shares. The available share class asks and bids are operable to be displayed as a table containing a plurality of investor asks by all investor users of companies, where each of the plurality of companies includes, but is not limited to, a company name, a company logo, a share class name, a current ask price, a current ask number of shares, an investor bid price, an investor bid share value, a highest bid price, a highest bid shares value, an updated bid GUI button, a current asks page, an ask history page, a filter by company (i.e., issuer) or share class input field, and/or a plurality of filter options. The filter options include, but are not limited to, company name, share class, shares, ask price, highest bid, investor bid, and/or ask expiration. If viewing an ask from another shareholder, the platform is operable to present the investor user with three possible actions (as a button or a menu choice): 1. Review Documents; 2. Banking; or 3. Bid. The Review Documents GUI button enables an investor user to review any documents associated with a specific share class ask. The Banking GUI button allows an investor to identify a banking account to use for funds for payments in purchasing shares. The Bid GUI button allows an investor to place a bid (see details about Make Bid GUI infra) on the selected Ask in the list. If the investor user is not the ask shareholder and has not reviewed required documents, the platform displays the Review Documents GUI button. If the investor user is not the ask shareholder and has reviewed required documents, the platform displays the Banking GUI button. If the investor user is not the ask shareholder and has both reviewed the required documents and set up their banking information, the platform displays the Bid GUI button.

Figure 127:
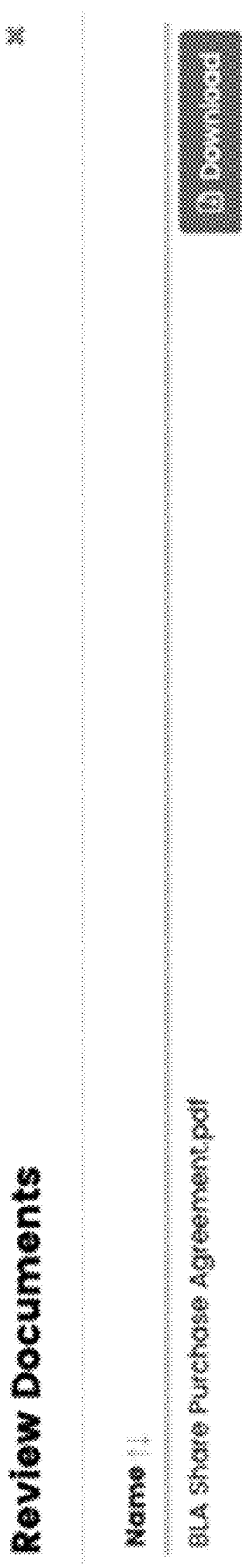

FIG. 127 illustrates a Review Documents GUI for a tokenized securities platform according to one embodiment of the present invention. The Review Documents GUI is operable to display a list of files. The list of files includes details related to at least one file including, but not limited to, at least one file name and at least one download GUI button to download the at least one file. The list of files preferably includes all documents needed to complete a transaction. In another embodiment, the Review Documents GUI includes a last modified date, a last modified by name, and/or a version number of the file. In one embodiment, the Review Documents GUI displays if a document is signature required, review required, or optional.

FIGS. 128-133 illustrate example GUIs related to bidding. Advantageously, the platform allows for investors to both buy and sell shares on the tokenized securities platform. Again, traditional platforms are not able to adapt to each company's unique bylaws, which often restricts the ability to trade shares.

FIG. 128 illustrates a Make Bid GUI for a tokenized securities platform according to one embodiment of the present invention. The Make Bid GUI is operable to display information including, but not limited to, a company name, a share class name, a number of shares up for bid, and/or an ask price. In addition, the Make Bid GUI includes a plurality of investor input fields including, but not limited to, a bid number of shares input field. The bid number of shares input field enables an investor to input a specific number of shares for which the investor wants to place a bid.

FIG. 129 illustrates a Make Bid GUI for a tokenized securities platform according to another embodiment of the present invention. The Make Bid GUI contains a plurality of investor input fields including, but not limited to, a bid number of shares input field, a bid price per share input field, and/or an expiration date input field. The bid number of shares input field enables an investor to input a specific number of shares for which the investor wants to place a bid. The bid price per share input field enables an investor to input a specific price per share that the investor wants associated with a number of desired shares. The platform is operable to set a minimum and/or maximum bid price per share. Advantageously, this allows company administrators to ensure that shares are not underpriced and/or overpriced.

FIG. 130 illustrates a Place Bid GUI for a tokenized securities platform according to one embodiment of the present invention. The Place Bid GUI is operable to indicate to investors a share class type corresponding to an ask, a share class number corresponding to an ask, an ask price, a highest bid value, and/or an expiration date. In addition, the Place Bid GUI includes a Valuation Estimator to assist in determining a bid price and/or an ask price. (The Valuation Estimator is discussed in detail below.) The Place Bid GUI further includes a plurality of investor input fields including, but not limited to, an investor bid price input field and/or a bid expiration date input field.

FIG. 131 illustrates an Investor Asks GUI for a tokenized securities platform according to yet another embodiment of the present invention. The Investor Asks GUI includes a make bid GUI button. The make bid GUI button enables an investor and/or a user to make a bid on a specified ask posted by an issuer and/or another investor.

FIG. 132 illustrates an Investor Asks GUI for a tokenized securities platform according to yet another embodiment of the present invention. The Investor Asks GUI is operable to display a pop-up notification when a bid is placed on a corresponding ask.

FIG. 133 illustrates an Investor Asks GUI for a tokenized securities platform according to yet another embodiment of the present invention. As investors place an initial bid and/or update an existing bid, the Investor Asks GUI updates in real-time or near-real-time. In addition, the Investor Asks GUI is operable to indicate when an investor's bid is the highest bid for a corresponding ask and/or indicate when an investor's bid has been accepted by the party that initially placed a corresponding ask. Moreover, the Investor Asks GUI is operable to add additional GUI buttons in real-time or near-real-time, depending on a stage of a particular ask. For example, if an ask has not expired and is still available to take bids, the Investor Ask GUI is operable to display an update bid GUI button for an investor who has placed an initial bid on the ask. In another example, if an ask has expired and an investor's bid was the highest bid and was accepted by the party that placed the ask, the Investor Ask GUI is operable to display an accept ask GUI button for the investor to accept the ask and complete the equity transaction.

In one embodiment, the issuer related to the shares is required to review the equity transaction (i.e., review the sellers, the buyers, and terms of the transaction) and approve the equity transaction before shares are transferred from the seller to the buyer.

FIG. 134 illustrates an Accept Bid GUI for a tokenized securities platform according to one embodiment of the present invention. The Accept Bid GUI is operable to display information corresponding to a specific ask including, but not limited to, a company name, a share class, a number of shares, an ask price, and/or information regarding existing bids. The information regarding existing bids includes, but is not limited to, a bid number of shares, a bid price, and an expiration date. In addition, the Accept Bid GUI includes a cancel GUI button and/or an accept bid GUI button. The cancel GUI button is operable to close the Accept Bid GUI. The accept bid GUI button is operable to allow a seller to accept the specific bid for a buyer.

FIG. 135 illustrates an Accept Ask GUI for a tokenized securities platform according to one embodiment of the present invention. The Accept Ask GUI is operable to display information corresponding to a specific ask including, but not limited to, a company name, a share class, a number of shares, an accepted bid price, and/or an expiration date. In addition, the Accept Ask GUI includes a cancel GUI button and/or an accept ask GUI button. The cancel GUI button is operable to close the Accept Ask GUI. The accept ask GUI button is operable to allow a buyer to accept the specific ask from the seller. If the equity transaction is approved by the issuer, the buyer will be notified that at least one document is ready for the buyer to review and/or sign. In addition, the buyer is notified that the next step requires the buyer to remit payment.

The bid and ask process is operable to include a purchase agreement and/or other legal documents required to change ownership from one owner to another. A purchase agreement is an example of a document that is added to a data room (as detailed above), approved to be used in a set of transactions during a transfer window, and processed by the platform based on who should sign it (e.g., buyer, seller, company administrator). In one embodiment, a buyer is unable to see details in the purchase agreement related to seller(s) (e.g., seller name, seller signature) and/or other buyer(s) and a seller is unable to see details in the purchase agreement related to buyer(s) (e.g., buyer name, buyer signature) and/or other seller(s), while all signatures are included in a complete document for the issuer's records. Advantageously, the platform allows for various visibility of data and signatures among the parties within a transaction to protect privacy and maintain anonymity. FIGS. 136-138 provide examples related to the purchase agreement.

FIG. 136 illustrates an example of a Share Purchase Agreement for a tokenized securities platform according to one embodiment of the present invention. The platform is operable to automatically enter information into a document (e.g., Share Purchase Agreement) including, but not limited to, a number of shares, a price per share, a total price, at least one fee, any taxes, a buyer name, a seller name, and/or a company name. In one embodiment, the platform is also operable to attach a second document to a first document. For example, the platform is operable to attach the Company's Limited Liability Company Agreement as Exhibit B.

FIGS. 137-139 illustrate signature pages for a document (e.g., sale of shares from a seller to a buyer). FIG. 137 illustrates a buyer signature page according to one embodiment of the present invention. The buyer signature page includes, but is not limited to, a buyer signature, a buyer name, a date signed, a number of shares, a price per share, a share cost, fees, and/or a total cost. FIG. 138 illustrates a seller signature page according to one embodiment of the present invention. The seller signature page includes, but is not limited to, a seller signature, a seller name, a date signed, a number of shares, a price per share, a share cost, fees, taxes, and/or a receipt amount. FIG. 139 illustrates a company (i.e., issuer) signature page according to one embodiment of the present invention. The buyer signature page includes, but is not limited to, a company representative signature, a company representative name, a title, a company name, and/or a date signed. In a preferred embodiment, the platform allows both the buyer and the seller to remain anonymous to each other.

Moreover, the platform is operable to issue fees to participating users. In one embodiment, fees are attached to dynamic groups. Thus, fees are attached to buyer and/or seller groups with fee collections implemented at each of the transfer steps. The platform then automatically pays the fees to brokers, agents, and/or other recipients.

Moreover, the platform is operable to withhold taxes for issuers. In one embodiment, taxes are calculated based on a type of transaction, a type of share class, and/or a location (for local and State taxes). For example, if employee stock options are converted to underlying common shares and sold, the returns between the basis and the sale price (the income to the employee) from the sale is a taxable event and can be treated similarly to a bonus for employee withholding tax purposes. Meaning, depending on the number of years the employee stock options were held, the amount of income gain, and the type of options (e.g., incentive, or non-qualifying), the platform is operable to calculate tax at the capital gains rate or ordinary income rate with the dollar amount provided to the issuer (along with the strike price in the transaction) for withholding purposes.

FIG. 140 illustrates a flow diagram for a money flow on a securities tokenization platform according to one embodiment of the present invention. At least one buyer with a corresponding at least one buyer's account (e.g., checking or savings account) sends a payment to an escrow account. The money is held in the escrow account until the closing is ready either as indicated by the issuer or determined by the platform. The money is then automatically released by the platform (assuming all conditions have been met). Once triggered, part of the payment is sent from the escrow account to an issuer's account (i.e., similar to a receivable/ accounts payable (AR/AP) account) for fees and/or taxes. If any brokers are participating in the transaction (not listed in FIG. 140), then part of the payment will go to pay their commissions (based on buyer's broker, seller's broker, or both). The remainder of the payment goes to the bank account (e.g., check or savings account) of the seller(s). Additionally, the platform invoices the issuer to remit payment for services rendered. The tokenized securities platform orchestrates transferring funds between Member Banks using the Automated Clearing House (ACH) Network for multiple parties throughout the lifecycle of a transaction. The lifecycle of the transaction includes, but is not limited to, payment initiation from all buyers, transfer of all monies collected to pay fees, taxes, and/or commissions in closing, payment to seller(s) for the shares acquired, and/or return of all funds from where the funds were distributed (e.g., seller's account) back to the buyer(s) if the closing is voided.

Furthermore, the present invention supports at least four Bid-Ask Models as shown in FIGS. 141-144. Bid-Ask Models relate to how a seller and buyer interact with one another on the tokenized securities platform.

FIG. 141 illustrates a flow diagram of a "House" Bid-Ask Model according to one embodiment of the present invention. In the House Bid-Ask Model a seller initially posts at least one ask. A buyer is able to respond to the at least one ask with at least one posted bid. The seller is then able to either accept or deny the at least one posted bid by the buyer(s). Once the seller accepts the at least one posted bid, the buyer is provided an opportunity to accept the at least one ask. Upon both the seller accepting the at least one posted bid and the buyer accepting the at least one ask, the process ends the bidding step.

FIG. 142 illustrates a flow diagram of a "Price Matcher" Bid-Ask Model according to one embodiment of the present invention. In the Price Matcher Bid-Ask Model, a seller initially posts at least one ask with an associated ask price. A buyer is able to respond to the at least one ask with at least one posted bid with at least one posted bid price. The seller is then prompted to accept the at least one posted bid from the buyer(s). If the seller accepts at least one posted bid and the at least one posted bid price is equal to the ask price, the bidding step ends.

FIG. 143 illustrates a flow diagram of a "Highest Bid" Bid-Ask Model according to one embodiment of the present invention. In the Highest Bid Bid-Ask Model, a seller initially posts at least one ask with a corresponding ask price. In addition, the seller is able to set up an expiration date corresponding to the at least one ask. A buyer is able to respond to the at least one ask with at least one posted bid with at least one bid price. The bidding completes if one of two conditions occur. If the seller accepts the at least one posted bid from the buyer, the bidding completes. Otherwise, the bidding will only complete once the expiration date has passed, where the buyer with the highest bid is the winning or selected buyer.

FIG. 144 illustrates a flow diagram of a "Match Expire" Bid-Ask Model according to one embodiment of the present invention. In the Match Expire Bid-Ask Model, a seller initially posts at least one ask with a corresponding ask price. In addition, the seller is able to set an expiration date corresponding to the at least one ask. A buyer is then able to respond to the at least one ask with at least one posted bid, where the at least one posted bid includes a bid price. At this time, the transaction will only complete bidding if one of two events occur. First, if the seller accepts the at least one posted bid before the expiration date, the transaction will complete bidding with the seller and the buyer associated with the at least one posted bid. Otherwise, the transaction will only complete bidding once the expiration date corresponding to the at least one ask has passed and there is at least one posted bid where the corresponding bid price is greater than or equal to the at least on ask price corresponding to the at least one ask.

Current methods of estimating share prices for non-public companies (issuers with restricted shares) rely on investors performing their own calculations and estimations, typically performed by hand or using multiple platforms to generate a single model. In traditional marketplaces, the price of restricted shares is generally not well-known. Moreover, most of the individuals making the actual buying decisions do not have access to key information such as how many fully diluted shares a company has in its capitalization table.

The platform of the present invention solves these issues by providing a Valuation Estimator, operable to incorporate share ownership, transaction statistics, and other share data (e.g., conversion rates between preferred stock and common stock) to provide share price ranges based on an investor's confidence level. This eliminates the need for investors to perform complex calculations by hand or using additional software platforms in order to produce a single share price for various share classes. As pricing in traditional marketplaces is difficult, the Valuation Estimator ensures that buyers and/or sellers understand pricing information based on their own confidence levels. Furthermore, traditional marketplaces fail to provide this type of contextual information, lack the ability to apply share and/or market statistics at intervals, and are unable to provide users with visual representations of these values. Examples of a Valuation Estimator are shown in FIGS. 145-147.

FIG. 145 illustrates a Valuation Estimator GUI for a tokenized securities platform according to one embodiment of the present invention. The Valuation Estimator GUI is operable to determine an estimated share price (e.g., bidding price relating to an ask). The platform is operable to search for a company and display a particular share class that the company is offering. In addition, the Valuation Estimator GUI creates an estimated price model using a share class quantity value. Furthermore, the Valuation Estimator GUI includes input fields for a current valuation, a future valuation, a time frame, a current confidence level, and/or a future confidence level, all of which are used to generate the estimated price model. In one embodiment, the Valuation Estimator GUI displays the estimated price model as a two-dimensional (2D) graph, using a time period for the x-axis and dollar value for the y-axis. In another embodiment, the estimated price model is displayed as a three-dimensional (3D) graph. The estimated price model displays an estimated current price, where the estimated current price is based on the current valuation and the current confidence level. In addition, the estimated price model displays an estimated future price, where the estimated future price is based on the future valuation and the future confidence level, In one embodiment, the estimated current price and the estimated future price are displayed as a range of prices, where the range is determined based on the corresponding confidence levels entered into the platform. In one embodiment, the Valuation Estimator GUI further includes a table containing a plurality of share information, where each of the plurality of share information includes, but is not limited to, a share class type, a number of shares, and/or a percent of total value. In another embodiment, the platform is operable to allow selection of a plurality different share classes a company has available using a share class GUI drop-down list. In another embodiment, the current confidence level, the future confidence level, and the time frame are GUI sliders. In yet another embodiment, the estimated price model is operable to update in real-time or near-real-time when any of the aforementioned values used to create the estimated price is modified.

FIG. 146 illustrates a Valuation Estimator GUI for a tokenized securities platform on a mobile device according to one embodiment of the present invention. The Valuation Estimator GUI is operable to adjust its display characteristics when the platform is used on a mobile device (e.g., smartphone, tablet). The Valuation Estimator GUI is operable to display a plurality of input fields including, but not limited to, a company name input field, a share class input field, a share class quantity input field, a current valuation, a future valuation, and/or a time frame. The platform is operable to create an estimated price model using the plurality of input fields when an estimate share price GUI button is selected. In one embodiment, the company name input field is a GUI drop-down list with a plurality of selectable company names. In another embodiment, the share class input field is a GUI drop-down list with a plurality of selectable share classes.

FIG. 147 illustrates a Valuation Estimator GUI for a tokenized securities platform on a mobile device according to another embodiment of the present invention. The platform is operable to display an estimated price model based on a plurality of input fields including, but not limited to, a company name input field, a share class input field, a share class quantity input field, a current valuation, a future valuation, and/or a time frame, using the Valuation Estimator GUI. The estimated price model is displayed on the mobile device, where the estimated price model displays elements including, but not limited to, a current price range, a current confidence level, a future price range, a future confidence level, and/or a time frame. In one embodiment, the future confidence level is displayed as GUI slider operable for real-time adjustment. In one embodiment, the time frame is displayed as a GUI slider, where the time frame is operable for real-time adjustment.

The platform is preferably operable to track vesting of shares. The Investor Vesting Schedule is operable to display the amount of a security that has been vested and the amount remaining to be vested on a time scale to administrators and/or investors. The platform allows administrators to set up a plurality of schedules that are then applied to individuals who own vesting securities. Additionally, the present invention also allows the creating of custom vesting schedules by issuers for a holder of a vesting security. The platform maintains a real-time schedule of vested and pending amounts and is operable to recalculate new schedules with any changes to a schedule and as time lapses. The platform provides GUIs for both investors and administrators.

FIG. 148 illustrates an Investor Vesting Schedule GUI for a tokenized securities platform according to one embodiment of the present invention. The Investor Vesting Schedule GUI is operable to display a vesting schedule corresponding to a specific company and share class. The Investor Vesting Schedule GUI is operable to display elements including, but not limited to, a company name, a share class type, a current transfer window expiration date, a vested to date share value, a total available share value, a vesting schedule graph, and/or a table containing a plurality of vesting frequencies. Each of the plurality of vesting frequencies includes a frequency rate, a start date, an end date, a number of shares, and/or a total vesting percentage. The vesting schedule graph is operable to distinguish between currently vested shares and shares not currently vested. In one embodiment, the vesting schedule graph is a 2D bar graph, where each bar corresponds to a specific date, a share number, and/or a share percentage. In one embodiment, the vesting schedule graph is a 2D graph other than a bar graph. In another embodiment, the vesting schedule graph is a 3D graph.

The platform enables the conversion of a first type of security class to a second type of security class (or converted to cash). Examples include, but are not limited to, a convertible debenture (debt) converted to common stock or cash, preferred shares converted to common shares, options converted to common stock, and/or warrants converted to preferred stock. After conversion, these shares are then operable to be transferred on the platform (e.g., via secondary transfer, aggregate sale). Example GUIs related to the conversion process are shown in FIGS. 149-154.

Additionally, the platform enables both conversion from a first type of share class to second type of share class and the ability to sell the second type of share class that results in a single request. FIG. 149 illustrates a Convert or Sell Options GUI for a tokenized securities platform according to one embodiment of the present invention. The Convert or Sell Options GUI enables input of a quantity of shares to convert and provides information relating to the quantity of shares. In one embodiment, the Convert or Sell Options GUI is operable to display, a share class type, a vested options value, a conversation ratio, a shares-after-conversion value, a strike price, and/or a payment due. In addition, the Convert or Sell Options GUI is operable to enable selection of either a sell options preference, where payment is automatically deducted at the time of a completed sale and shares are transferred to a buyers as per a shareholder agreement, or a convert options preference, where payment is due immediately and upon processing the payment, the investor will own the quantity of the shares input by the investor with any rights associated with the shares as outlined in accordance with a shareholder agreement.

Additionally, the platform enables convertible securities to have these conversion properties: 1) a party that triggers conversion (e.g., issuing entity, the securities owner); 2) a trigger event (e.g., qualified financing, non-qualified financing, maturity date, 'anytime', liquidation); 3) at least one conversion option (e.g., converts into cash or another security, conversion ratio, conversion price); and/or 4) a party that selects one of the at least one conversion option.

The platform also enables conversion into a securities class to be created in the future. For example, a convertible note is operable to convert into the next qualified round of financing, even if the share class for the next round has not been determined at the time the convertible note is created.

The platform enables securities conversion based on transactional events. Meaning, a conversion does not always require a party to trigger conversion. In one embodiment, the conversion is automatically triggered by a trigger event alone. For example, an option may automatically convert to a common share in the trigger event of a change in ownership (e.g., new issuance which causes an ownership change).

FIG. 150 illustrates a Convert Note GUI for a tokenized securities platform according to one embodiment of the present invention. The Convert Note GUI enables an investor to select one of three processes: (1) convert to shares, (2) reinvest principal with interest, or (3) other conversion method. Essentially, the conversion provides a dollar value to the holder that can be used to buy other shares or set the purchase amount whereby the issuer buys the convertible from the holder. In addition, the Convert Note GUI is operable to display a share class type, an initial investment value, an investment with interest value, a company valuation, a share price, a discount, and/or a shares-after-conversion value. Furthermore, the Convert Note GUI includes a quantity to convert input field, a cancel GUI button, and/or a convert note GUI button. In one embodiment, the quantity to convert is measured in terms of price. The cancel GUI button is operable to close the Convert Note GUI. The convert note GUI button uses the quantity to convert input field and converts the note using the quantity to convert.

FIG. 151 illustrates a Convert Options GUI for a tokenized securities platform according to one embodiment of the present invention. Essentially, the holder can convert the options into another share class by paying the strike price to the issuer. The Convert Options GUI enables a quantity of shares to convert to be specified and a payment corresponding to a payment due value to be made. In addition, the Convert Options GUI is operable to display a share class type, a vested options value, a quantity to convert value, a conversion ratio, a shares-after-conversion value, a strike price, and/or a payment due. In one embodiment, the quantity to convert is automatically entered by the platform. In one embodiment, the platform is operable to enter the quantity to convert via user input.

FIG. 152 illustrates a Convert Restricted Stock Units GUI for a tokenized securities platform according to one embodiment of the present invention. Essentially, the conversion of Restricted Stock removes the restrictions, which can include terms for resale, voting, or other limitations. The Convert Restricted Stock Units GUI is operable to display elements including, but not limited to, a share class type, a vested restricted stock unit (RSU) value, a quantity to convert value, a conversion ratio, and/or a shares-after-conversion value. In one embodiment, the quantity to convert value is input by an investor.

FIG. 153 illustrates a Convert Warrants GUI for a tokenized securities platform according to one embodiment of the present invention. Essentially, the conversion of a warrant enables the holder to pay a specific strike price to the issuer to have an ownership interest in another share class. The Convert Warrants GUI enables a payment to be made once a specified number of shares has been input to convert. The Convert Warrants GUI is operable to display information including, but not limited to, a share class type, a warrants value, a quantity to convert value, a conversion ratio, a shares-after-conversion value, a strike price, and/or a payment due. In one embodiment, the quantity to convert value is input by the investor.

FIG. 154 illustrates a Convertibles Menu GUI for a tokenized securities platform according to one embodiment of the present invention. The Convertibles Menu GUI is operable to display information relating to an investor's shares, options, warrants, RSUs, and/or convertible notes. The information includes a plurality of companies, where each of the plurality of companies includes, but is not limited to, a company name, a share type, a ratio, a quantity, a strike price, an expiration, an investor action, a transfer window, a status, a principal amount, an interest rate, a discount, and/or a threshold. The Convertibles Menu GUI displays all equity transactions related to an investor in a single location.

Third Parties

The platform stores both transactional and non-transactional data for regulatory reporting purposes, activity tracking, and analysis. Many investors rely on third parties to make investment decisions whether it is in the form of investing advice or analysis of issuer's performance. These third parties rely on accurate data to properly advise clients or make general recommendations about issuers. The platform, with its immutable ledger, enables third parties to trust that the information has not been tampered with or otherwise altered. The platform enables third parties (e.g., Broker/Dealers) to both maintain and subscribe to information in the platform. Meaning, they both generate data for others as well as obtain data from others. This symbiotic relationship of users and the system creates improved information flow across all constituencies of the platform.

One type of Service User (i.e., third party user) of the platform is a Back-Office provider. Back Office providers include, but are not limited to, Broker/Dealers and Valuation Experts. For Broker/Dealers, their back-office needs are to track activity for reporting to FINRA and to track commissions for tax purposes. The tokenized securities platform provides all transactional history including, but not limited to, exact details of timing, participants, payments, issuers, securities, and/or documented approval authorizations to meet those requirements. For Back Office providers for Issuers, one of the main services is 409A valuations. A 409A valuation is basically an independent evaluation of the value of an issuer's securities which then defines the value of the issuer's entity itself. Any recent sales of an issuer's securities inform the valuation, and the platform has that transactional data as well as the ownership information of shares to be used in valuation calculations.

Another Service User of the platform is Securities Lawyers. Securities Lawyers are interested in verifying the compliance of Bylaws or Operating Agreements of issuing entities is maintained in deals. The platform enables the capture of the bylaws and operating agreement securities rules (e.g., rules covering Transfer Windows) as well as records the execution of those rules. Thus, it is a simple matter to review the execution of the rules to know that they have been followed. For example, if a shareholder approval by a certain class of stock is required for a sale by one of its owners, the platform will record the approvals/disapprovals and only allow the sale to proceed if approved. The tokenized securities platform allows a Securities Lawyer to review a vote of approval or disapproval of the sale by each shareholder, a time of the approval or the disapproval by each shareholder, and/or a subsequent initiation of the sale in the records. The platform also records if no action was taken within a certain time period. For example, the platform records if one of the shareholders who was asked to approve or disapprove did not respond within the timeframe allowed (e.g., 7 days) in the bylaws. Additionally, the platform allows a Securities Lawyer to view which securities documents were sent to each participant to ensure that all required securities documents were viewed and/or processed by participants. The tokenized securities platform uses data rooms to store the documents, and when those documents are used, it records a name of a participant who interacted (e.g., viewed, downloaded, acknowledged, signed) with the documents, when each interaction took place (e.g., a timestamp for viewing, a timestamp for downloading, a timestamp for acknowledging, a timestamp for signing), and/or provides electronic copies of all actioned documents.

Another Service User of the platform is a Data Analytics Provider. Data Analytics Providers provide issuers and investors trends or unique observations about broad categories in the marketplace. For example, Data Analytics Providers provide data that compares valuations and stock prices of different industries. This data is used to help investors understand how macro issues are affecting performance of specific issuers or to help issuers understand what valuations are reasonable for their entity. The platform provides Data Analytics Providers anonymized, accurate, transactional data on a near real-time basis. This transactional data includes, but is not limited to, pricing, timing, industry classification, share classification, issuer stage of growth, and/or rounded issuer market capitalization.

The tokenized securities platform further supports a plurality of modeling workflows including, but not limited to, a modeling workflow for advisors, a modeling workflow for brokers, and/or a modeling workflow for managers of brokers. Examples of the plurality of modeling workflows are shown in FIGS. 155-157. The various advisors, brokers, and managers of brokers interact using these modeling workflows when performing operations on the tokenized securities platform of the present invention. Moreover, managers of brokers are operable to view and/or participate in the modeling workflow for brokers, wherein the ability to view and/or participate is dependent upon which brokers the manager is associated with.

FIG. 155 illustrates a modeling workflow for advisors according to one embodiment of the present invention. The modeling workflow for advisors corresponds to the Company Sell side of the platform. First, the platform requires an advisor to log in to the platform. Once the advisor (i.e., broker) has logged in, the platform requires that the advisor complete any necessary platform registration requirements. After the advisor has completed the platform registration requirements, the platform enables the advisor to view reporting documents and company lists. Company lists include administrative details corresponding to a specific company. Furthermore, advisors are able to create liquidity events, create new transfer windows, and/or view other company administrative details that the advisor has been granted permission to view while looking at the company lists present on the platform.

FIG. 156 illustrates a modeling workflow for brokers according to one embodiment of the present invention. The modeling workflow for brokers corresponds to the Investor Buy/Sell side of the platform. First, the platform requires a broker to log in to the platform. Upon logging in, the platform prompts the broker to complete any outstanding platform registration requirements and/or setup processes. The platform enables the broker to view their corresponding broker profile, broker documents, broker deals, and/or broker clients. When viewing broker documents, the platform enables the broker to view additional details corresponding to each and every document listed. In addition, the platform enables the broker to upload new documents, send a document that requires a signature to another user (e.g., a potential investor customer), and/or archive existing documents. For example, before a broker can initiate a transaction with a customer, the broker may need to get an investor to sign New Account form to meet regulatory requirements. When viewing broker deals, the platform provides the broker with basic share details corresponding to every deal, the ability to prepare a "Price Plus" deal, and/or recommend new deals for the broker. A Price Plus deal adds a broker commission fee in addition to the ask price (seller's price), with the broker's buying customer only seeing a price on the platform that includes the commission. Moreover, the platform enables the broker to view all of the broker's active deals. Active deals include, but are not limited to, in-progress deals, deals requiring the placing of a bid, and/or deals requiring the acceptance of a bid. Deals that are no longer active are considered "closed." Closed deals proceed with the signing and sharing of any necessary documentation, resulting in payment to and/or from parties associated with the deal. When viewing broker clients, the platform presents the broker with a list of companies and/or individuals registered as clients with the broker. In addition, the platform further enables the broker to view specific details corresponding to each company that is registered as a client of the broker. The platform further enables the broker to invite new clients to the platform.

FIG. 157 illustrates a modeling workflow for a broker's manager according to one embodiment of the present invention. First, the platform requires a manager to log in. Once successfully logged in, the platform prompts the manager to complete any outstanding platform registration requirements. Upon completing all of the platform registration requirements, the platform enables the manager to participate in reporting processes, manage the manager's corresponding broker roster, and/or view all of the brokers that the manager is associated with. When viewing all of the brokers that the manager is associated with, the manager has access to the modeling workflow for brokers processes and/or functionalities.

FIGS. 158-159 are example GUIs for an Advisor. An Advisor is a licensed broker/dealer who advises potential investment decisions in addition to facilitating transactions with potential buyers and sellers. The distinction is made in the platform because there are different regulatory reporting requirements when advice is given versus when it is not. FIG. 158 illustrates an Advisor Client List GUI for an Advisor screen according to one embodiment of the present invention. The Advisor Client List GUI includes, but is not limited to, a list (e.g., scrollable list) containing a plurality of clients, a search input field, a business industry drop-down box, an Import Clients GUI button, an Invite a Client GUI Button, a Filter Reset GUI button, and/or an Apply Filter GUI Button. The list containing the plurality of clients further includes client information corresponding to each of the plurality of clients. Client information includes, but is not limited to, a client name, a client address, a client phone number, a client business industry, an industry classification, and/or a client image. In a preferred embodiment, the industry drop-down box includes all of the industries currently listed within the list containing the plurality of clients.

The Advisor Client List GUI is further operable for filtering using the search input field and/or the business industry drop-down box.

FIG. 159 illustrates an Advisor Client Detail GUI according to one embodiment of the present invention. The Advisor Client Detail GUI includes, but is not limited to, a client name, a client address, a client phone number, a client business industry, an industry classification, a Create Liquidity GUI button, a Create a Transfer Window GUI button, and/or a client activity table. The Advisor Client Detail GUI enables the platform to store and/or display client data efficiently. In addition, the client activity table is operable to display a table of client history information, client payment information, and/or client documents. In one embodiment, the client activity table includes, but is not limited to, a company name, a share class, a number of shares, a closing price, a closing date, a buyer, and/or a seller.

FIGS. 160-167 are example GUIs for a Broker. FIG. 160 illustrates a Broker Client List GUI for a Broker screen according to one embodiment of the present invention. The Broker Client List GUI includes, but is not limited to, a list (e.g., scrollable list) containing a plurality of clients, a search input field, a business industry drop-down box, a Request a Company GUI button, an Import Clients GUI button, an Invite a Client GUI Button, a Filter Reset GUI button, and/or an Apply Filter GUI Button. The scrollable list containing a plurality of clients further includes client information corresponding to each of the plurality of clients. Client information includes, but is not limited to, a client name, a client address, a client phone number, a client business industry, an industry classification, and/or a client image. In a preferred embodiment, the industry drop-down box includes all of the industries currently listed within the scrollable list containing the plurality of clients. The Broker Client List GUI is further operable for filtering using the search input field and/or the business industry drop-down box.

FIG. 161 illustrates a Broker Client Detail GUI according to one embodiment of the present invention. The Broker Client Detail GUI includes, but is not limited to, a client name, a client address, a client phone number, a client business industry, an industry classification, an Active Deals GUI, and/or a client activity table. The Active Deals GUI is operable to indicate deals in which a client is currently participating, as well as a status corresponding to each client deal (e.g., active, inactive, etc.). The Active Deals GUI includes, but is not limited to, a company name, a company image, a funding round indicator, a share class, a number of shares, a total number of company shares, a current ask price, a current company valuation, a closing price, a closing date, and/or a transfer window end date. Advantageously, the Broker Client Detail GUI enables brokers to view client details for every active deal a specific client is participating in. In one embodiment, the Active Deals GUI is updated in real time or near-real time.

FIG. 162 illustrates an Invite New Client GUI according to one embodiment of the present invention. The Invite New Client GUI enables a broker to invite a prospective client to see a list of companies that the broker and/or the prospective client have a relationship with in order to broker future deals. The Invite New Client GUI includes, but is not limited to, a prospective client name input field, a prospective client email address input field, a Cancel GUI button, and/or an Invite GUI button.

FIG. 163 illustrates a Broker Deals GUI according to one embodiment of the present invention. The Broker Deals GUI provides a single location for a broker to view all of their corresponding deals. The Broker Deals GUI includes, but is not limited to, a list containing a plurality of deals, an Active deal status checkbox, an Open deal status checkbox, a Closed deal status checkbox, a company input field, a stock type drop-down box, an ask price minimum range value, an ask price maximum range value, a Reset Filter GUI button, and/or an Apply Filter. Each of the deals within the list containing a plurality of deals includes, but is not limited to, a company name, a funding round, a stock type, a total number of shares, a company image, a current ask price, a current valuation price, a transfer window end date, and/or a deal status indicator. Unlike traditional marketplace platforms, the tokenized securities platform of the present invention enables a broker to easily locate and/or search through all of the deals the broker is currently associated with. In addition, the platform provides a plurality of filtering options, enabling the broker to quickly and efficiently locate a specific deal. Moreover, the Broker Deals GUI is operable for filtering using the Active deal status checkbox, the Open deal status checkbox, the Closed deal status checkbox, the company input field, the stock type drop-down box, the ask price minimum range value, the ask price maximum range value, and/or any combinations thereof.

FIG. 164 illustrates a Deal Status GUI according to one embodiment of the present invention. The Deal Status GUI includes, but is not limited to, a company name, a funding round, a stock type, a total number of company shares, a current ask price, a current valuation price, a transfer window end date, a deal status indicator, a Place Bid GUI button, and/or an Invite GUI button. The Deal Status GUI is operable to indicate, in real time or near-real time, a status for every deal a client is participating in. Example statuses include, but are not limited to, active, inactive, open, closed, and/or paused.

FIG. 165 illustrates an Invite Clients to This Deal GUI according to one embodiment of the present invention. The Invite Clients to This Deal GUI enables a broker, and/or other users, to invite prospective and/or current clients to take part in a new deal. The Invite Clients to This Deal GUI includes, but is not limited to, a search input field, a business industry drop-down box, a Reset Filter GUI button, an Apply Filter GUI button, a list containing a plurality of prospective clients, a selection indicator for each of the plurality of prospective clients, and/or a Send Invites GUI button. The list containing the plurality of prospective clients includes information related to each of the plurality of prospective clients including, but not limited to, a prospective client name, a prospective client address, a prospective client phone number, a business industry, an industry classification, and/or a prospective client email address. Advantageously, the tokenized securities platform of the present invention is operable to provide detailed information for a plurality of prospective clients, where the detailed information is operable to be filtered and/or searched through using custom input terms and/or the business industry drop-down box. In one embodiment, the business industry drop-down box is populated with industries corresponding to those within the list containing the plurality of prospective clients.

FIG. 166 illustrates an Invite Sent pop-up GUI for a Broker Detail GUI according to one embodiment of the present invention. A broker selects at least one client to send an invite to, and the invite is sent to the at least one client after selecting an Invite Clients GUI button. Simultaneously, the platform is operable to indicate, via the Invite Sent pop-up GUI, that the invite was successfully sent to the at least one client.

FIG. 167 illustrates a Broker Documents GUI according to one embodiment of the present invention. The Broker Documents GUI includes, but is not limited to, a table containing a plurality of documents, a search input field, a visibility groups input field, a deal status drop-down box, a Reset Filter GUI button, and/or an Apply Filter GUI button. Each of the plurality of documents includes, but is not limited to, a file name, a file size, a visibility groups indicator, and/or a deal status indicator. Advantageously, the Broker Documents GUI provides a single location where a broker is able to view any and all documents associated with deals in which the broker is a participant. In one embodiment, the deal status drop-down box is created and/or populated using the deal status indicators corresponding to each of the plurality of documents. The Broker Documents GUI is further operable for filtering using the search input field, the visibility groups input field, the deal status drop-down box, and/or any combination thereof.

FIGS. 168-171 are example GUIs for a Broker Administrator. FIG. 168 illustrates a Broker Administrator Employee Roster GUI according to one embodiment of the present invention. The Broker Administrator Employee Roster GUI provides a broker administrator with a quick and/or efficient means of viewing employee information for a given company. The Broker Administrator Employee Roster GUI includes, but is not limited to, a table containing a plurality of employees, a search input field, a FINRA Central Registration Depository (CRD) ID #input field, a Reset Filter GUI button, and/or an Apply Filter GUI button. The table containing the plurality of employees includes information related to each of the plurality of employees including, but not limited to, an employee name, an employee position, an employee FINRA CRD ID #, an employee email, and/or an employee phone number. The Broker Administrator Employee Roster GUI is further operable to be filtered using the search input field and/or the FINRA CRD ID #input field.

FIG. 169 illustrates a Broker Administrator Employee History Detail GUI according to one embodiment of the present invention. The Broker Administrator Employee History Detail GUI includes, but is not limited to, an employee name, an employee position, an employee FINRA CRD ID #, an employee email address, an employee phone number, an employee picture, and/or a table containing a plurality of employee information including, but not limited to, employee deal historical data and/or employee licenses (e.g., date of licensing, other licenses, other licenses date(s)).

FIG. 170 illustrates a Broker Administrator Employee Licenses Detail GUI according to one embodiment of the present invention. The Broker Administrator Employee Licenses Detail GUI includes, but is not limited to, an employee name, an employee position, an employee FINRA CRD ID #, an employee email address, an employee phone number, an employee picture, and/or a table containing a plurality of employee information including, but not limited to, employee deal historical data and/or employee licenses.

FIG. 171 illustrates a Broker Administrator Report GUI according to one embodiment of the present invention. The Broker Administrator Report GUI includes, but is not limited to, a search input field, a deal status drop-down box, a Reset Filter GUI button, an Apply Filter GUI button, and/or a table containing a plurality of reports. Each of the plurality of reports includes, but is not limited to, a report name and/or a last run date. The Broker Administrator Report GUI is operable for filtering using the search input field and/or the deal status drop-down box.

Referring now to FIG. 172, a schematic diagram illustrating a cloud-based computing network used in one embodiment of the invention for interactions between user devices and a server computer of a tokenized securities offering entity is shown. As illustrated, components of the systems and methods include the following components and sub-components, all constructed and configured for network-based communication, and further including data processing and storage. As illustrated in FIG. 172, a basic schematic of some of the key components of a financial settlement system according to the present invention are shown. The system 200 comprises a server 210 with a processing unit 211. The server 210 is constructed, configured and coupled to enable communication over a network 250. The server provides for user interconnection with the server over the network using a personal computer (PC) 240 positioned remotely from the server, the personal computer having instructions 247. Furthermore, the system is operable for use with at least one or a multiplicity of remote computers, computing devices, or terminals 260, 270, having operating systems 269, 279 or software operable thereon. For example, a client/server architecture is shown. Alternatively, a user may interconnect through the network 250 using a user device such as a personal digital assistant (PDA), mobile communication device, or mobile computing device, such as by way of example and not limitation, a mobile phone, a cell phone, smart phone, tablet computer, laptop computer, wearable computing device, netbook, a terminal, or any other computing device suitable for network communication, whether wired or wireless. Also, alternative architectures may be used instead of the client/server architecture. For example, a PC network, or other suitable architecture may be used. The network 250 may be the Internet, an intranet, or any other network suitable for searching, obtaining, and/or using information and/or communications. The system of the present invention further includes an operating system 212 installed and running on the server 210, enabling server 210 to communicate through network 250 with the remote, distributed user devices. The operating system may be any operating system known in the art that is suitable for network communication as described hereinbelow. Data storage 220 may house an operating system 222, memory 224, and programs 226.

Additionally, or alternatively to FIG. 172, FIG. 173 is a schematic diagram of an embodiment of the invention illustrating a computer system and network, generally described as 800, having a network 810 and a plurality of computing devices 820, 830, 840. In one embodiment of the invention, the computer system 800 includes a cloud-based network 810 for distributed communication via the network's wireless communication antenna 812 and processing by a plurality of mobile communication computing devices 830. In another embodiment of the invention, the computer system 800 is a virtualized or cloud-based computing system capable of executing any or all aspects of software and/or application components presented herein on the computing devices 820, 830, 840. In certain aspects, the computer system 800 may be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of digital computers 820, 840, 850 and mobile devices 830, such as a server, blade server, mainframe, mobile phone, a personal digital assistant (PDA), a smart phone, a desktop computer, a netbook computer, a tablet computer, a workstation, a laptop, and other similar computing devices. The components shown here, their connections and relationships, and their functions, are meant to be exemplary only, and are not meant to limit implementations of the invention described and/or claimed in this document.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 may additionally include components such as a storage device 890 for storing the operating system 892 and one or more application programs 894, a network interface unit 896, and/or an input/output controller 898. Each of the components may be coupled to each other through at least one bus 868. The input/output controller 898 may receive and process input from, or provide output to, a number of other devices 899, including, but not limited to, alphanumeric input devices, mice, electronic styluses, display units, touch screens, signal generation devices (e.g., speakers) or printers.

By way of example, and not limitation, the processor 860 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown in FIG. 173, a computing device 840 may use multiple processors 860 and/or multiple buses 868, as appropriate, along with multiple memories 862 of multiple types (e.g., a combination of a DSP and a microprocessor, a plurality of microprocessors, one or more microprocessors in conjunction with a DSP core). Also, multiple computing devices may be connected via at least one network, with each device providing portions of the necessary operations (e.g., a server bank, a group of blade servers, or a multi-processor system). Alternatively, some steps or methods may be performed by circuitry that is specific to a given function.

According to various embodiments illustrated in FIG. 173, the computer system 800 may operate in a networked environment using logical connections to local and/or remote computing devices 820, 830, 840, 850 through a network 810. A computing device 830 may connect to a network 810 through a network interface unit 896 connected to the bus 868. Computing devices may communicate communication media through wired networks, direct-wired connections or wirelessly such as acoustic, RF or infrared through a wireless communication antenna 897 in communication with the network's wireless communication antenna 812 and the network interface unit 896, which may include digital signal processing circuitry when necessary. The network interface unit 896 may provide for communications under various modes or protocols.

In one or more exemplary aspects, the instructions may be implemented in hardware, software, firmware, or any combinations thereof. A computer readable medium may provide volatile or non-volatile storage for one or more sets of instructions, such as operating systems, data structures, program modules, applications or other data embodying any one or more of the methodologies or functions described herein. The computer readable medium illustrated in FIG. 173 may include the memory 862, the processor 860, and/or the storage media 890 and may be a single medium or multiple media (e.g., a centralized or distributed computer system) that store the one or more sets of instructions 900. Non-transitory computer readable media includes all computer readable media, with the sole exception being a transitory, propagating signal per se. The instructions 900 may further be transmitted or received over the network 810 via the network interface unit 896 as communication media, which may include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 illustrated in FIG. 173 include, but are not limited to, volatile and non-volatile media such as cache, RAM, ROM, EPROM, EEPROM, FLASH memory or other solid state memory technology, disks or discs (e.g., digital versatile disks (DVD), HD-DVD, BLU-RAY, compact disc (CD), CD-ROM, floppy disc) or other optical storage, magnetic cassettes, magnetic tape, magnetic disk storage or other magnetic storage devices, or any other medium that can be used to store the computer readable instructions and which can be accessed by the computer system 800.

It is also contemplated that the computer system 800 may not include all of the components shown in FIG. 173, may include other components that are not explicitly shown in FIG. 173, or may utilize an architecture completely different than that shown in FIG. 173. The various illustrative logical blocks, modules, elements, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

One or more communications protocols and/or methods for wired or wireless communications over the at least one network may be used with the present invention systems and methods.

The network-based communication can be wired or wireless using protocols such as, by way of example and not limitation, internet protocol (IP) including IPv4 and IPv6, cellular protocols 1G, 2G, 3G, 4G/LTE, and 5G, 802.11, ZIGBEE, BLUETOOTH, or others currently available or developed in the future. Also, by way of definition and description supporting the claimed subject matter, preferably, the present invention includes communication methodologies for messaging via a communication layer or for data transmission or communication over at least one network as described in the foregoing and in the following. IP-based communications over a network are most preferred for secure transmission, and for transmission of data having at least one of a security, a priority, a transport route, and content. Correspondingly, and consistent with the communication methodologies for transmitting or communicating data from the platform or at least one server, or within a closed system, as described hereinabove, according to the present invention, as used throughout this specification, figures and claims, the term ZIGBEE refers to any wireless communication protocol adopted by the Institute of Electronics & Electrical Engineers (IEEE) according to standard 802.15.4 or any successor standard(s), the term WI-FI refers to any communication protocol adopted by the IEEE under standard 802.11 or any successor standard(s), the term WIMAX refers to any communication protocol adopted by the IEEE under standard 802.16 or any successor standard (s), and the term BLUETOOTH refers to any short-range communication protocol implementing IEEE standard 802.15.1 or any successor standard(s). Additionally or alternatively to WIMAX, other communications protocols may be used, including but not limited to a "1G" wireless protocol such as analog wireless transmission, first generation standards based (IEEE, ITU or other recognized world communications standard), a "2G" standards based protocol such as "EDGE" or "CDMA 2000" also known as "1×RTT", a 3G based standard such as "High Speed Packet Access (HSPA) or Evolution for Data Only (EVDO), any accepted 4G standard such as IEEE, ITU standards that include WIMAX, Long Term Evolution "LTE" and its derivative standards, any Ethernet solution wireless or wired, or any proprietary wireless or power line carrier standards that communicate to a client device or any controllable device that sends and receives an IP-based message. The term "High Speed Packet Data Access (HSPA)" refers to any communication protocol adopted by the International Telecommunication Union (ITU) or another mobile telecommunications standards body referring to the evolution of the Global System for Mobile Communications (GSM) standard beyond its third generation Universal Mobile Telecommunications System (UMTS) protocols. The term "Long Term Evolution (LTE)" refers to any communication protocol adopted by the ITU or another mobile telecommunications standards body referring to the evolution of GSM-based networks to voice, video and data standards anticipated to be replacement protocols for HSPA. The term "Code Division Multiple Access (CDMA) Evolution Date-Optimized (EVDO) Revision A (CDMA EVDO Rev. A)" refers to the communication protocol adopted by the ITU under standard number TIA-856 Rev. A.

Certain modifications and improvements will occur to those skilled in the art upon a reading of the foregoing description. By way of example and not limitation, the description describes an immutable ledger-based platform for investment activity that is automatically managed by electronic smart contracts for at least one accredited investor. However, the SEC or other governing or regulatory authority, may provide for non-accredited participation in at least one investment opportunity, for which the platform would similarly function. In another example, while the description is focused on cryptocurrency illustrations, other currency equivalents may be provided for by the present invention. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:
1. A system for performing transactions of tokenized securities, comprising:
   an immutable ledger-based platform;
   a server computer for a tokenized securities offering entity; and
   at least one user device;
   wherein the immutable ledger-based platform is in network communication with the server computer for the tokenized securities offering entity and the at least one user device;
   wherein the immutable ledger-based platform facilitates a remote transaction of tokenized securities between at least one buyer and at least one seller;
   wherein the immutable ledger-based platform deploys tokenized securities contracts for the tokenized securities for the tokenized securities offering entity;
   wherein the tokenized securities contracts are smart contracts including at least one bundle of rights, wherein the at least one bundle of rights designates dynamic rights of shareholders and/or dynamic rights of an issuer of the tokenized securities;
   wherein each of the at least one bundle of rights designates at least one rights participant, at least one triggering participant, at least one triggering event, an acquiring method, a time to execute, and/or at least one participation limitation;
   wherein the server computer for the tokenized securities offering entity receives user input data from the at least one user device for registering to purchase at least one securities token;
   wherein the at least one triggering event for one or more of the at least one bundle of rights for at least one of the tokenized securities contracts includes the at least one user device registering to purchase the at least one securities token associated with the at least one of the tokenized securities contracts;
   wherein the at least one triggering event causes the immutable ledger-based platform to initiate at least one activity request to the at least one rights participant, wherein the at least one activity request is completed upon a designated action made by the at least one rights participant or inaction by the at least one rights participant for the time to execute;
   wherein the immutable ledger-based platform automatically initiates at least one second activity request upon completion of the at least one activity request in real time, wherein the at least one second activity request corresponds to a second bundle of rights; and
   wherein upon completion of all activity requests associated with each bundle of rights associated with all of the at least one securities token, the tokenized securities contracts associated with the at least one securities token are executed and the transaction is recorded on an immutable distributed ledger.

2. The system of claim 1, wherein the immutable ledger-based platform records the tokenized securities contracts for the transactions of the tokenized securities on the immutable distributed ledger.

3. The system of claim 1, wherein the at least one bundle of rights provides partial sales rights, fractional sales rights, co-sale rights, affiliate sales rights, bid rights, approval rights, offer rights, refusal rights, undersubscribed rights, closing rights, redemption of call rights, put rights, tag-along rights, drag-along rights, voting rights, transfer rights, liquidation rights, and/or custom rights.

4. The system of claim 1, wherein the at least one bundle of rights provides rules associated with a transfer window for the tokenized securities, wherein the transfer window represents a period of time during which the transactions of the tokenized securities are enabled through the immutable

89 ledger-based platform, and wherein the immutable ledger-based platform allows the transfer window to be viewed, paused, restarted, and/or terminated in real time.

5. The system of claim 1, wherein the at least one bundle of rights enables transfer of one or more of the at least one securities token between two or more shareholders, and wherein the two or more shareholders include the at least one buyer and the at least one seller.

6. The system of claim 1, wherein the at least one bundle of rights associated with a particular tokenized security persist following transactions of the particular tokenized security.

7. The system of claim 1, wherein the at least one activity request includes a document requirement, wherein the document requirement includes a requirement that a document is opened, read, and/or signed by the at least one user device or read by the at least one user device before the at least one activity request is completed.

8. The system of claim 1, wherein the at least one activity request is only able to be completed by a user device associated with a particular user profile that is not associated with the at least one buyer or the at least one seller.

9. The system of claim 1, wherein the immutable ledger-based platform allows the completion of multiple activity requests in parallel.

10. The system of claim 1, wherein the immutable distributed ledger includes at least one acyclic graph ledger, at least one quantum computing ledger, and/or at least one blockchain-based ledger.

11. The system of claim 1, wherein the immutable distributed ledger includes a valuation estimator interface, wherein the valuation estimator interface displays a range of estimated current valuation of the tokenized securities and/or the issuer of the tokenized securities and a range of estimated future valuation of the tokenized securities and/or the issuer of the tokenized securities based on a capitalization structure, transactional pricing, and a confidence level in the estimated current valuation and/or a confidence level in the estimated future valuation.

12. The system of claim 1, wherein the immutable distributed ledger includes a capitalization table interface, wherein the capitalization table interface displays information including at least one owner and at least one share class, wherein the information further includes a number of shares for each of the at least one owner in each of the at least one share class, a percentage of shares for each of the at least one owner in each of the at least one share class, and/or a total percentage of issued, outstanding, and/or fully diluted shares for each of the at least one owner, wherein the capitalization table interface provides for export of the information to a comma-separated values file, a spreadsheet file, or a database file, and wherein the capitalization table interface is updated in real time based on the transactions of the tokenized securities.

13. The system of claim 1, wherein the immutable ledger-based platform sends at least one message to the at least one user device, wherein the at least one message includes a notification about an upcoming event and/or actions available to the at least one user device.

14. The system of claim 1, wherein the immutable ledger-based platform sends at least one message to the at least one user device, wherein the at least one message includes at least one document and a response required indicator for the at least one document.

15. The system of claim 1, wherein the immutable ledger-based platform provides at least one poll question including at least one templated item to the at least one user device,

90 wherein the at least one templated item is uniquely constructed for the at least one user device based on ownership of the tokenized securities and profile data associated with the at least one user device.

16. The system of claim 1, wherein the immutable ledger-based platform provides at least one poll question, wherein each of the at least one poll question includes an expiration date and/or at least one poll response for the at least one poll question.

17. The system of claim 1, wherein the immutable ledger-based platform includes a vesting schedule interface, wherein the vesting schedule interface includes a timeline for vesting of the tokenized securities and a percentage of tokenized securities currently vested.

18. The system of claim 1, wherein the immutable ledger-based platform converts a first tokenized securities to a second tokenized securities, wherein conversion of the first tokenized securities to the second tokenized securities includes a trigger event for the conversion, at least one conversion option for the conversion, and a party that selects one of the at least one conversion option for the conversion.

19. The system of claim 1, wherein the transactions include a new issuance transaction, a tender offer transaction, a buy back transaction, an aggregate sale transaction, a secondary transaction, a liquidity transaction, and/or a conversion transaction.

20. The system of claim 1, wherein the immutable ledger-based platform includes an audit trail, wherein the audit trail includes a name of at least one activity, a description of the at least one activity, a status of the at least one activity, a date of the at least one activity, a time of the at least one activity, data related to the at least one activity, and/or a party who completed the at least one activity.

21. A system for performing transactions of tokenized securities, comprising:
   an immutable ledger-based platform;
   a server computer for a tokenized securities offering entity; and
   at least one user device;
   wherein the immutable ledger-based platform is in network communication with the server computer for the tokenized securities offering entity and the at least one user device;
   wherein the immutable ledger-based platform facilitates a remote transaction of tokenized securities between at least one buyer and at least one seller;
   wherein the immutable ledger-based platform deploys tokenized securities contracts for the tokenized securities for the tokenized securities offering entity;
   wherein the tokenized securities contracts are smart contracts including at least one bundle of rights, wherein the at least one bundle of rights designates dynamic rights of shareholders and/or dynamic rights of an issuer of the tokenized securities;
   wherein each of the at least one bundle of rights designates at least one rights participant, at least one triggering participant, at least one triggering event, an acquiring method, a time to execute, and at least one participation limitation;
   wherein the server computer for the tokenized securities offering entity receives user input data from the at least one user device for registering to purchase at least one securities token;
   wherein the at least one triggering event causes the immutable ledger-based platform to initiate at least one activity request to the at least one rights participant, wherein the at least one activity request is completed upon a designated action made by the at least one rights participant or inaction by the at least one rights participant for the time to execute;

wherein the at least one activity request includes a document requirement, wherein the document requirement includes a requirement that a document is opened, read, and/or signed by the at least one user device or read by the at least one user device before the at least one activity request is completed;

wherein upon completion of all activity requests associated with each bundle of rights associated with all of the at least one securities token, the tokenized securities contracts associated with the at least one securities token are executed and the transaction is recorded on an immutable distributed ledger; and wherein the immutable distributed ledger includes at least one acyclic graph ledger, at least one quantum computing ledger, or at least one blockchain-based ledger.

22. The system of claim 21, wherein the at least one bundle of rights enables transfer of one or more of the at least one securities token between two or more shareholders, and wherein the two or more shareholders include the at least one buyer and the at least one seller.

23. The system of claim 21, wherein the at least one bundle of rights provides partial sales rights, fractional sales rights, co-sale rights, affiliate sales rights, bid rights, approval rights, offer rights, refusal rights, undersubscribed rights, closing rights, redemption of call rights, put rights, tag-along rights, drag-along rights, voting rights, transfer rights, liquidation rights, and/or custom rights.

24. A system for performing transactions of tokenized securities, comprising:
an immutable ledger-based platform;
a server computer for a tokenized securities offering entity; and
at least one user device;
wherein the immutable ledger-based platform is in network communication with the server computer for the tokenized securities offering entity and the at least one user device;
wherein the immutable ledger-based platform facilitates a remote transaction of tokenized securities between at least one buyer and at least one seller;
wherein the immutable ledger-based platform deploys tokenized securities contracts for the tokenized securities for the tokenized securities offering entity;
wherein the tokenized securities contracts are smart contracts including at least one bundle of rights, wherein the at least one bundle of rights designates dynamic rights of shareholders and/or dynamic rights of an issuer of the tokenized securities;
wherein each of the at least one bundle of rights designates at least one rights participant, at least one triggering participant, at least one triggering event, an acquiring method, a time to execute, and/or at least one participation limitation;
wherein the server computer for the tokenized securities offering entity receives user input data from the at least one user device for registering to purchase at least one securities token;
wherein the at least one triggering event for one or more of the at least one bundle of rights for at least one of the tokenized securities contracts includes the at least one user device registering to purchase the at least one securities token associated with the at least one of the tokenized securities contracts;

wherein the at least one triggering event causes the immutable ledger-based platform to initiate at least one activity request to the at least one rights participant, wherein the at least one activity request is completed upon a designated action made by the at least one rights participant or inaction by the at least one rights participant for the time to execute;

wherein the immutable ledger-based platform automatically initiates at least one second activity request upon completion of the at least one activity request in real time, wherein the at least one second activity request corresponds to a second bundle of rights;

wherein the immutable ledger-based platform alerts at least one offline user in real time when participation becomes available for the at least one offline user upon completion of at least one completed activity request; and wherein upon completion of all activity requests associated with each bundle of rights associated with all of the at least one securities token, the tokenized securities contracts associated with the at least one securities token are executed and the transaction is recorded on an immutable distributed ledger.

25. The system of claim 24, wherein the immutable ledger-based platform provides a trustee account or a centralized wallet to facilitate transactions with fiat currencies and non-accepted cryptocurrencies.

26. The system of claim 24, wherein the tokenized securities contracts comprise at least one proxy contract, at least one escrow contract, and/or at least one aggregate contract.

27. The system of claim 24, wherein the server computer sends a link to documents related to the at least one securities token to the at least one user device; and wherein the immutable ledger-based securities token platform receives confirmation through use of at least one watermark that the documents have been downloaded by the at least one user device.

28. A method for performing transactions of tokenized securities, comprising:
providing an immutable ledger-based platform, a server computer for a tokenized securities offering entity, and at least one user device;
wherein the immutable ledger-based platform is in network communication with the server computer for the tokenized securities offering entity and the at least one user device;
the immutable ledger-based platform constructing and deploying tokenized securities contracts for tokenized securities on the immutable ledger-based platform;
wherein the tokenized securities contracts are smart contracts including at least one bundle of rights, wherein the at least one bundle of rights designates, dynamic rights of shareholders and/or dynamic rights of an issuer of the tokenized securities;
the server computer for the tokenized securities offering entity receiving user input data from the at least one user device for registering to purchase at least one securities token;
the immutable ledger-based platform initiating at least one activity request to at least one rights participant in response to at least one triggering event, wherein the at least one activity request is completed upon a designated action made by the at least one rights participant or inaction by the at least one rights participant for a time to execute;
the immutable ledger-based platform automatically initiating at least one second activity request upon completion of the at least one activity request in real time, wherein the at least one second activity request corresponds to a second bundle of rights;

the tokenized securities contracts associated with the at least one securities token automatically executing upon completion of all activity requests associated with each bundle of rights associated with all of the at least one securities token; and recording the execution of the tokenized securities contracts and transfer of the at least one securities token on an immutable distributed ledger.

29. The method of claim 28, wherein the at least one bundle of rights represents rules associated with a transfer window for the tokenized securities, wherein the transfer window represents a period of time during which the transactions of the tokenized securities are enabled through the immutable ledger-based platform, and further comprising the immutable ledger-based platform pausing the transfer window, restarting the transfer window, and/or terminating the transfer window in real time based upon the immutable ledger-based platform receiving an edit to one or more of the at least one bundle of rights and/or receiving an addition of at least one additional bundle of rights.

30. The method of claim 28, wherein the tokenized securities offered by the tokenized securities offering entity are Blockchain Instrument for Transferrable Equity (BITE) tokens, wherein the BITE tokens represent common stock, preferred stock, options, warrants, convertible notes, and/or restricted stock units.

* * * * *